US009452685B2

(12) United States Patent
Hyde et al.

(10) Patent No.: US 9,452,685 B2
(45) Date of Patent: Sep. 27, 2016

(54) DWELLING RELATED INFORMATION CENTER ASSOCIATED WITH COMMUNICATION AND CONTROL SYSTEM AND METHOD FOR WIRELESS ELECTRIC VEHICLE ELECTRICAL ENERGY TRANSFER

(71) Applicant: Elwha LLC, Bellevue, WA (US)

(72) Inventors: Roderick A. Hyde, Redmond, WA (US); Jordin T. Kare, Seattle, WA (US); Richard T. Lord, Gig Harbor, WA (US); Robert W. Lord, Seattle, WA (US); Clarence T. Tegreene, Mercer Island, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 332 days.

(21) Appl. No.: 14/145,225

(22) Filed: Dec. 31, 2013

(65) Prior Publication Data
US 2015/0091531 A1    Apr. 2, 2015

Related U.S. Application Data

(63) Continuation-in-part of application No. 14/041,443, filed on Sep. 30, 2013, and a continuation-in-part of application No. 14/086,903, filed on Nov. 21, 2013, and a continuation-in-part of application No.
(Continued)

(51) Int. Cl.
*B60L 11/18*    (2006.01)
*G05B 19/042*    (2006.01)
(Continued)

(52) U.S. Cl.
CPC .......... *B60L 11/182* (2013.01); *B60L 11/1824* (2013.01); *B60L 11/1848* (2013.01);
(Continued)

(58) Field of Classification Search
CPC .............. B60L 11/182; B60L 11/1824; B60L 11/1848; G05B 19/042; G06Q 10/0631; G06Q 10/0639; G06Q 10/105; H04L 41/22; H04L 67/10; H04L 67/125
USPC ......... 711/149, 156; 320/108, 109, 107, 137
See application file for complete search history.

(56) References Cited

U.S. PATENT DOCUMENTS

| 4,102,273 A | 7/1978 | Merkle et al. |
| 5,202,617 A | 4/1993 | Nor |

(Continued)

FOREIGN PATENT DOCUMENTS

| JP | 2009/106136 A | 5/2009 |
| JP | 2010/246271 A | 10/2010 |

(Continued)

OTHER PUBLICATIONS

"Computer," located https://web.archive.org/20120621082412/http://en.wikipedia.org/wiki/Computer; bearing a date of Sep. 26, 2015; pp. 1-19; Wikipedia.

(Continued)

*Primary Examiner* — Stephen Elmore

(57) ABSTRACT

A computationally implemented system and method that is designed to, but is not limited to: electronically processing status related intake associated at least in part with one or more electric vehicle recharging affairs for one or more electric vehicles by wireless electrical energy transfer affiliated at least in part with one or more dwelling associates of at least in part one or more dwelling related areas. In addition to the foregoing, other method aspects are described in the claims, drawings, and text forming a part of the present disclosure.

41 Claims, 65 Drawing Sheets

Related U.S. Application Data

14/092,082, filed on Nov. 27, 2013, now Pat. No. 9,199,549, and a continuation-in-part of application No. 14/089,513, filed on Nov. 25, 2013, and a continuation-in-part of application No. 14/092,306, filed on Nov. 27, 2013, and a continuation-in-part of application No. 14/091,702, filed on Nov. 27, 2013, now Pat. No. 9,199,548, and a continuation-in-part of application No. 14/092,126, filed on Nov. 27, 2013, now Pat. No. 9,205,754, and a continuation-in-part of application No. 14/133,382, filed on Dec. 18, 2013, and a continuation-in-part of application No. 14/136,143, filed on Dec. 20, 2013, now abandoned, and a continuation of application No. 14/144,203, filed on Dec. 30, 2013, and a continuation-in-part of application No. 14/145,137, filed on Dec. 31, 2013, and a continuation-in-part of application No. 14/145,178, filed on Dec. 31, 2013, and a continuation-in-part of application No. 14/145,069, filed on Dec. 31, 2013, and a continuation-in-part of application No. 14/145,264, filed on Dec. 31, 2013.

(51) Int. Cl.
| | |
|---|---|
| *G06Q 10/06* | (2012.01) |
| *G06Q 10/10* | (2012.01) |
| *H04L 12/24* | (2006.01) |
| *H04L 29/08* | (2006.01) |

(52) U.S. Cl.
CPC ......... *G05B19/042* (2013.01); *G06Q 10/0631* (2013.01); *G06Q 10/0639* (2013.01); *G06Q 10/105* (2013.01); *H04L 41/22* (2013.01); *H04L 67/10* (2013.01); *H04L 67/125* (2013.01); *G05B 2219/23189* (2013.01)

(56) References Cited

U.S. PATENT DOCUMENTS

| | | | |
|---|---|---|---|
| 5,283,513 A | 2/1994 | Fujita et al. | |
| 5,349,535 A | 9/1994 | Gupta | |
| 5,585,205 A | 12/1996 | Kohchi | |
| 5,594,318 A | 1/1997 | Nor et al. | |
| 5,656,916 A | 8/1997 | Hotta | |
| 5,821,731 A | 10/1998 | Kuki et al. | |
| 5,842,534 A * | 12/1998 | Frank | B60K 6/48 180/65.25 |
| 5,927,938 A | 7/1999 | Hammerslag | |
| 5,951,229 A | 9/1999 | Hammerslag | |
| 5,952,813 A | 9/1999 | Ochiai | |
| 5,998,963 A | 12/1999 | Aarseth | |
| 6,116,363 A * | 9/2000 | Frank | B60K 6/48 180/65.25 |
| 6,164,204 A | 12/2000 | Kawada et al. | |
| 6,218,796 B1 | 4/2001 | Kozlowski | |
| 6,614,204 B2 | 9/2003 | Pellegrino et al. | |
| 6,934,603 B1 | 8/2005 | Kochanneck | |
| 7,201,384 B2 | 4/2007 | Chaney | |
| 7,602,143 B2 | 10/2009 | Capizzo | |
| 9,000,721 B2 * | 4/2015 | Hernandez | B60L 11/1824 307/10.1 |
| 9,140,763 B2 * | 9/2015 | Gilchrist | G01R 31/40 |
| 9,199,548 B2 * | 12/2015 | Hyde | B60L 11/1848 |
| 9,199,549 B2 * | 12/2015 | Hyde | B60L 11/1848 |
| 9,205,754 B2 * | 12/2015 | Hyde | B60L 11/1848 |
| 9,302,594 B2 | 4/2016 | Tripathi et al. | |
| 2004/0121645 A1 | 6/2004 | Postrel | |
| 2004/0142733 A1 | 7/2004 | Parise | |
| 2005/0002263 A1 | 1/2005 | Iwase et al. | |
| 2008/0039980 A1 | 2/2008 | Pollack et al. | |
| 2008/0040223 A1 | 2/2008 | Bridges et al. | |
| 2008/0040296 A1 | 2/2008 | Bridges et al. | |
| 2008/0040479 A1 | 2/2008 | Bridge et al. | |
| 2008/0052026 A1 | 2/2008 | Amidon et al. | |
| 2008/0052145 A1 | 2/2008 | Kaplan et al. | |
| 2008/0258682 A1 | 10/2008 | Li | |
| 2009/0043520 A1 | 2/2009 | Pollack et al. | |
| 2009/0066287 A1 | 3/2009 | Pollack et al. | |
| 2010/0017249 A1 | 1/2010 | Fincham et al. | |
| 2010/0145717 A1 | 6/2010 | Hoeltzel | |
| 2010/0300323 A1 | 12/2010 | Ennis | |
| 2011/0029168 A1 * | 2/2011 | Talberg | B60K 6/48 701/22 |
| 2011/0055098 A1 | 3/2011 | Stewart | |
| 2011/0057816 A1 | 3/2011 | Noble et al. | |
| 2011/0123309 A1 | 5/2011 | Berdelle-Hilge et al. | |
| 2011/0153193 A1 | 6/2011 | Fox et al. | |
| 2011/0156652 A1 | 6/2011 | Kishiyama et al. | |
| 2011/0202216 A1 | 8/2011 | Thai-Tang et al. | |
| 2011/0282527 A1 | 11/2011 | Inbarajan et al. | |
| 2011/0303509 A1 | 12/2011 | Agassi et al. | |
| 2012/0109519 A1 | 5/2012 | Uyeki | |
| 2012/0153894 A1 | 6/2012 | Widmer | |
| 2012/0161696 A1 | 6/2012 | Cook et al. | |
| 2012/0181973 A1 * | 7/2012 | Lyden | B60L 11/182 320/101 |
| 2012/0233077 A1 | 9/2012 | Tate, Jr. et al. | |
| 2012/0245750 A1 | 9/2012 | Paul et al. | |
| 2012/0296678 A1 | 11/2012 | Boot et al. | |
| 2012/0303257 A1 | 11/2012 | Ichihara | |
| 2012/0331301 A1 | 12/2012 | Outwater et al. | |
| 2013/0002197 A1 * | 1/2013 | Hernandez | B60L 11/1824 320/109 |
| 2013/0020864 A1 * | 1/2013 | Smajlovic | B60H 1/00428 307/9.1 |
| 2013/0024059 A1 | 1/2013 | Miller et al. | |
| 2013/0029595 A1 * | 1/2013 | Widmer | H04B 5/0031 455/39 |
| 2013/0033227 A1 | 2/2013 | Gibbons, Jr. | |
| 2013/0041531 A1 | 2/2013 | LaFrance | |
| 2013/0093393 A1 | 4/2013 | Shimotani et al. | |
| 2013/0106346 A1 | 5/2013 | Salter et al. | |
| 2013/0110296 A1 | 5/2013 | Khoo et al. | |
| 2013/0132270 A1 | 5/2013 | Cheung et al. | |
| 2013/0154553 A1 | 6/2013 | Steele | |
| 2013/0162025 A1 * | 6/2013 | Momose | B60L 11/1862 307/9.1 |
| 2013/0175974 A1 | 7/2013 | Bassham et al. | |
| 2013/0184882 A1 * | 7/2013 | Momose | B60L 11/1838 700/286 |
| 2013/0214738 A1 | 8/2013 | Chen et al. | |
| 2013/0218402 A1 | 8/2013 | Hoshihara et al. | |
| 2013/0249477 A1 | 9/2013 | Keeling et al. | |
| 2014/0002015 A1 * | 1/2014 | Tripathi | B60L 11/182 320/108 |
| 2014/0006137 A1 | 1/2014 | Melen et al. | |
| 2014/0012448 A1 | 1/2014 | Tripathi et al. | |
| 2014/0021908 A1 | 1/2014 | McCool et al. | |
| 2014/0035526 A1 | 2/2014 | Tripathi et al. | |
| 2014/0070764 A1 | 3/2014 | Keeling | |
| 2014/0103866 A1 | 4/2014 | Kothavale et al. | |
| 2014/0111151 A1 | 4/2014 | Keeling et al. | |
| 2014/0132210 A1 * | 5/2014 | Partovi | H02J 5/005 320/108 |
| 2014/0203768 A1 | 7/2014 | Andic et al. | |
| 2014/0203769 A1 | 7/2014 | Keeling et al. | |
| 2014/0232331 A1 | 8/2014 | Stamenic et al. | |
| 2014/0333256 A1 | 11/2014 | Widmer et al. | |
| 2014/0347018 A1 | 11/2014 | Boblett et al. | |
| 2014/0379183 A1 | 12/2014 | Long | |
| 2015/0077046 A1 | 3/2015 | Huang et al. | |
| 2015/0077053 A1 | 3/2015 | Stamenic et al. | |
| 2015/0084588 A1 | 3/2015 | Covic et al. | |
| 2015/0091503 A1 * | 4/2015 | Hyde | B60L 11/1803 320/108 |

(56) References Cited

U.S. PATENT DOCUMENTS

| | | | |
|---|---|---|---|
| 2015/0091504 A1* | 4/2015 | Hyde | B60L 11/1848 320/108 |
| 2015/0091505 A1* | 4/2015 | Hyde | B60L 11/1848 320/108 |
| 2015/0091506 A1* | 4/2015 | Hyde | B60L 11/1848 320/108 |
| 2015/0091507 A1* | 4/2015 | Hyde | B60L 11/1824 320/108 |
| 2015/0094887 A1 | 4/2015 | Kawashima | |
| 2015/0094888 A1 | 4/2015 | Hyde et al. | |
| 2015/0095114 A1 | 4/2015 | Hyde et al. | |
| 2015/0177302 A1 | 6/2015 | Lu et al. | |

FOREIGN PATENT DOCUMENTS

| | | |
|---|---|---|
| JP | 2013/034323 A | 2/2013 |
| WO | WO 2009/113268 A1 | 9/2009 |
| WO | WO 2011/037322 A2 | 3/2011 |

OTHER PUBLICATIONS

PCT International Search Report; International App. No. PCT/US2014/066785; Mar. 16, 2015; pp. 1-4.

"CD-ROM," located at https://web.archive.org/web/20040408210937/http://en.wikipedia.org/wiki/CD-ROM; bearing a date of Dec. 30, 2015; pp. 1-2; Wikipedia.

* cited by examiner

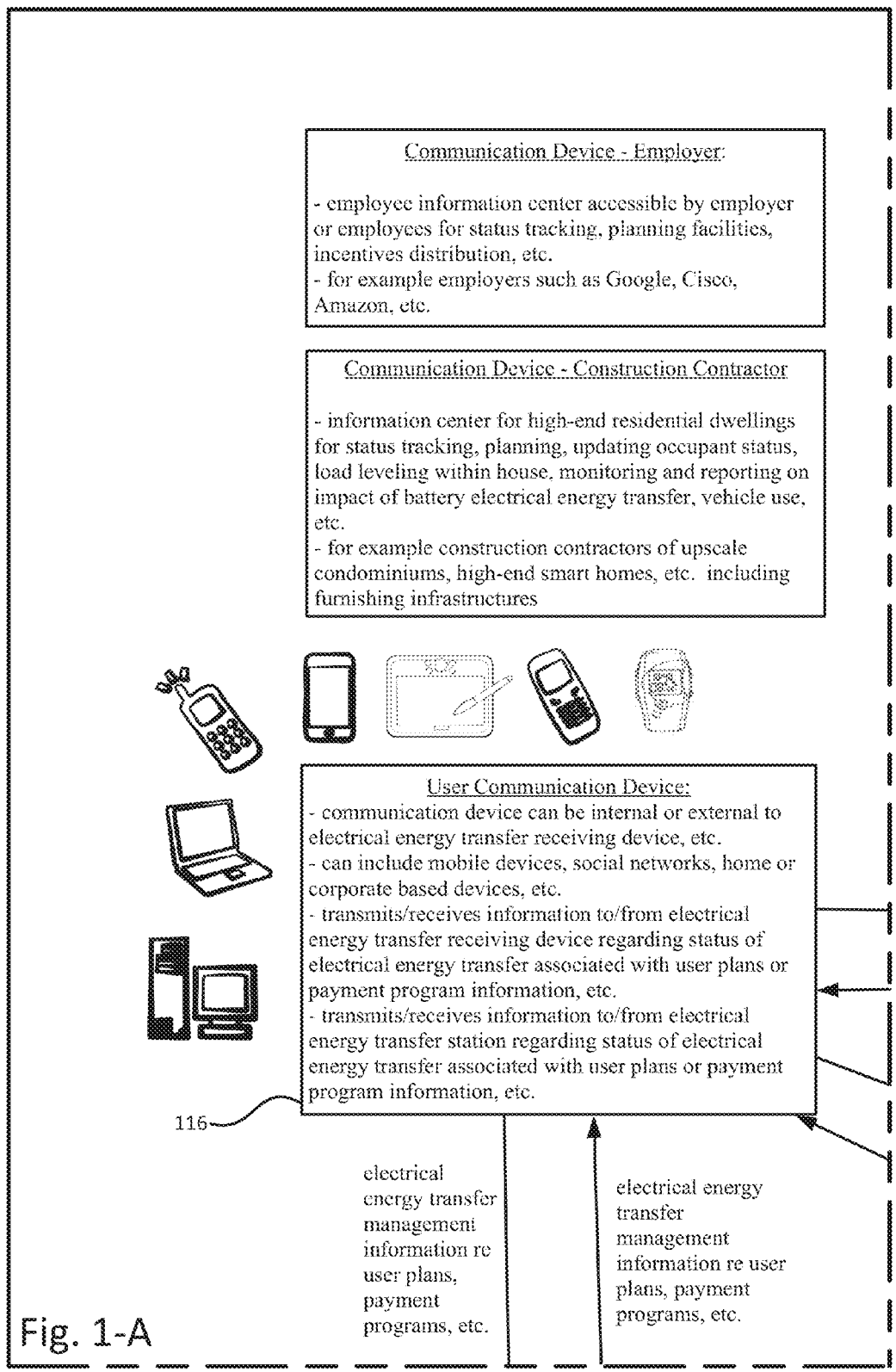
Fig. 1-A

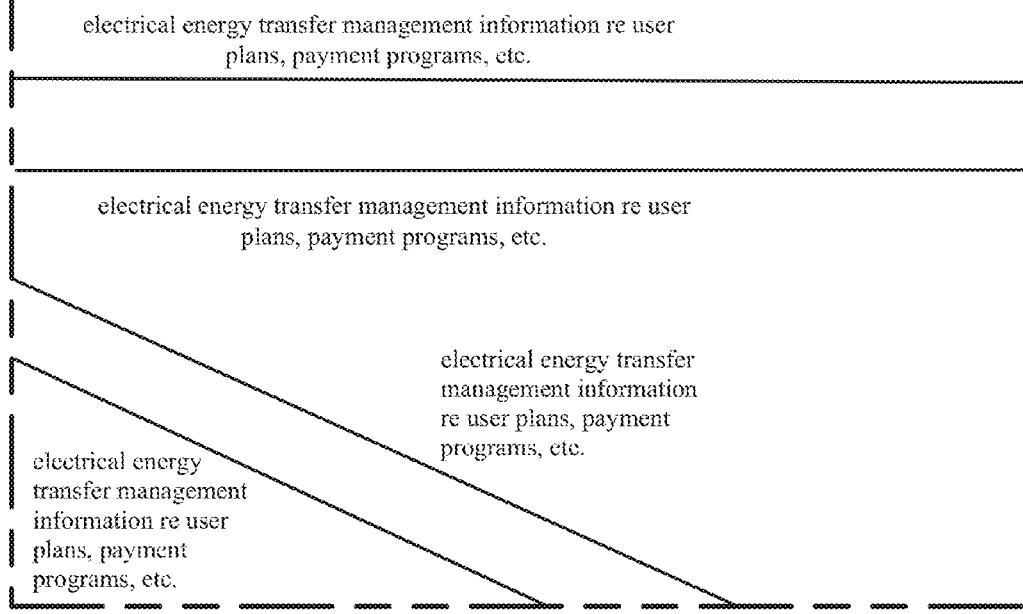
Fig. 1-B

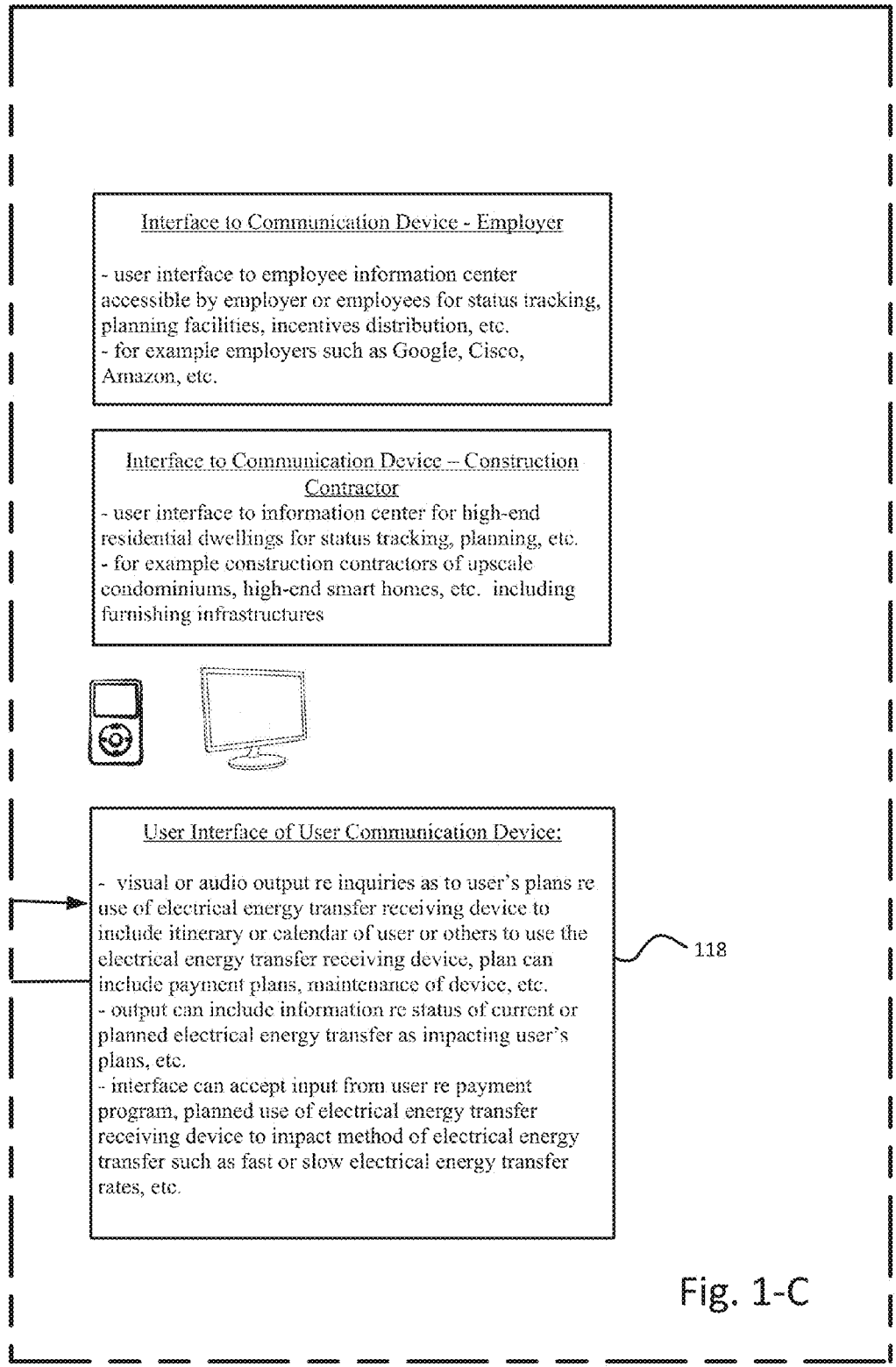
Fig. 1-C

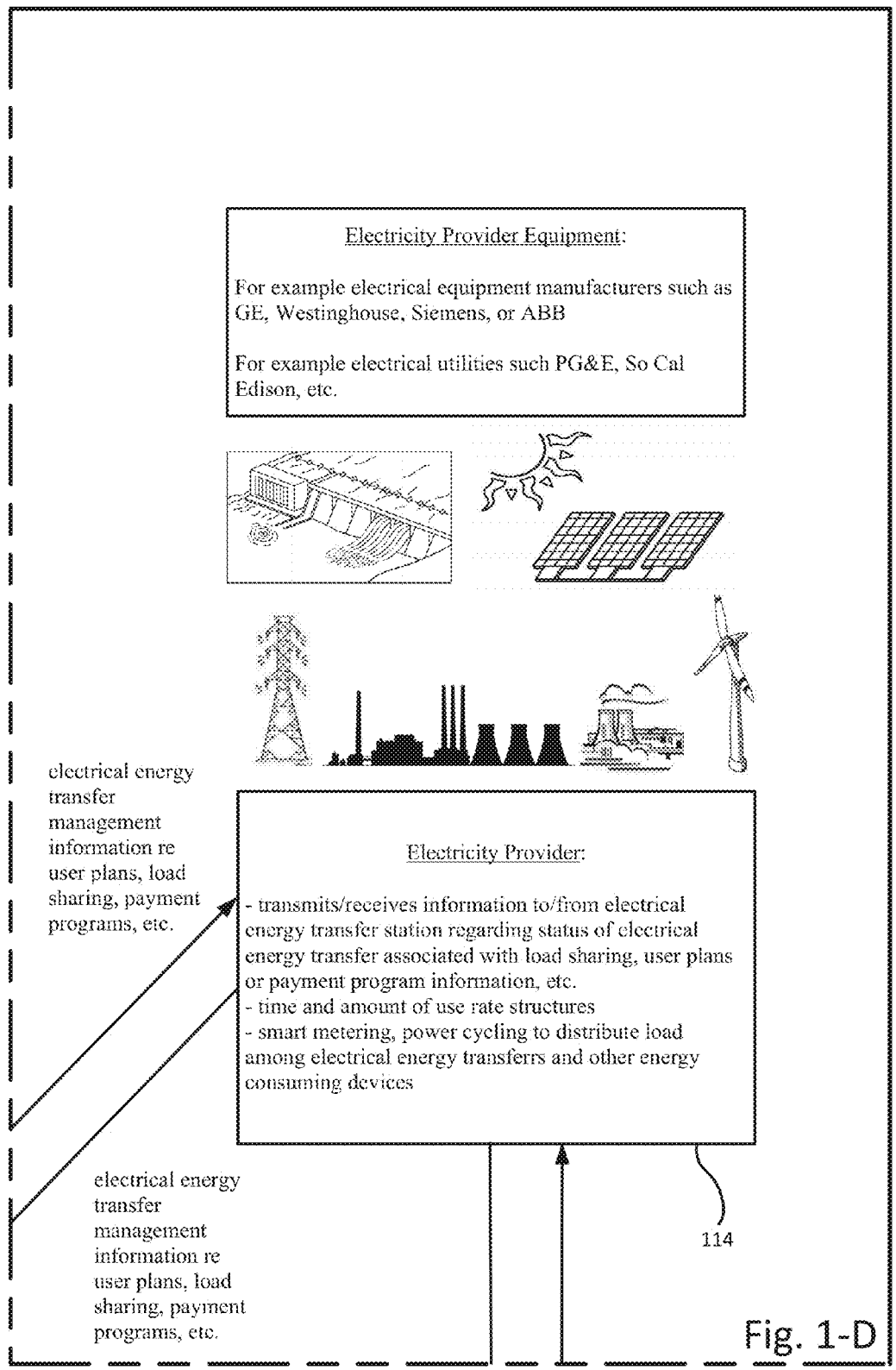
Fig. 1-D

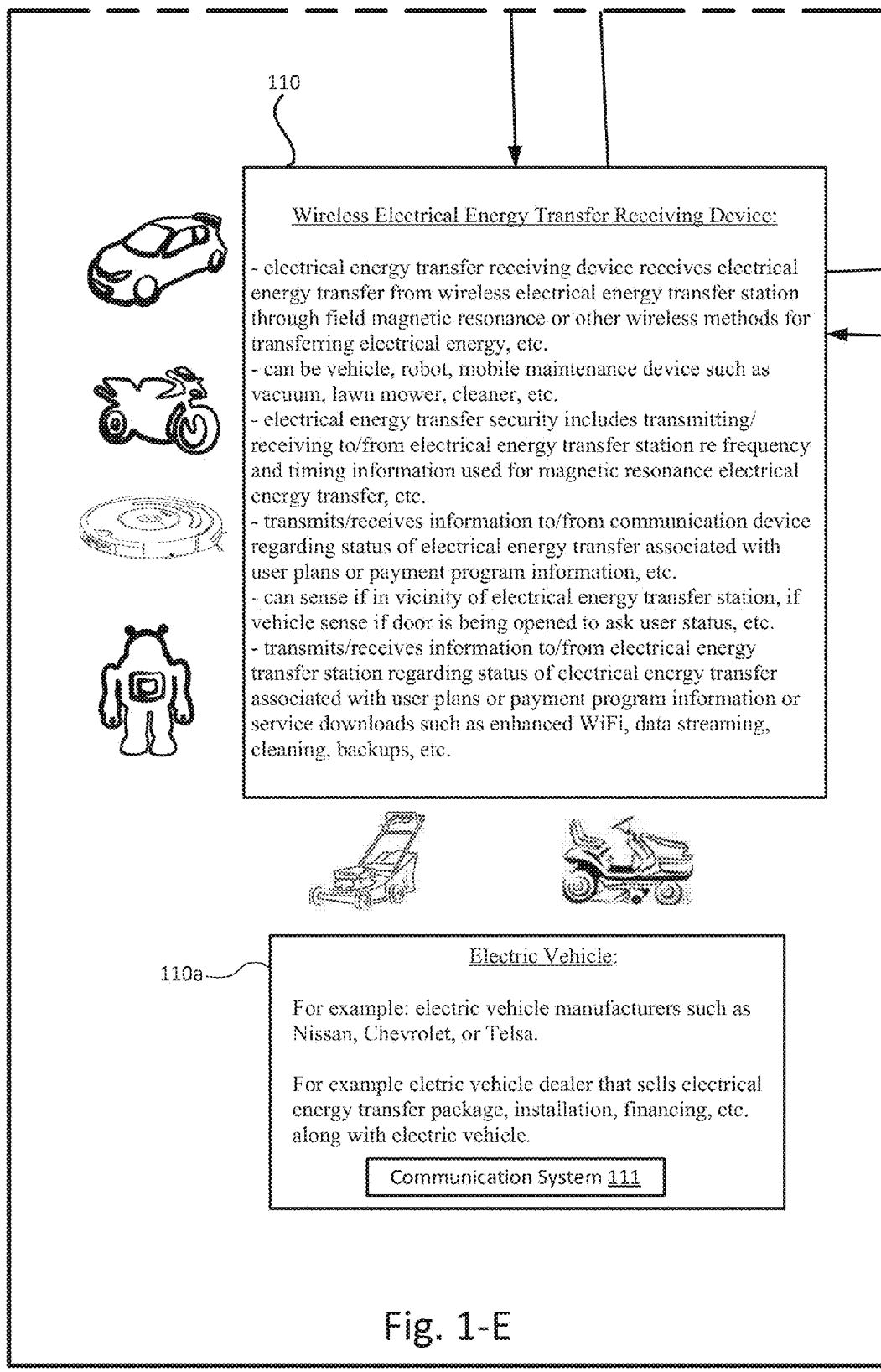
Fig. 1-E electrical energy transfer management information re frequency
security, user plans, load sharing, payment programs, etc.
electrical energy transfer management information re
frequency security, user plans, load sharing, payment
programs, etc.
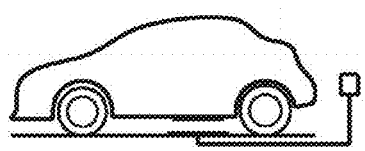
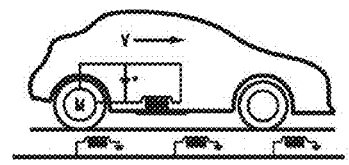
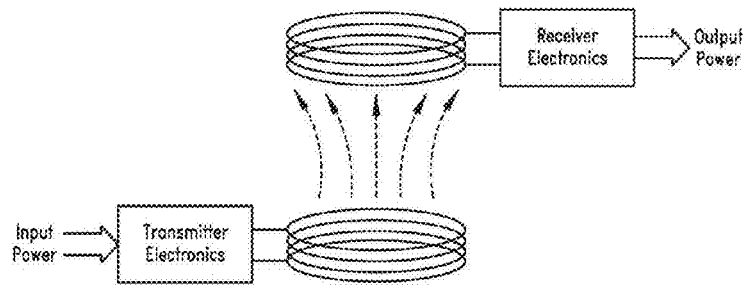
Fig. 1-F

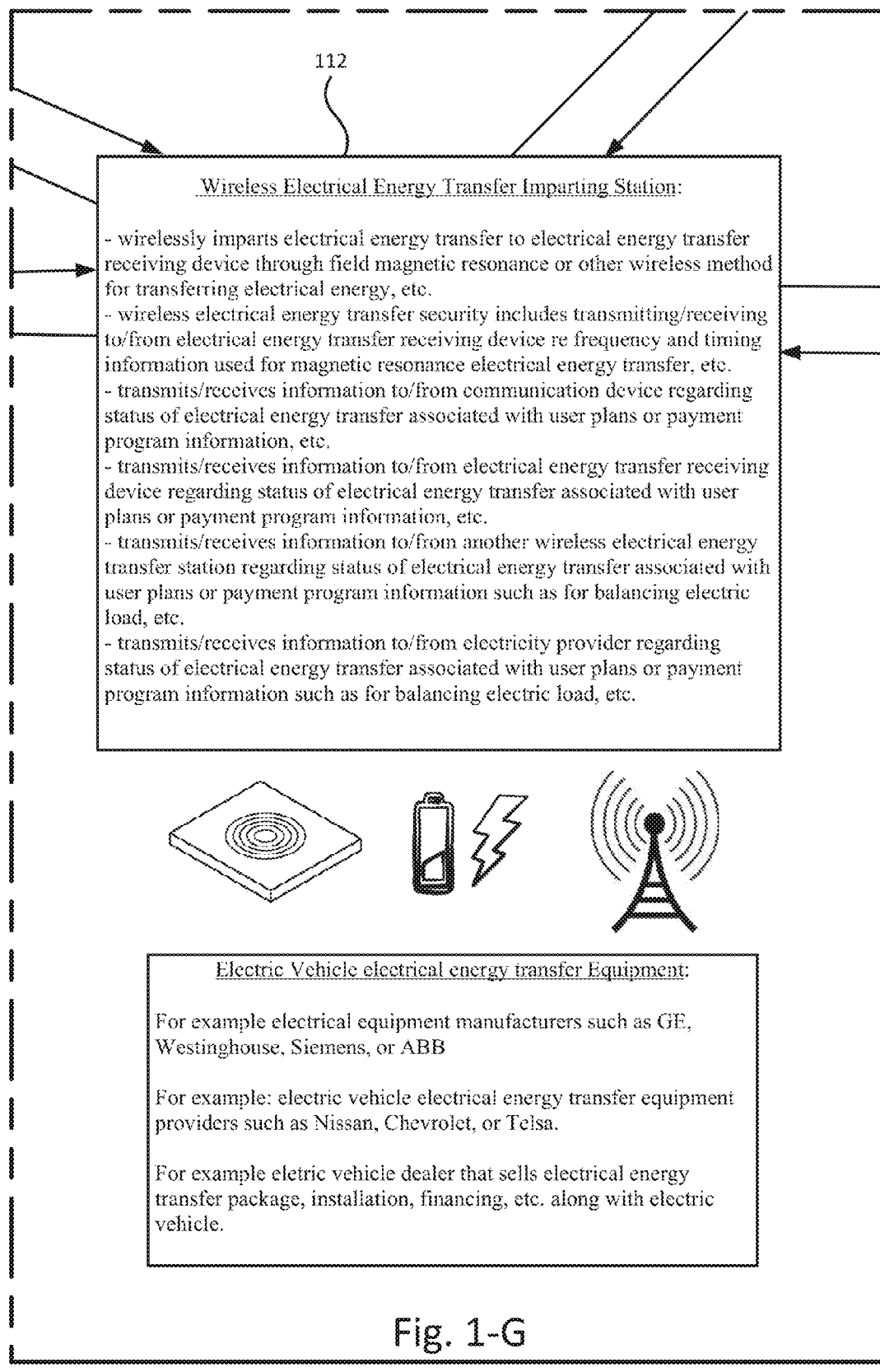
Fig. 1-G

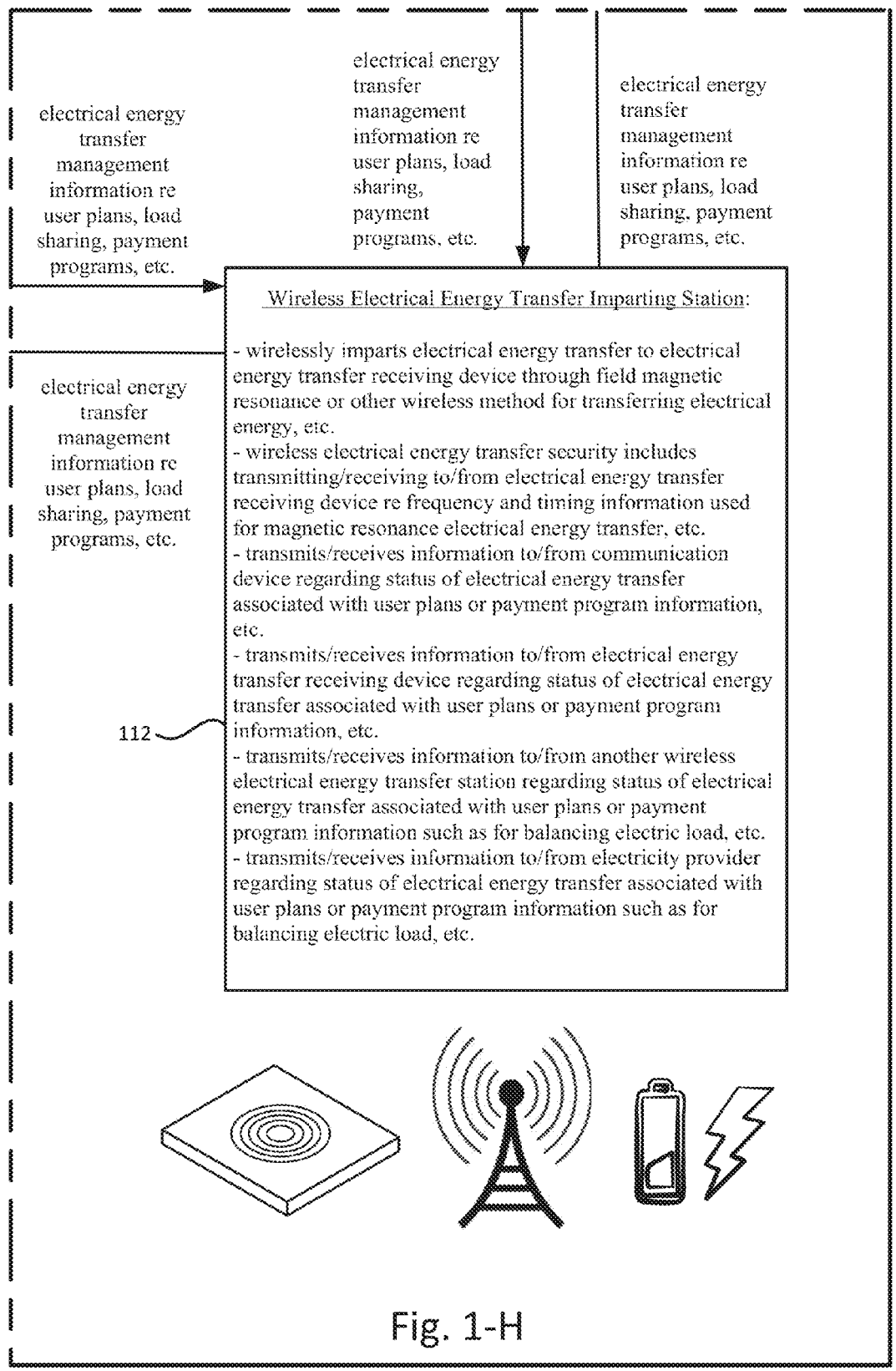
Fig. 1-H

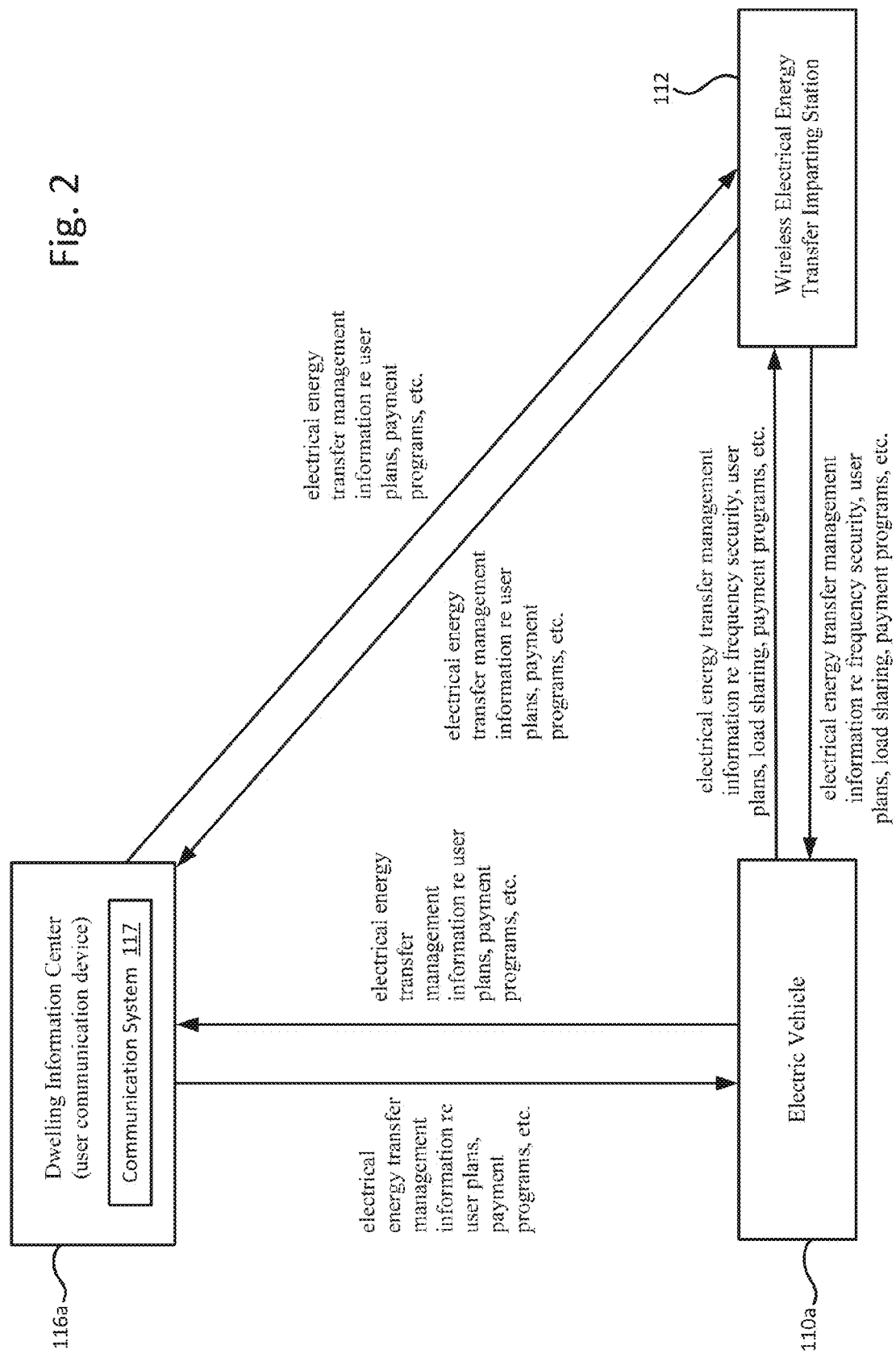

m11 electronically processing status related intake associated with electric vehicle recharging affairs for electric vehicles by wireless electrical energy transfer affiliated with dwelling associates of dwelling related areas module m1101 processing status related intake involving activity associated with electric vehicle user dwelling associates module m1102 processing status related intake involving contactless smart card systems associated with on electric vehicles module m1103 processing status related intake involving manual entering of data involving keypads module m1104 processing status related intake involving direct text entry module m1105 processing status related intake involving dwelling associates speaking in reply to sound input systems module m1106 processing status related intake regarding dwelling associate uses of electric vehicles module m1107 processing status related intake involving processing terrain or traffic information regarding routes of travel for the electric vehicles taken by dwelling associates module m1108 processing status related intake involving processing commuter routing information for dwelling associates using electric vehicles module m1109 processing status related intake involving processing trip advisory information regarding routes of travel for the electric vehicles used by the dwelling associates module m1110 processing status related intake involving processing information regarding alternative modes of transportation along routes of travel of electric vehicles for the dwelling associates module m1111 processing status related intake involving processing information regarding periods in which the electric vehicles will be unavailable for use by the dwelling associates module

Fig. 5-A m11 electronically processing status related intake associated with electric vehicle recharging affairs for electric vehicles by wireless electrical energy transfer affiliated with dwelling associates of dwelling related areas module m1101 processing status related intake involving activity associated with electric vehicle user dwelling associates module m1106 processing status related intake regarding dwelling associate uses of electric vehicles module m1112 processing status related intake involving processing information regarding planned errands to be run by dwelling associates with electric vehicles module m1113 processing status related intake involving processing information regarding commercial delivery schedules driven by dwelling associates utilizing electric vehicles module m1114 processing status related intake involving processing information regarding regulated uses by dwelling associates of electric vehicles module m1115 processing status related intake involving processing information regarding ad hoc use by dwelling associates of electric vehicles module m1116 processing status related intake involving processing information regarding driving habits of dwelling associates associated with driving electric vehicles module m1117 processing status related intake involving processing information regarding itineraries associated with use of electric vehicles by dwelling associates module m1118 processing status related intake involving processing information regarding weather forecasts associated with travel involving use by dwelling associates of electric vehicles module m1119 processing status related intake involving processing information regarding news broadcasts associated with travel involving use of electric vehicles by dwelling associates module

Fig. 5-B

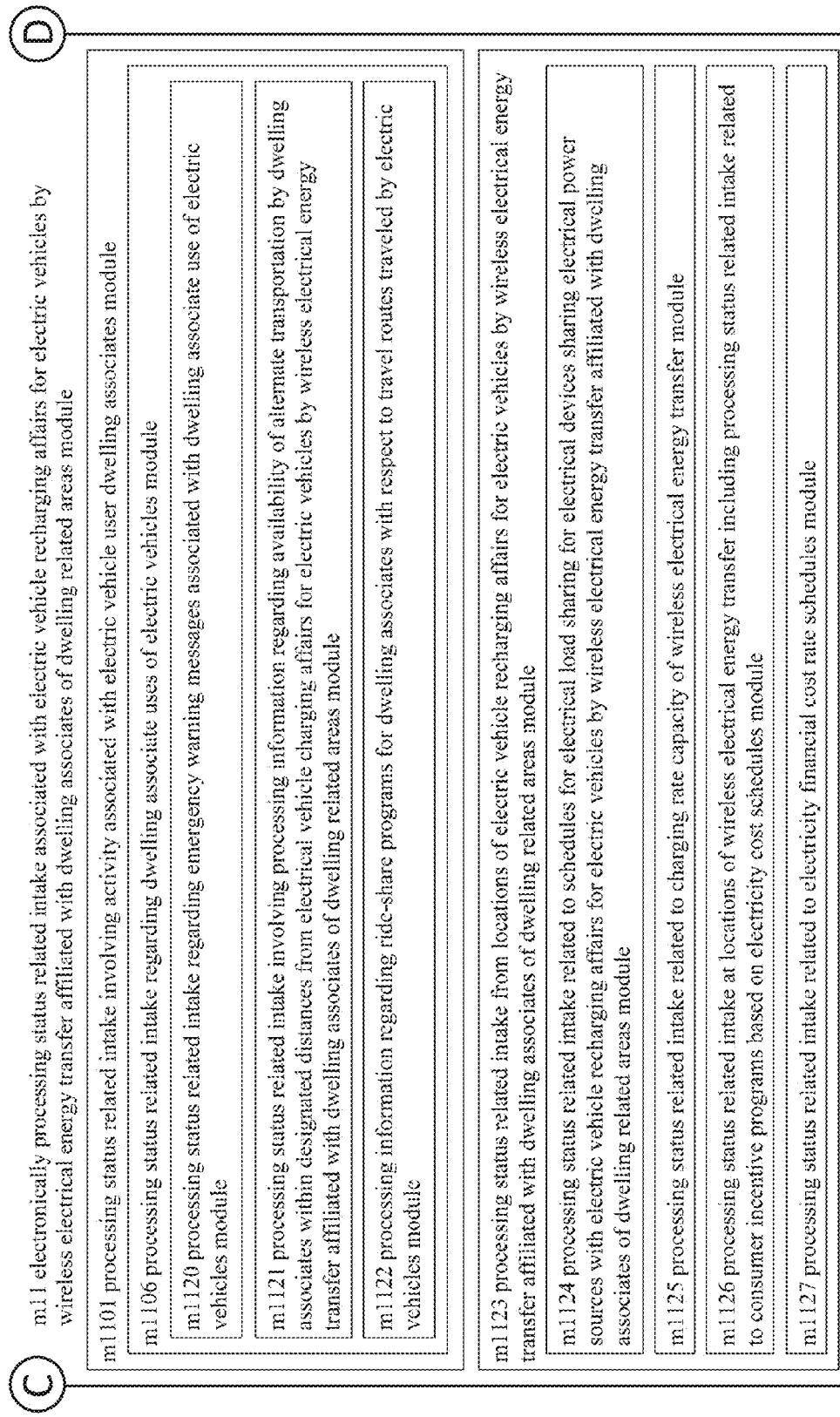
Fig. 5-C m11 electronically processing status related intake associated with electric vehicle recharging affairs for electric vehicles by wireless electrical energy transfer affiliated with dwelling associates of dwelling related areas module m1123 processing status related intake from locations of electric vehicle recharging affairs for electric vehicles by wireless electrical energy transfer affiliated with dwelling associates of dwelling related areas module m1128 processing status related intake related to electricity load share capacity schedules module m1129 processing status related intake related to electric utility capacity information involving communication channels of wireless electrical energy transfer module m1130 processing status related intake related to electrical energy charging appointments reserved for electrical vehicles other than electric vehicles module m1131 processing status related intake related to maximum charging rate capacities of wireless electrical energy transfer module m1132 processing status related intake related to cost information for priority handling of wireless electrical energy transfer for electric vehicles module m1133 processing status related intake from locations of electric vehicle recharging affairs for electric vehicles by wireless electrical energy transfer affiliated with dwelling associates of dwelling related areas including processing status related intake related to wireless electrical energy transfer availability schedules for electric vehicles module m1134 processing status related intake from locations of electric vehicle recharging affairs for electric vehicles by wireless electrical energy transfer affiliated with dwelling associates of dwelling related areas including processing status related intake related to histories of electrical energy consumption by wireless electrical energy transfer module m1135 processing status related intake from locations of electric vehicle recharging affairs for electric vehicles by wireless electrical energy transfer affiliated with dwelling associates of dwelling related areas including processing status related intake related to electricity use data involving remote reporting from electric utility databases module

- m11 electronically processing status related intake associated with electric vehicle recharging affairs for electric vehicles by wireless electrical energy transfer affiliated with dwelling associates of dwelling related areas module
  - m1123 processing status related intake from locations of electric vehicle recharging affairs for electric vehicles by wireless electrical energy transfer affiliated with dwelling associates of dwelling related areas module
  - m1136 processing status related intake related to peak demand and reserve capacity of wireless electrical energy transfer module
  - m1137 processing status related intake related to communication with electric utility smart grid information systems with updates regarding electricity consumption from electric utility databases module
  - m1138 processing status related intake related to priority classification for electric vehicle charging scheduling requests of wireless electrical energy transfer module
  - m1139 processing status related intake related to dwelling associate profile classifications module
  - m1140 processing status related intake related to electrical energy use of associated local grid electrical energy provider resources for other than charging of electric vehicles module
  - m1141 processing status related intake related to plans for recharging of electric vehicles other than electric vehicles module
  - m1142 processing status related intake related to technical specifications of wireless electrical energy transfer module
  - m1143 processing status related intake involving computer network communication reporting of wireless electrical energy transfer module
  - m1144 processing status related intake received wirelessly module
  - m1145 processing status related intake involving RFID tags module
  - m1146 processing status related intake involving bluetooth supported communication module

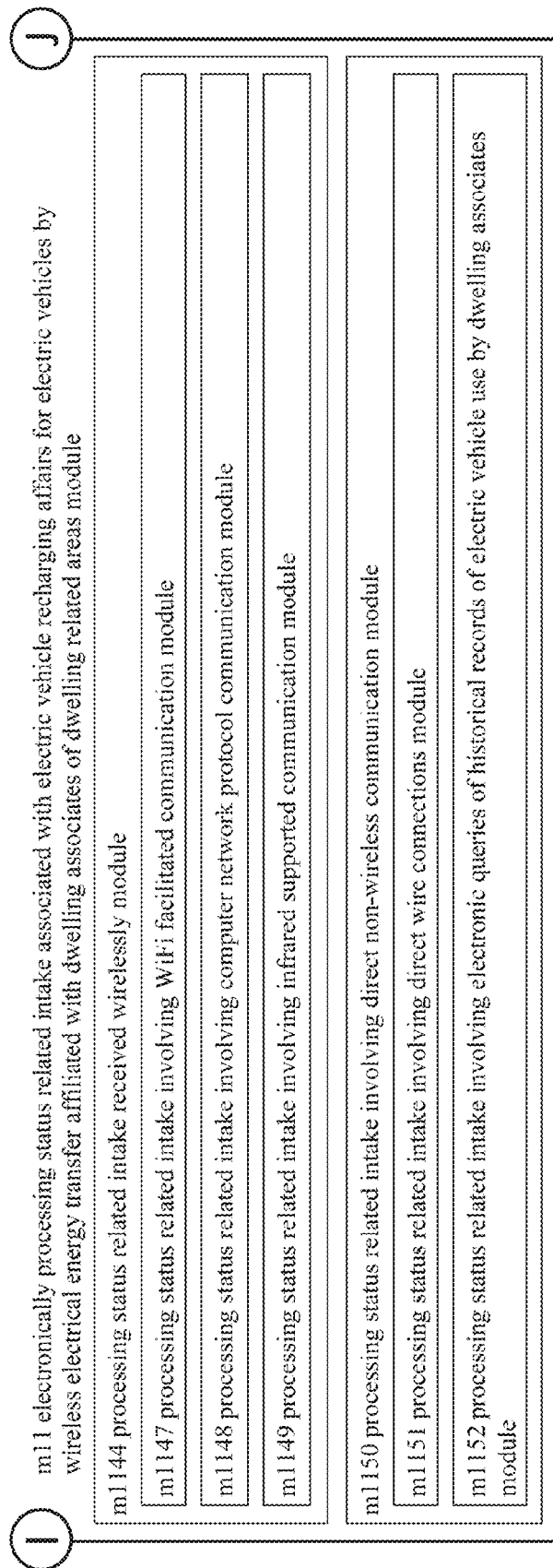
Fig. 5-F m12 electronically monitoring operational aspects affecting influence between electric vehicles and dwelling associates of dwelling related areas module m1201 processing status related intake involving forecast related information in electronic form module m1202 processing status related intake involving internet cloud-based collaboration systems module m1203 processing status related intake involving incentive-based programs for dwelling associates module m1204 processing status related intake involving human relationships of dwelling associates affecting use of electric vehicles module m1205 processing status related intake involving household budgeting of dwelling associates module m1206 processing status related intake involving dwelling maintenance tasks module m1207 processing status related intake involving group objectives of dwelling associates module m1208 processing status related intake involving guidelines for dwelling associate participation in electric vehicle use module m1209 processing status related intake involving dwelling associate input to social networking systems module m1210 processing status related intake involving tax strategies of dwelling associates module m1211 processing status related intake involving compensation objectives of dwelling associates module m1212 processing status related intake involving voucher related aspects regarding dwelling associates module m1213 processing status related intake involving gift program details associated with dwelling associates module m1214 processing status related intake involving retirement benefits of dwelling associates module

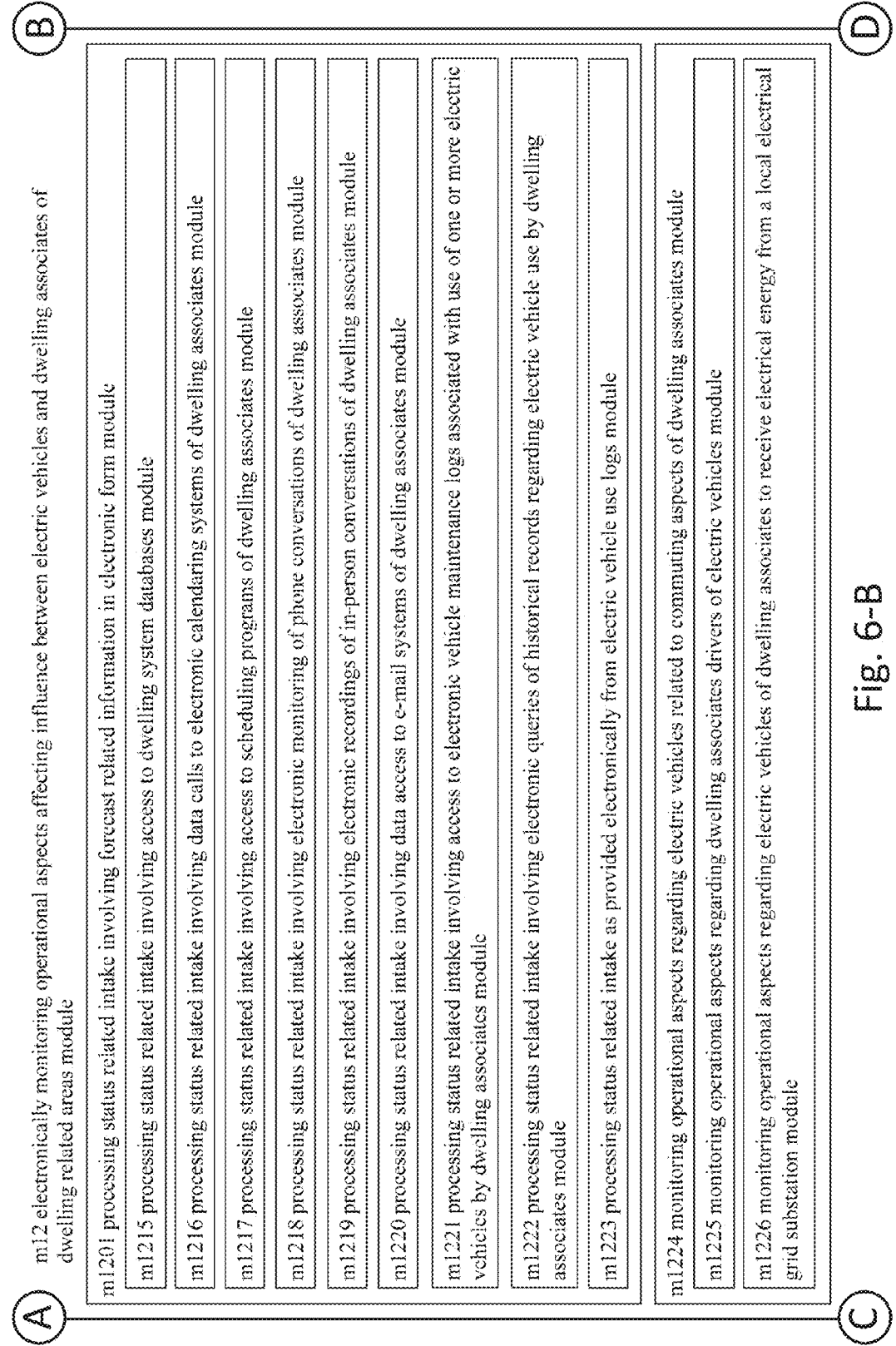
Fig. 6-B

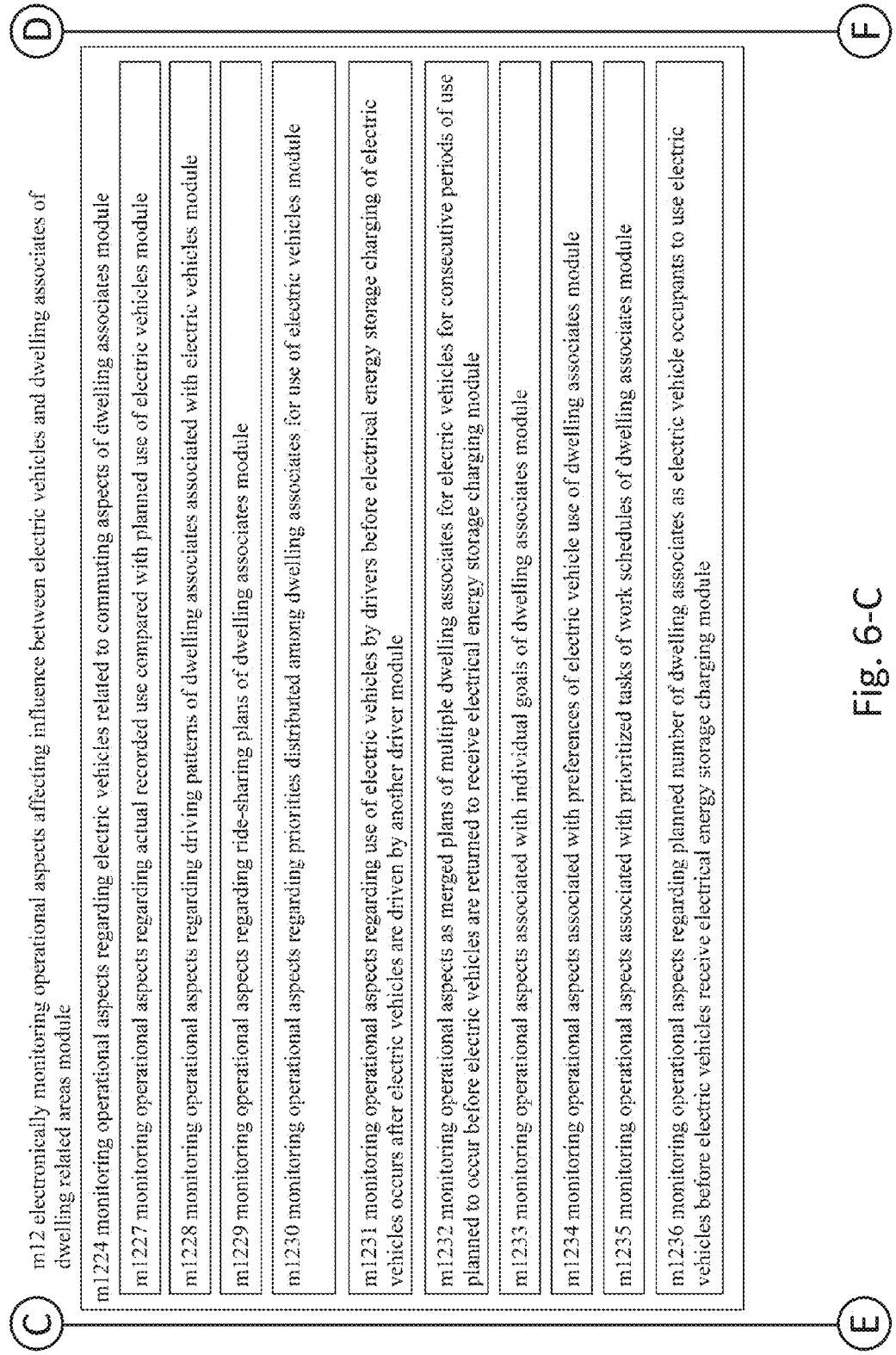
Fig. 6-C

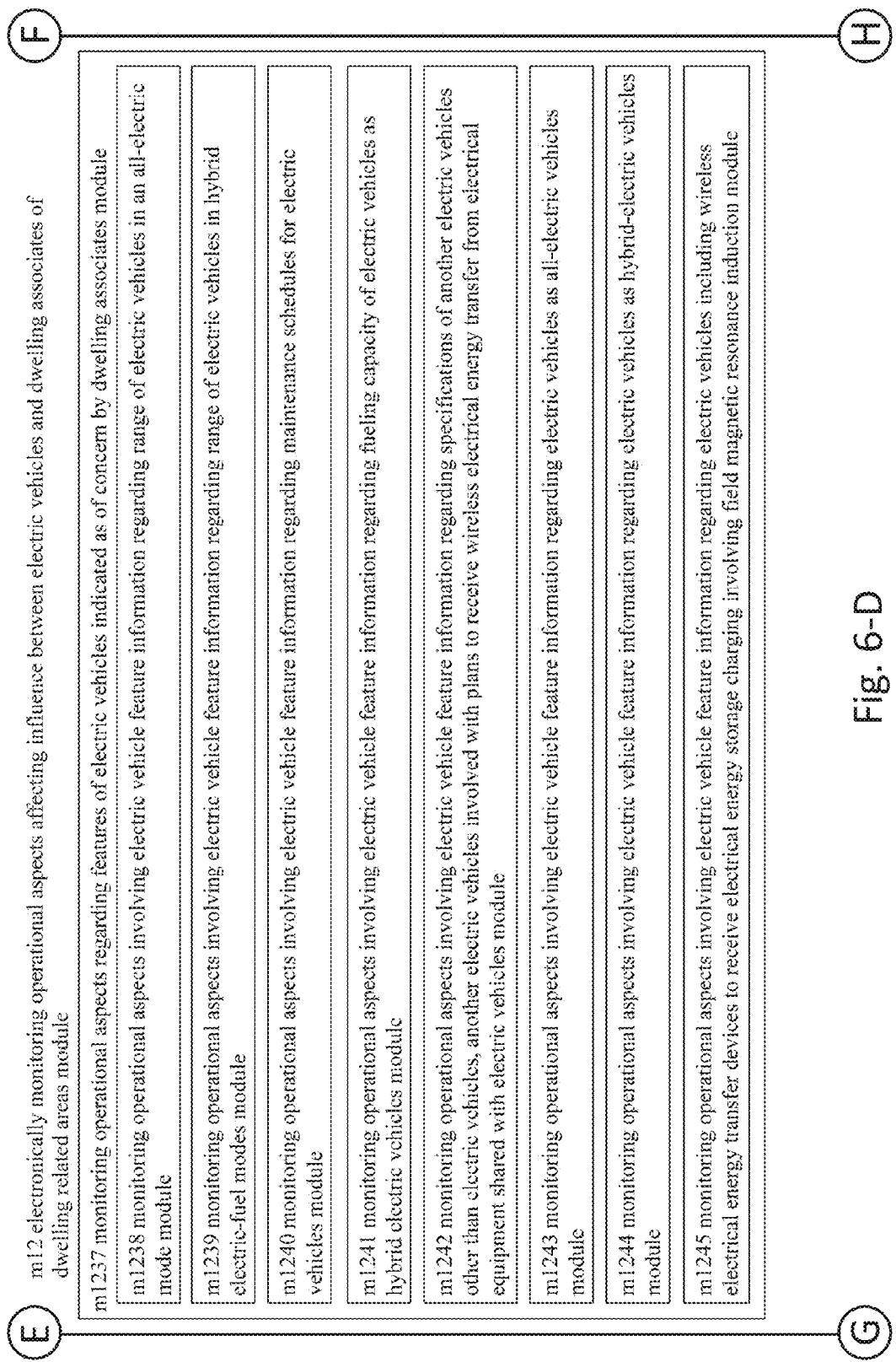
Fig. 6-D

Fig. 6-E m12 electronically monitoring operational aspects affecting influence between electric vehicles and dwelling associates of dwelling related areas module m1237 monitoring operational aspects regarding features of electric vehicles indicated as of concern by dwelling associates module m1246 monitoring operational aspects involving electric vehicle feature information regarding electric vehicles including wireless electrical energy transfer devices to receive electrical energy storage charging involving highly resonant inductive wireless power transfer module m1247 monitoring operational aspects involving electric vehicle feature information regarding electric vehicles including wireless electrical energy transfer devices to receive electrical energy storage charging involving wireless capacitive charging module m1248 monitoring operational aspects regarding electric vehicle features associated with input by dwelling associates including monitoring operational aspects involving electric vehicle feature information regarding electric vehicles including electrical energy storage devices module m1249 monitoring operational aspects involving electric vehicle feature information regarding electric vehicles including electrical energy storage as capacitive electrical energy storage devices module m1250 monitoring operational aspects involving tracking electric vehicle feature information regarding electric vehicles including electrical energy storage as lithium ion, lead acid, or nickel cadmium electrical energy storage devices module m1251 monitoring operational aspects involving electric vehicle feature information regarding electric vehicles including storage life aspects of electrical energy storage module m1252 monitoring operational aspects regarding dwelling associate preferences of location for energy transfer to electric vehicles module m1253 monitoring operational aspects involving dwelling associate preferences of location other than destination locations of dwelling associate occupants of electric vehicles to include subsequent electrical energy storage charging of electric vehicles module m12 electronically monitoring operational aspects affecting influence between the electric vehicles and dwelling associates of the dwelling related areas module m1237 monitoring operational aspects regarding features of the electric vehicles indicated as of concern by the dwelling associates module m1252 monitoring operational aspects regarding dwelling associate preferences of location for energy transfer to the electric vehicles module m1254 monitoring operational aspects involving dwelling associate preferences of location for electrical energy storage charging of the electric vehicles at locations of vocational employ of the dwelling associates module m1255 monitoring operational aspects involving dwelling associate preferences of location for electrical energy storage charging of the electric vehicles at locations on planned routes of travel of the electric vehicles module m1256 monitoring operational aspects involving dwelling associate preferences of location for electrical charging of the electric vehicles at garage locations for housing the electric vehicles module m1257 monitoring operational aspects involving dwelling associate preferences of location for electrical energy storage charging of electric vehicles at park and ride locations for parking electric vehicles module m1258 monitoring operational aspects involving dwelling associate preferences of location for electrical charging of the electric vehicles at parking lot locations for parking the electric vehicles module m1259 monitoring operational aspects involving dwelling associate preferences of location for electrical charging of the electric vehicles at parking garage locations for parking the electric vehicles module m1260 monitoring operational aspects involving dwelling associate preferences of location for non-electrical energy transfer to the electric vehicles as a hybrid-electric vehicle at non-electric re-fueling station locations module m1261 monitoring operational aspects involving dwelling associate preferences of location for electrical charging of the electric vehicles at static charging locations along routes of travel of the electric vehicles module

Fig. 6-F

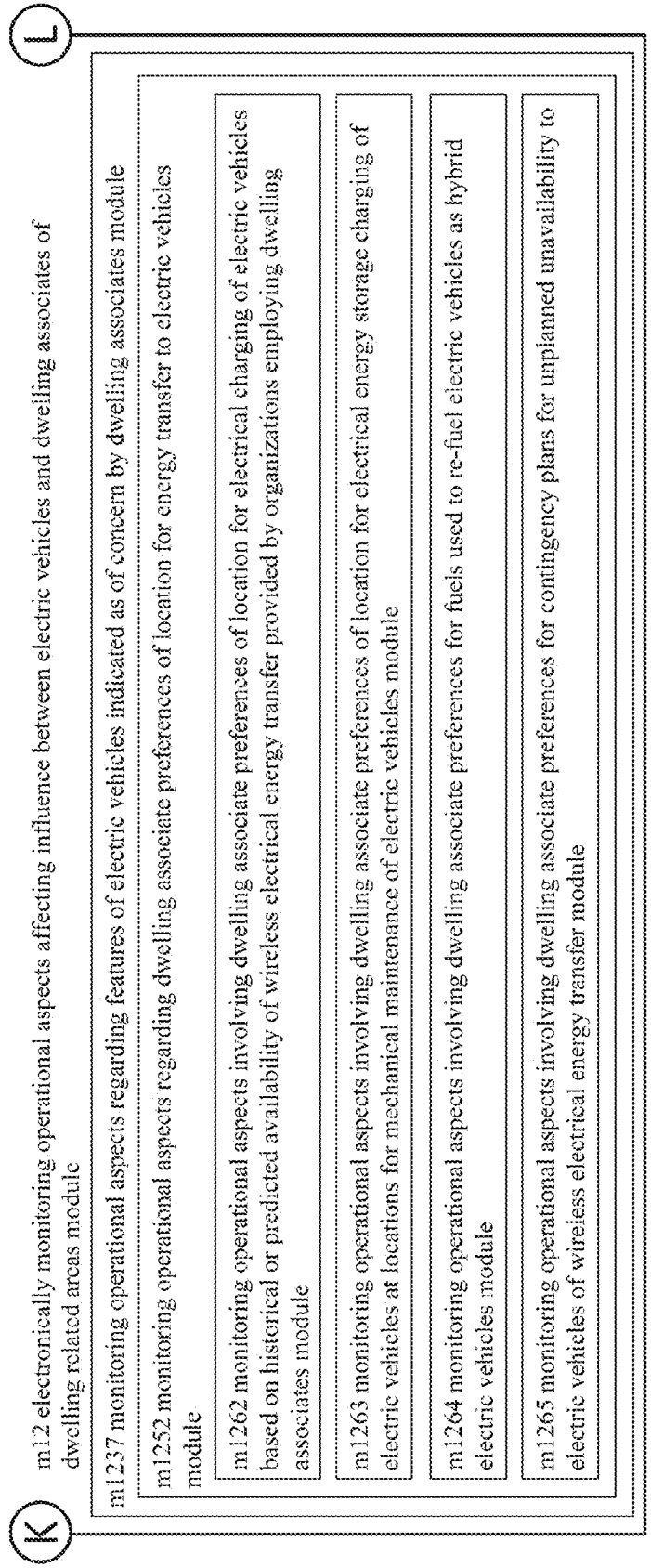
Fig. 6-G

Fig. 7-A m13 electronically ascertaining dwelling related wireless recharging guidance for recharging of electric vehicles by wireless electrical energy transfer affiliated with dwelling associates of dwelling related areas...

m1301 ascertaining dwelling related wireless recharging guidance involving locations of wireless electrical energy transfer module m1302 ascertaining dwelling related wireless recharging guidance involving locations of wireless electrical energy transfer module m1303 ascertaining dwelling related wireless recharging guidance based on identification and verification of dwelling associates module m1304 ascertaining dwelling related wireless recharging guidance regarding verification of selection of wireless electrical energy transfer for electric vehicles module m1305 ascertaining dwelling related wireless recharging guidance regarding financial status information for dwelling associate accounts of dwelling associates module m1306 ascertaining dwelling related wireless recharging guidance based on charging rate capacity of wireless electrical energy transfer module m1307 ascertaining dwelling related wireless recharging guidance involving electrical charging rate for electrical energy storage devices of electric vehicles module m1308 ascertaining dwelling related wireless recharging guidance concerning use planning for electric vehicles module m1309 ascertaining dwelling related wireless recharging guidance involving amount of time electric vehicles are available for wireless electrical energy transfer module m1310 ascertaining dwelling related wireless recharging guidance involving amount of electrical energy available to be transferred to electric vehicles in a designated period of time by wireless electrical energy transfer module

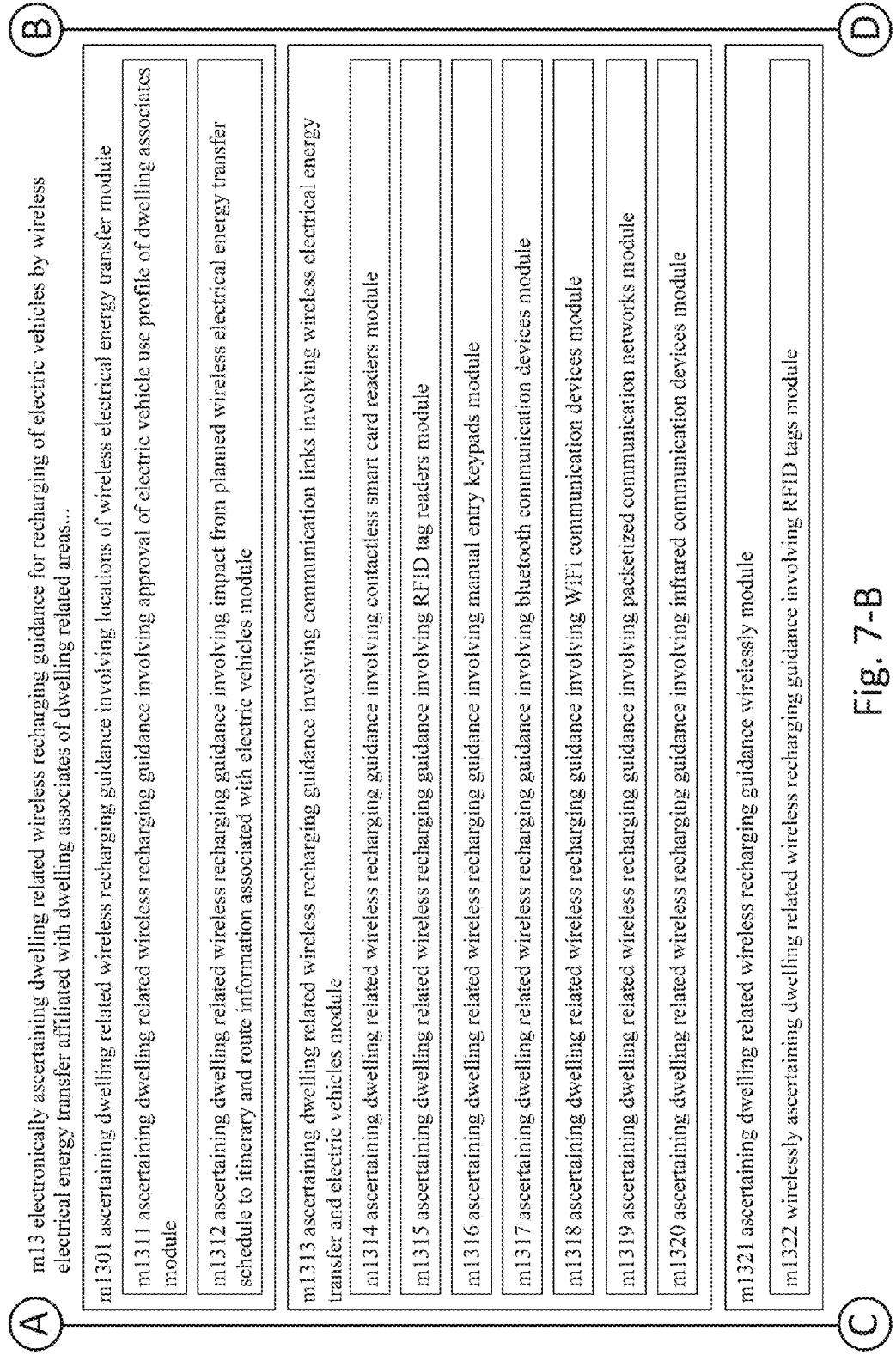
Fig. 7-B

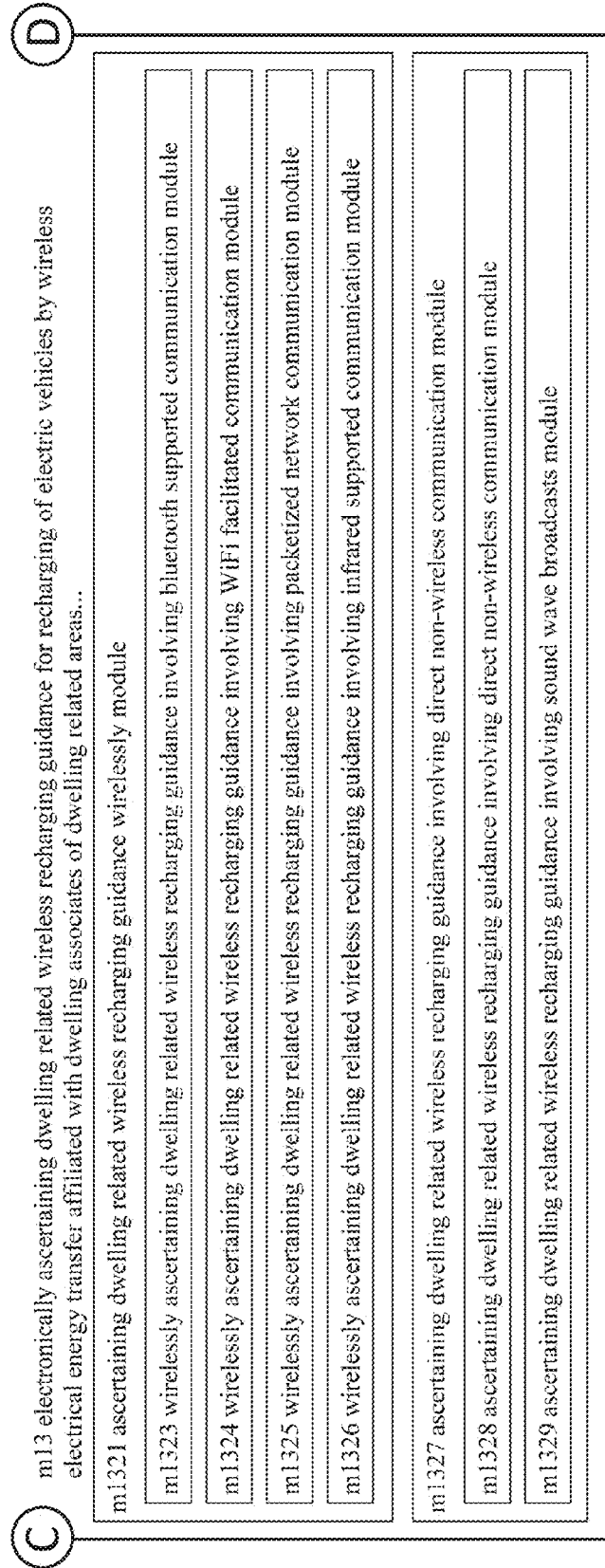
Fig. 7-C

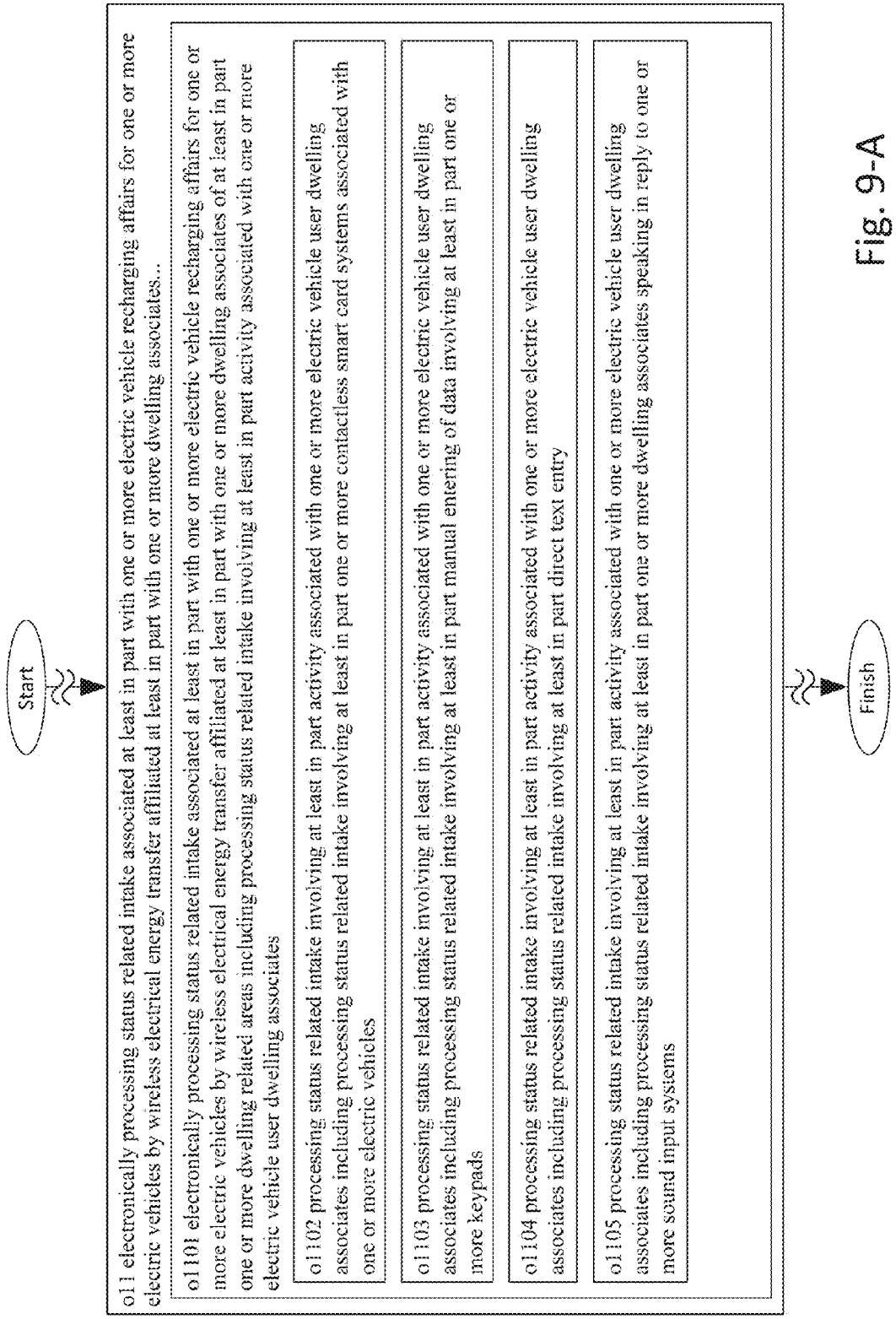
Fig. 9-A

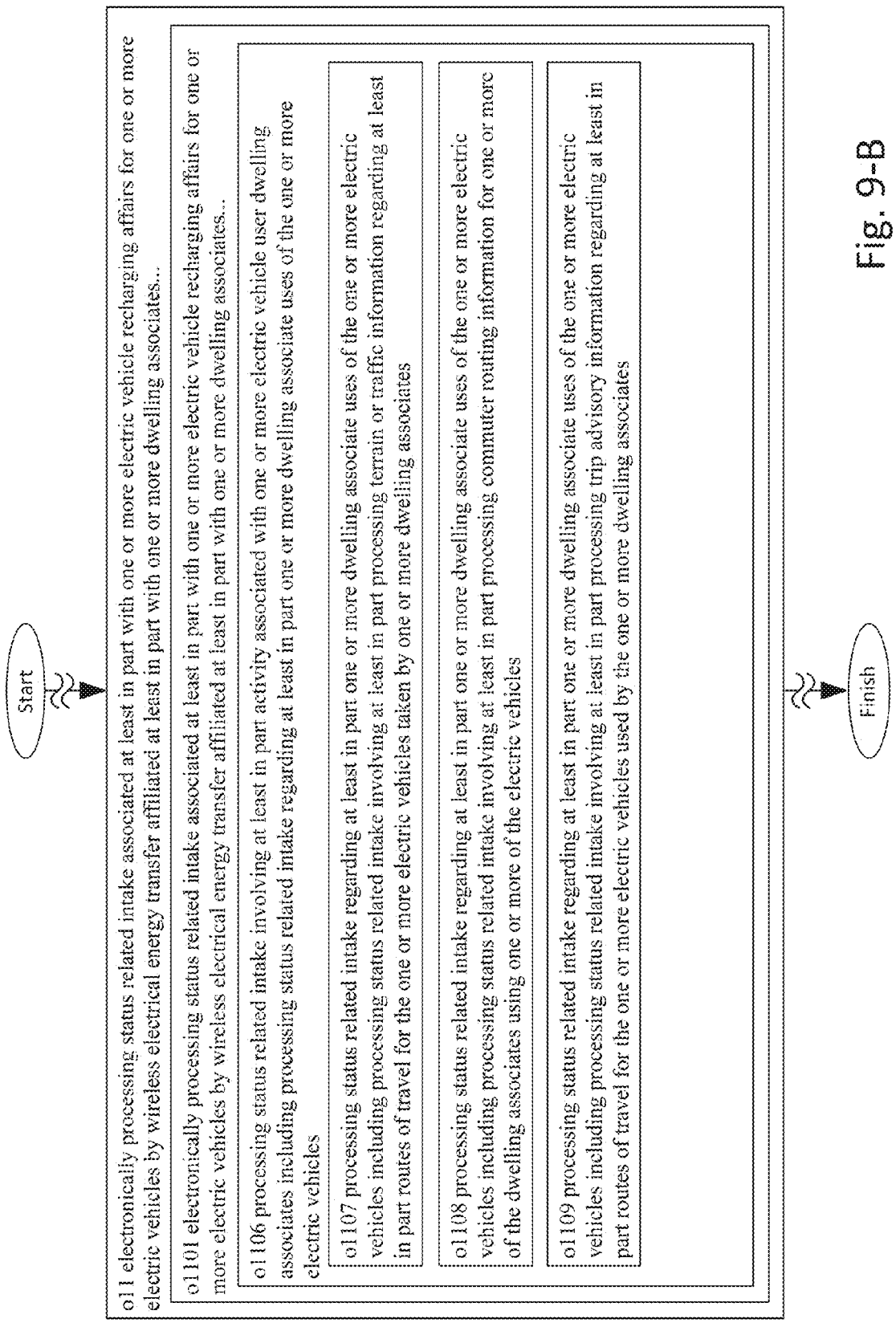
Fig. 9-B

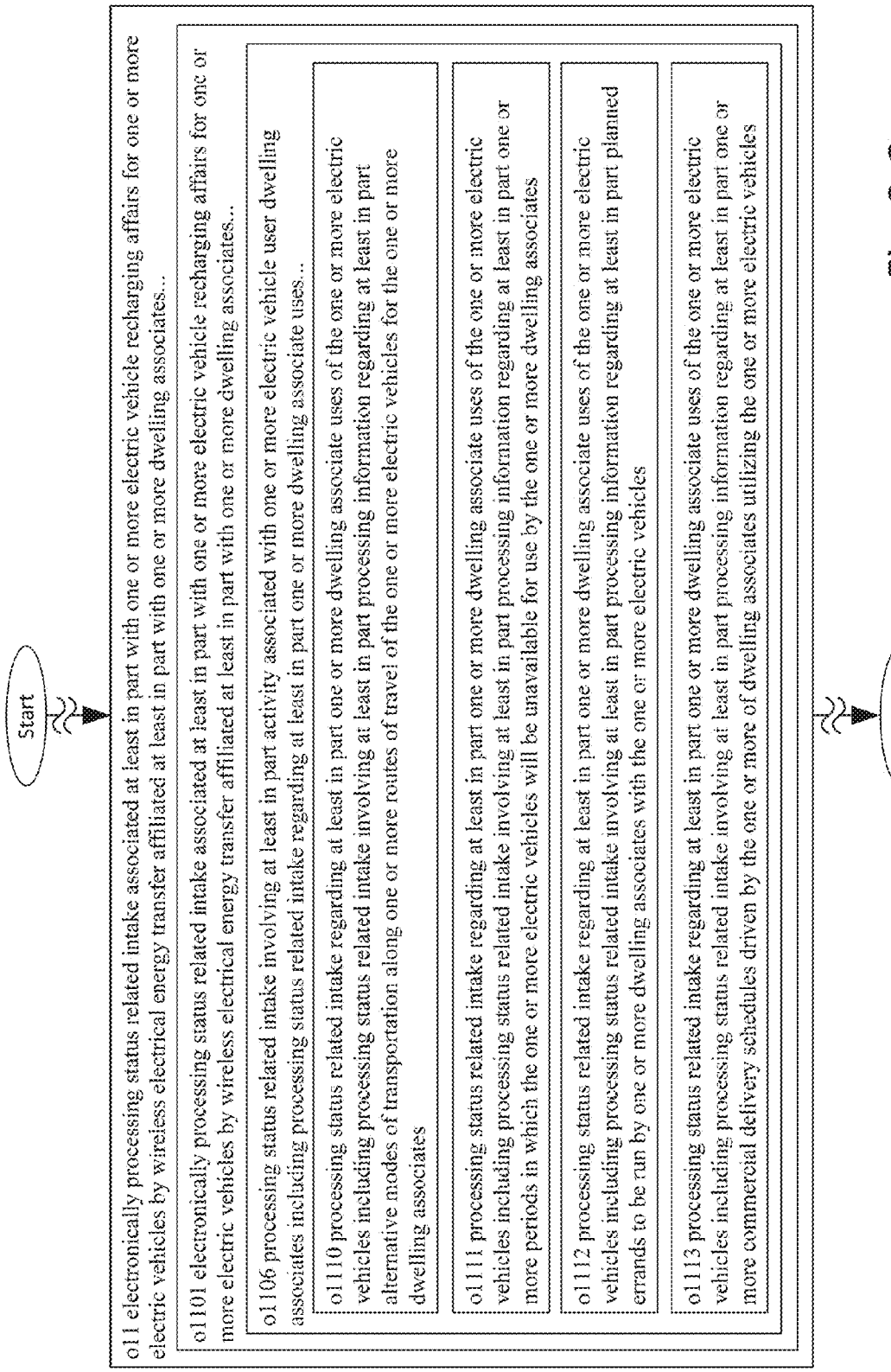
Fig. 9-C

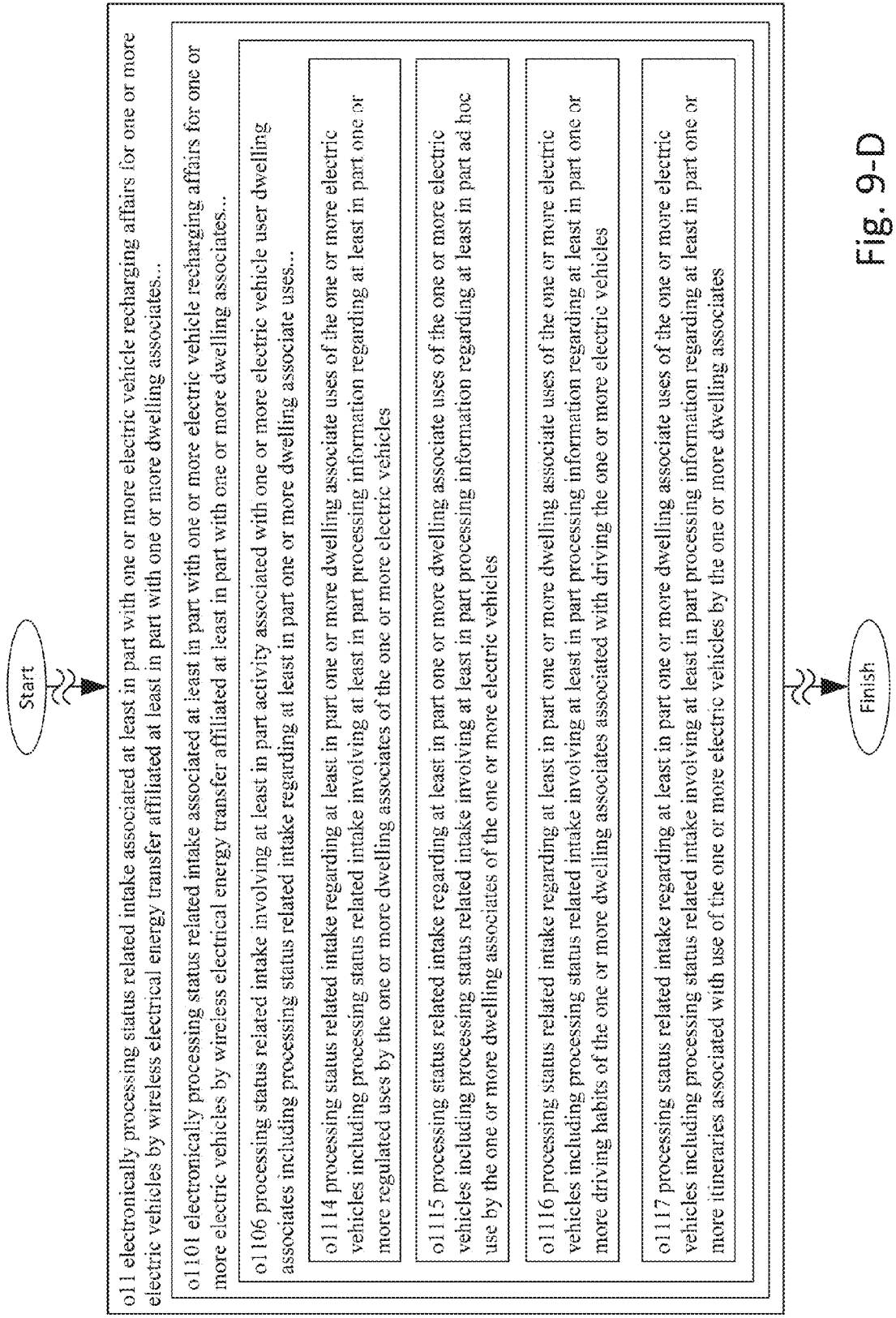
Fig. 9-D

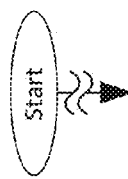

o11 electronically processing status related intake associated at least in part with one or more electric vehicle recharging affairs for one or more electric vehicles by wireless electrical energy transfer affiliated at least in part with one or more dwelling associates...

o1101 electronically processing status related intake associated at least in part with one or more electric vehicle recharging affairs for one or more electric vehicles by wireless electrical energy transfer affiliated at least in part with one or more dwelling associates...

o1106 processing status related intake involving at least in part activity associated with one or more electric vehicle user dwelling associates including processing status related intake regarding at least in part one or more dwelling associate uses...

o1118 processing status related intake regarding at least in part one or more dwelling associate uses of the one or more electric vehicles including processing status related intake involving at least in part processing information regarding at least in part one or more weather forecasts associated with travel involving at least in part use by the one or more dwelling associates of the one or more electric vehicles o1119 processing status related intake regarding at least in part one or more dwelling associate uses of the one or more electric vehicles including processing status related intake involving at least in part processing information regarding at least in part one or more news broadcasts associated with travel involving at least in part use of the one or more electric vehicles by the one or more dwelling associates o1120 processing status related intake regarding at least in part one or more dwelling associate uses of the one or more electric vehicles including processing status related intake involving at least in part emergency warning messages associated with dwelling associate use of the one or more electric vehicles o1121 processing status related intake regarding at least in part one or more dwelling associate uses of the one or more electric vehicles including processing status related intake involving at least in part processing information regarding at least in part availability of alternate transportation by the one or more dwelling associates within one or more designated distances from electrical vehicle charging affairs for the one or more electric vehicles by wireless electrical energy transfer affiliated at least in part with one or more dwelling associates of at least in part one or more dwelling related areas

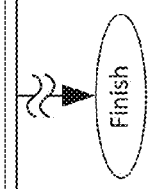

Fig. 9-E

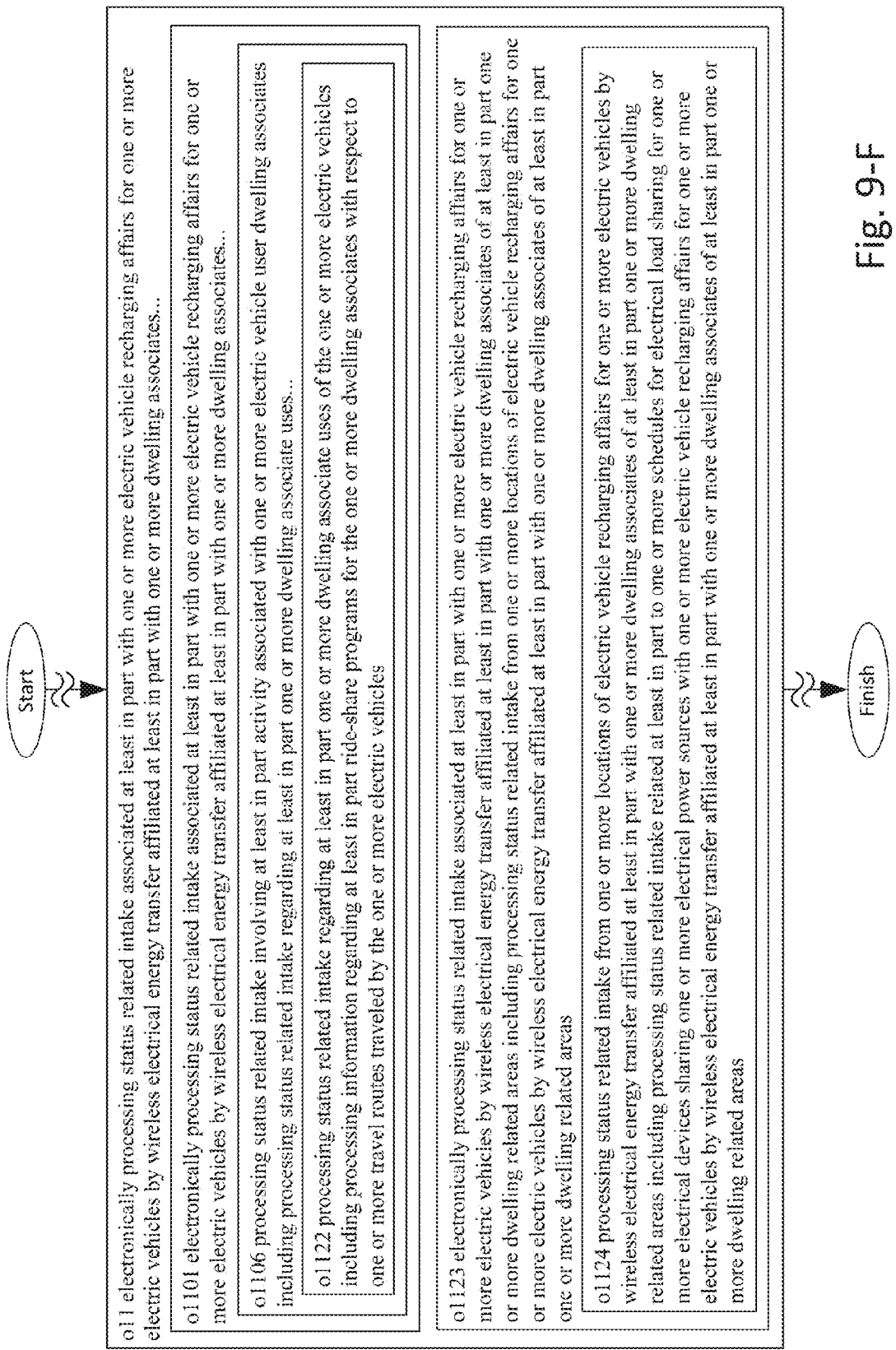
Fig. 9-F

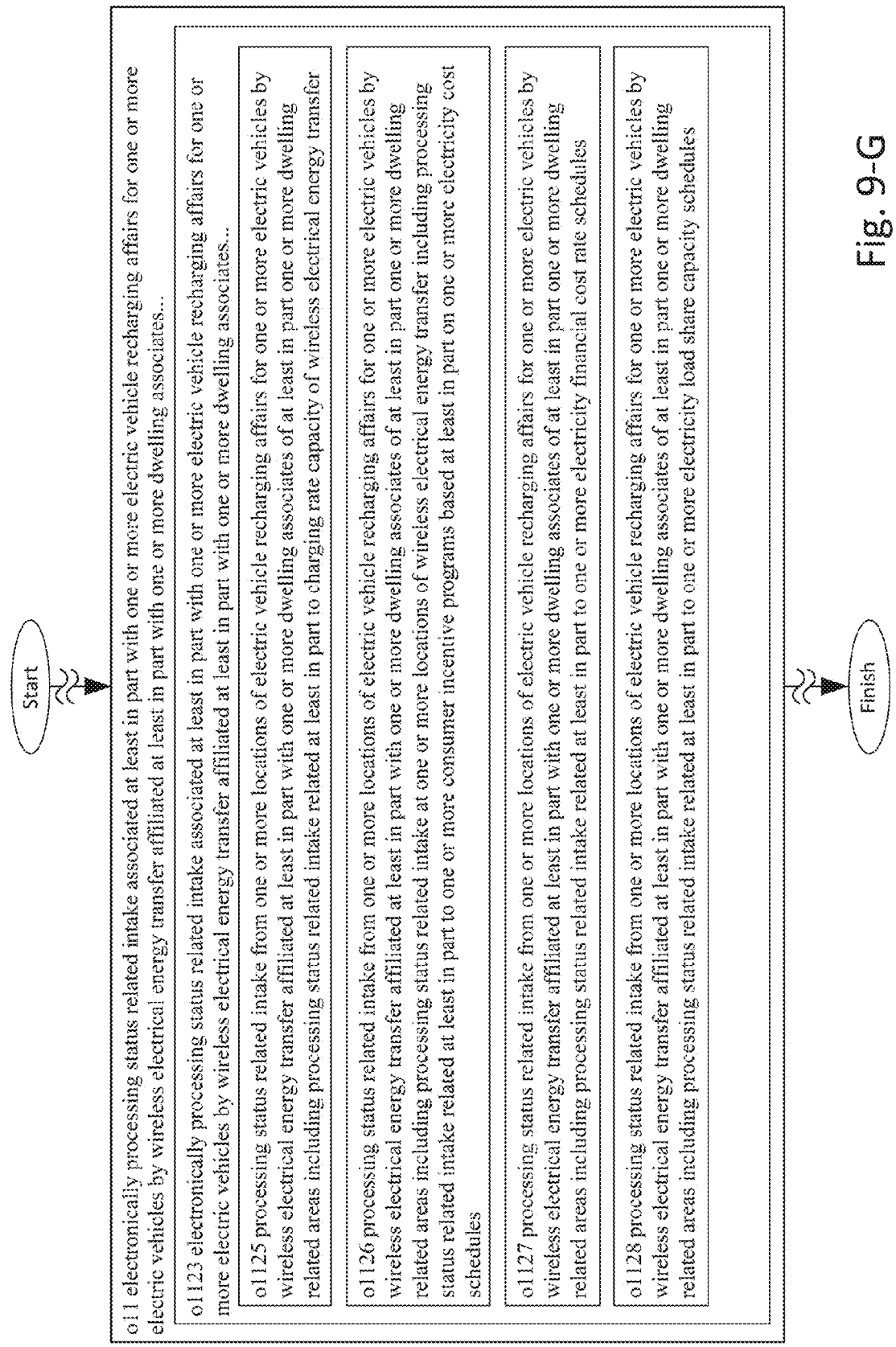
Fig. 9-G

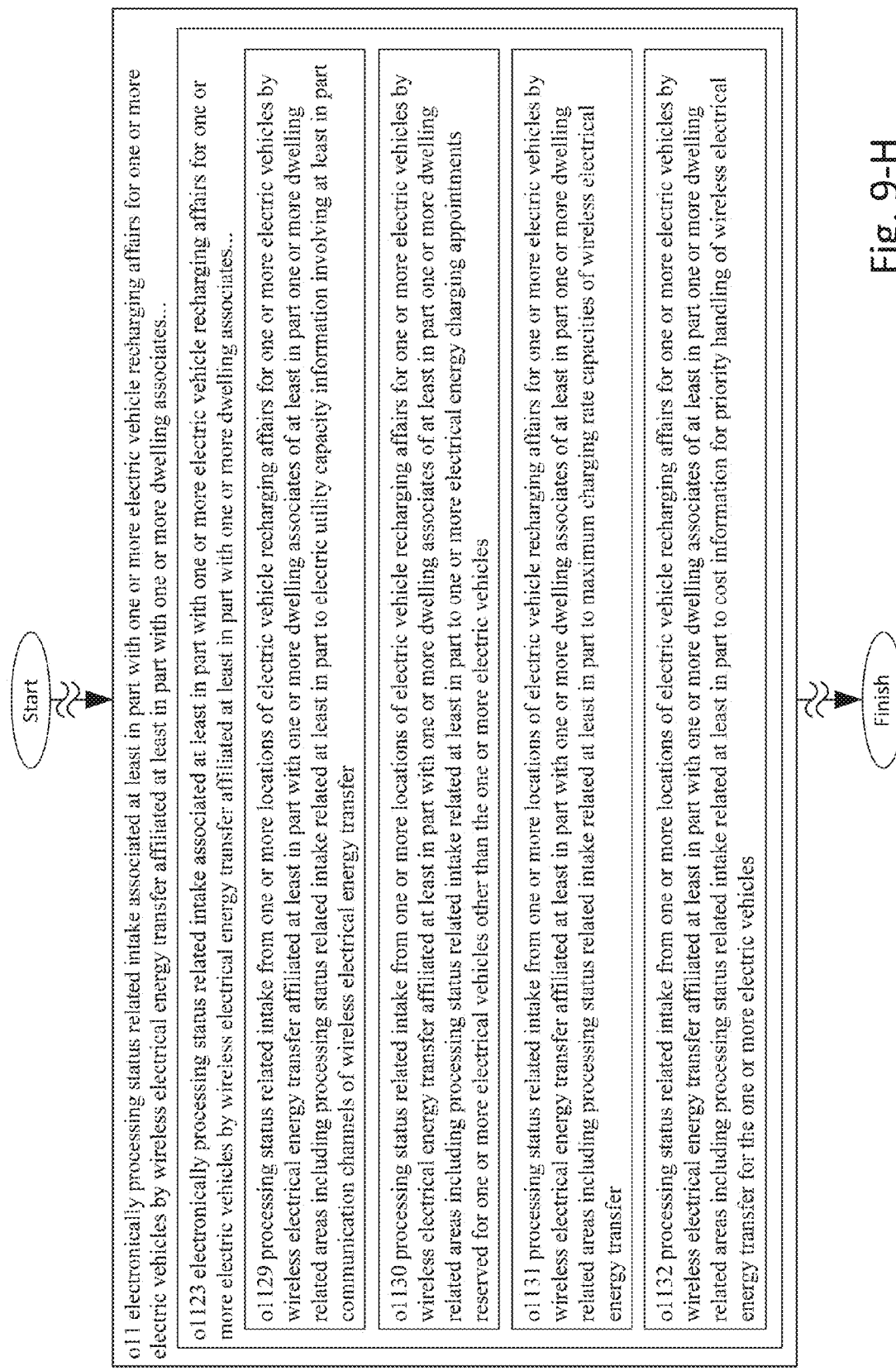
Fig. 9-H

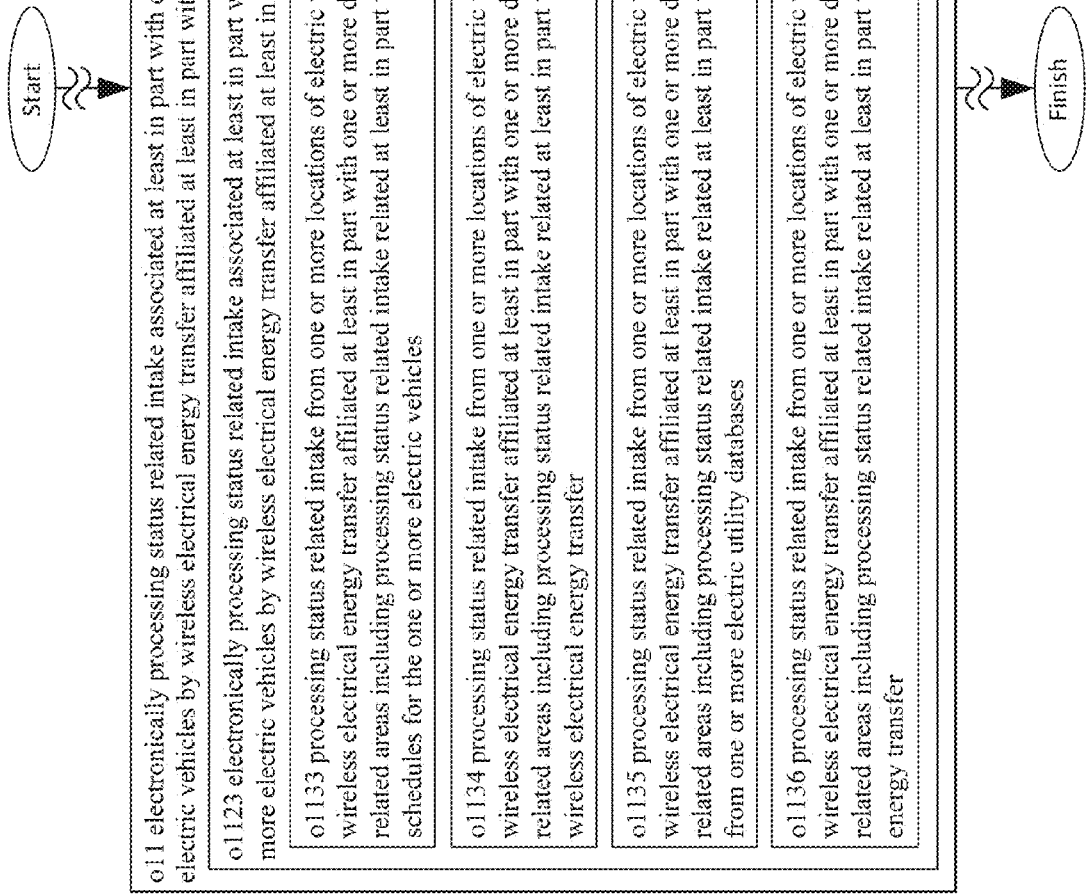
Fig. 9-I

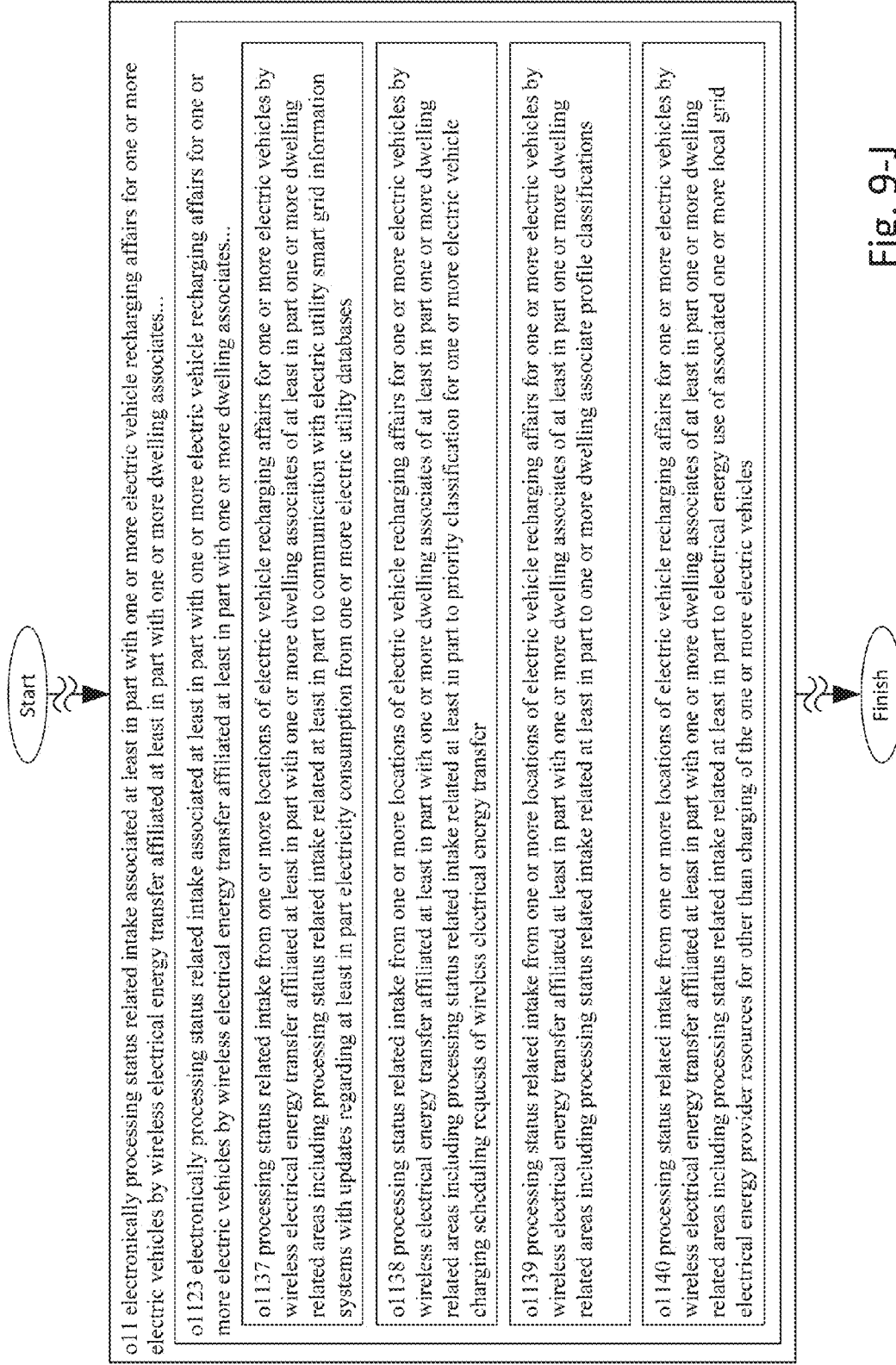
Fig. 9-J

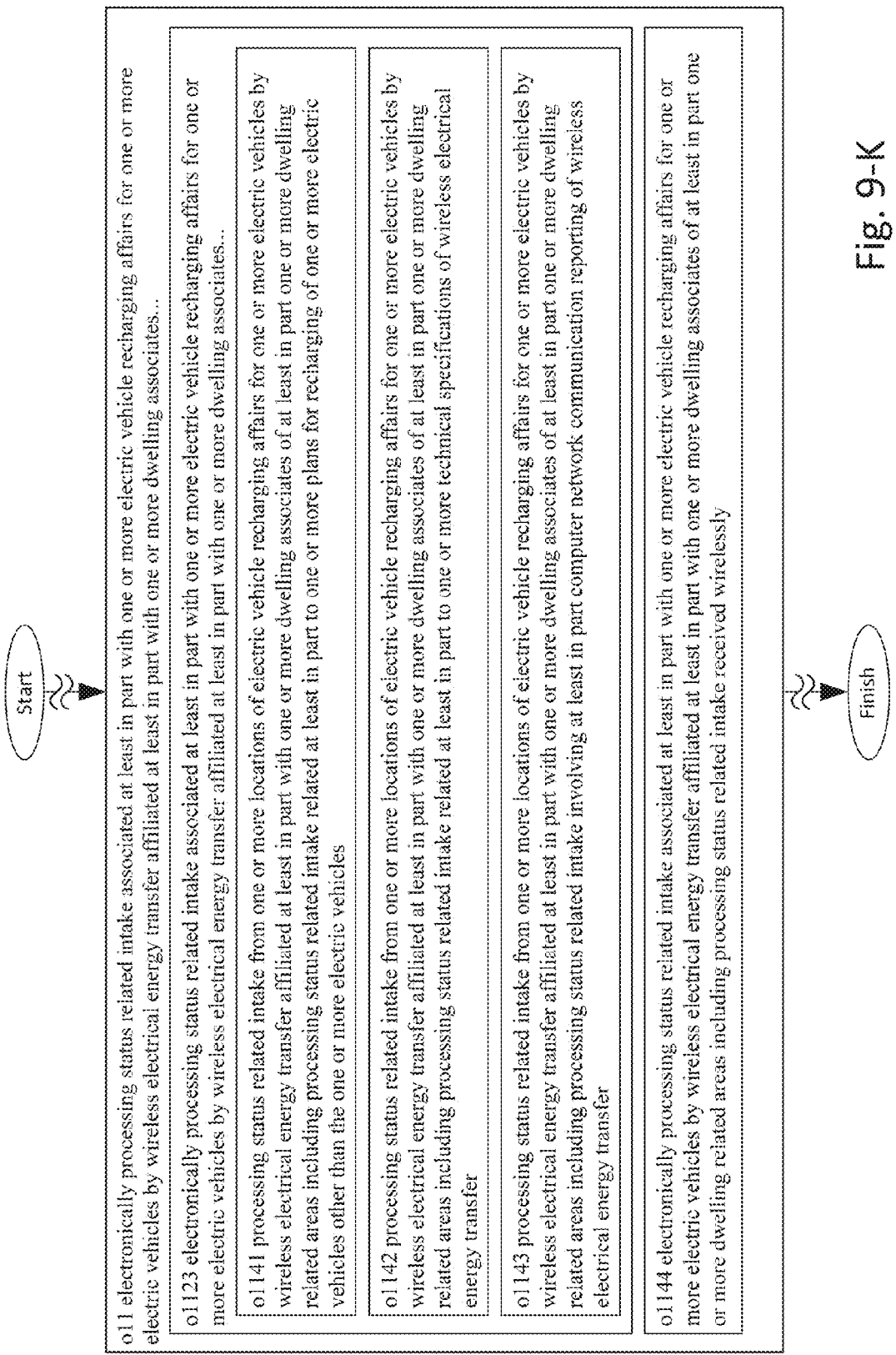

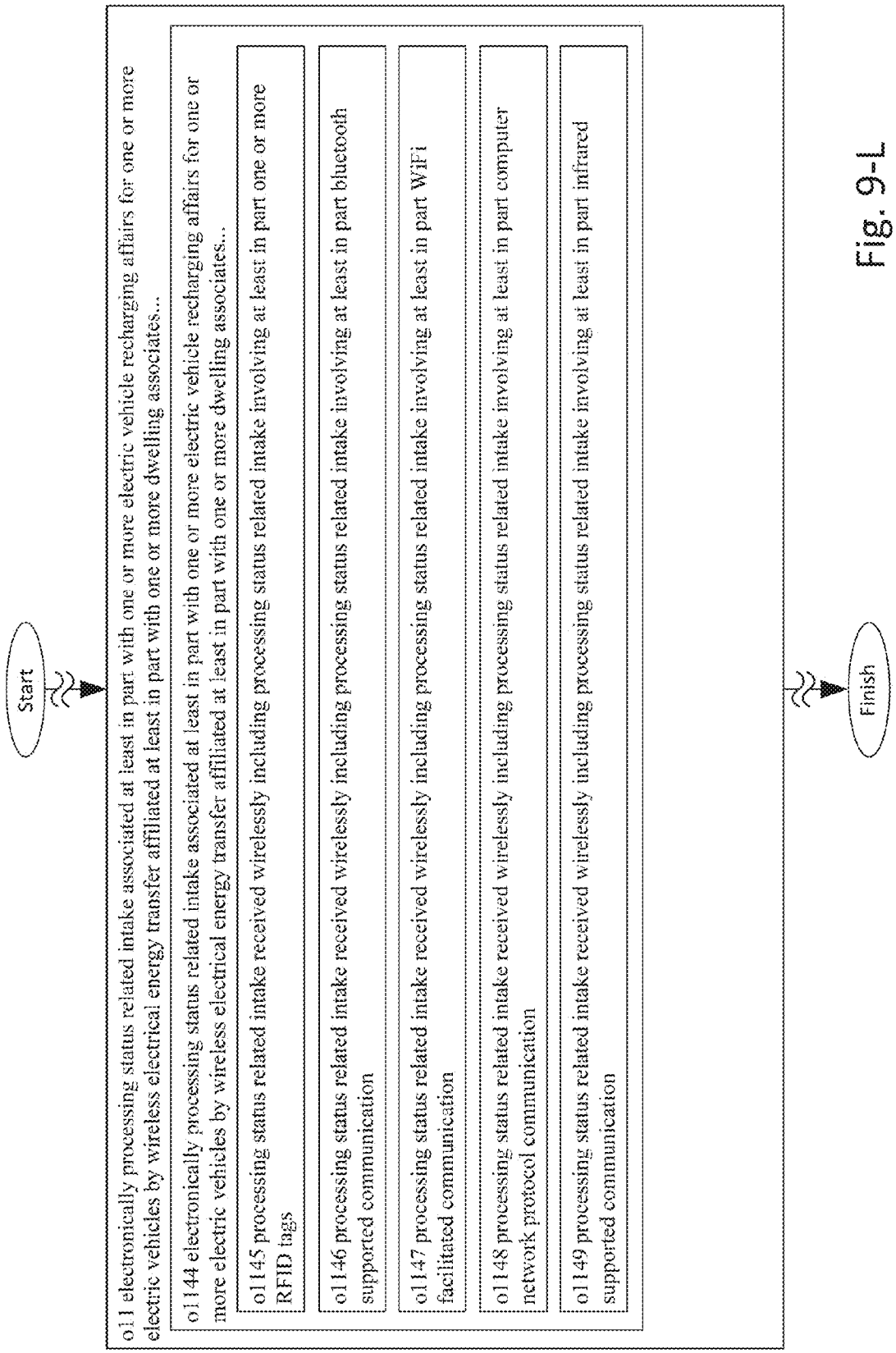
Fig. 9-L

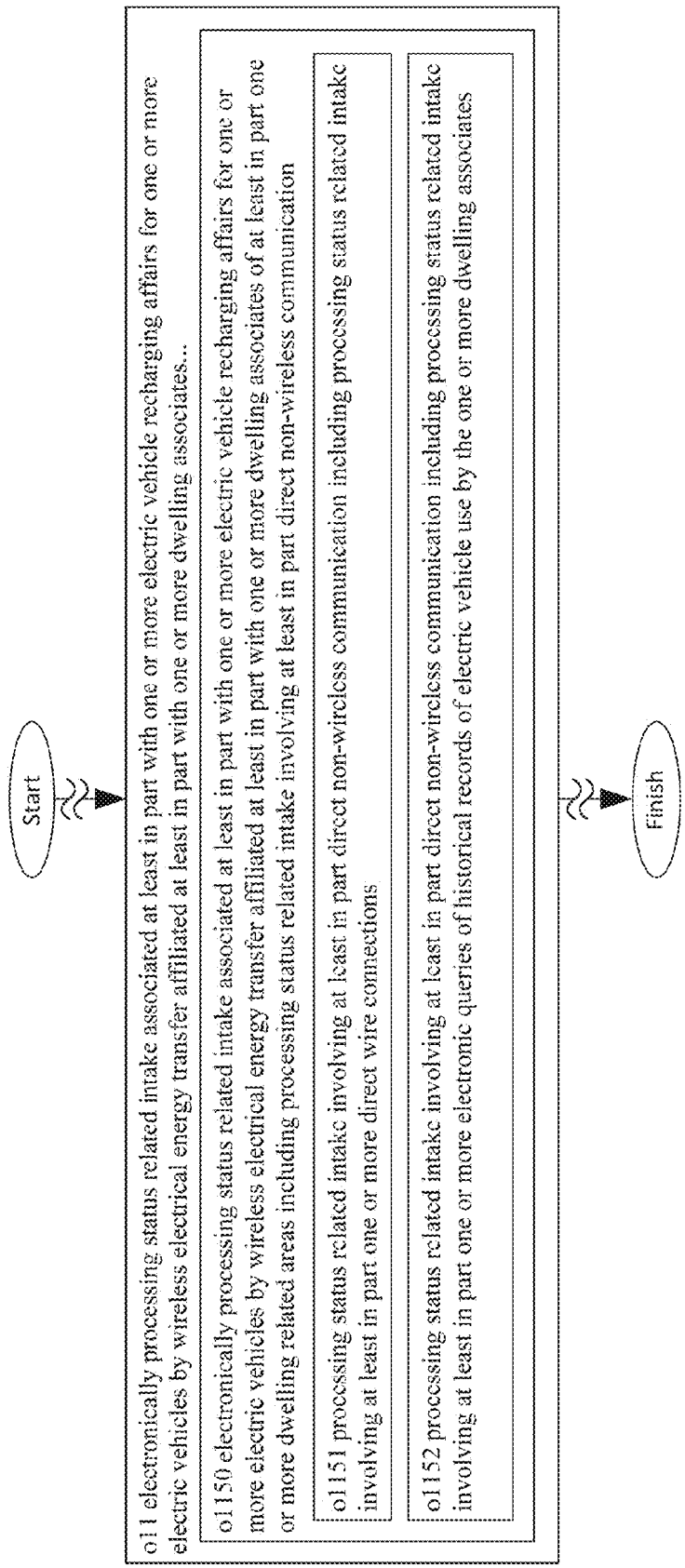
Fig. 9-M

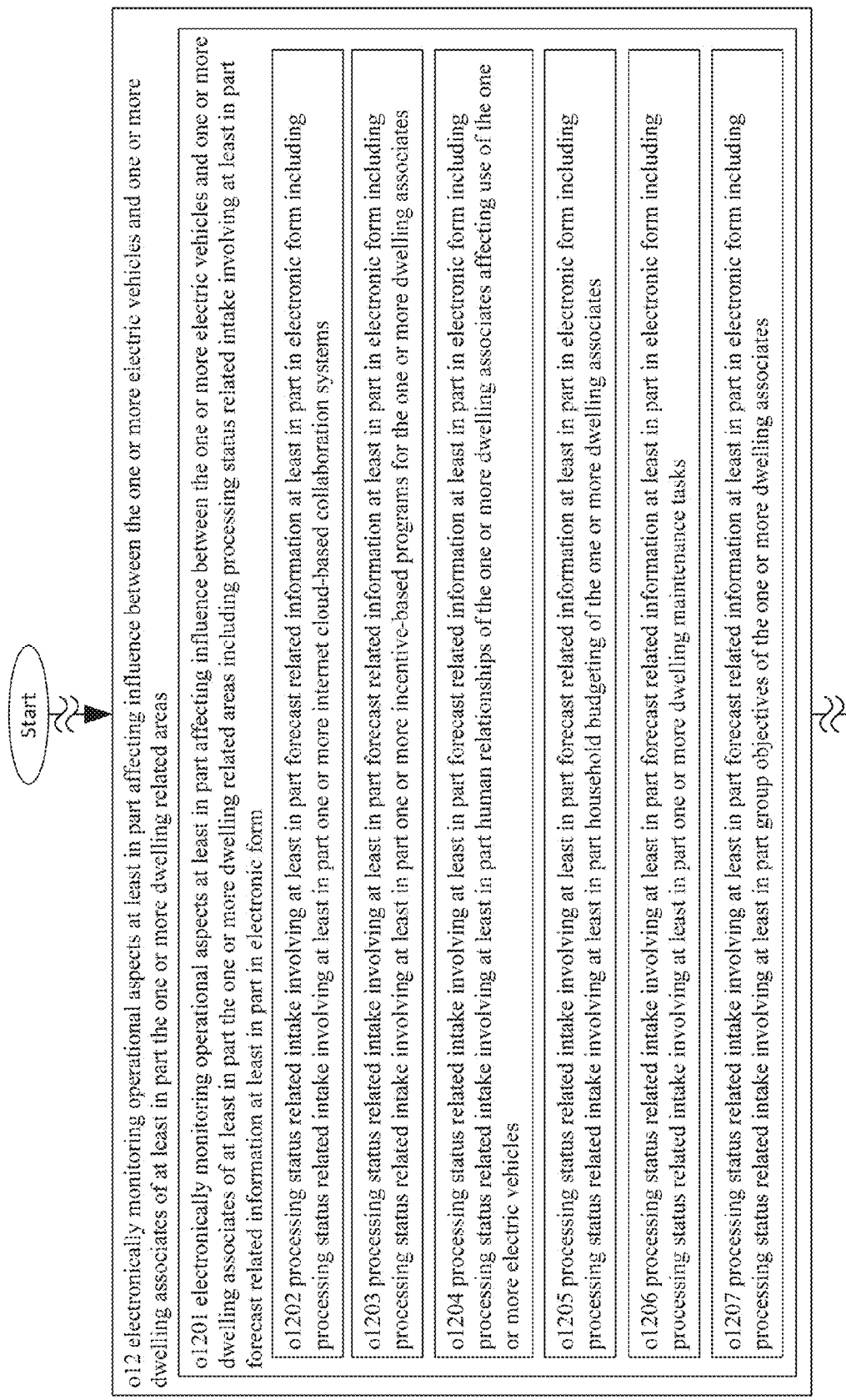
Fig. 10-A

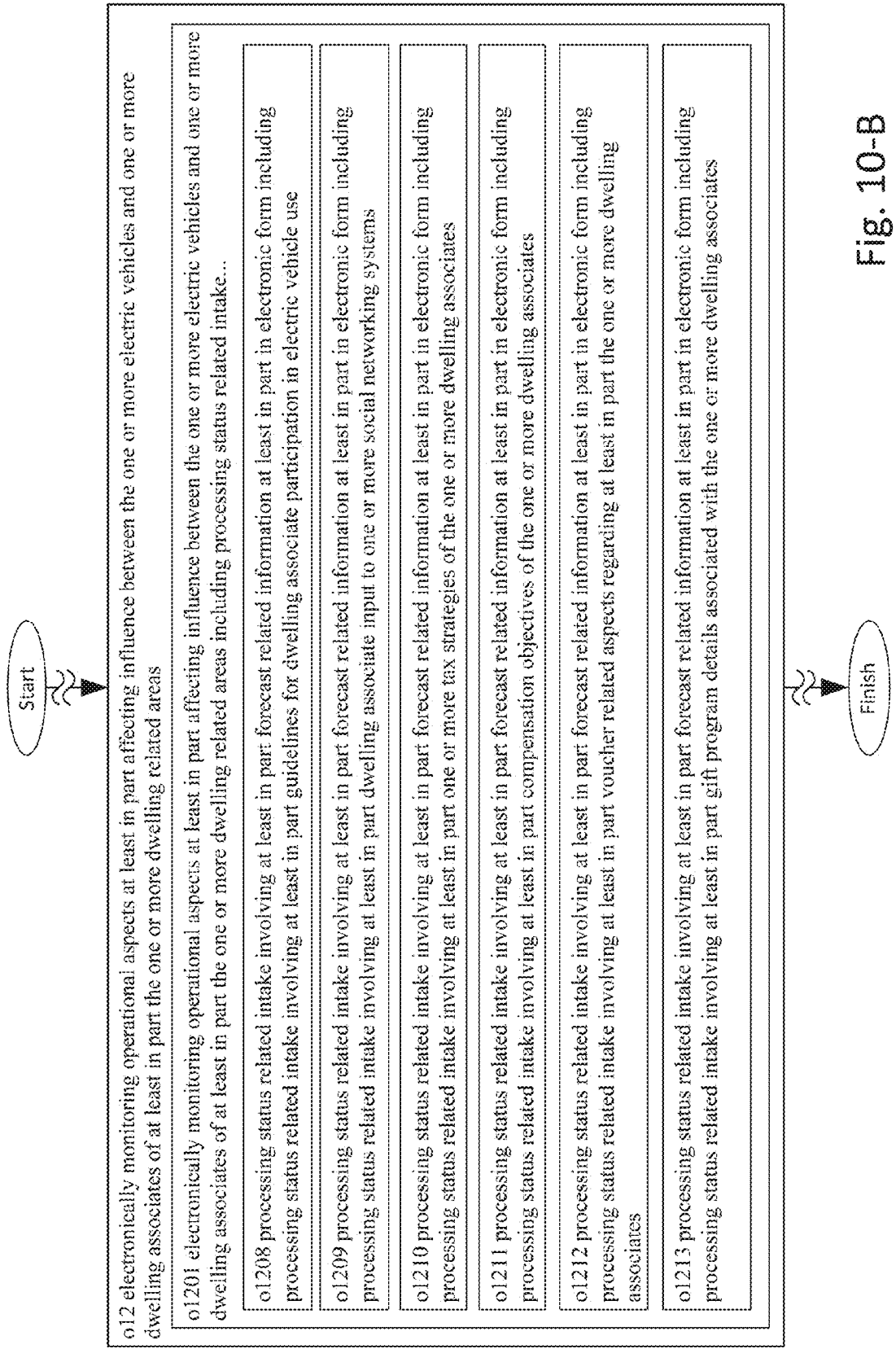
Fig. 10-B

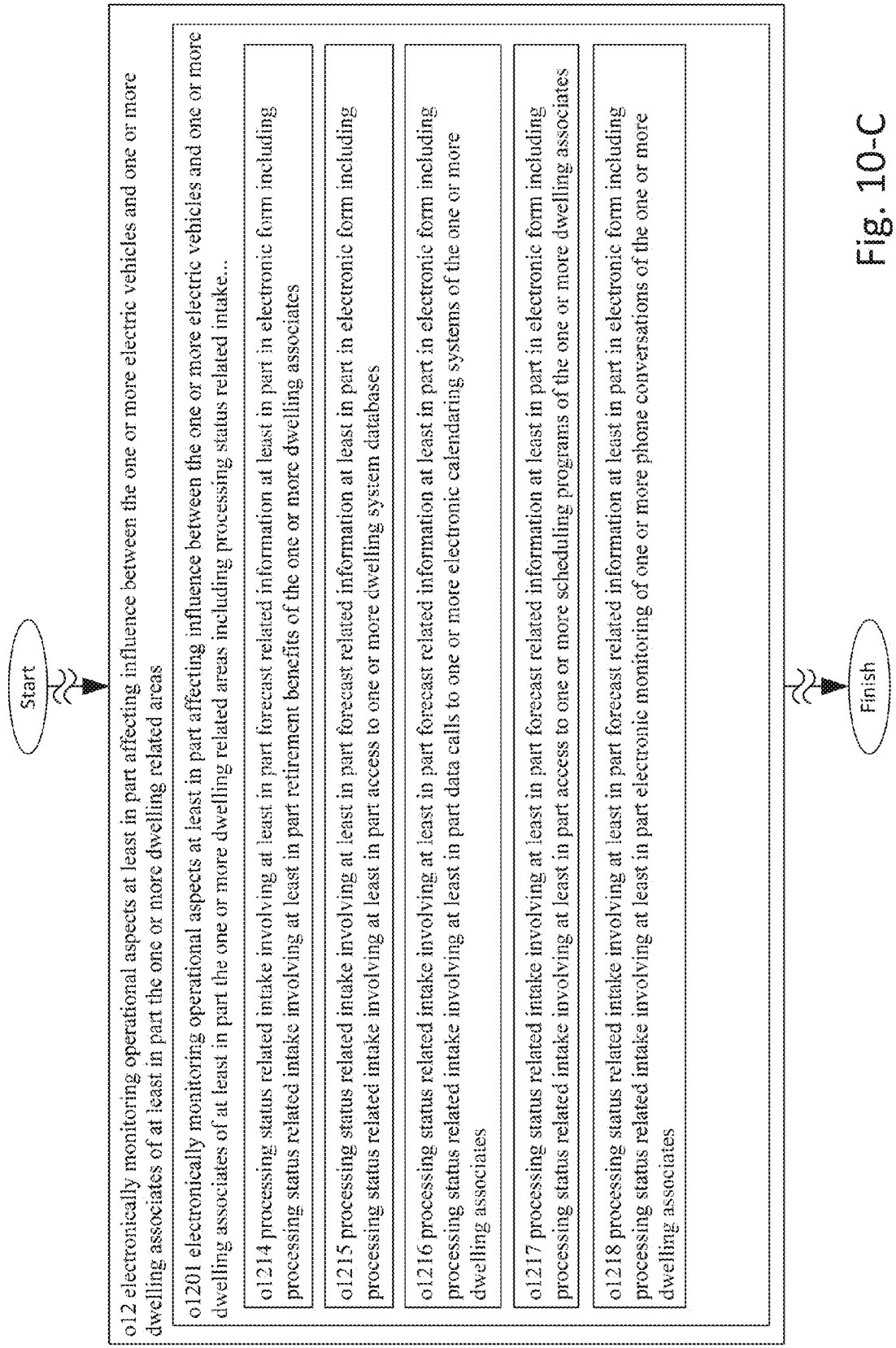
Fig. 10-C

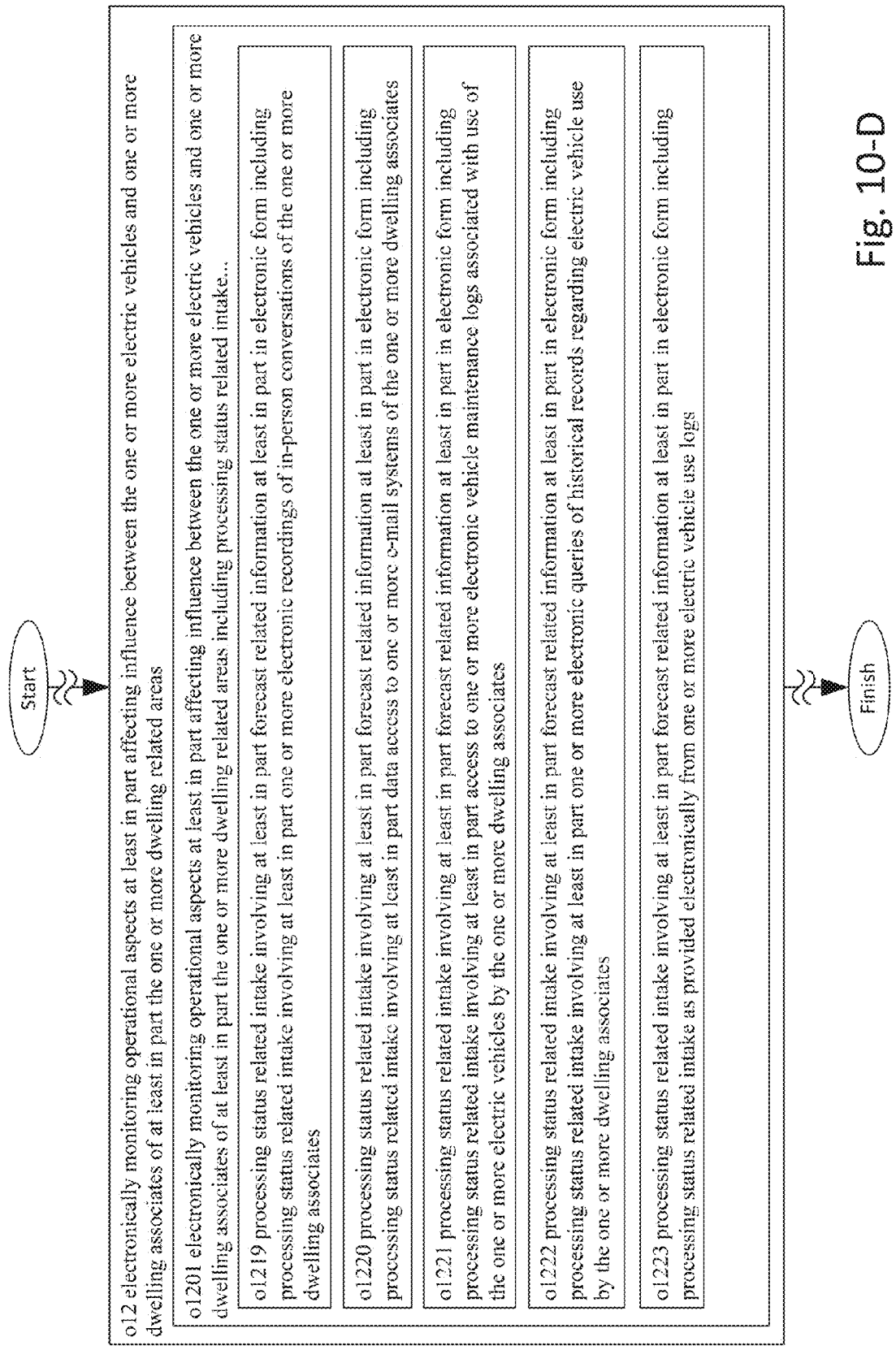
Fig. 10-D

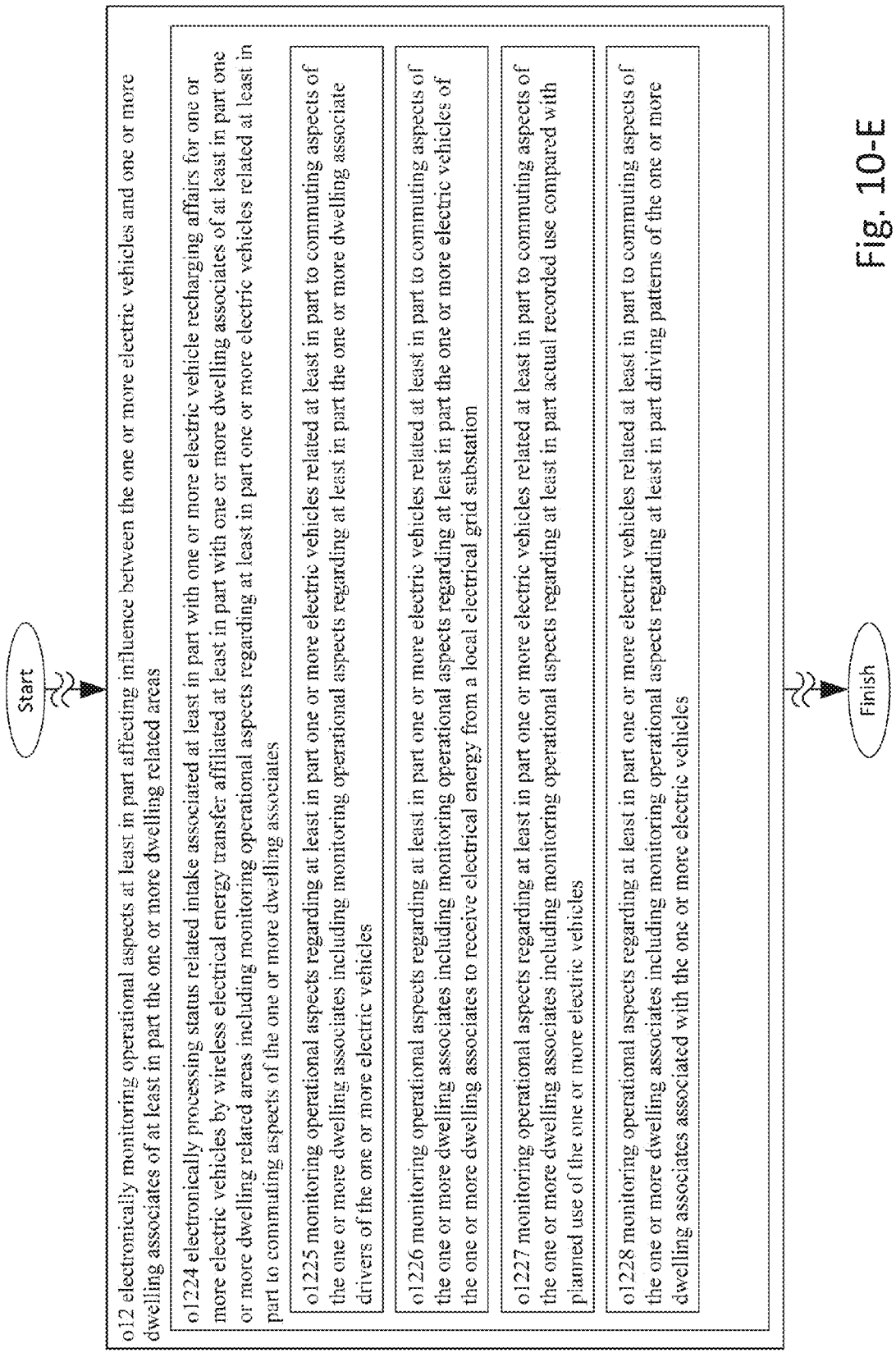
Fig. 10-E

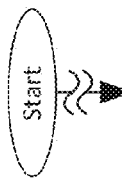

o12 electronically monitoring operational aspects at least in part affecting influence between the one or more electric vehicles and one or more dwelling associates of at least in part the one or more dwelling related areas o1224 electronically processing status related intake associated at least in part with one or more electric vehicle recharging affairs for one or more electric vehicles by wireless electrical energy transfer affiliated at least in part with one or more dwelling associates...

o1229 monitoring operational aspects regarding at least in part one or more electric vehicles related at least in part to commuting aspects of the one or more dwelling associates including monitoring operational aspects regarding at least in part one or more ride-sharing plans of the one or more dwelling associates o1230 monitoring operational aspects regarding at least in part one or more electric vehicles related at least in part to commuting aspects of the one or more dwelling associates including monitoring operational aspects regarding at least in part one or more priorities distributed among the one or more dwelling associates for use of the one or more electric vehicles o1231 monitoring operational aspects regarding at least in part one or more electric vehicles related at least in part to commuting aspects of the one or more dwelling associates including monitoring operational aspects regarding at least in part use of the one or more electric vehicles by one or more drivers before electrical energy storage charging of the one or more electric vehicles occurs after the one or more electric vehicles is driven by another driver o1232 monitoring operational aspects regarding at least in part one or more electric vehicles related at least in part to commuting aspects of the one or more dwelling associates including monitoring operational aspects as merged plans of multiple dwelling associates for the one or more electric vehicles for consecutive periods of use planned to occur before the one or more electric vehicles are returned to receive electrical energy storage charging

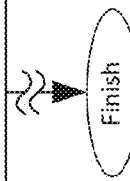

Fig. 10-F

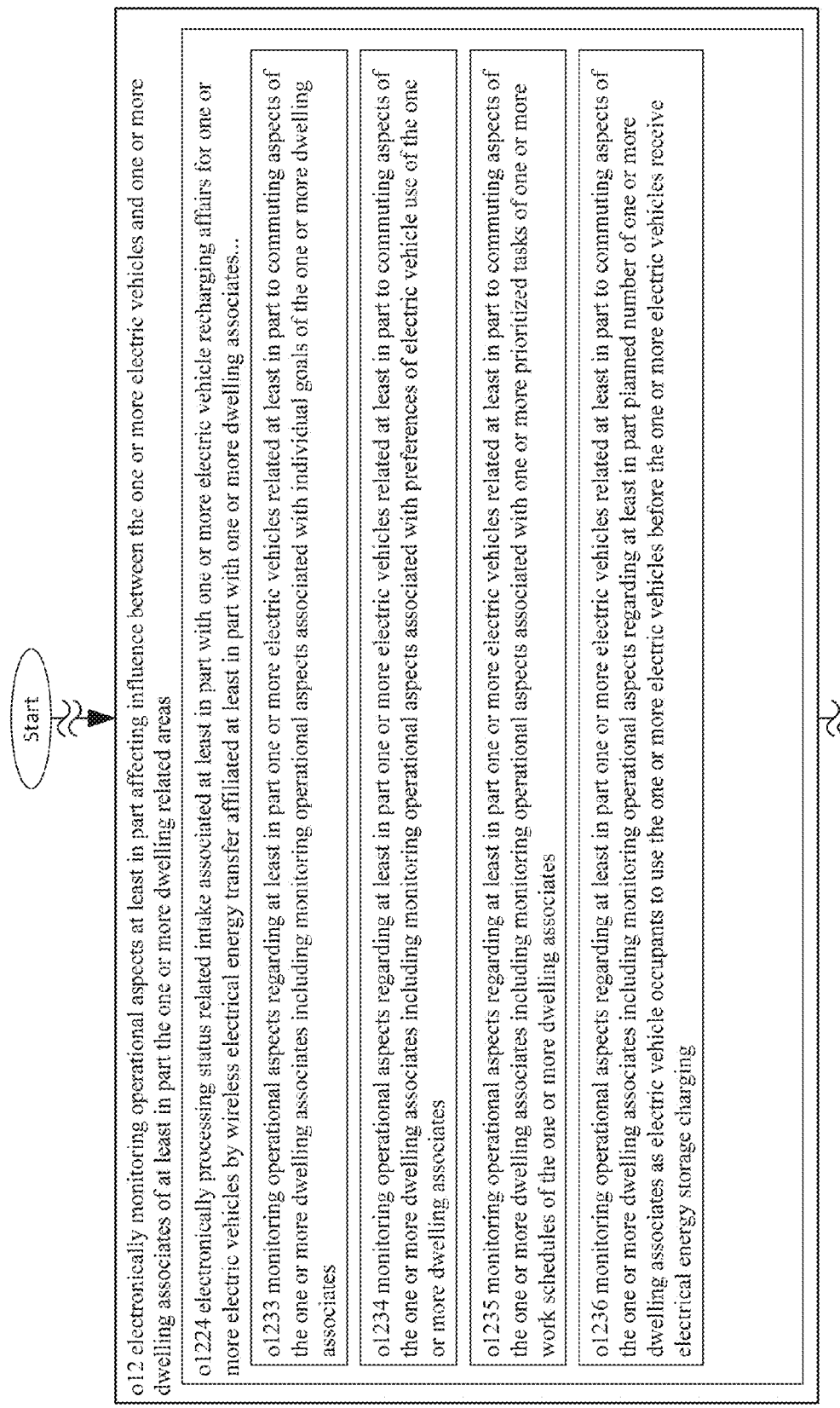
Fig. 10-G

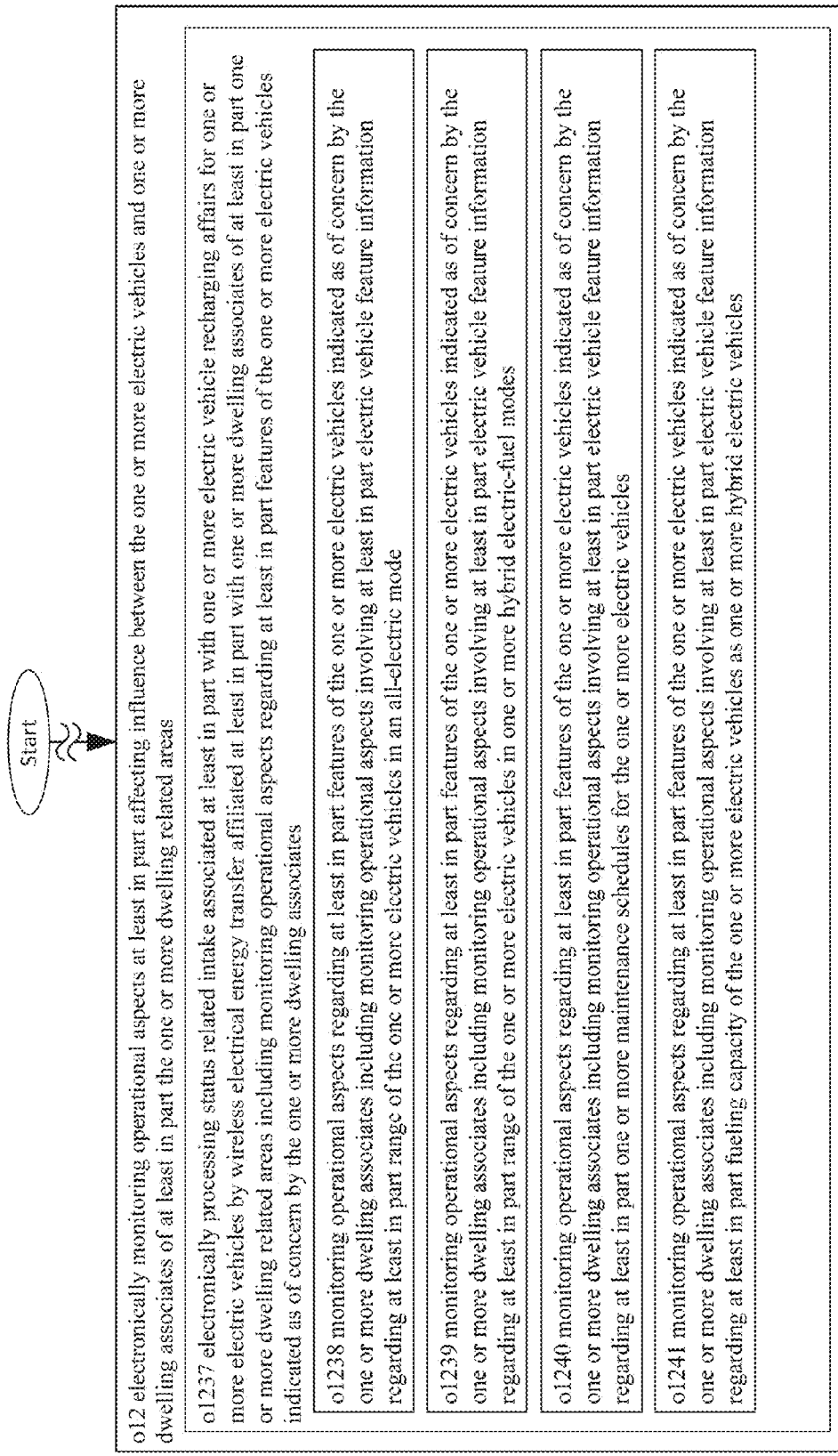
Fig. 10-H

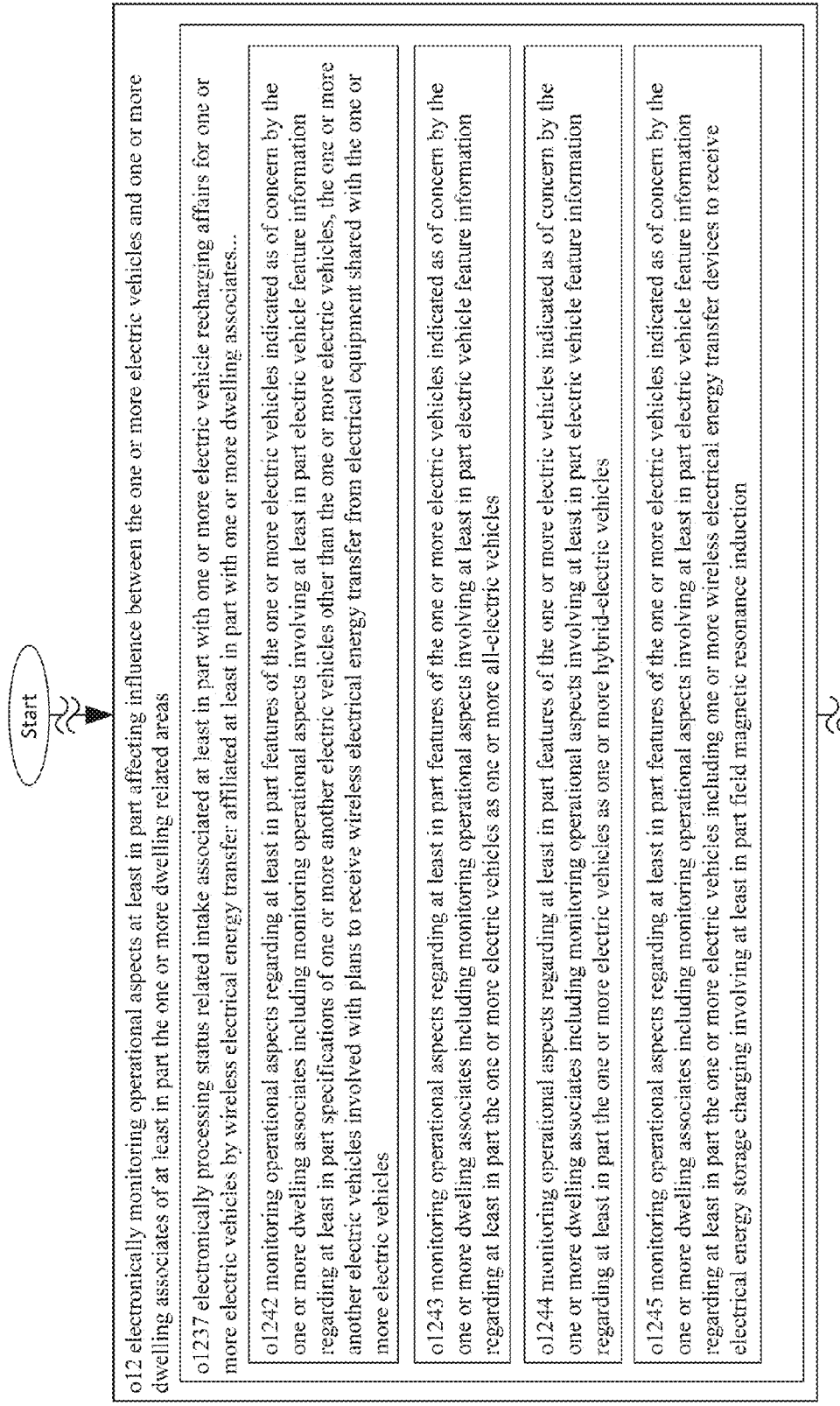
Fig. 10-I

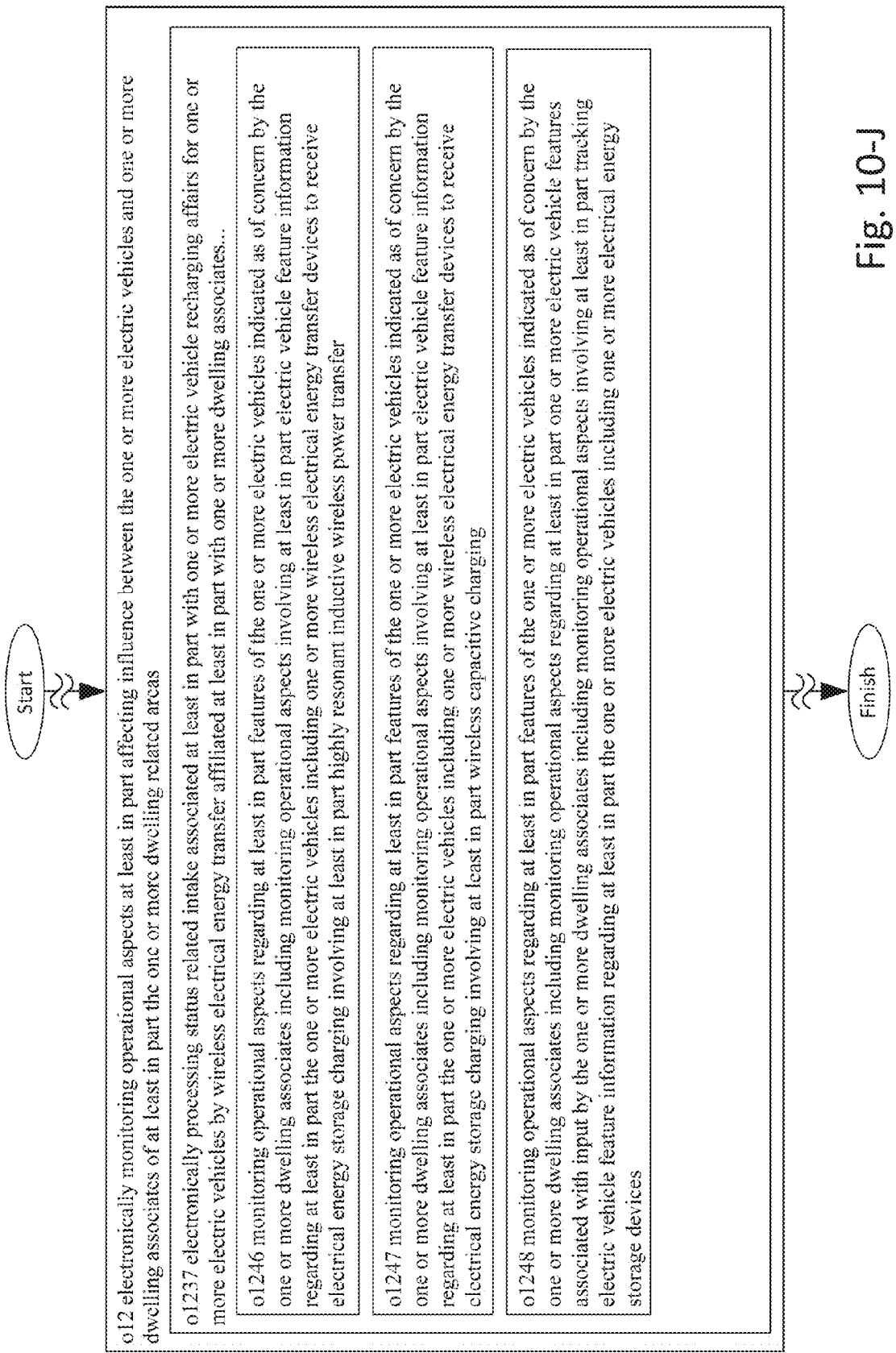
Fig. 10-J

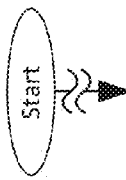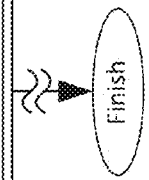

o12 electronically monitoring operational aspects at least in part affecting influence between the one or more electric vehicles and one or more dwelling associates of at least in part the one or more dwelling related areas o1237 electronically processing status related intake associated at least in part with one or more electric vehicle recharging affairs for one or more electric vehicles by wireless electrical energy transfer affiliated at least in part with one or more dwelling associates...

o1248 monitoring operational aspects regarding at least in part features of the one or more electric vehicles indicated as of concern by the one or more dwelling associates including monitoring operational aspects regarding at least in part one or more electric vehicle features...

o1249 monitoring operational aspects regarding at least in part one or more electric vehicle features associated with input by the one or more dwelling associates including monitoring operational aspects involving at least in part tracking electric vehicle feature information regarding at least in part the one or more electric vehicles including one or more electrical energy storage devices including monitoring operational aspects involving at least in part electric vehicle feature information regarding at least in part the one or more electric vehicles including electrical energy storage as capacitive electrical energy storage devices o1250 monitoring operational aspects regarding at least in part one or more electric vehicle features associated with input by the one or more dwelling associates including monitoring operational aspects involving at least in part tracking electric vehicle feature information regarding at least in part the one or more electric vehicles including one or more electrical energy storage devices including monitoring operational aspects involving at least in part electric vehicle feature information regarding at least in part the one or more electric vehicles including electrical energy storage as lithium ion, lead acid, or nickel cadmium electrical energy storage devices o1251 monitoring operational aspects regarding at least in part one or more electric vehicle features associated with input by the one or more dwelling associates including monitoring operational aspects involving at least in part tracking electric vehicle feature information regarding at least in part the one or more electric vehicles including one or more electrical energy storage devices including monitoring operational aspects involving at least in part electric vehicle feature information regarding at least in part the one or more electric vehicles including storage life aspects of electrical energy storage

Fig. 10-K

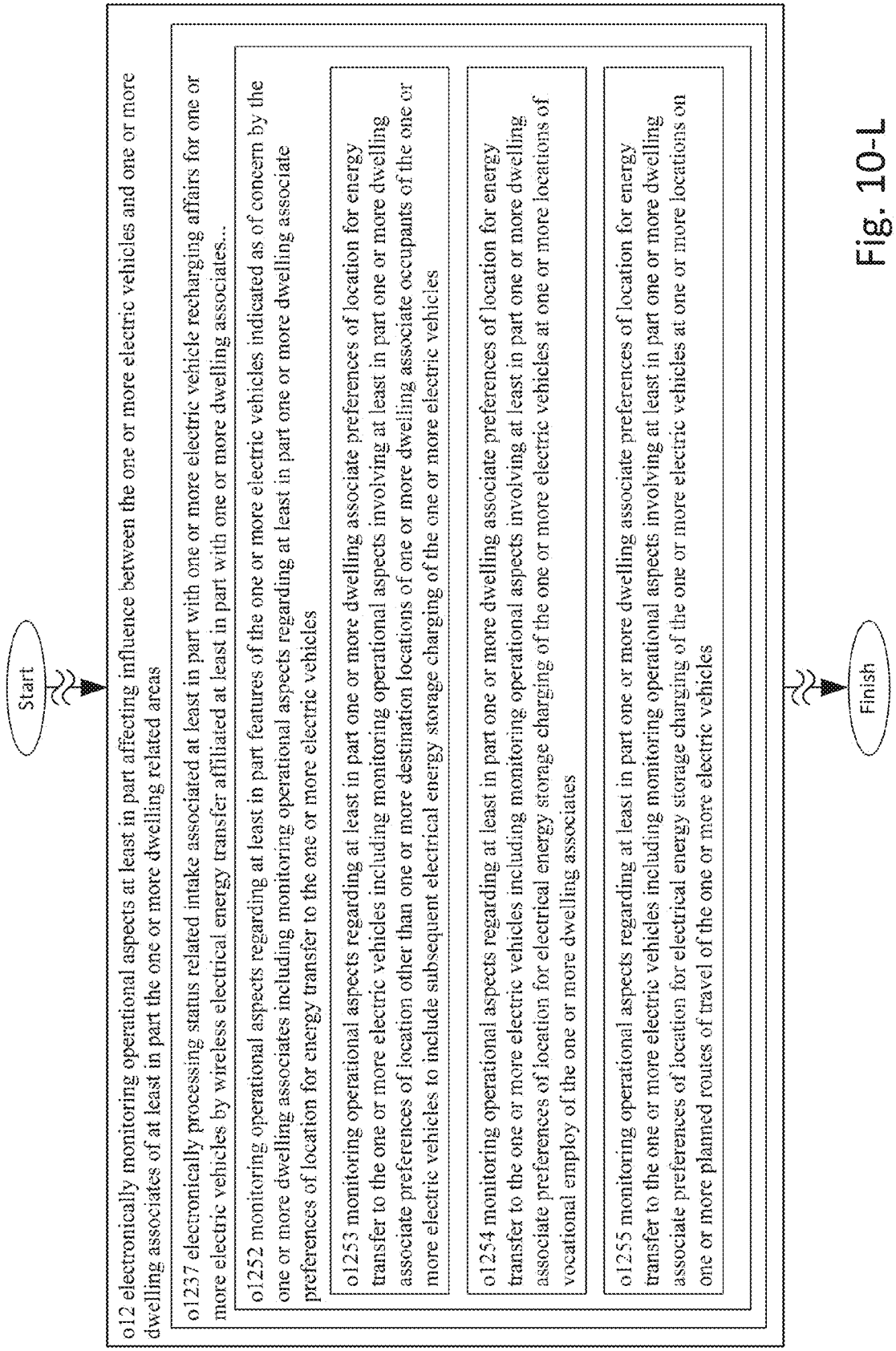
Fig. 10-L

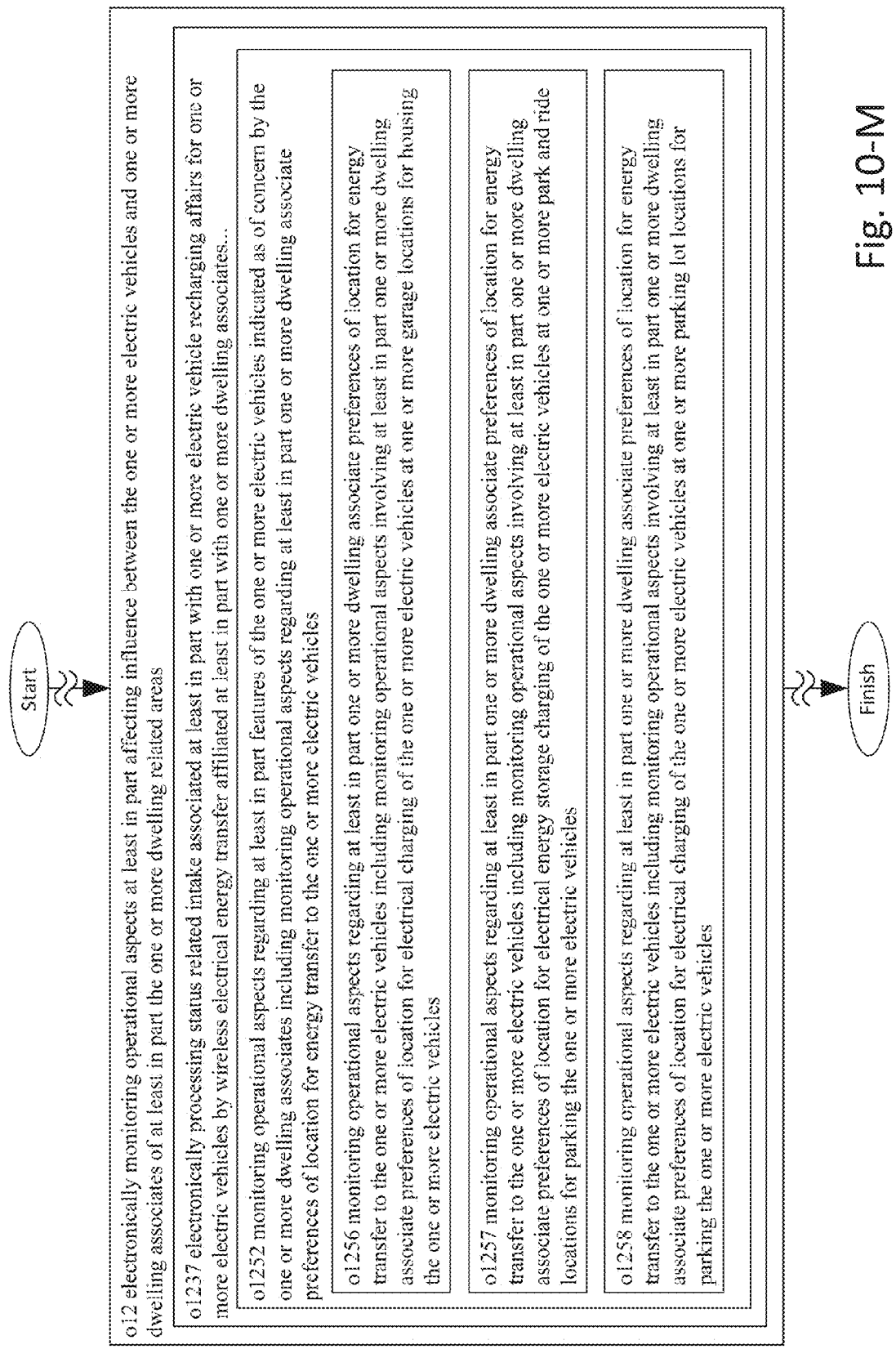
Fig. 10-M

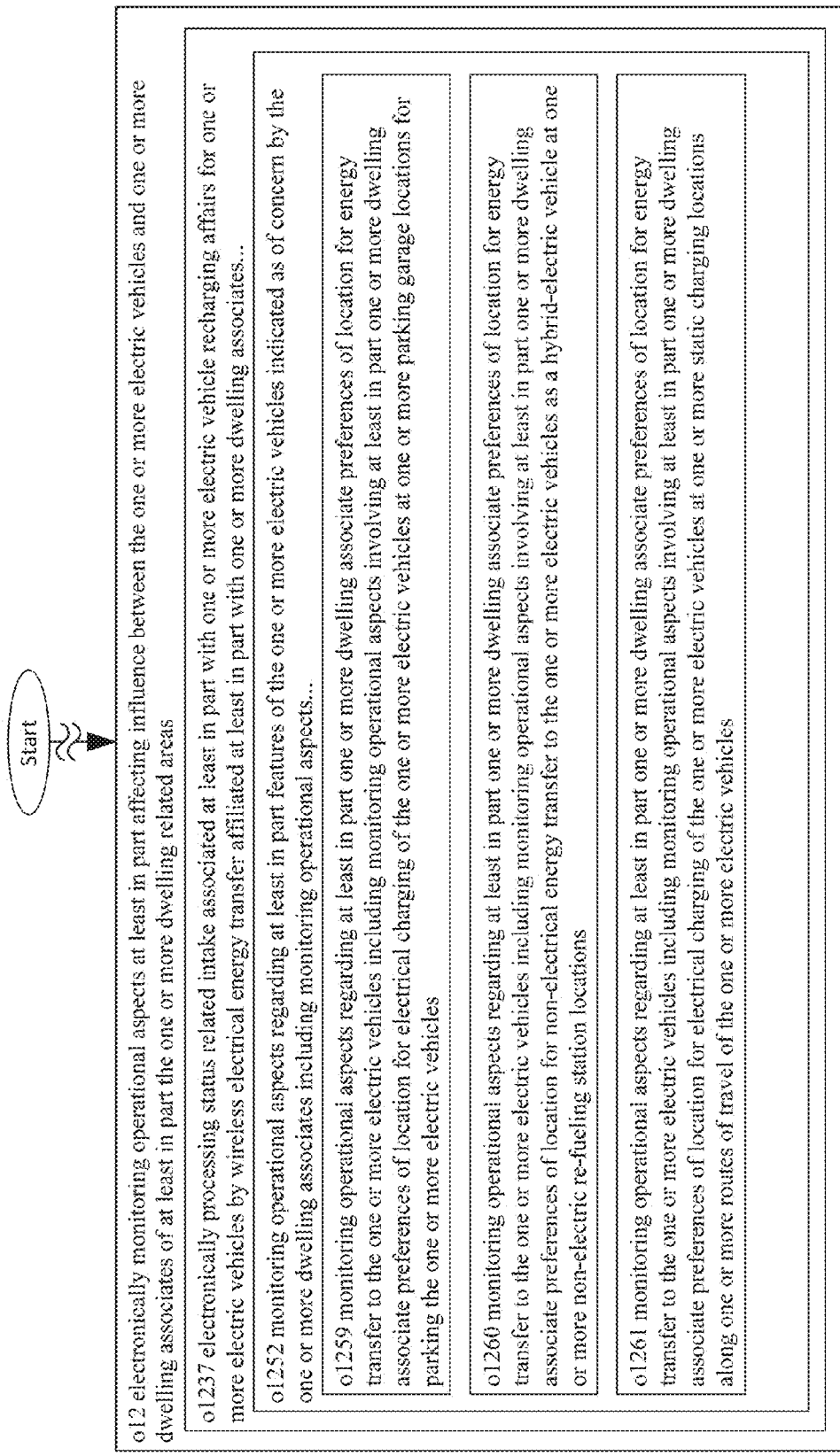
Fig. 10-N

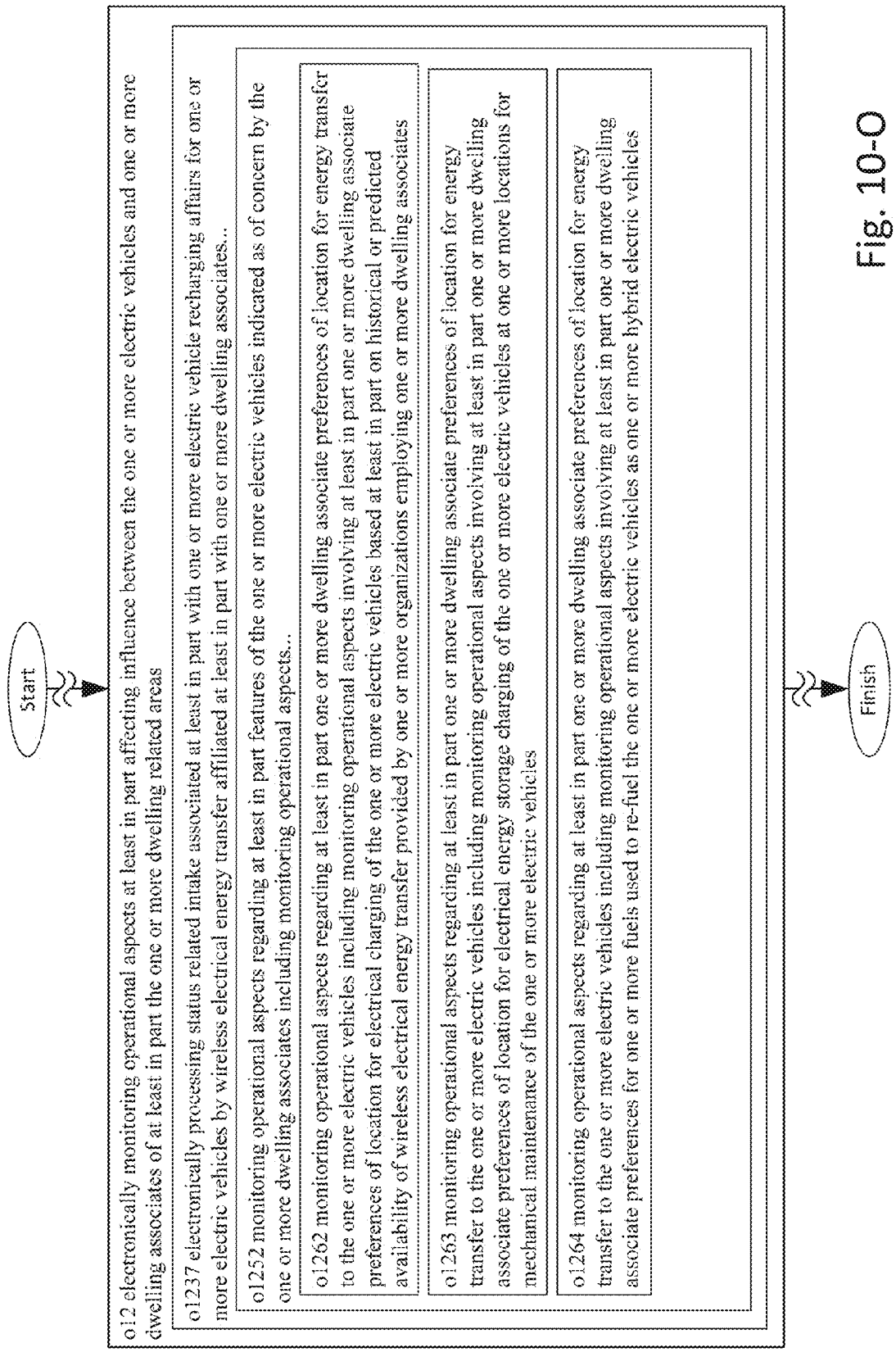
Fig. 10-O

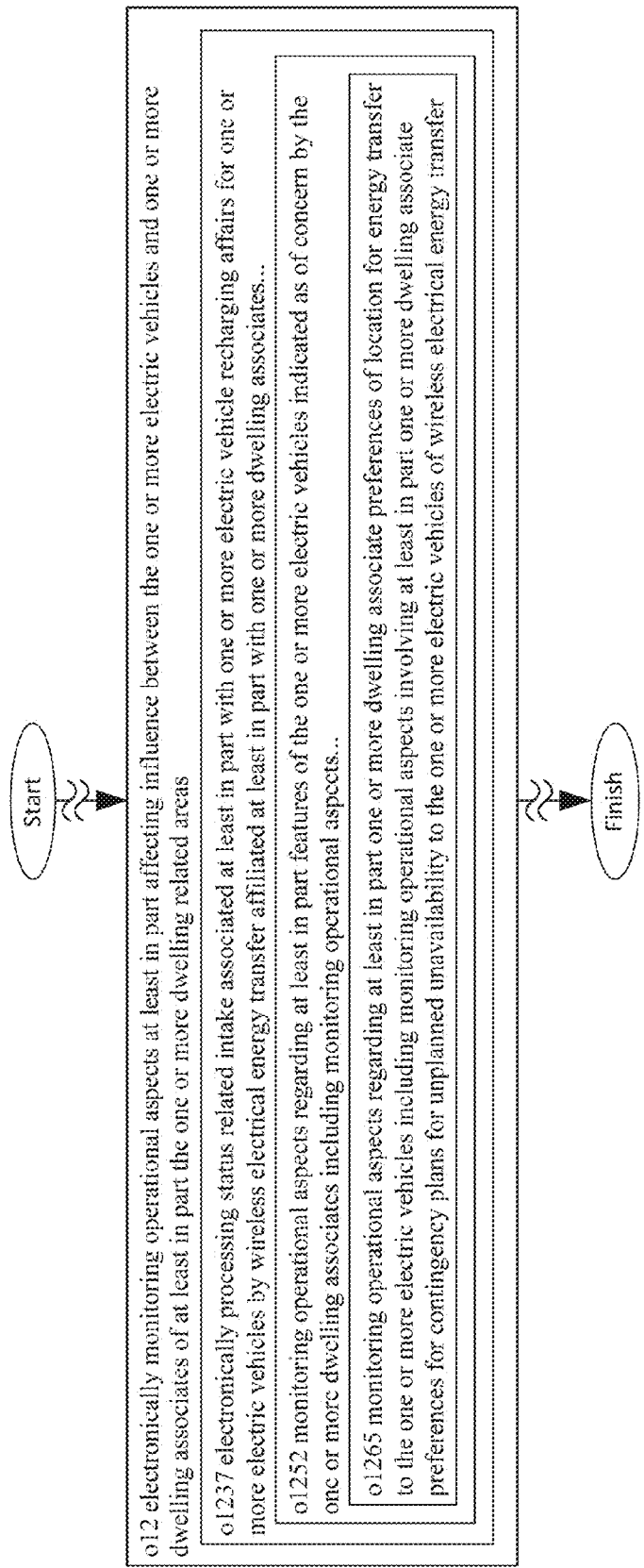
Fig. 10-P

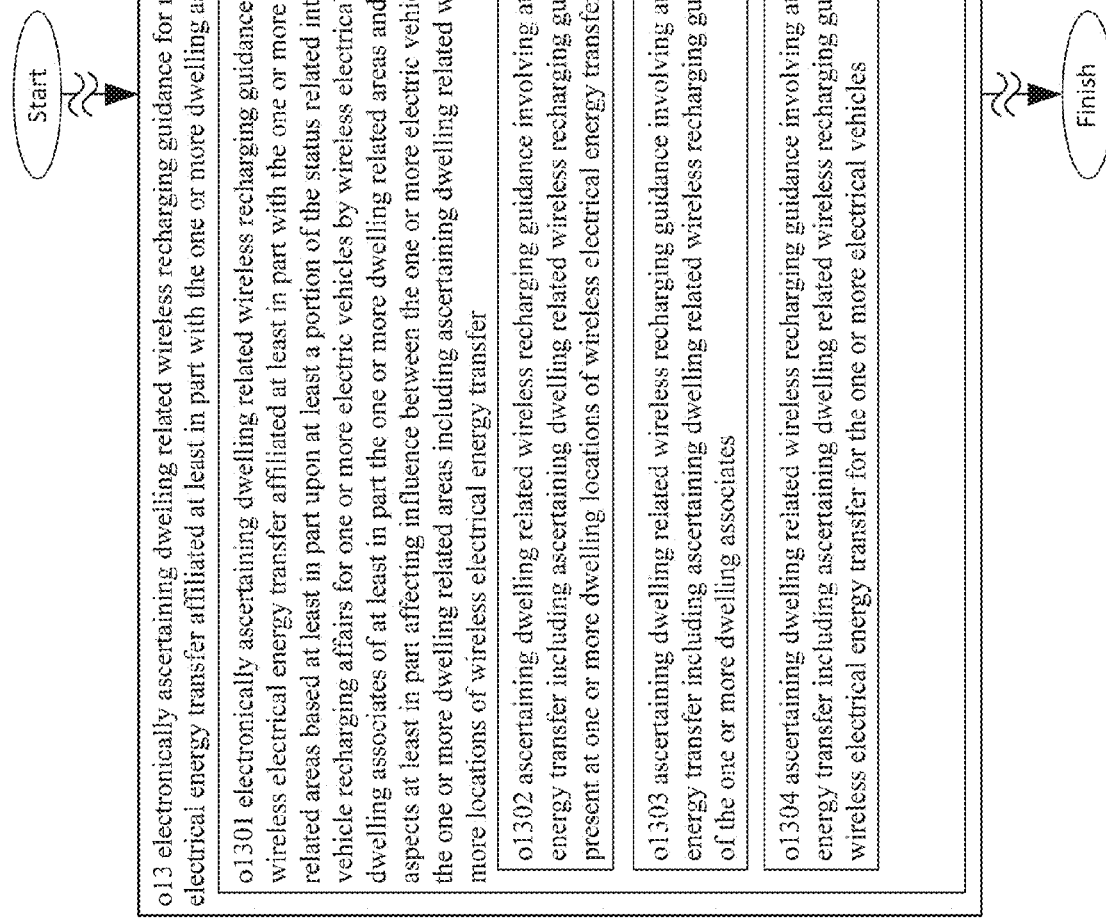
Fig. 11-A

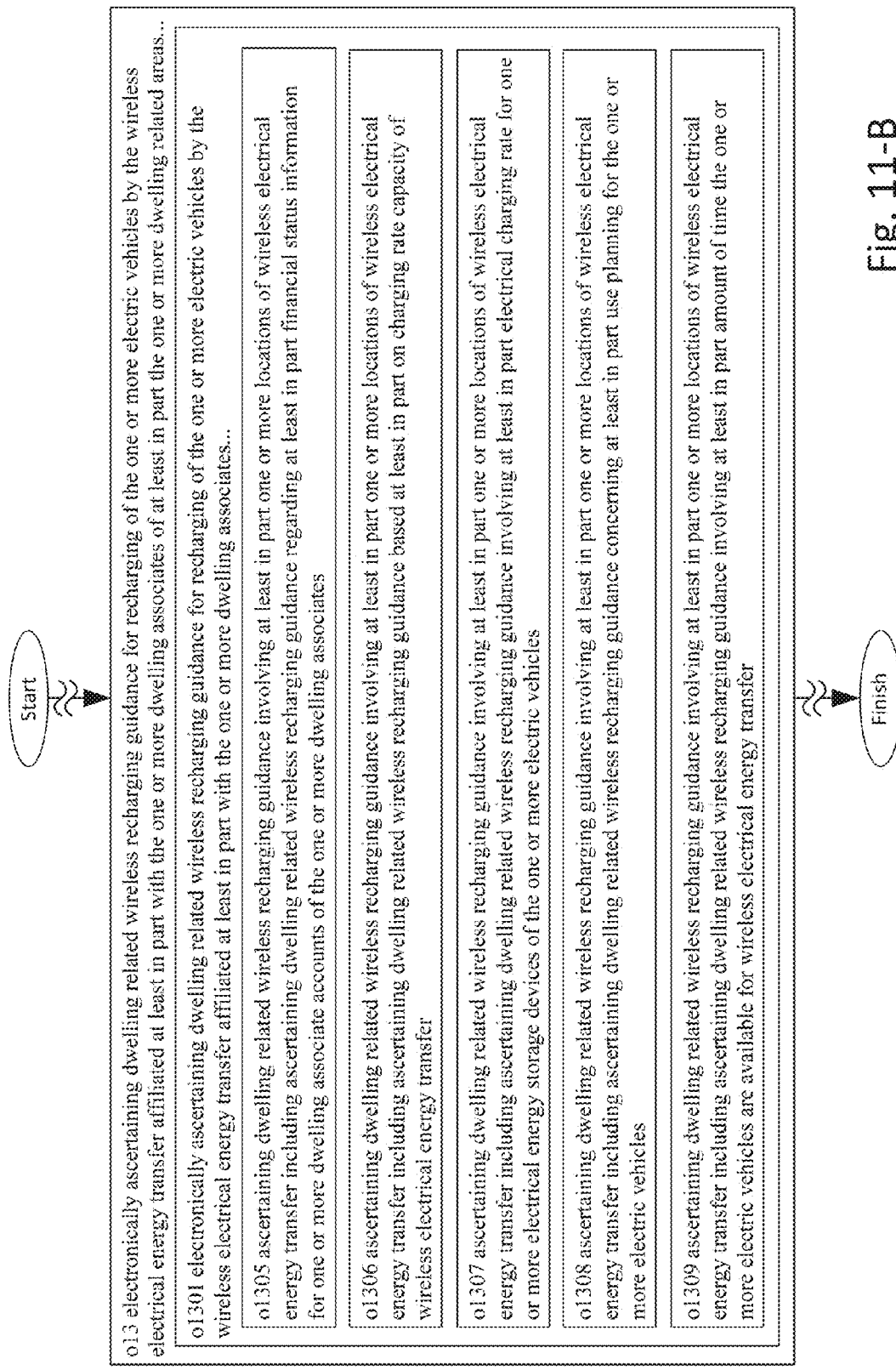
Fig. 11-B

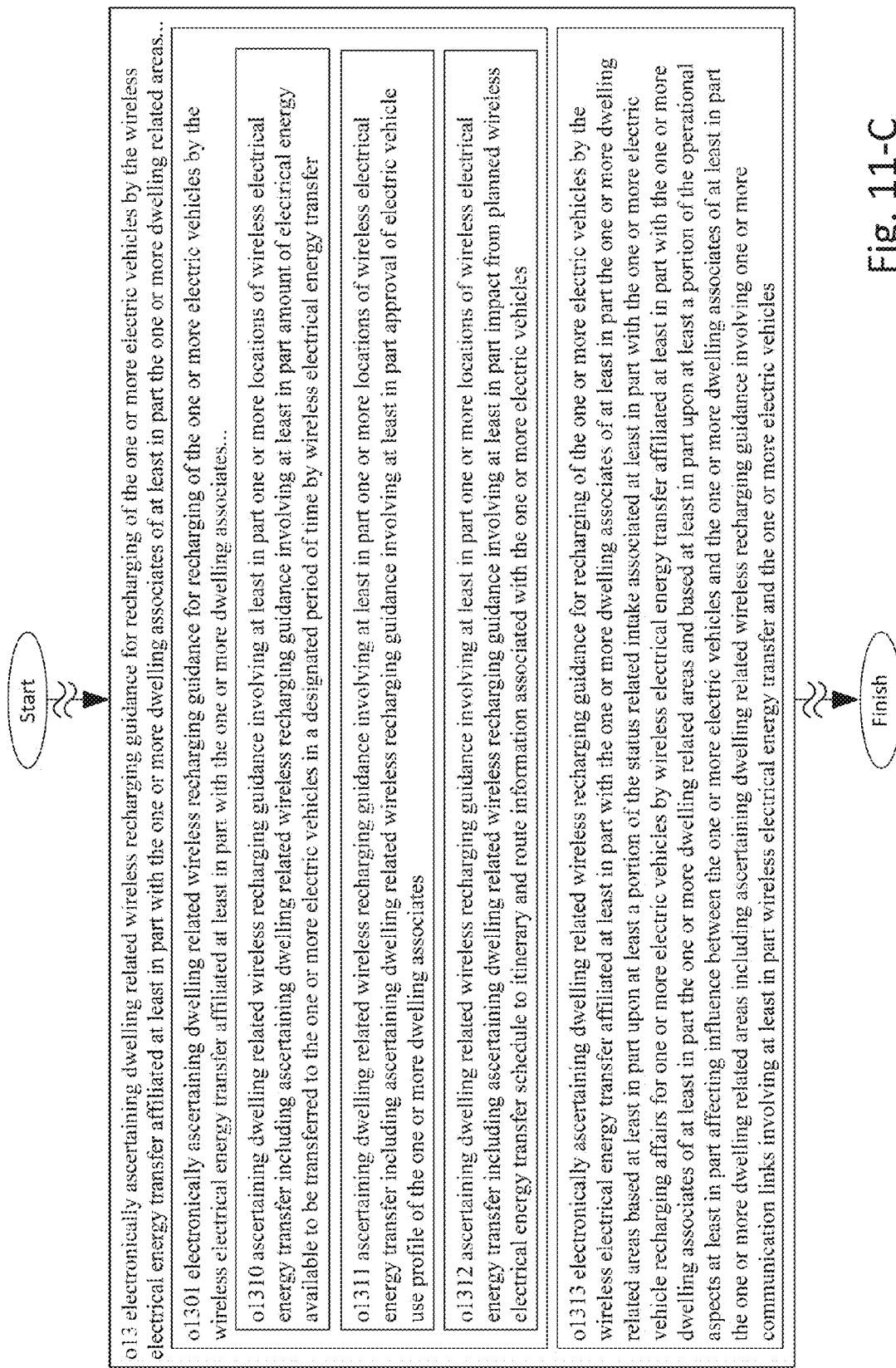
Fig. 11-C

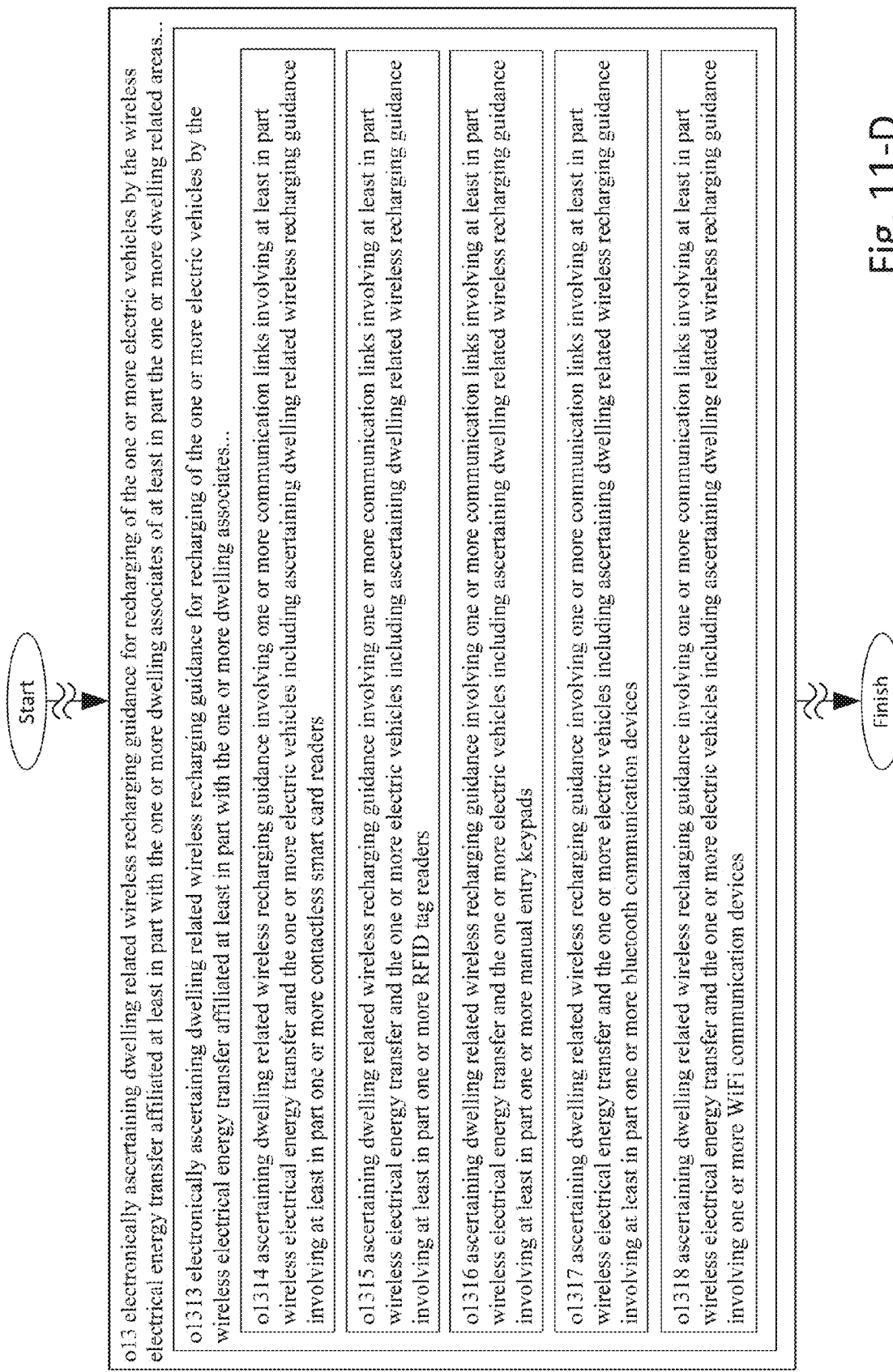
Fig. 11-D

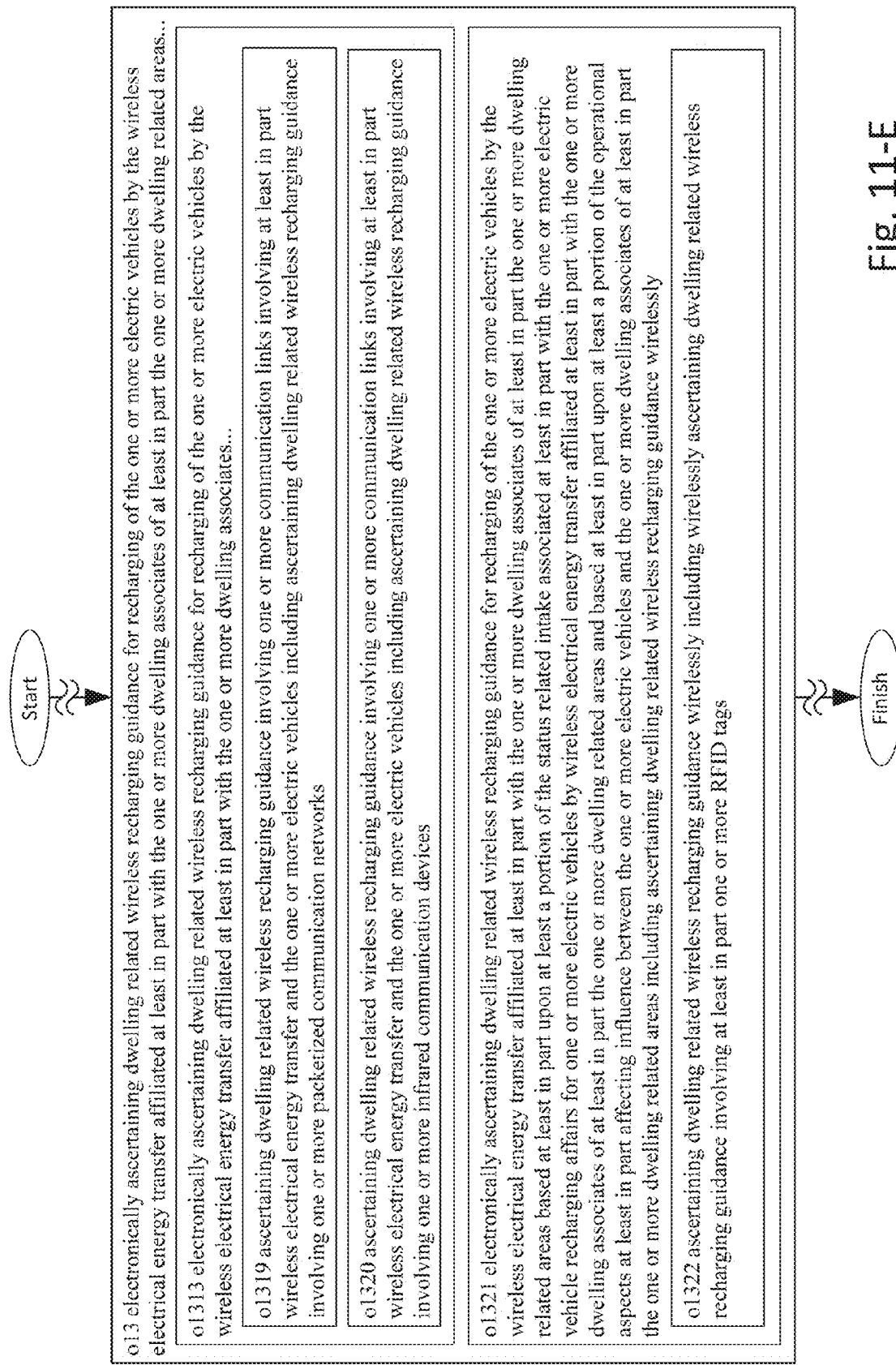
Fig. 11-E

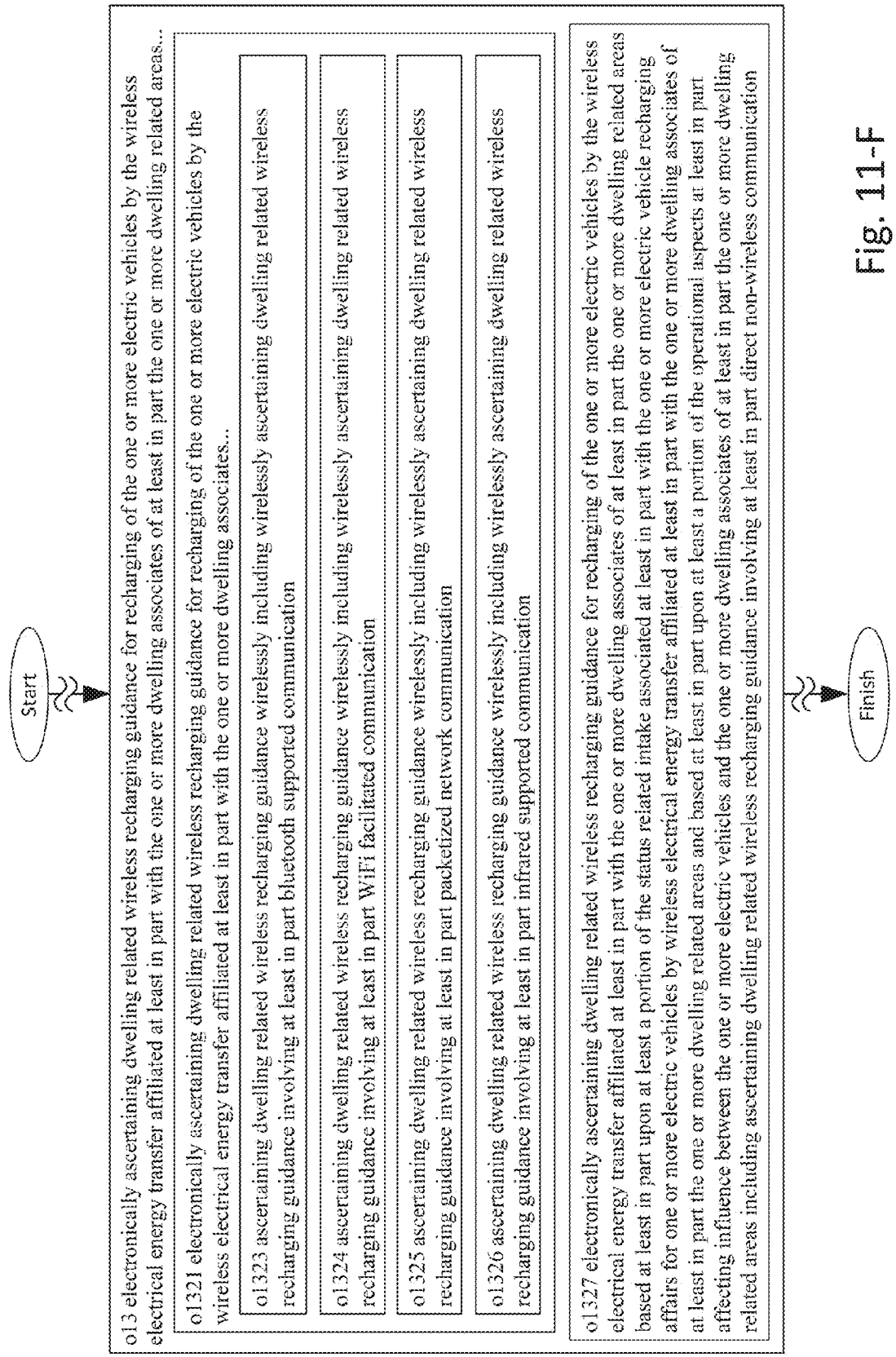
Fig. 11-F

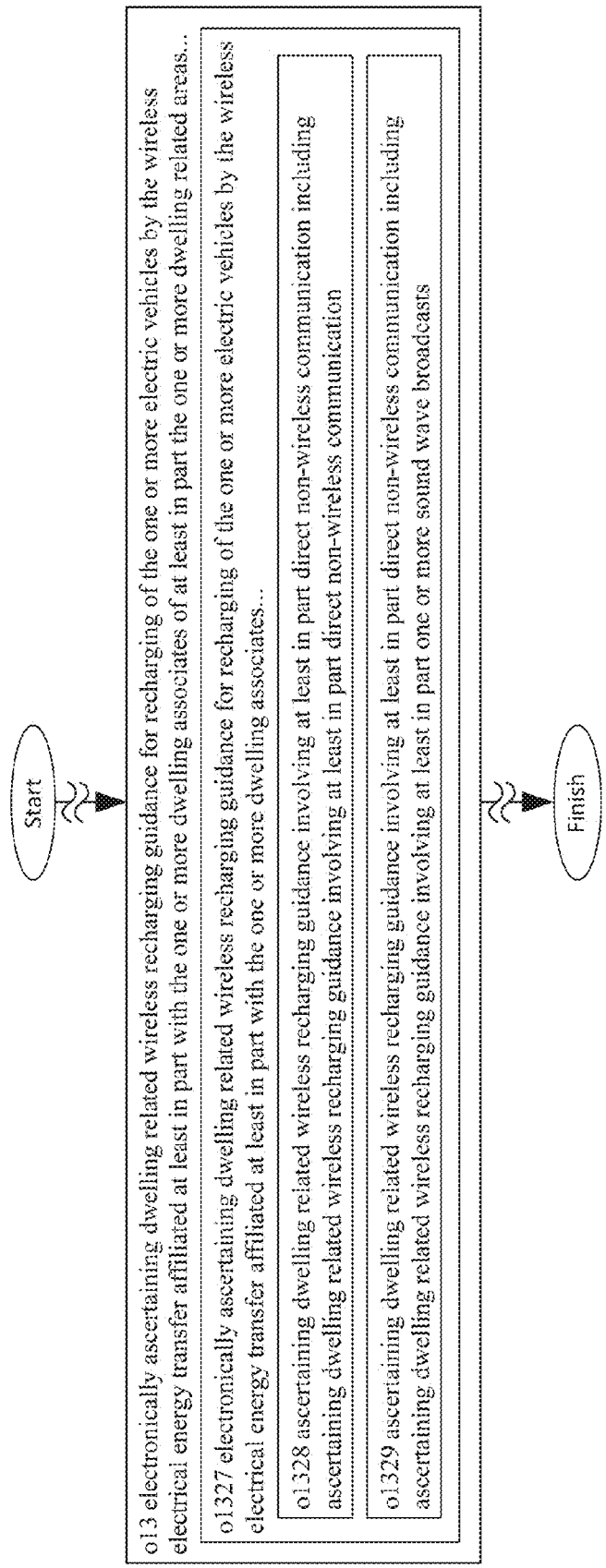
Fig. 11-G

DWELLING RELATED INFORMATION CENTER ASSOCIATED WITH COMMUNICATION AND CONTROL SYSTEM AND METHOD FOR WIRELESS ELECTRIC VEHICLE ELECTRICAL ENERGY TRANSFER

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

Related Applications

The present application constitutes a continuation-in-part of U.S. patent application Ser. No. 14/145,137, entitled EMPLOYMENT RELATED INFORMATION CENTER ASSOCIATED WITH COMMUNICATION AND CONTROL SYSTEM AND METHOD FOR WIRELESS ELECTRIC VEHICLE ELECTRICAL ENERGY TRANSFER, naming Roderick A. Hyde, Jordin T. Kare, Richard T. Lord, Robert W. Lord, Clarence T. Tegreene, Lowell L. Wood, Jr. as inventors, filed 31, Dec. 2013, is related to the present application.

The present application constitutes a continuation-in-part of U.S. patent application Ser. No. 14/145,178, entitled USER INTERFACE TO EMPLOYMENT RELATED INFORMATION CENTER ASSOCIATED WITH COMMUNICATION AND CONTROL SYSTEM AND METHOD FOR WIRELESS ELECTRIC VEHICLE ELECTRICAL ENERGY TRANSFER, naming Roderick A. Hyde, Jordin T. Kare, Richard T. Lord, Robert W. Lord, Clarence T. Tegreene, Lowell L. Wood, Jr. as inventors, filed 31, Dec. 2013, is related to the present application.

The present application constitutes a continuation-in-part of U.S. patent application Ser. No. 14/145,069, entitled USER INTERFACE TO RESIDENCE RELATED INFORMATION CENTER ASSOCIATED WITH COMMUNICATION AND CONTROL SYSTEM AND METHOD FOR WIRELESS ELECTRIC VEHICLE ELECTRICAL ENERGY TRANSFER, naming Roderick A. Hyde, Jordin T. Kare, Richard T. Lord, Robert W. Lord, Clarence T. Tegreene, Lowell L. Wood, Jr. as inventors, filed 31, Dec. 2013, is related to the present application.

The present application constitutes a continuation-in-part of U.S. patent application Ser. No. 14/145,264, entitled USER INTERFACE TO RESIDENCE RELATED INFORMATION CENTER ASSOCIATED WITH COMMUNICATION AND CONTROL SYSTEM AND METHOD FOR WIRELESS ELECTRIC VEHICLE ELECTRICAL ENERGY TRANSFER, naming Roderick A. Hyde, Jordin T. Kare, Richard T. Lord, Robert W. Lord, Clarence T. Tegreene, Lowell L. Wood, Jr. as inventors, filed 31, Dec. 2013, is related to the present application.

For purposes of the USPTO extra-statutory requirements, the present application constitutes a continuation-in-part of U.S. patent application Ser. No. 14/136,143, entitled USER INTERFACE TO EMPLOYMENT RELATED INFORMATION CENTER ASSOCIATED WITH COMMUNICATION AND CONTROL SYSTEM AND METHOD FOR WIRELESS ELECTRIC VEHICLE ELECTRICAL ENERGY TRANSFER, naming RODERICK A. HYDE; JORDIN T. KARE; RICHARD T. LORD; ROBERT W. LORD; CLARENCE T. TEGREENE; AND LOWELL L. WOOD, JR. as inventors, filed 20, Dec. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/133,382, entitled EMPLOYMENT RELATED INFORMATION CENTER ASSOCIATED WITH COMMUNICATION AND CONTROL SYSTEM AND METHOD FOR WIRELESS ELECTRIC VEHICLE ELECTRICAL ENERGY TRANSFER, naming RODERICK A. HYDE; JORDIN T. KARE; RICHARD T. LORD; ROBERT W. LORD; CLARENCE T. TEGREENE; AND LOWELL L. WOOD, JR. as inventors, filed 18, Dec. 2013, which is currently co-pending or is an application of which a currently co-pending application is entitled to the benefit of the filing date.

The present application constitutes a continuation of U.S. patent application Ser. No. 14/144,203, entitled USER INTERFACE TO RESIDENCE RELATED INFORMATION CENTER ASSOCIATED WITH COMMUNICATION CONTROL SYSTEM AND METHOD FOR WIRELESS ELECTRIC VEHICLE ELECTRICAL ENERGY TRANSFER, naming Roderick A. Hyde, Jordin T. Kare, Richard T. Lord, Robert W. Lord, Clarence T. Tegreene, Lowell L. Wood, Jr. as inventors, filed 30, Dec. 2013 which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/092,126, entitled COMMUNICATION AND CONTROL REGARDING ELECTRICITY PROVIDER FOR WIRELESS ELECTRIC VEHICLE ELECTRICAL ENERGY TRANSFER, naming RODERICK A. HYDE; JORDIN T. KARE; RICHARD T. LORD; ROBERT W. LORD; CLARENCE T. TEGREENE; AND LOWELL L. WOOD, JR. as inventors, filed 27, Nov. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/092,306, entitled COMMUNICATION AND CONTROL SYSTEM AND METHOD REGARDING ELECTRIC VEHICLE CHARGING EQUIPMENT FOR WIRELESS ELECTRIC VEHICLE ELECTRICAL ENERGY TRANSFER, naming RODERICK A. HYDE; JORDIN T. KARE; RICHARD T. LORD; ROBERT W. LORD; CLARENCE T. TEGREENE;

AND LOWELL L. WOOD, JR. as inventors, filed 27, Nov. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/092,082, entitled COMMUNICATION AND CONTROL SYSTEM AND METHOD REGARDING ELECTRIC VEHICLE FOR WIRELESS ELECTRIC VEHICLE ELECTRICAL ENERGY TRANSFER, naming RODERICK A. HYDE; JORDIN T. KARE; RICHARD T. LORD; ROBERT W. LORD; CLARENCE T. TEGREENE; AND LOWELL L. WOOD, JR. as inventors, filed 27, Nov. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/091,702, entitled COMMUNICATION AND CONTROL REGARDING ELECTRICITY PROVIDER FOR WIRELESS ELECTRIC VEHICLE ELECTRICAL ENERGY TRANSFER, naming RODERICK A. HYDE; JORDIN T. KARE; RICHARD T. LORD; ROBERT W. LORD; CLARENCE T. TEGREENE; AND LOWELL L. WOOD, JR. as inventors, filed 27, Nov. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/089,513, entitled COMMUNICATION AND CONTROL SYSTEM AND METHOD REGARDING ELECTRIC VEHICLE CHARGING EQUIPMENT FOR WIRELESS ELECTRIC VEHICLE ELECTRICAL ENERGY TRANSFER, naming RODERICK A. HYDE; JORDIN T. KARE; RICHARD T. LORD; ROBERT W. LORD; CLARENCE T. TEGREENE; AND LOWELL L. WOOD, JR. as inventors, filed 25, Nov. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/086,903, entitled COMMUNICATION AND CONTROL SYSTEM AND METHOD REGARDING ELECTRIC VEHICLE FOR WIRELESS ELECTRIC VEHICLE ELECTRICAL ENERGY TRANSFER, naming RODERICK A. HYDE; JORDIN T. KARE; RICHARD T. LORD; ROBERT W. LORD; CLARENCE T. TEGREENE; AND LOWELL L. WOOD, JR. as inventors, filed 21, Nov. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 14/041,443, entitled COMMUNICATION AND CONTROL REGARDING WIRELESS ELECTRIC VEHICLE ELECTRICAL ENERGY TRANSFER, naming RODERICK A. HYDE; JORDIN T. KARE; RICHARD T. LORD; ROBERT W. LORD; CLARENCE T. TEGREENE; AND LOWELL L. WOOD, JR. as inventors, filed 30, Sep. 2013, which is currently co-pending or is an application of which a currently co-pending application is entitled to the benefit of the filing date.

SUMMARY

In one aspect, a computationally-implemented method includes, but is not limited to electronically processing status related intake associated at least in part with one or more electric vehicle recharging affairs for one or more electric vehicles by wireless electrical energy transfer affiliated at least in part with one or more dwelling associates of at least in part one or more dwelling related areas; electronically monitoring operational aspects at least in part affecting influence between the one or more electric vehicles and one or more dwelling associates of at least in part the one or more dwelling related areas; and electronically ascertaining dwelling related wireless recharging guidance for recharging of the one or more electric vehicles by the wireless electrical energy transfer affiliated at least in part with the one or more dwelling associates of at least in part the one or more dwelling related areas based at least in part upon at least a portion of the status related intake associated at least in part with the one or more electric vehicle recharging affairs for one or more electric vehicles by wireless electrical energy transfer affiliated at least in part with the one or more dwelling associates of at least in part the one or more dwelling related areas and based at least in part upon at least a portion of the operational aspects at least in part affecting influence between the one or more electric vehicles and the one or more dwelling associates of at least in part the one or more dwelling related areas. In addition to the foregoing, other method aspects are described in the claims, drawings, and text forming a part of the disclosure set forth herein.

In one or more various aspects, related machines, compositions of matter, or manufactures of systems may include, but are not limited to, circuitry and/or programming for effecting the herein-referenced method aspects; the circuitry and/or programming can be virtually any combination of hardware, software, and/or firmware configured to effect the herein-referenced method aspects depending upon the design choices of the system designer (limited to patentable subject matter under 35 USC 101).

A computationally-implemented system includes, but is not limited to: means for electronically processing status related intake associated at least in part with one or more electric vehicle recharging affairs for one or more electric vehicles by wireless electrical energy transfer affiliated at least in part with one or more dwelling associates of at least in part one or more dwelling related areas; means for electronically monitoring operational aspects at least in part affecting influence between the one or more electric vehicles and one or more dwelling associates of at least in part the one or more dwelling related areas; and means for electronically ascertaining dwelling related wireless recharging guidance for recharging of the one or more electric vehicles by the wireless electrical energy transfer affiliated at least in part with the one or more dwelling associates of at least in part the one or more dwelling related areas based at least in part upon at least a portion of the status related intake associated at least in part with the one or more electric vehicle recharging affairs for one or more electric vehicles by wireless electrical energy transfer affiliated at least in part with the one or more dwelling associates of at least in part the one or more dwelling related areas and based at least in part upon at least a portion of the operational aspects at least in part affecting influence between the one or more electric vehicles and the one or more dwelling associates of at least in part the one or more dwelling related areas. In addition to the foregoing, other system aspects are described in the claims, drawings, and text forming a part of the disclosure set forth herein.

A computationally-implemented system includes, but is not limited to electrical circuitry arrangement for electronically processing status related intake associated with electric vehicle recharging affairs for electric vehicles by wireless electrical energy transfer affiliated with dwelling associates of dwelling related areas; electrical circuitry arrangement for electronically monitoring operational aspects affecting influence between electric vehicles and dwelling associates of dwelling related areas; and electrical circuitry arrangement for electronically ascertaining dwelling related wireless recharging guidance for recharging of electric vehicles by wireless electrical energy transfer affiliated with dwelling associates of dwelling related areas based upon at least a portion of status related intake associated with electric vehicle recharging affairs for electric vehicles by wireless electrical energy transfer affiliated with dwelling associates of dwelling related areas and based upon at least a portion of operational aspects affecting influence between electric vehicles and dwelling associates of dwelling related areas. In addition to the foregoing, other system aspects are described in the claims, drawings, and text forming a part of the disclosure set forth herein.

A system includes, but is not limited to electronically processing status related intake associated with electric vehicle recharging affairs for electric vehicles by wireless electrical energy transfer affiliated with dwelling associates of dwelling related areas module configured to operate in accordance with electronically processing status related intake associated at least in part with one or more electric vehicle recharging affairs for one or more electric vehicles by wireless electrical energy transfer affiliated at least in part with one or more dwelling associates of at least in part one or more dwelling related areas; electronically monitoring operational aspects affecting influence between electric vehicles and dwelling associates of dwelling related areas module configured to operate in accordance with electronically monitoring operational aspects at least in part affecting influence between the one or more electric vehicles and one or more dwelling associates of at least in part the one or more dwelling related areas; electronically ascertaining dwelling related wireless recharging guidance for recharging of electric vehicles by wireless electrical energy transfer affiliated with dwelling associates of dwelling related areas based upon at least a portion of status related intake associated with electric vehicle recharging affairs for electric vehicles by wireless electrical energy transfer affiliated with dwelling associates of dwelling related areas and based upon at least a portion of operational aspects affecting influence between electric vehicles and dwelling associates of dwelling related areas module configured to operate in accordance with electronically ascertaining dwelling related wireless recharging guidance for recharging of the one or more electric vehicles by the wireless electrical energy transfer affiliated at least in part with the one or more dwelling associates of at least in part the one or more dwelling related areas based at least in part upon at least a portion of the status related intake associated at least in part with the one or more electric vehicle recharging affairs for one or more electric vehicles by wireless electrical energy transfer affiliated at least in part with the one or more dwelling associates of at least in part the one or more dwelling related areas and based at least in part upon at least a portion of the operational aspects at least in part affecting influence between the one or more electric vehicles and the one or more dwelling associates of at least in part the one or more dwelling related areas. In addition to the foregoing, other system aspects are described in the claims, drawings, and text forming a part of the disclosure set forth herein.

An article of manufacture including one or more non-transitory signal-bearing storage medium bearing one or more instructions for electronically processing status related intake associated at least in part with one or more electric vehicle recharging affairs for one or more electric vehicles by wireless electrical energy transfer affiliated at least in part with one or more dwelling associates of at least in part one or more dwelling related areas; one or more instructions for electronically monitoring operational aspects at least in part affecting influence between the one or more electric vehicles and one or more dwelling associates of at least in part the one or more dwelling related areas; and one or more instructions for electronically ascertaining dwelling related wireless recharging guidance for recharging of the one or more electric vehicles by the wireless electrical energy transfer affiliated at least in part with the one or more dwelling associates of at least in part the one or more dwelling related areas based at least in part upon at least a portion of the status related intake associated at least in part with the one or more electric vehicle recharging affairs for one or more electric vehicles by wireless electrical energy transfer affiliated at least in part with the one or more dwelling associates of at least in part the one or more dwelling related areas and based at least in part upon at least a portion of the operational aspects at least in part affecting influence between the one or more electric vehicles and the one or more dwelling associates of at least in part the one or more dwelling related areas. In addition to the foregoing, other computer program product aspects are described in the claims, drawings, and text forming a part of the disclosure set forth herein.

A system including one or more computing devices; and one or more instructions when executed on the one or more computing devices cause the one or more computing devices to perform electronically processing status related intake associated at least in part with one or more electric vehicle recharging affairs for one or more electric vehicles by wireless electrical energy transfer affiliated at least in part with one or more dwelling associates of at least in part one or more dwelling related areas; electronically monitoring operational aspects at least in part affecting influence between the one or more electric vehicles and one or more dwelling associates of at least in part the one or more dwelling related areas; and electronically ascertaining dwelling related wireless recharging guidance for recharging of the one or more electric vehicles by the wireless electrical energy transfer affiliated at least in part with the one or more dwelling associates of at least in part the one or more dwelling related areas based at least in part upon at least a portion of the status related intake associated at least in part with the one or more electric vehicle recharging affairs for one or more electric vehicles by wireless electrical energy transfer affiliated at least in part with the one or more dwelling associates of at least in part the one or more dwelling related areas and based at least in part upon at least a portion of the operational aspects at least in part affecting influence between the one or more electric vehicles and the one or more dwelling associates of at least in part the one or more dwelling related areas. In addition to the foregoing, other computer program product aspects are described in the claims, drawings, and text forming a part of the disclosure set forth herein.

In addition to the foregoing, various other method and/or system and/or program product aspects are set forth and described in the teachings such as text (e.g., claims and/or detailed description) and/or drawings of the present disclosure.

In one or more various aspects, a method includes but is not limited to that which is illustrated in the drawings. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of is an example of Dwelling Related Information Center Associated with Communication and Control System and Method for Wireless Electric Vehicle Electrical Energy Transfer that may provide context, for instance, in introducing one or more processes and/or devices described herein.

In accordance with 37 CFR 1.84(h)(2)

Figure 1:
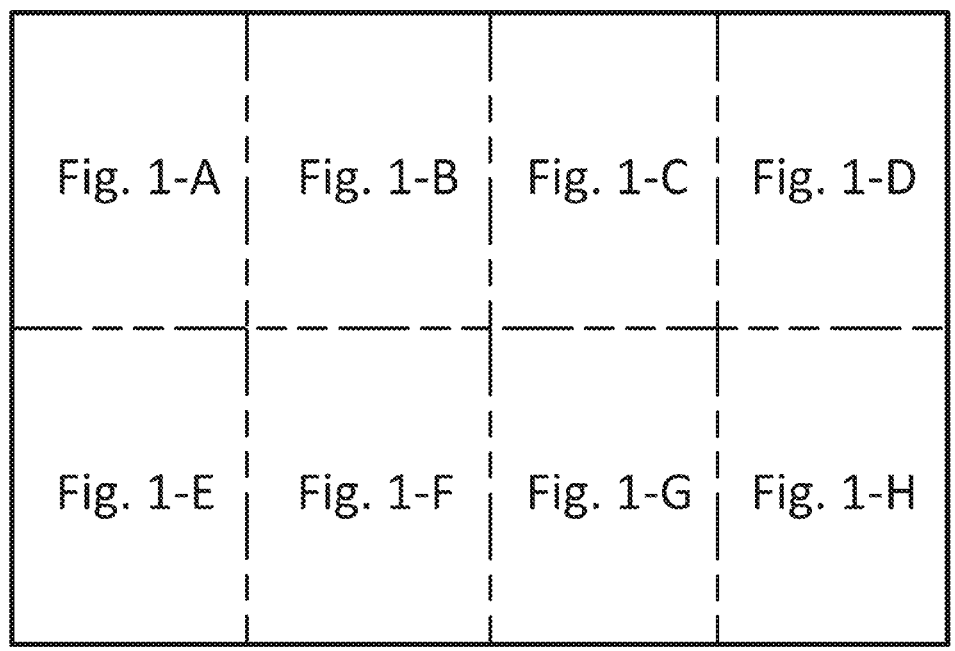
FIG. 1 shows how FIG. 1-A through FIG. 1-H (Sheets 2-9) are to be arranged and assembled to form "a view of a large machine or device in its entirety . . . broken into partial views . . . extended over several sheets" labeled. The "views on two or more sheets form, in effect, a single complete view, [and] the views on the several sheets . . . [are] so arranged that the complete figure can be assembled" from "partial views drawn on separate sheets . . . linked edge to edge," in that the partial-view FIGS. 1-A to 1-H are ordered alphabetically, by increasing column from left to right, as shown in the following table (with further orientation as indicated by phantom-lines on the partial-view figures)

| FIG. 1-A | FIG. 1-B | FIG. 1-C | FIG. 1-D |
| FIG. 1-E | FIG. 1-F | FIG. 1-G | FIG. 1-H |

FIG. 2 shows a schematic diagram of implementation(s) of environment(s) and/or implementations(s) of one or more technologies described herein including dwelling information center implementation(s) in communication with electric vehicle implementation(s), and with wireless electrical energy transfer imparting station implementation(s).

Figure 3:
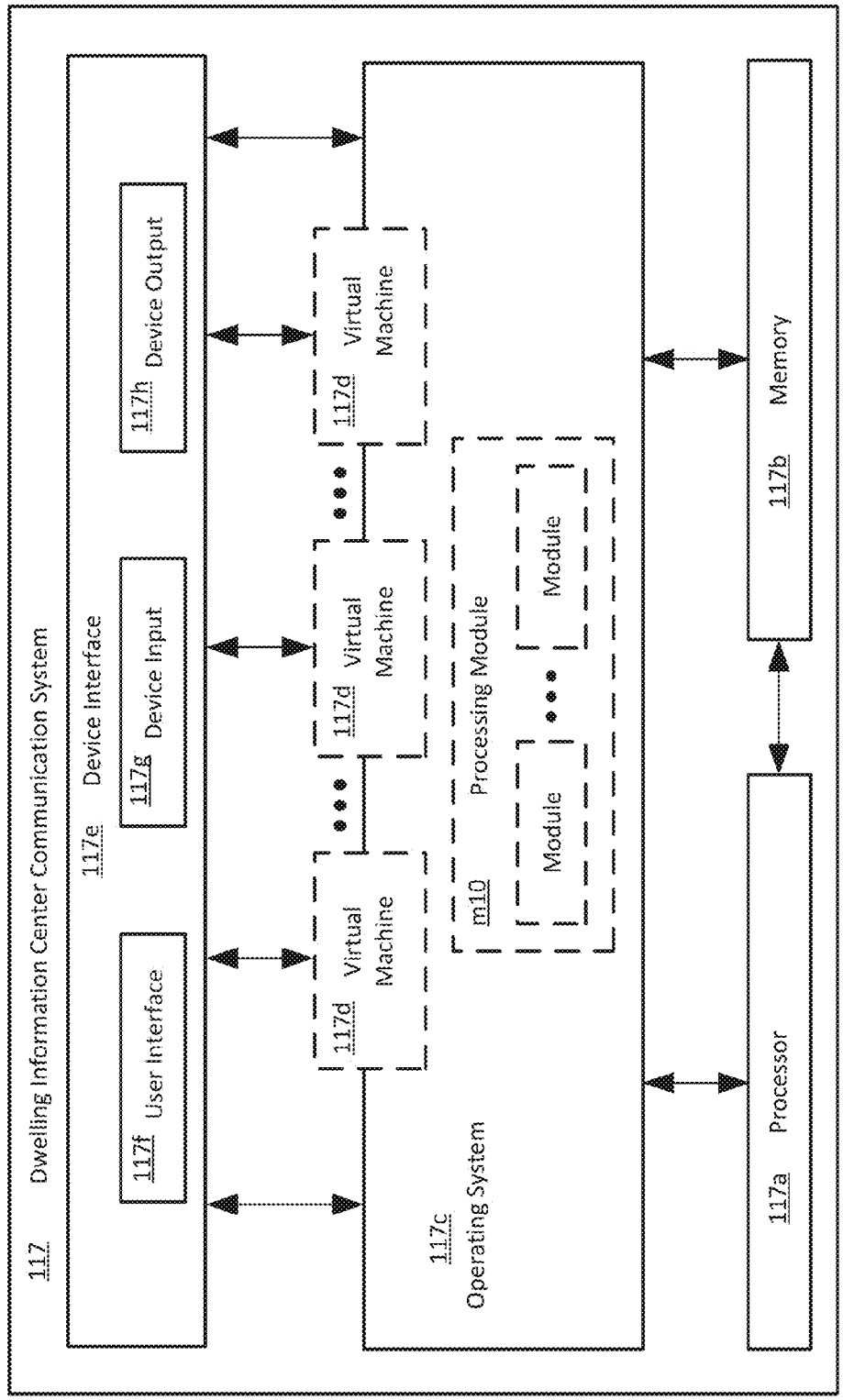

FIG. 3 shows a schematic diagram of implementation(s) of environment(s) and/or implementations(s) of one or more technologies described herein including dwelling information center communication system implementation(s).

Figure 4:
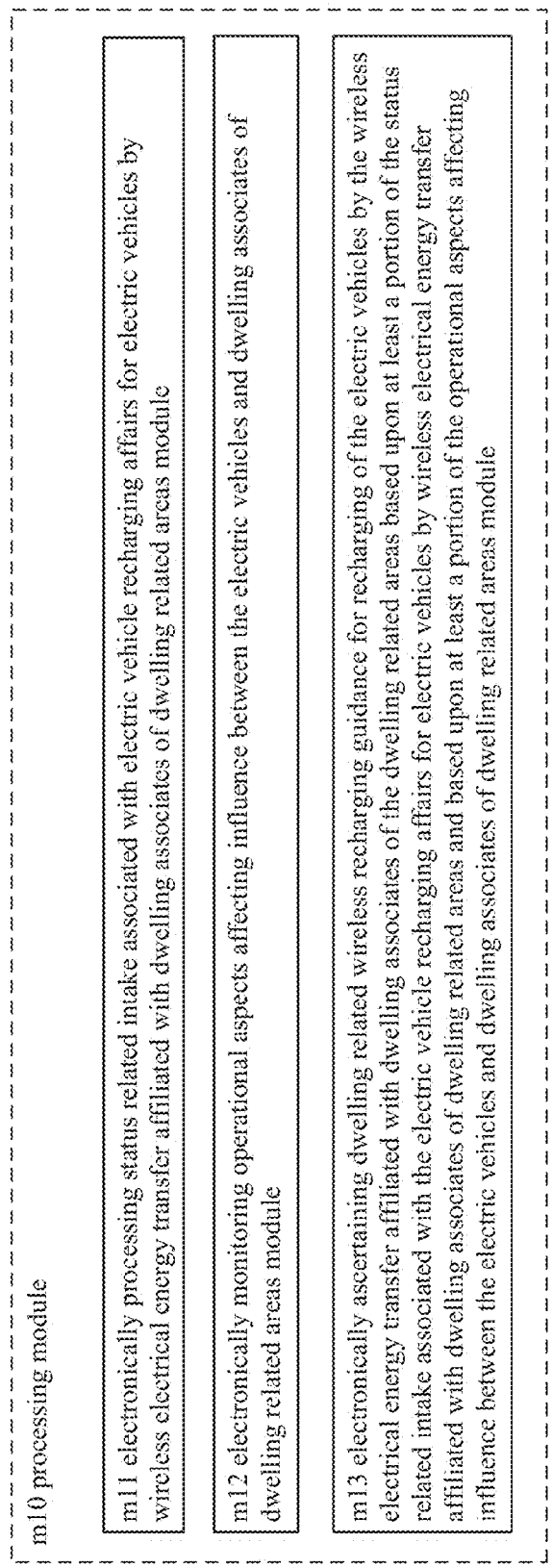

FIG. 4 shows a schematic diagram of implementation(s) of environment(s) and/or implementations(s) of one or more technologies described herein including processing module implementation(s).

FIG. 5-A through FIG. 5-F (sheets 13-18) show a partially schematic diagram of an implementation(s) of electronically processing status related intake associated with electric vehicle recharging affairs for electric vehicles by wireless electrical energy transfer affiliated with dwelling associates of dwelling related areas module(s).

FIG. 6-A through FIG. 6-G (sheets 19-25) show a partially schematic diagram of an implementation(s) of electronically monitoring operational aspects affecting influence between electric vehicles and dwelling associates of dwelling related areas module(s).

FIG. 7-A through FIG. 7-C (sheets 26-28) show a partially schematic diagram of an implementation(s) of electronically ascertaining dwelling related wireless recharging guidance for recharging of electric vehicles by wireless electrical energy transfer affiliated with dwelling associates of dwelling related areas based upon at least a portion of status related intake associated with electric vehicle recharging affairs for electric vehicles by wireless electrical energy transfer affiliated with dwelling associates of dwelling related areas and based upon at least a portion of operational aspects affecting influence between electric vehicles and dwelling associates of dwelling related areas module(s).

Figure 8:
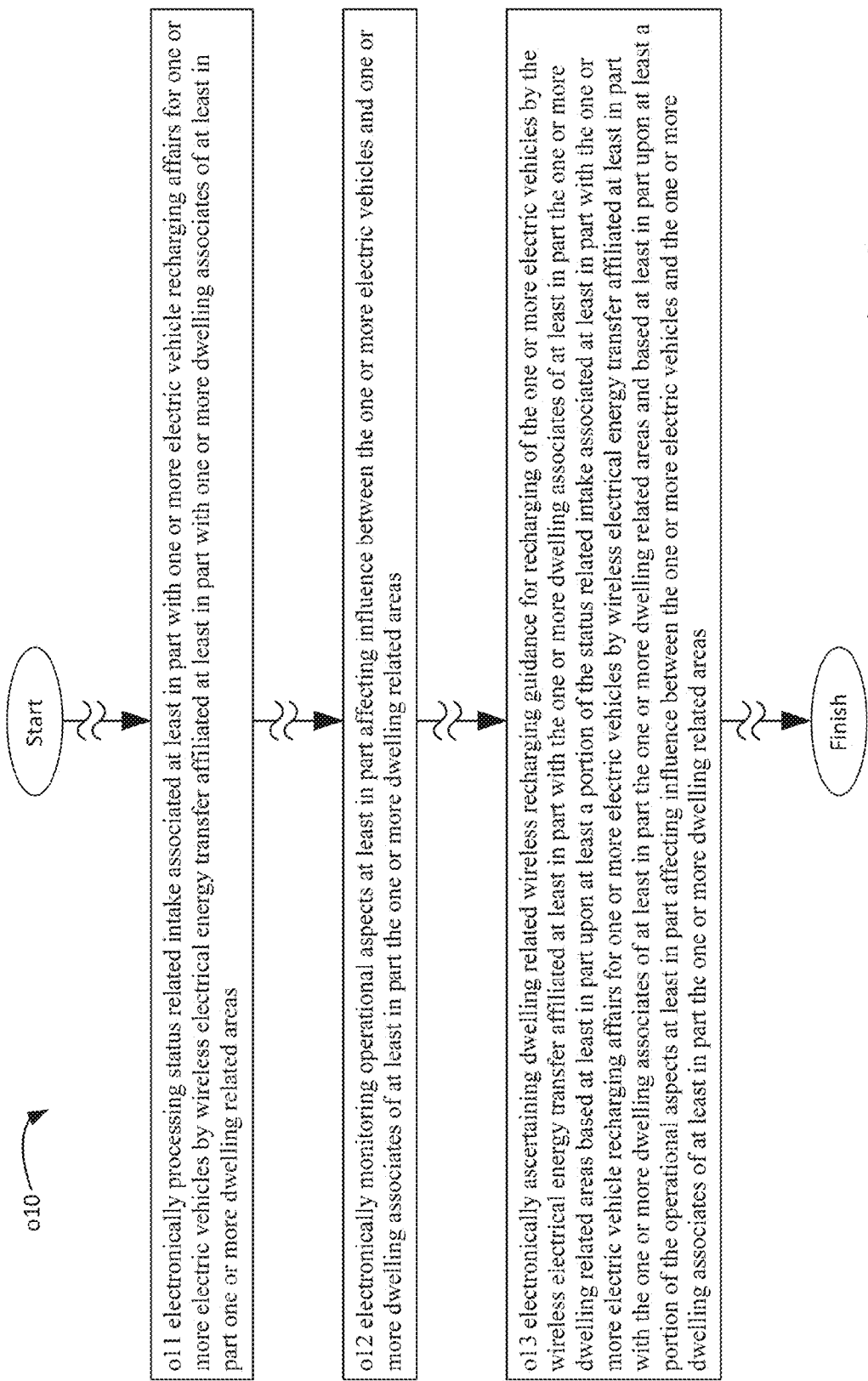

FIG. 8 shows a high-level flowchart illustrating an operational flow o10 representing exemplary operations related to operation o11, operation o12, and operation o13.

FIG. 9-A through FIG. 9-M (Sheets 30-42) show a high-level flowchart including exemplary implementations of operation o11 of FIG. 8.

FIG. 10-A through FIG. 10-P (Sheets 43-58) show a high-level flowchart including exemplary implementations of operation o12 of FIG. 8.

FIG. 11-A through FIG. 11-G (Sheets 59-65) show a high-level flowchart including exemplary implementations of operation o13 of FIG. 8.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present application may use formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Thus, in accordance with various embodiments, computationally implemented methods, systems, circuitry, articles of manufacture, ordered chains of matter, and computer program products are designed to, among other things, provide an interface for the environment illustrated in FIG. 1-A through FIG. 1-H.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very High Speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011100001111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructionsper_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scalable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although one or more users maybe shown and/or described herein, e.g., in FIGS. 1-A through 1-H, and other places, as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g., "configured to") generally encompass active-state components and/or inactive-state components and/or standby-state components, unless context requires otherwise.

As depicted in FIGS. 1-A through 1-H, a communication and control system and method regarding wireless electric vehicle electrical energy transfer is shown to include a wireless electrical energy transfer receiving device 110, such as electric vehicle 110a, having communication system 111, wireless electrical energy transfer imparting station(s) 112, an electricity provider 114, and a user communication device 116 with a user interface of the user communication device 118. The wireless electrical energy transfer receiving device 110, wireless electrical energy transfer imparting station(s) 112, electricity provider 114, and user communication device 116 with user interface 118 can communicate with each other using wired or wireless communication networks such as but not limited to internet, cellular, point-to-point and other network modes. Other methods of communication between one or more of these various devices and/or systems can include but are not limited to one or more of the following such as contactless smart card located on vehicle, RFID tag, manual entering of data into keypad, blue tooth communication, WiFi communication, FM radio wave communication, infrared communication, direct communication via wired communication, audio (e.g., voice recognition, etc.). Communication between these devices and/or systems can include purposes such as identification and verification of consumer, user, or other individual(s), identification and verification of energy transfer source and/or receiver, finance status of user or other account, energy available at source and/or point of reception, condition of electrical receiving device (e.g., vehicle, energy storage system (e.g., batteries, etc.)), use history (how vehicle or other electrical energy receiving device was used) such as information provided by a vehicle log, use or energy transfer scheduling, or energy transfer logs or project energy transfer deadline(s), etc., projected energy transfer completion time with respect to an adequate energy amount in storage for next destination of a vehicle, user or other individual profile and/or account information, projected user itinerary and/or route planning Itinerary planning can also include route planning, travel objectives, daily commuter schedule and routes, planned versus actual vehicle routes, various planned and actual tasks and errands associated with vehicle or other device use.

In some implementations there are singular or multiple of wireless electrical energy transfer receiving device 110, wireless electrical energy transfer imparting station(s) 112, electricity provider 114, or user communication device 116 with user interface 118.

In one or more implementations of the wireless electrical energy transfer receiving device 110 can be involved with receiving electrical energy transfer from wireless electrical energy transfer station through field magnetic resonance or other wireless methods for transferring electrical energy, etc. Examples of such can include vehicle(s), robot(s), mobile maintenance device(s) such as vacuum(s), lawn mower(s), cleaner(s), etc. The wireless electrical energy transfer receiving device 110 can be involved with electrical energy transfer security including transmitting/receiving to/from electrical energy transfer imparting station(s) re frequency and timing information used for magnetic resonance electrical energy transfer, etc. By coordinating changes in frequencies regarding what frequency electrical energy is transferred theft of electrical energy transferred can be deterred. Other aspects can include the wireless electrical energy transfer receiving device 110 transmitting/receiving information to/from the user communication device user 116 regarding status of electrical energy transfer associated with user plans or payment program information, etc. The wireless electrical energy transfer receiving device 110 can sense if it is in the vicinity of the wireless electrical energy transfer imparting station 112, and/or sensing if its door (e.g., in an electrical vehicle implementation) is being opened to ask user status, etc. The wireless electrical energy transfer receiving device 110 can transmit/receive information to/from electrical the electrical energy transfer imparting station 112 regarding status of electrical energy transfer associated with user plans or payment program information or service downloads such as enhanced WiFi, data streaming, cleaning, backups, etc. The wireless electrical energy transfer receiving device 110 can send to the wireless electrical energy transfer imparting station(s) 112 electrical energy transfer management information re frequency security, user plans, load sharing, payment programs, etc. The wireless electrical energy transfer receiving device 110 can receive from the wireless electrical energy transfer imparting station(s) 112 electrical energy transfer management information re frequency security, user plans, load sharing, payment programs, etc. The wireless electrical energy transfer receiving device 110 can send to the user communication device 116 electrical energy transfer management information re user plans, payment programs, etc. The wireless electrical energy transfer receiving device 110 can receive from the user communication device 116 electrical energy transfer management information re user plans, payment programs, etc.

Exemplary implementations of the wireless electrical energy transfer receiving device 110 can include one or more electric vehicles such as manufactured by such manufacturers as Nissan, Chevrolet, or Tesla. Furthermore exemplary implementation can include electric vehicle dealers that sell electrical energy transfer packages including equipment, installation, financing, etc. along with electric vehicle. Exemplary implementations of electric vehicle can include aspects such as batteries such as lithium ion, lead acid, nickel cadmium, capacitors, etc. Other aspects of electric vehicles can include charging (wireless energy transfer) technology such as wireless changing of the vehicle. Considerations regarding wireless energy transfer imparted to the vehicle can include how the vehicle is driven, commuting details such as distance, routes, errands, tasks, commercial deliveries, courier services, industrial cargo transport, location of electrical energy transfer, garage configuration, park and ride details, parking lot layout, commercial charging station infrastructure, etc. Other exemplary implementations can include aspects involving the alliance for wireless power (A4WP) such as involving Qualcomm Inc., Apple Inc., Intel, Inc. and/or Samsung Inc.'s implementation(s) of near field magnetic resonance or simply field magnetic resonance electrical energy transfer or other wireless electrical energy transfer technologies such as for transferring electrical energy from millimeters up to meters in distance. Such implementations can include electrical energy transfer for airport parking lots, employee parking lots, private of public garages, and other locations where one or more vehicles may be stationary for short or long term durations. Exemplary implementations can include charging one or more vehicles through induction pads located in parking spaces beneath where the one or more vehicles are parked.

The wireless electrical energy transfer imparting station(s) 112 can wirelessly impart electrical energy transfer to the electrical energy transfer receiving device 110 through field magnetic resonance or other wireless method for transferring electrical energy, etc. The wireless electrical energy transfer imparting station(s) 112 can accomplish wireless electrical energy transfer security such as through transmitting/receiving to/from the electrical energy transfer receiving device 110 regarding frequency and timing information used for field magnetic resonance electrical energy transfer, etc. The wireless electrical energy transfer imparting station(s) 112 can transmit/receive information to/from the user communication device 116 regarding status of electrical energy transfer associated with user plans or payment program information, etc. The wireless electrical energy transfer imparting station(s) 112 can transmit/receive information to/from the electrical energy transfer receiving device 110 regarding status of electrical energy transfer associated with user plans or payment program information, etc. The wireless electrical energy transfer imparting station(s) 112 can transmit/receive information to/from another wireless electrical energy transfer imparting station 112 regarding status of electrical energy transfer associated with user plans or payment program information such as for balancing electric load, etc. The wireless electrical energy transfer imparting station(s) 112 can transmits/receive information to/from electricity provider 114 regarding status of electrical energy transfer associated with user plans or payment program information such as for balancing electric load, etc. As shown, the wireless electrical energy transfer imparting station(s) 112 can send to the electrical energy transfer receiving device 110 electrical energy transfer management information re frequency security, user plans, load sharing, payment programs, etc. The wireless electrical energy transfer imparting station(s) 112 can receive from the electrical energy transfer receiving device 110 electrical energy transfer management information re frequency security, user plans, load sharing, payment programs, etc. The wireless electrical energy transfer imparting station(s) 112 can send to the user communication device 116 electrical energy transfer management information re user plans, payment programs, etc. The wireless electrical energy transfer imparting station(s) 112 can receive from the user communication device 116 electrical energy transfer management information re user plans, payment programs, etc. The wireless electrical energy transfer imparting station(s) 112 can send to another wireless electrical energy transfer imparting station(s) 112 electrical energy transfer management information re user plans, load sharing, payment programs, etc. The wireless electrical energy transfer imparting station(s) 112 can receive from another wireless electrical energy transfer imparting station(s) 112 electrical energy transfer management information re user plans, load sharing, payment programs, etc. The wireless electrical energy transfer imparting station(s) 112 can send to electricity provider 114 electrical energy transfer management information re user plans, load sharing, payment programs, etc. The wireless electrical energy transfer imparting station(s) 112 can receive from electricity provider 114 electrical energy transfer management information re user plans, load sharing, payment programs, etc.

Exemplary implementations of the wireless electrical energy transfer imparting station(s) 112 can include electric vehicle electrical energy transfer equipment. For example, example electrical equipment manufactured by manufacturers such as GE, Westinghouse, Siemens, or ABB. Other exemplary implementations can include electric vehicle electrical energy transfer equipment provided by electric vehicle manufacturers such as Nissan, Chevrolet, or Tesla or dealers thereof. For example, one or more electric vehicle dealers can sells electrical energy transfer packages including equipment installation, financing, etc. along with electric vehicle.

Exemplary implementations of the wireless electrical energy transfer imparting station(s) 112 can include smart metering such as including recorded consumption energy based on time period of other intervals of time, coordination of energy transfer based on electricity demand put on the electricity provider 114 by various parties, two-way communication between the metering at the wireless electrical energy transfer imparting station(s) 112 and the electricity provider 114 for control and/or reporting of energy transfer at the site of the metering. Further, load balancing at the wireless electrical energy transfer imparting station(s) 112 or the electricity provider 114 can be accomplished through load matching, daily peak demand reserve, storage of excess electrical power during low demand periods to release as demand rises, store of energy during peak times and release energy during off peak times, use of a battery bank to store energy, use of an electricity providing grid to balance energy production and consumption, use of smart grid technology to allow consumers and other users to communicate with utility using digital means, and control from the electricity provider 114 to switch electrical energy transfer at the wireless electrical energy transfer imparting station(s) 112 on or off.

In implementations of the wireless electrical energy transfer imparting station(s) 112 there may be multiple priorities from various perspectives (such as user, vehicle, charging station, electricity provider, etc.) for electrical energy transfer such as urgent or immediate need, when lower rate/cost is available, when next lower (lowest) rate/cost is available, or dependent on charging optimization or electrical energy supply optimization. Exemplary implementations can include the electric vehicle or other implementations of the wireless electrical energy transfer receiving device 110 receiving charge when rate/cost is lowest, and allowing grid to receive electrical energy when rates are higher. Implementations can utilize server technology with communication networks to implement communication. Such server technology can be used to store user profiles and utility power grid load balancing history and other data.

The wireless electrical energy transfer imparting station(s) 112 can utilize field magnetic resonance technology or resonant inductive coupling which can involve wireless transmission of electrical energy between two coils that are tuned to resonate at the same frequency and include electrical equipment such as resonance transformers. Further aspects can include the wireless electrical energy transfer imparting station(s) 112 having one or more voltage-controlled oscillator electrical circuits with one or more first transducers and one or more second transducers to electrically charge an energy storage device using electromagnetic or inductive charging. Exemplary implementations can include one or more electric vehicles equipped with one or more translocators for transmitting one or more coded signals to the wireless electrical energy transfer imparting station(s) 112 corresponding to the location of an electric vehicle or other wireless electrical energy transfer receiving device 110 and further activating the wireless electrical energy transfer imparting station(s) 112.

In implementations the wireless electrical energy transfer imparting station(s) 112 could communicate with the wireless electrical energy transfer receiving device 110 and/or the electricity provider 114 through an encrypted link so that both the electrical energy transfer receiving device 110 and the wireless electrical energy transfer imparting station(s) 112 know ahead of time what frequency to use for electrical energy transfer to hinder theft of electrical energy. Frequencies can be varied in this manner to thwart prediction of such frequencies. Further modes of electrical energy transfer can include fast and slow transfers depending upon plans, efficiencies, cost rates, and other factors discussed herein such as an electrical vehicle could audibly ask the driver the driver's plans, financial membership status (such as a "gold membership" status), input from social network associates or monitoring, smart metering by electricity provider 114 and/or other user aspects as the driver exits the vehicle and then factors such aspects into subsequent electrical energy transfer rates and timing. The wireless electrical energy transfer imparting station(s) 112 can also provide various data downloads including news updates, software, data maintenance, etc. as the electrical energy transfer is occurring.

The wireless electrical energy transfer imparting station(s) 112 can also include communication not only with one or more electric vehicles but also other electricity consuming devices in a dwelling or other structure or location such as involving load leveling or balancing between charging an electric vehicle and powering household air conditioning, refrigeration, and hot water heating.

In implementations the electricity provider 114 can transmit/receive information to/from the wireless electrical energy transfer imparting station(s) 112 regarding status of electrical energy transfer associated with load sharing, user plans or payment program information, etc. including time and amount of use rate structures and smart metering, power cycling to distribute load among electrical energy transfers and other energy consuming devices. The electricity provider 114 can send to the wireless electrical energy transfer imparting station(s) 112 electrical energy transfer management information re user plans, load sharing, payment programs, etc. The electricity provider can receive from the wireless electrical energy transfer imparting station(s) 112 electrical energy transfer management information re user plans, load sharing, payment programs, etc. Exemplary implementations of the electricity provider 114 can include electricity provider equipment such as equipment manufactured by electrical equipment manufacturers such as GE, Westinghouse, Siemens, or ABB and electricity providers including electrical utilities such PG&E, So Cal Edison, and/or locally owned equipment such as solar panels, wind generators, etc. Other aspects can be involved such as smart metering and/or load balancing mentioned above.

Implementations of the user communication device 116 can include the user communication device being internal or external to electrical energy transfer receiving device, etc. The user communication device 116 can include mobile devices, social networks, home or corporate based devices, etc. The user communication device 116 can transmit/receive information to/from the wireless electrical energy transfer receiving device 110 regarding status of electrical energy transfer associated with user plans or payment program information, etc. The user communication device 116 can transmit/receive information to/from the wireless electrical energy transfer imparting station(s) 112 regarding status of electrical energy transfer associated with user plans or payment program information, etc. The user communication device 116 can send to the wireless electrical energy transfer receiving device 110 electrical energy transfer management information re user plans, payment programs, etc. The user communication device 116 can receive from the wireless electrical energy transfer receiving device 110 electrical energy transfer management information re user plans, payment programs, etc. The user communication device 116 can send to the wireless electrical energy transfer imparting station(s) 112 electrical energy transfer management information re user plans, payment programs, etc. The user communication device 116 can receive from the wireless electrical energy transfer imparting station(s) 112 electrical energy transfer management information re user plans, payment programs, etc. The user communication device 116 can send to the user interface 118 electrical energy transfer management information re user plans, payment programs, etc. The user communication device 116 can receive from the user interface 118 electrical energy transfer management information re user plans, payment programs, etc.

The user communication device 116 with the user interface 118 can include but are not limited to one or more of the following: a mobile device, a tablet, a cell phone, a smart phone, a gaming unit, a laptop, a walkie-talkie, a notebook computer, a tablet, using operating systems including Android, iOS, Win 8 or other operating systems and/or including one or more other types of wireless mobile device.

Exemplary implementations of the user communication device 116 can include an employer based information system such as an employee information center accessible by employer or employees for status tracking, planning facilities, incentives distribution, etc. For instance, employers could include Google Inc., Cisco Inc., Amazon Inc., etc. Employee perks could be tracked and otherwise utilized by the employee information center such as including the employer coving costs of electrical energy transfer to charge an employee's electric vehicle parked in an employee parking space provided by the employer as a convenience to the employee.

Other implementations of the user communication device 116 can include an information center for high-end residential dwellings for status tracking, planning, updating occupant status, load leveling within house, monitoring and reporting on impact of battery electrical energy transfer, vehicle use, etc. For example construction contractors of upscale condominiums, high-end smart homes, etc. Including furnishing infrastructures could be involved with installation of such exemplary implementations. Aspects can include smart home information centers that can provide such functions as establishment of appropriate time(s) to charge electric vehicle(s) based on upon predicted use by occupants of such vehicle(s) based on input from such occupants through active and passive means such as direct inquiry of occupants or review of occupant itineraries stored in calendaring databases and other databases.

Implementations of the user interface 118 of the user communication device 116 can include visual or audio output re inquiries as to user's plans re use of electrical energy transfer receiving device to include itinerary or calendar of user or others to use the electrical energy transfer receiving device, plan can include payment plans, maintenance of device, etc. Other output can include information re status of current or planned electrical energy transfer as impacting user's plans, etc. The user interface 118 can accept input from user re payment program, planned use of electrical energy transfer receiving device to impact method of electrical energy transfer such as fast or slow electrical energy transfer rates, etc. The user interface 118 can send to user communication device 116 electrical energy transfer management information re user plans, payment programs, etc. The user interface 118 can receive from the user communication device 116 electrical energy transfer management information re user plans, payment programs, etc.

Exemplary implementations of the user interface 118 can include a user interface to an employee information center accessible by employer or employees for status tracking, planning facilities, incentives distribution, etc. Such employers can include Google Inc., Cisco Inc., Amazon Inc., etc. Other implementations of the user interface 118 can include a user interface to information center for high-end residential dwellings for status tracking, planning, etc. For example implementations can be provided by construction contractors of upscale condominiums, high-end smart homes, etc. including furnishing infrastructures such as using smart home information centers as discussed above.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in implementation(s)," "in one embodiment," "in some embodiments," "in several embodiments," "in at least one embodiment," "in various embodiments," etc., may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Turning now to FIG. 2, FIG. 2 depicts some aspects also depicted in FIGS. 1A-1H and discussed above regarding communication between dwelling information center 116a having dwelling information center communication system 117, electric vehicle 110a, and wireless electrical energy transfer imparting station 112.

Turning now to FIG. 3, the dwelling information center communication system 117 is depicted to include processor 117a, memory 117b, operating system 117c, and device interface 117e.

Processor(s)

Processor 117a may include one or more microprocessors, central processing units ("cpu"), a graphics processing units ("gpu"), physics processing units, digital signal processors, network processors, floating point processors, and the other processors. In implementation(s), processor 117a may be a server. In implementation(s), processor 117a may be a distributed-core processor. Although processor 117a can be understood in one sense as depicted as a single processor that is part of a single dwelling information center communication system 117, processor 117a may be multiple processors distributed over one or many dwelling information center communication systems 117, which may or may not be configured to operate together. Processor 117a is illustrated as being configured to execute computer readable instructions in order to execute one or more operations described above, and as illustrated in FIGS. 8-11-F.

Memory System(s)

Further shown in FIG. 3, dwelling information center communication system 117 includes memory 117b, which may include memory, cache memory such as random access memory (RAM), flash memory, synchronous random access memory (SRAM), dynamic random access memory (DRAM), or other types of memory such as read only memory ("ROM"), programmable read only memory ("PROM"), flash memory, hard drives, erasable programmable read-only memory (EPROM), disk-based media, disc-based media, magnetic storage, optical storage, volatile memory, nonvolatile memory, mass storage devices, and any combination thereof. In implementation(s), memory 117b may be at single network site(s) or separated from the communication system 117, e.g., available on different system(s) on a network, wired or wirelessly. For example, in a networked system, there may be many communication systems 117 having memory 117b as located at central server(s) that may be a few feet away or located across an ocean. In implementation(s) memory 117b may be located at multiple network sites, including sites that are distant from each other.

Operating System(s)

Referring again to FIG. 3, dwelling information center communication system 117 includes operating system 117c, some versions thereof being mobile or otherwise, and may include processing module m10, which may further include modules (some of which are described below), and may further include virtual machines 117d (such as process virtual machines, virtual machines of hardware, virtual machines of virtual machines, Java virtual machines, Dalvik virtual machines, virtual machines for use with Android operating systems such as Samsung or Google mobile devices or for use with other mobile operating systems such as Apple iOS on Microsoft Windows based mobile operating systems, etc.).

Device Interface(s)

As shown also in FIG. 3, dwelling information center communication system 117 can include device interface 117e, which can include user interface 117f, device input 117g, and device output 117h.

In implementation(s), device interface 117e can include any component that allows interaction with its environment. For example, in implementation(s) device interface 117e can include one or more sensors, e.g., a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), a radio, including a wireless radio, a transmitter, a receiver, an emitter, a broadcaster, etc.

In implementation(s), device interface 117e also may include one or more user interface components, e.g., user interface 117f (e.g., although they are drawn separately, in implementation(s), user interface 117f is a type of device interface 117e), and in implementation(s) including one or more device inputs 117g and one or more device outputs 117h. User interface 117f may include any hardware, software, firmware, and combination thereof that allows one or more users to interact with dwelling information center communication system 117, and for vice versa. In implementation(s), user interface 117f may include a monitor, screen, touchscreen, liquid crystal display ("LCD") screen, light emitting diode ("LED") screen, speaker, handset, earpiece, keyboard, keypad, touchpad, mouse, trackball, remote control, button set, microphone, video camera, still camera, a charge-coupled device ("CCD") element, a photovoltaic element, etc.

Referring again to FIG. 3, implementation(s) of device interface 117e may include one or more components in addition to or integrated with user interface 117f to provide ways that communication system 117 can input and output information with its environment(s) and/or user(s). These components of device interface 117e for user interface 117f, device input 117g, and/or device output 117h may include one or more sensors, e.g., a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), a radio, including a wireless radio, a transmitter, a receiver, an emitter, a broadcaster, etc., and other components as well to serve user interface, input and/or output function(s) for device interface 117e such as for user interface 117f, device input 117g and device output 117h.

Further examples of user interface 117f, device input 117g, and/or device output 117h may include any hardware, software, firmware, and combination thereof, to provide capability for a user thereof to interact with employment information center communication system 117. Implementation(s) of user interface 117f, device input 117g, and/or device output 117h can include monitor(s), screen(s), touchscreen(s), liquid crystal display ("LCD") screen(s), light emitting diode ("LED") screen(s), speaker(s), handset(s), earpiece(s), keyboard(s), keypad(s), touchpad(s), mouse(s), trackball(s), remote control(s), button set(s), microphone(s), video camera(s), still camera(s), a charge-coupled device ("CCD") element(s), a photovoltaic element(s), etc.

As other examples, implementation(s) of device interface 117e can include including portions for outputting information, inputting information, and/or controlling aspects thereof. Various arrangements such as display window(s), audio emitter(s), tactile interface(s), button(s), slider(s), gesture interface(s), articulation(s), knob(s), icon(s), desktop(s), ribbon(s), bar(s), tool(s), stylus area(s), keypad(s), keyboard(s), and other audio, video, graphic, tactile, etc. input, output, or control aspects can be used. For instance, graphical user interface presentations can be presented upon display surfaces while other input and/or output aspects can be utilized.

Modules

Implementations of modules can involve different combinations (limited to patentable subject matter under 35 U.S.C. 101) of one or more aspects from one or more electrical circuitry arrangements and/or one or more aspects from one or more instructions.

In one or more implementations, as shown in FIG. 4, the processing module m10 may include electronically processing status related intake associated with electric vehicle recharging affairs for electric vehicles by wireless electrical energy transfer affiliated with dwelling associates of dwelling related areas module m11.

In one or more implementations, as shown in FIG. 4, the processing module m10 may include electronically monitoring operational aspects affecting influence between electric vehicles and dwelling associates of dwelling related areas module m12.

In one or more implementations, as shown in FIG. 4, the processing module m10 may include electronically ascertaining dwelling related wireless recharging guidance for recharging of electric vehicles by wireless electrical energy transfer affiliated with dwelling associates of dwelling related areas based upon at least a portion of status related intake associated with electric vehicle recharging affairs for electric vehicles by wireless electrical energy transfer affiliated with dwelling associates of dwelling related areas and based upon at least a portion of operational aspects affecting influence between the electric vehicles and dwelling associates of dwelling related areas module m13.

In one or more implementations, as shown in FIG. 5-A, module m11 may include processing status related intake involving activity associated with electric vehicle user dwelling associates module m1101.

In one or more implementations, as shown in FIG. 5-A, module m1101 may include processing status related intake involving contactless smart card systems associated with electric vehicles module m1102.

In one or more implementations, as shown in FIG. 5-A, module m1101 may include processing status related intake involving manual entering of data involving keypads module m1103.

In one or more implementations, as shown in FIG. 5-A, module m1101 may include processing status related intake involving direct text entry module m1104.

In one or more implementations, as shown in FIG. 5-A, module m1101 may include processing status related intake involving dwelling associates speaking in reply to sound input systems module m1105.

In one or more implementations, as shown in FIG. 5-A, module m1101 may include processing status related intake regarding dwelling associate uses of electric vehicles module m1106.

In one or more implementations, as shown in FIG. 5-A, module m1106 may include processing status related intake involving processing terrain or traffic information regarding routes of travel for electric vehicles taken by dwelling associates module m1107.

In one or more implementations, as shown in FIG. 5-A, module m1106 may include processing status related intake involving processing commuter routing information for dwelling associates using of electric vehicles module m1108.

In one or more implementations, as shown in FIG. 5-A, module m1106 may include processing status related intake involving processing trip advisory information regarding routes of travel for electric vehicles used by dwelling associates module m1109.

In one or more implementations, as shown in FIG. 5-A, module m1106 may include processing status related intake involving processing information regarding alternative modes of transportation along routes of travel of electric vehicles for dwelling associates module m1110.

In one or more implementations, as shown in FIG. 5-A, module m1106 may include processing status related intake involving processing information regarding periods in which electric vehicles will be unavailable for use by dwelling associates module m1111.

In one or more implementations, as shown in FIG. 5-B, module m1106 may include processing status related intake involving processing information regarding planned errands to be run by dwelling associates with electric vehicles module m1112.

In one or more implementations, as shown in FIG. 5-B, module m1106 may include processing status related intake involving processing information regarding commercial delivery schedules driven by dwelling associates utilizing electric vehicles module m1113.

In one or more implementations, as shown in FIG. 5-B, module m1106 may include processing status related intake involving processing information regarding regulated uses by dwelling associates of electric vehicles module m1114.

In one or more implementations, as shown in FIG. 5-B, module m1106 may include processing status related intake involving processing information regarding ad hoc use by dwelling associates of electric vehicles module m1115.

In one or more implementations, as shown in FIG. 5-B, module m1106 may include processing status related intake involving processing information regarding driving habits of dwelling associates associated with driving electric vehicles module m1116.

In one or more implementations, as shown in FIG. 5-B, module m1106 may include processing status related intake involving processing information regarding itineraries associated with use of electric vehicles by dwelling associates module m1117.

In one or more implementations, as shown in FIG. 5-B, module m1106 may include processing status related intake involving processing information regarding wear forecasts associated with travel involving use by dwelling associates of electric vehicles module m1118.

In one or more implementations, as shown in FIG. 5-B, module m1106 may include processing status related intake involving processing information regarding news broadcasts associated with travel involving use of electric vehicles by dwelling associates module m1119.

In one or more implementations, as shown in FIG. 5-C, module m1106 may include processing status related intake regarding emergency warning messages associated with dwelling associate use of electric vehicles module m1120.

In one or more implementations, as shown in FIG. 5-C, module m1106 may include processing status related intake involving processing information regarding availability of alternate transportation by dwelling associates within designated distances from electrical vehicle charging affairs for electric vehicles by wireless electrical energy transfer affiliated with dwelling associates of dwelling related areas module m1121.

In one or more implementations, as shown in FIG. 5-C, module m1106 may include processing information regarding ride-share programs for dwelling associates with respect to travel routes traveled by electric vehicles module m1122.

In one or more implementations, as shown in FIG. 5-C, module m11 may include processing status related intake from locations of electric vehicle recharging affairs for electric vehicles by wireless electrical energy transfer affiliated with dwelling associates of dwelling related areas module m1123.

In one or more implementations, as shown in FIG. 5-C, module m1123 may include processing status related intake related to schedules for electrical load sharing for electrical devices sharing electrical power sources with electric vehicle recharging affairs for electric vehicles by wireless electrical energy transfer affiliated with dwelling associates of dwelling related areas module m1124.

In one or more implementations, as shown in FIG. 5-C, module m1123 may include processing status related intake related to charging rate capacity of wireless electrical energy transfer module m1125.

In one or more implementations, as shown in FIG. 5-C, module m1123 may include processing status related intake at locations of wireless electrical energy transfer including processing status related intake related to consumer incentive programs based on electricity cost schedules module m1126.

In one or more implementations, as shown in FIG. 5-C, module m1123 may include processing status related intake related to electricity financial cost rate schedules module m1127.

In one or more implementations, as shown in FIG. 5-D, module m1123 may include processing status related intake related to electricity load share capacity schedules module m1128.

In one or more implementations, as shown in FIG. 5-D, module m1123 may include processing status related intake related to electric utility capacity information involving communication channels of wireless electrical energy transfer module m1129.

In one or more implementations, as shown in FIG. 5-D, module m1123 may include processing status related intake related to electrical energy charging appointments reserved for electrical vehicles other than electric vehicles module m1130.

In one or more implementations, as shown in FIG. 5-D, module m1123 may include processing status related intake related to maximum charging rate capacities of wireless electrical energy transfer module m1131.

In one or more implementations, as shown in FIG. 5-D, module m1123 may include processing status related intake related to cost information for priority handling of wireless electrical energy transfer for electric vehicles module m1132.

In one or more implementations, as shown in FIG. 5-D, module m1123 may include processing status related intake from locations of electric vehicle recharging affairs for electric vehicles by wireless electrical energy transfer affiliated with dwelling associates of dwelling related areas including processing status related intake related to wireless electrical energy transfer availability schedules for electric vehicles module m1133.

In one or more implementations, as shown in FIG. 5-D, module m1123 may include processing status related intake from locations of electric vehicle recharging affairs for electric vehicles by wireless electrical energy transfer affiliated with dwelling associates of dwelling related areas including processing status related intake related to histories of electrical energy consumption by wireless electrical energy transfer module m1134.

In one or more implementations, as shown in FIG. 5-D, module m1123 may include processing status related intake from locations of electric vehicle recharging affairs for electric vehicles by wireless electrical energy transfer affiliated with dwelling associates of dwelling related areas including processing status related intake related to electricity use data involving remote reporting from electric utility databases module m1135.

In one or more implementations, as shown in FIG. 5-E, module m1123 may include processing status related intake related to peak demand and reserve capacity of wireless electrical energy transfer module m1136.

In one or more implementations, as shown in FIG. 5-E, module m1123 may include processing status related intake related to communication with electric utility smart grid information systems with updates regarding electricity consumption from electric utility databases module m1137.

In one or more implementations, as shown in FIG. 5-E, module m1123 may include processing status related intake related to priority classification for electric vehicle charging scheduling requests of wireless electrical energy transfer module m1138.

In one or more implementations, as shown in FIG. 5-E, module m1123 may include processing status related intake related to dwelling associate profile classifications module m1139.

In one or more implementations, as shown in FIG. 5-E, module m1123 may include processing status related intake related to electrical energy use of associated local grid electrical energy provider resources for other than charging of electric vehicles module m1140.

In one or more implementations, as shown in FIG. 5-E, module m1123 may include processing status related intake related to plans for recharging of electric vehicles other than electric vehicles module m1141.

In one or more implementations, as shown in FIG. 5-E, module m1123 may include processing status related intake related to technical specifications of wireless electrical energy transfer module m1142.

In one or more implementations, as shown in FIG. 5-E, module m1123 may include processing status related intake involving computer network communication reporting of wireless electrical energy transfer module m1143.

In one or more implementations, as shown in FIG. 5-E, module m11 may include processing status related intake received wirelessly module m1144.

In one or more implementations, as shown in FIG. 5-E, module m1144 may include processing status related intake involving RFID tags module m1145.

In one or more implementations, as shown in FIG. 5-E, module m1144 may include processing status related intake involving bluetooth supported communication module m1146.

In one or more implementations, as shown in FIG. 5-F, module m1144 may include processing status related intake involving WiFi facilitated communication module m1147.

In one or more implementations, as shown in FIG. 5-F, module m1144 may include processing status related intake involving computer network protocol communication module m1148.

In one or more implementations, as shown in FIG. 5-F, module m1144 may include processing status related intake involving infrared supported communication module m1149.

In one or more implementations, as shown in FIG. 5-F, module m11 may include processing status related intake involving direct non-wireless communication module m1150.

In one or more implementations, as shown in FIG. 5-F, module m1150 may include processing status related intake involving direct wire connections module m1151.

In one or more implementations, as shown in FIG. 5-F, module m1150 may include processing status related intake involving electronic queries of historical records of electric vehicle use by dwelling associates module m1152.

In one or more implementations, as shown in FIG. 6-A, module m12 may include processing status related intake involving forecast related information in electronic form module m1201.

In one or more implementations, as shown in FIG. 6-A, module m1201 may include processing status related intake involving internet cloud-based collaboration systems module m1202.

In one or more implementations, as shown in FIG. 6-A, module m1201 may include processing status related intake involving incentive-based programs for dwelling associates module m1203.

In one or more implementations, as shown in FIG. 6-A, module m1201 may include processing status related intake involving human relationships of dwelling associates affecting use of electric vehicles module m1204.

In one or more implementations, as shown in FIG. 6-A, module m1201 may include processing status related intake involving household budgeting of dwelling associates module m1205.

In one or more implementations, as shown in FIG. 6-A, module m1201 may include processing status related intake involving dwelling maintenance tasks module m1206.

In one or more implementations, as shown in FIG. 6-A, module m1201 may include processing status related intake involving group objectives of dwelling associates module m1207.

In one or more implementations, as shown in FIG. 6-A, module m1201 may include processing status related intake involving guidelines for dwelling associate participation in electric vehicle use module m1208.

In one or more implementations, as shown in FIG. 6-A, module m1201 may include processing status related intake involving dwelling associate input to social networking systems module m1209.

In one or more implementations, as shown in FIG. 6-A, module m1201 may include processing status related intake involving tax strategies of dwelling associates module m1210.

In one or more implementations, as shown in FIG. 6-A, module m1201 may include processing status related intake involving compensation objectives of dwelling associates module m1211.

In one or more implementations, as shown in FIG. 6-A, module m1201 may include processing status related intake involving voucher related aspects regarding dwelling associates module m1212.

In one or more implementations, as shown in FIG. 6-A, module m1201 may include processing status related intake involving gift program details associated with dwelling associates module m1213.

In one or more implementations, as shown in FIG. 6-A, module m1201 may include processing status related intake involving retirement benefits of dwelling associates module m1214.

In one or more implementations, as shown in FIG. 6-B, module m1201 may include processing status related intake involving access to dwelling system databases module m1215.

In one or more implementations, as shown in FIG. 6-B, module m1201 may include processing status related intake involving data calls to electronic calendaring systems of dwelling associates module m1216.

In one or more implementations, as shown in FIG. 6-B, module m1201 may include processing status related intake involving access to scheduling programs of dwelling associates module m1217.

In one or more implementations, as shown in FIG. 6-B, module m1201 may include processing status related intake involving electronic monitoring of phone conversations of dwelling associates module m1218.

In one or more implementations, as shown in FIG. 6-B, module m1201 may include processing status related intake involving electronic recordings of in-person conversations of dwelling associates module m1219.

In one or more implementations, as shown in FIG. 6-B, module m1201 may include processing status related intake involving data access to e-mail systems of dwelling associates module m1220.

In one or more implementations, as shown in FIG. 6-B, module m1201 may include processing status related intake involving access to electronic vehicle maintenance logs associated with use of one or more electric vehicles by dwelling associates module m1221.

In one or more implementations, as shown in FIG. 6-B, module m1201 may include processing status related intake involving electronic queries of historical records regarding electric vehicle use by dwelling associates module m1222.

In one or more implementations, as shown in FIG. 6-B, module m1201 may include processing status related intake as provided electronically from electric vehicle use logs module m1223.

In one or more implementations, as shown in FIG. 6-B, module m12 may include monitoring operational aspects regarding electric vehicles related to commuting aspects of dwelling associates module m1224.

In one or more implementations, as shown in FIG. 6-B, module m1224 may include monitoring operational aspects regarding dwelling associate drivers of electric vehicles module m1225.

In one or more implementations, as shown in FIG. 6-B, module m1224 may include monitoring operational aspects regarding electric vehicles of dwelling associates to receive electrical energy from a local electrical grid substation module m1226.

In one or more implementations, as shown in FIG. 6-C, module m1224 may include monitoring operational aspects regarding actual recorded use compared with planned use of electric vehicles module m1227.

In one or more implementations, as shown in FIG. 6-C, module m1224 may include monitoring operational aspects regarding driving patterns of dwelling associates associated with electric vehicles module m1228.

In one or more implementations, as shown in FIG. 6-C, module m1224 may include monitoring operational aspects regarding ride-sharing plans of dwelling associates module m1229.

In one or more implementations, as shown in FIG. 6-C, module m1224 may include monitoring operational aspects regarding priorities distributed among dwelling associates for use of electric vehicles module m1230.

In one or more implementations, as shown in FIG. 6-C, module m1224 may include monitoring operational aspects regarding use of electric vehicles by drivers before electrical energy storage charging of electric vehicles occurs after electric vehicles are driven by another driver module m1231.

In one or more implementations, as shown in FIG. 6-C, module m1224 may include monitoring operational aspects as merged plans of multiple dwelling associates for electric vehicles for consecutive periods of use planned to occur before electric vehicles are returned to receive electrical energy storage charging module m1232.

In one or more implementations, as shown in FIG. 6-C, module m1224 may include monitoring operational aspects associated with individual goals of dwelling associates module m1233.

In one or more implementations, as shown in FIG. 6-C, module m1224 may include monitoring operational aspects associated with preferences of electric vehicle use of dwelling associates module m1234.

In one or more implementations, as shown in FIG. 6-C, module m1224 may include monitoring operational aspects associated with prioritized tasks of work schedules of dwelling associates module m1235.

In one or more implementations, as shown in FIG. 6-C, module m1224 may include monitoring operational aspects regarding planned number of dwelling associates as electric vehicle occupants to use electric vehicles before electric vehicles receive electrical energy storage charging module m1236.

In one or more implementations, as shown in FIG. 6-D, module m12 may include monitoring operational aspects regarding features of electric vehicles indicated as of concern by dwelling associates module m1237.

In one or more implementations, as shown in FIG. 6-D, module m1237 may include monitoring operational aspects involving electric vehicle feature information regarding range of electric vehicles in an all-electric mode module m1238.

In one or more implementations, as shown in FIG. 6-D, module m1237 may include monitoring operational aspects involving electric vehicle feature information regarding range of electric vehicles in hybrid electric-fuel modes module m1239.

In one or more implementations, as shown in FIG. 6-D, module m1237 may include monitoring operational aspects involving electric vehicle feature information regarding maintenance schedules for electric vehicles module m1240.

In one or more implementations, as shown in FIG. 6-D, module m1237 may include monitoring operational aspects involving electric vehicle feature information regarding fueling capacity of electric vehicles as hybrid electric vehicles module m1241.

In one or more implementations, as shown in FIG. 6-D, module m1237 may include monitoring operational aspects involving electric vehicle feature information regarding specifications of another electric vehicles other than electric vehicles, another electric vehicles involved with plans to receive wireless electrical energy transfer from electrical equipment shared with electric vehicles module m1242.

In one or more implementations, as shown in FIG. 6-D, module m1237 may include monitoring operational aspects involving electric vehicle feature information regarding electric vehicles as all-electric vehicles module m1243.

In one or more implementations, as shown in FIG. 6-D, module m1237 may include monitoring operational aspects involving electric vehicle feature information regarding electric vehicles as hybrid-electric vehicles module m1244.

In one or more implementations, as shown in FIG. 6-D, module m1237 may include monitoring operational aspects involving electric vehicle feature information regarding electric vehicles including wireless electrical energy transfer devices to receive electrical energy storage charging involving field magnetic resonance induction module m1245.

In one or more implementations, as shown in FIG. 6-E, module m1237 may include monitoring operational aspects involving electric vehicle feature information regarding electric vehicles including wireless electrical energy transfer devices to receive electrical energy storage charging involving highly resonant inductive wireless power transfer module m1246.

In one or more implementations, as shown in FIG. 6-E, module m1237 may include monitoring operational aspects involving electric vehicle feature information regarding electric vehicles including wireless electrical energy transfer devices to receive electrical energy storage charging involving wireless capacitive charging module m1247.

In one or more implementations, as shown in FIG. 6-E, module m1237 may include monitoring operational aspects regarding electric vehicle features associated with input by dwelling associates including monitoring operational aspects involving tracking electric vehicle feature information regarding electric vehicles including electrical energy storage devices module m1248.

In one or more implementations, as shown in FIG. 6-E, module m1248 may include monitoring operational aspects involving electric vehicle feature information regarding electric vehicles including electrical energy storage as capacitive electrical energy storage devices module m1249.

In one or more implementations, as shown in FIG. 6-E, module m1248 may include monitoring operational aspects involving tracking electric vehicle feature information regarding electric vehicles including electrical energy storage as lithium ion, lead acid, or nickel cadmium electrical energy storage devices module m1250.

In one or more implementations, as shown in FIG. 6-E, module m1248 may include monitoring operational aspects involving electric vehicle feature information regarding electric vehicles including storage life aspects of electrical energy storage module m1251.

In one or more implementations, as shown in FIG. 6-E, module m1237 may include monitoring operational aspects regarding dwelling associate preferences of location for energy transfer to electric vehicles module m1252.

In one or more implementations, as shown in FIG. 6-E, module m1252 may include monitoring operational aspects involving dwelling associate preferences of location other than destination locations of dwelling associate occupants of electric vehicles to include subsequent electrical energy storage charging of electric vehicles module m1253.

In one or more implementations, as shown in FIG. 6-F, module m1252 may include monitoring operational aspects involving dwelling associate preferences of location for electrical energy storage charging of electric vehicles at locations of vocational employ of dwelling associates module m1254.

In one or more implementations, as shown in FIG. 6-F, module m1252 may include monitoring operational aspects involving dwelling associate preferences of location for electrical energy storage charging of electric vehicles at locations on planned routes of travel of electric vehicles module m1255.

In one or more implementations, as shown in FIG. 6-F, module m1252 may include monitoring operational aspects involving dwelling associate preferences of location for electrical charging of electric vehicles at garage locations for housing electric vehicles module m1256.

In one or more implementations, as shown in FIG. 6-F, module m1252 may include monitoring operational aspects involving dwelling associate preferences of location for electrical energy storage charging of electric vehicles at park and ride locations for parking electric vehicles module m1257.

In one or more implementations, as shown in FIG. 6-F, module m1252 may include monitoring operational aspects involving dwelling associate preferences of location for electrical charging of electric vehicles at parking lot locations for parking electric vehicles module m1258.

In one or more implementations, as shown in FIG. 6-F, module m1252 may include monitoring operational aspects involving dwelling associate preferences of location for electrical charging of electric vehicles at parking garage locations for parking electric vehicles module m1259.

In one or more implementations, as shown in FIG. 6-F, module m1252 may include monitoring operational aspects involving dwelling associate preferences of location for non-electrical energy transfer to electric vehicles as a hybrid-electric vehicle at non-electric re-fueling station locations module m1260.

In one or more implementations, as shown in FIG. 6-F, module m1252 may include monitoring operational aspects involving dwelling associate preferences of location for electrical charging of electric vehicles at static charging locations along routes of travel of electric vehicles module m1261.

In one or more implementations, as shown in FIG. 6-G, module m1252 May include monitoring operational aspects involving dwelling associate preferences of location for electrical charging of electric vehicles based on historical or predicted availability of wireless electrical energy transfer provided by organizations employing dwelling associates module m1262.

In one or more implementations, as shown in FIG. 6-G, module m1252 may include monitoring operational aspects involving dwelling associate preferences of location for electrical energy storage charging of electric vehicles at locations for mechanical maintenance of electric vehicles module m1263.

In one or more implementations, as shown in FIG. 6-G, module m1252 may include monitoring operational aspects involving dwelling associate preferences for fuels used to re-fuel electric vehicles as hybrid electric vehicles module m1264.

In one or more implementations, as shown in FIG. 6-G, module m1252 may include monitoring operational aspects involving dwelling associate preferences for contingency plans for unplanned unavailability to electric vehicles of wireless electrical energy transfer module m1265.

In one or more implementations, as shown in FIG. 7-A, module m13 may include ascertaining dwelling related wireless recharging guidance involving locations of wireless electrical energy transfer module m1301.

In one or more implementations, as shown in FIG. 7-A, module m1301 may include ascertaining dwelling related wireless recharging guidance involving electric vehicles present at dwelling locations of wireless electrical energy transfer module m1302.

In one or more implementations, as shown in FIG. 7-A, module m1301 may include ascertaining dwelling related wireless recharging guidance based on identification and verification of dwelling associates module m1303.

In one or more implementations, as shown in FIG. 7-A, module m1301 may include ascertaining dwelling related wireless recharging guidance regarding verification of selection of wireless electrical energy transfer for electrical vehicles module m1304.

In one or more implementations, as shown in FIG. 7-A, module m1301 may include ascertaining dwelling related wireless recharging guidance regarding financial status information for dwelling associate accounts of dwelling associates module m1305.

In one or more implementations, as shown in FIG. 7-A, module m1301 may include ascertaining dwelling related wireless recharging guidance based on charging rate capacity of wireless electrical energy transfer module m1306.

In one or more implementations, as shown in FIG. 7-A, module m1301 may include ascertaining dwelling related wireless recharging guidance involving electrical charging rate for electrical energy storage devices of electric vehicles module m1307.

In one or more implementations, as shown in FIG. 7-A, module m1301 may include ascertaining dwelling related wireless recharging guidance concerning use planning for electric vehicles module m1308.

In one or more implementations, as shown in FIG. 7-A, module m1301 may include ascertaining dwelling related wireless recharging guidance involving amount of time electric vehicles are available for wireless electrical energy transfer module m1309.

In one or more implementations, as shown in FIG. 7-A, module m1301 may include ascertaining dwelling related wireless recharging guidance involving amount of electrical energy available to be transferred to electric vehicles in a designated period of time by wireless electrical energy transfer module m1310.

In one or more implementations, as shown in FIG. 7-B, module m1301 may include ascertaining dwelling related wireless recharging guidance involving approval of electric vehicle use profile of dwelling associates module m1311.

In one or more implementations, as shown in FIG. 7-B, module m1301 may include ascertaining dwelling related wireless recharging guidance involving impact from planned wireless electrical energy transfer schedule to itinerary and route information associated with electric vehicles module m1312.

In one or more implementations, as shown in FIG. 7-B, module m13 may include ascertaining dwelling related wireless recharging guidance involving communication links involving wireless electrical energy transfer and electric vehicles module m1313.

In one or more implementations, as shown in FIG. 7-B, module m1313 may include ascertaining dwelling related wireless recharging guidance involving contactless smart card readers module m1314.

In one or more implementations, as shown in FIG. 7-B, module m1313 may include ascertaining dwelling related wireless recharging guidance involving RFID tag readers module m1315.

In one or more implementations, as shown in FIG. 7-B, module m1313 may include ascertaining dwelling related wireless recharging guidance involving manual entry keypads module m1316.

In one or more implementations, as shown in FIG. 7-B, module m1313 may include ascertaining dwelling related wireless recharging guidance involving bluetooth communication devices module m1317.

In one or more implementations, as shown in FIG. 7-B, module m1313 may include ascertaining dwelling related wireless recharging guidance involving WiFi communication devices module m1318.

In one or more implementations, as shown in FIG. 7-B, module m1313 may include ascertaining dwelling related wireless recharging guidance involving packetized communication networks module m1319.

In one or more implementations, as shown in FIG. 7-B, module m1313 may include ascertaining dwelling related wireless recharging guidance involving infrared communication devices module m1320.

In one or more implementations, as shown in FIG. 7-B, module m13 may include ascertaining dwelling related wireless recharging guidance wirelessly module m1321.

In one or more implementations, as shown in FIG. 7-B, module m1321 may include wirelessly ascertaining dwelling related wireless recharging guidance involving RFID tags module m1322.

In one or more implementations, as shown in FIG. 7-C, module m1321 may include wirelessly ascertaining dwelling related wireless recharging guidance involving bluetooth supported communication module m1323.

In one or more implementations, as shown in FIG. 7-C, module m1321 may include wirelessly ascertaining dwelling related wireless recharging guidance involving WiFi facilitated communication module m1324.

In one or more implementations, as shown in FIG. 7-C, module m1321 may include wirelessly ascertaining dwelling related wireless recharging guidance involving packetized network communication module m1325.

In one or more implementations, as shown in FIG. 7-C, module m1321 may include wirelessly ascertaining dwelling related wireless recharging guidance involving infrared supported communication module m1326.

In one or more implementations, as shown in FIG. 7-C, module m13 may include ascertaining dwelling related wireless recharging guidance involving direct non-wireless communication module m1327.

In one or more implementations, as shown in FIG. 7-C, module m1327 may include ascertaining dwelling related wireless recharging guidance involving direct non-wireless communication module m1328.

In one or more implementations, as shown in FIG. 7-C, module m1327 may include ascertaining dwelling related wireless recharging guidance involving sound wave broadcasts module m1329.

Flowcharts

An operational flow o10 as shown in FIG. 8 represents example operations related to electronically processing status related intake associated at least in part with one or more electric vehicle recharging affairs for one or more electric vehicles by wireless electrical energy transfer affiliated at least in part with one or more dwelling associates of at least in part one or more dwelling related areas; electronically monitoring operational aspects at least in part affecting influence between the one or more electric vehicles and one or more dwelling associates of at least in part the one or more dwelling related areas; and electronically ascertaining dwelling related wireless recharging guidance for recharging of the one or more electric vehicles by the wireless electrical energy transfer affiliated at least in part with the one or more dwelling associates of at least in part the one or more dwelling related areas based at least in part upon at least a portion of the status related intake associated at least in part with the one or more electric vehicle recharging affairs for one or more electric vehicles by wireless electrical energy transfer affiliated at least in part with the one or more dwelling associates of at least in part the one or more dwelling related areas and based at least in part upon at least a portion of the operational aspects at least in part affecting influence between the one or more electric vehicles and the one or more dwelling associates of at least in part the one or more dwelling related areas.

FIG. 8 and those figures that follow may have various examples of operational flows, and explanation may be provided with respect to the above-described examples and/or with respect to other examples and contexts. Nonetheless, it should be understood that the operational flows may be executed in a number of other environments and contexts, and/or in modified versions. Furthermore, although the various operational flows are presented in the sequence(s) illustrated, it should be understood that the various operations may be performed in other orders than those which are illustrated, or may be performed concurrently.

In FIG. 8 and those figures that follow, various operations may be depicted in a box-within-a-box manner. Such depictions may indicate that an operation in an internal box may comprise an optional exemplary implementation of the operational step illustrated in one or more external boxes. However, it should be understood that internal box operations may be viewed as independent operations separate from any associated external boxes and may be performed in any sequence with respect to all other illustrated operations, or may be performed concurrently.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In one or more implementations, as shown in FIG. 8, the operational flow o10 proceeds to operation o11 for electronically processing status related intake associated at least in part with one or more electric vehicle recharging affairs for one or more electric vehicles by wireless electrical energy transfer affiliated at least in part with one or more dwelling associates of at least in part one or more dwelling related areas. Origination of a physically tangible component group can be accomplished through skilled in the art design choice selection including use of one or more components and/or subsystems explicitly and/or implicitly referred to herein for at least in part implementing execution of one or more instructions of the operation o11, for performance of the operation o11 by an electrical circuitry arrangement as activated thereto, and/or otherwise fulfillment of the operation o11. One or more non-transitory signal bearing physical media can bear the one or more instructions that when executed can direct performance of the operation o11. Furthermore, electronically processing status related intake associated with electric vehicle recharging affairs for electric vehicles by wireless electrical energy transfer affiliated with dwelling associates of dwelling related areas module m11 depicted in FIG. 4 as being included in the processing module m10, when executed and/or activated, can direct performance of and/or perform the operation o11. Illustratively, in one or more implementations, the operation o11 can be carried out, for example, by electronically processing (e.g., collecting, storing, annotating, accessing, retrieving, accumulating, monitoring, reporting, analyzing, summarizing, condensing, applying, etc.) status related intake (e.g., informational, projected, historical, performance, identification, organizational, background, affiliation, goal, milestone, accomplishment, detraction, objective, guideline, award, demerit, extra-curricular, etc.) associated at least in part (e.g., tangentially, directly, occasionally, temporarily, permanently, fully, partially, etc.) with one or more electric vehicle (e.g., all-electric, hybrid, gas-electric, diesel-electric, propane-electric, fuel-cell-electric, common-rail electric, car, truck, short distance, long distance, van, bus, cart, commercial, private, governmental, etc.) recharging (e.g., fast charge, slow trickle, low density, high density, recurrent, sporadic, ad hoc, predictive, total, partial, remedial, etc.) affairs (e.g., devices, mechanisms, procedures, structures, methods, countermeasures, plays, real, virtual, simulated, transitory, permanent, replacement, redundant, alternative, etc.) for one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) by wireless (e.g., electromagnetic resonance, short distance, long distance, high power, low power, static, dynamic, etc.) electrical energy (e.g., electrical energy stored or to be stored by such as battery, lead-acid, metal hydride, nickel-cadmium, chemical, solid state, capacitive, gaseous, compressed gas based, etc.) transfer (e.g., fast charge, slow trickle, low density, high density, recurrent, sporadic, ad hoc, predictive, total, partial, remedial, etc.) affiliated (e.g., tangentially, directly, indirectly, partially, fully, organizational, ethically, regionally, demographically, vocationally, generationally, educationally, politically, recreationally, etc.) at least in part with one or more dwelling (e.g., shelter, temporary, familial, residential, suburban, city, housing, high density, low density, singular, multiple, etc.) associates (e.g., habitating, lodging, occupying, visiting, touring, lounging, recreating, playing, working, studying, eating, owning, renting, leasing, contracting, retiring, sleeping, resting, reflecting, individual, group, corporate, governmental, civic, educational, volunteer, retired, candidate, temporary, permanent, driver, rider, occupant, maintainer, regular, occasional, ad hoc, commuter, pleasure, business, etc.) of at least in part one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, landscaped, palatial, in-town, uptown, downtown, penthouse, mansion, suburban, rural, family, shelter, rental, condominium, upscale, high-tech, modern, traditional, contemporary, classic, etc.).

In one or more implementations, as shown in FIG. 8, the operational flow o10 proceeds to operation o12 for electronically monitoring operational aspects at least in part affecting influence between the one or more electric vehicles and one or more dwelling associates of at least in part the one or more dwelling related areas. Origination of a physically tangible component group can be accomplished through skilled in the art design choice selection including use of one or more components and/or subsystems explicitly and/or implicitly referred to herein for at least in part implementing execution of one or more instructions of the operation o12, for performance of the operation o12 by an electrical circuitry arrangement as activated thereto, and/or otherwise fulfillment of the operation o12. One or more non-transitory signal bearing physical media can bear the one or more instructions that when executed can direct performance of the operation o12. Furthermore, electronically monitoring operational aspects affecting influence between electric vehicles and dwelling associates of dwelling related areas module m12 depicted in FIG. 4 as being included in the processing module m10, when executed and/or activated, can direct performance of and/or perform the operation o12. Illustratively, in one or more implementations, the operation o12 can be carried out, for example, by electronically monitoring (e.g., on-going, temporary, ad hoc, scheduled, periodic, receiving, gathering, collecting, categorizing, grouping, noting, storing, assessing, distilling, etc.) operational (e.g., drivable, maintainable, inventorial, storable, allocatable, reliable, usable, plannable, deterministic, predictable, functional, etc.) aspects (e.g., factors, contributory, foundational, direct, indirect, regular, sporadic, considerations, secondary, tertiary, etc.) at least in part affecting (e.g., tangentially, directly, occasionally, temporarily, permanently, fully, partially, etc.) influence (e.g., plan, reliance, replacement, use cycling, maintenance, allocation, cooperative, sharing, affordability, budgeting, provision, temporary, on-going, occasional, daily, use of by, etc.) between the one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) and one or more dwelling (e.g., shelter, temporary, familial, residential, suburban, city, housing, high density, low density, singular, multiple, etc.) associates (e.g., individual, group, corporate, governmental, civic, educational, volunteer, retired, candidate, temporary, permanent, driver, rider, occupant, maintainer, regular, occasional, ad hoc, commuter, pleasure, business, etc.) of at least in part the one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, palatial, in-town, uptown, down-town, penthouse, mansion, suburban, rural, family, shelter, rental, condominium, up-scale, high-tech, modern, traditional, contemporary, classic, etc.).

In one or more implementations, as shown in FIG. 8, the operational flow o10 proceeds to operation o13 for electronically ascertaining dwelling related wireless recharging guidance for recharging of the one or more electric vehicles by the wireless electrical energy transfer affiliated at least in part with the one or more dwelling associates of at least in part the one or more dwelling related areas based at least in part upon at least a portion of the status related intake associated at least in part with the one or more electric vehicle recharging affairs for one or more electric vehicles by wireless electrical energy transfer affiliated at least in part with the one or more dwelling associates of at least in part the one or more dwelling related areas and based at least in part upon at least a portion of the operational aspects at least in part affecting influence between the one or more electric vehicles and the one or more dwelling associates of at least in part the one or more dwelling related areas. Origination of a physically tangible component group can be accomplished through skilled in the art design choice selection including use of one or more components and/or subsystems explicitly and/or implicitly referred to herein for at least in part implementing execution of one or more instructions of the operation o13, for performance of the operation o13 by an electrical circuitry arrangement as activated thereto, and/or otherwise fulfillment of the operation o13. One or more non-transitory signal bearing physical media can bear the one or more instructions that when executed can direct performance of the operation o13. Furthermore, electronically ascertaining dwelling related wireless recharging guidance for recharging of electric vehicles by wireless electrical energy transfer affiliated with dwelling associates of dwelling related areas based upon at least a portion of status related intake associated with electric vehicle recharging affairs for electric vehicles by wireless electrical energy transfer affiliated with dwelling associates of dwelling related areas and based upon at least a portion of operational aspects affecting influence between electric vehicles and dwelling associates of dwelling related areas module m13 depicted in FIG. 4 as being included in the processing module m10, when executed and/or activated, can direct performance of and/or perform the operation o13. Illustratively, in one or more implementations, the operation o13 can be carried out, for example, by electronically ascertaining (e.g., determining, judging, comparing, noting, sorting, classifying, categorizing, indexing, reviewing, assessing, addressing, identifying, assembling, etc.) dwelling (e.g., shelter, temporary, familial, residential, suburban, city, housing, high density, low density, singular, multiple, etc.) related (e.g., tangentially, directly, occasionally, temporarily, permanently, fully, partially, etc.) wireless (e.g., electromagnetic resonance, short distance, long distance, high power, low power, static, dynamic, etc.) recharging (e.g., fast charge, slow trickle, low density, high density, recurrent, sporadic, ad hoc, predictive, total, partial, remedial, etc.) guidance (e.g., mandatory, instructional, suggestive, advisory, cautionary, encouragement, congratulatory, rewarding, maintaining, warning, reactionary, optimistic, proactive, supplemental, etc.) for recharging (e.g., fast charge, slow trickle, low density, high density, recurrent, sporadic, ad hoc, predictive, total, partial, remedial, etc.) of the one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) by the wireless (e.g., electromagnetic resonance, short distance, long distance, high power, low power, static, dynamic, etc.) electrical energy (e.g., electrical energy stored or to be stored by such as battery, lead-acid, metal hydride, nickel-cadmium, chemical, solid state, capacitive, gaseous, compressed gas based, etc.) transfer (e.g., fast charge, slow trickle, low density, high density, recurrent, sporadic, ad hoc, predictive, total, partial, remedial, etc.) affiliated (e.g., tangentially, directly, indirectly, partially, fully, organizational, ethically, regionally, demographically, vocationally, generationally, educationally, politically, recreationally, etc.) at least in part with the one or more dwelling (e.g., shelter, temporary, familial, residential, suburban, city, housing, high density, low density, singular, multiple, etc.) associates (e.g., habitating, lodging, occupying, visiting, touring, lounging, recreating, playing, working, studying, eating, owning, renting, leasing, contracting, retiring, sleeping, resting, reflecting, individual, group, corporate, governmental, civic, educational, volunteer, retired, candidate, temporary, permanent, driver, rider, occupant, maintainer, regular, occasional, ad hoc, commuter, pleasure, business, etc.) of at least in part the one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, landscaped, palatial, in-town, uptown, downtown, penthouse, mansion, suburban, rural, family, shelter, rental, condominium, upscale, high-tech, modern, traditional, contemporary, classic, etc.) based at least in part upon (e.g., directly, derived, indirectly, assumed, presumed, anticipated, predicted, concluded, deductive, inductive, conjecture, experiential, theoretical, historical, prophetic, etc.) at least a portion (e.g., limiting, exclusionary, inclusionary, encompassing, limited, surpassing, macroscopic, microscopic, singular, multitude, etc.) of the status related intake (e.g., informational, projected, historical, performance, identification, organizational, background, affiliation, goal, milestone, accomplishment, detraction, objective, guideline, award, demerit, extra-curricular, etc.) associated at least in part (e.g., tangentially, directly, occasionally, temporarily, permanently, fully, partially, etc.) with the one or more electric vehicle (e.g., all-electric, hybrid, gas-electric, diesel-electric, propane-electric, fuel-cell-electric, common-rail electric, car, truck, short distance, long distance, van, bus, cart, commercial, private, governmental, etc.) recharging (e.g., fast charge, slow trickle, low density, high density, recurrent, sporadic, ad hoc, predictive, total, partial, remedial, etc.) affairs (e.g., devices, mechanisms, procedures, structures, methods, countermeasures, plays, real, virtual, simulated, transitory, permanent, replacement, redundant, alternative, etc.) for one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) by wireless (e.g., electromagnetic resonance, short distance, long distance, high power, low power, static, dynamic, etc.) electrical energy (e.g., electrical energy stored or to be stored by such as battery, lead-acid, metal hydride, nickel-cadmium, chemical, solid state, capacitive, gaseous, compressed gas based, etc.) transfer (e.g., fast charge, slow trickle, low density, high density, recurrent, sporadic, ad hoc, predictive, total, partial, remedial, etc.) affiliated (e.g., tangentially, directly, indirectly, partially, fully, organizational, ethically, regionally, demographically, vocationally, generationally, educationally, politically, recreationally, etc.) at least in part with the one or more dwelling (e.g., shelter, temporary, familial, residential, suburban, city, housing, high density, low density, singular, multiple, etc.) associates (e.g., habitating, lodging, occupying, visiting, touring, lounging, recreating, playing, working, studying, eating, owning, renting, leasing, contracting, retiring, sleeping, resting, reflecting, individual, group, corporate, governmental, civic, educational, volunteer, retired, candidate, temporary, permanent, driver, rider, occupant, maintainer, regular, occasional, ad hoc, commuter, pleasure, business, etc.) of at least in part the one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, landscaped, palatial, in-town, uptown, downtown, penthouse, mansion, suburban, rural, family, shelter, rental, condominium, upscale, high-tech, modern, traditional, contemporary, classic, etc.) and based at least in part upon (e.g., directly, derived, indirectly, assumed, presumed, anticipated, predicted, concluded, deductive, inductive, conjecture, experiential, theoretical, historical, prophetic, etc.) at least a portion of the operational (e.g., drivable, maintainable, inventorial, storable, allocatable, reliable, usable, plannable, deterministic, predictable, functional, etc.) aspects (e.g., factors, contributory, foundational, direct, indirect, regular, sporadic, considerations, secondary, tertiary, etc.) at least in part affecting (e.g., tangentially, directly, occasionally, temporarily, permanently, fully, partially, etc.) influence (e.g., plan, reliance, replacement, use cycling, maintenance, allocation, cooperative, sharing, affordability, budgeting, provision, temporary, on-going, occasional, daily, use of by, etc.) between the one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) and the one or more dwelling (e.g., shelter, temporary, familial, residential, suburban, city, housing, high density, low density, singular, multiple, etc.) associates (e.g., individual, group, corporate, governmental, civic, educational, volunteer, retired, candidate, temporary, permanent, driver, rider, occupant, maintainer, regular, occasional, ad hoc, commuter, pleasure, business, etc.) of at least in part the one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, palatial, in-town, up-town, down-town, penthouse, mansion, suburban, rural, family, shelter, rental, condominium, up-scale, high-tech, modern, traditional, contemporary, classic, etc.).

In one or more implementations, as shown in FIG. 9-A, the operation o11 can include operation o1101 for electronically processing status related intake associated at least in part with one or more electric vehicle recharging affairs for one or more electric vehicles by wireless electrical energy transfer affiliated at least in part with one or more dwelling associates of at least in part one or more dwelling related areas including processing status related intake involving at least in part activity associated with one or more electric vehicle user dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1101, for performance of the operation o1101 by an electrical circuitry arrangement as activated thereto, and/or otherwise fulfillment of the operation o1101. One or more non-transitory signal bearing physical media can bear the one or more instructions that when executed can direct performance of the operation o1101. Furthermore, processing status related intake involving activity associated with electric vehicle user dwelling associates module m1101 depicted in FIG. 5-A as being included in the module m11, when executed and/or activated, can direct performance of and/or perform the operation o1101. Illustratively, in one or more implementations, the operation o1101 can be carried out, for example, by electronically processing (e.g., collecting, storing, annotating, accessing, retrieving, accumulating, monitoring, reporting, analyzing, summarizing, condensing, applying, etc.) status related intake (e.g., informational, projected, historical, performance, identification, organizational, background, affiliation, goal, milestone, accomplishment, detraction, objective, guideline, award, demerit, extracurricular, etc.) associated at least in part (e.g., tangentially, directly, occasionally, temporarily, permanently, fully, partially, etc.) with one or more electric vehicle (e.g., all-electric, hybrid, gas-electric, diesel-electric, propane-electric, fuel-cell-electric, common-rail electric, car, truck, short distance, long distance, van, bus, cart, commercial, private, governmental, etc.) recharging (e.g., fast charge, slow trickle, low density, high density, recurrent, sporadic, ad hoc, predictive, total, partial, remedial, etc.) affairs (e.g., devices, mechanisms, procedures, structures, methods, countermeasures, plays, real, virtual, simulated, transitory, permanent, replacement, redundant, alternative, etc.) for one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) by wireless (e.g., electromagnetic resonance, short distance, long distance, high power, low power, static, dynamic, etc.) electrical energy (e.g., electrical energy stored or to be stored by such as battery, lead-acid, metal hydride, nickel-cadmium, chemical, solid state, capacitive, gaseous, compressed gas based, etc.) transfer (e.g., fast charge, slow trickle, low density, high density, recurrent, sporadic, ad hoc, predictive, total, partial, remedial, etc.) affiliated (e.g., tangentially, directly, indirectly, partially, fully, organizational, ethically, regionally, demographically, vocationally, generationally, educationally, politically, recreationally, etc.) at least in part with one or more dwelling (e.g., shelter, temporary, familial, residential, suburban, city, housing, high density, low density, singular, multiple, etc.) associates (e.g., habitating, lodging, occupying, visiting, touring, lounging, recreating, playing, working, studying, eating, owning, renting, leasing, contracting, retiring, sleeping, resting, reflecting, individual, group, corporate, governmental, civic, educational, volunteer, retired, candidate, temporary, permanent, driver, rider, occupant, maintainer, regular, occasional, ad hoc, commuter, pleasure, business, etc.) of at least in part one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, landscaped, palatial, in-town, uptown, downtown, penthouse, mansion, suburban, rural, family, shelter, rental, condominium, upscale, high-tech, modern, traditional, contemporary, classic, etc.) including processing status related intake involving at least in part activity associated with one or more electric vehicle user dwelling associates (e.g., processing information involving active data entry by the one or more dwelling associates such as downloading data of a personal data assistant device of the dwelling associates, or involving text of voice entry directed to an interface found in the dashboard of the one or more electric vehicles, etc.).

In one or more implementations, as shown in FIG. 9-A, the operation o1101 can include operation o1102 for processing status related intake involving at least in part activity associated with one or more electric vehicle user dwelling associates including processing status related intake involving at least in part one or more contactless smart card systems associated with one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1102, for performance of the operation o1102 by an electrical circuitry arrangement as activated thereto, and/or otherwise fulfillment of the operation o1102. One or more non-transitory signal bearing physical media can bear the one or more instructions that when executed can direct performance of the operation o1102. Furthermore, processing status related intake involving contactless smart card systems associated with electric vehicles module m1102 depicted in FIG. 5-A as being included in the module m1101, when executed and/or activated, can direct performance of and/or perform the operation o1102. Illustratively, in one or more implementations, the operation o1102 can be carried out, for example, by processing status related intake involving at least in part activity associated with one or more electric vehicle user dwelling associates (e.g., processing information involving active data entry by the one or more dwelling associates such as downloading data of a personal data assistant device of the dwelling associates, or involving text of voice entry directed to an interface found in the dashboard of the one or more electric vehicles, etc.) including processing status related intake involving at least in part one or more contactless smart card systems associated with one or more electric vehicles (e.g., processing information involving one or more dwelling associates swiping cards, cell phones, wallets or other smart card type devices containing information regarding either the dwelling associate profile information, past or future itineraries, etc.).

In one or more implementations, as shown in FIG. 9-A, the operation o1101 can include operation o1103 for processing status related intake involving at least in part activity associated with one or more electric vehicle user dwelling associates including processing status related intake involving at least in part manual entering of data involving at least in part one or more keypads. Origination of a physically tangible component group can be accomplished through skilled in the art design choice selection including use of one or more components and/or subsystems explicitly and/or implicitly referred to herein for at least in part implementing execution of one or more instructions of the operation o1103, for performance of the operation o1103 by an electrical circuitry arrangement as activated thereto, and/or otherwise fulfillment of the operation o1103. One or more non-transitory signal bearing physical media can bear the one or more instructions that when executed can direct performance of the operation o1103. Furthermore, processing status related intake involving manual entering of data involving keypads module m1103 depicted in FIG. 5-A as being included in the module m1101, when executed and/or activated, can direct performance of and/or perform the operation o1103. Illustratively, in one or more implementations, the operation o1103 can be carried out, for example, by processing status related intake involving at least in part activity associated with one or more electric vehicle user dwelling associates (e.g., processing information involving active data entry by the one or more dwelling associates such as downloading data of a personal data assistant device of the dwelling associates, or involving text of voice entry directed to an interface found in the dashboard of the one or more electric vehicles, etc.) including processing status related intake involving at least in part manual entering of data involving at least in part one or more keypads (e.g., processing information involving use of data entry on one or more keypads such as located on a console within the one or more electric vehicles or near a charging station of the one or more electric vehicles, etc.).

In one or more implementations, as shown in FIG. 9-A, the operation o1101 can include operation o1104 for processing status related intake involving at least in part activity associated with one or more electric vehicle user dwelling associates including processing status related intake involving at least in part direct text entry. Origination of a physically tangible component group can be accomplished through skilled in the art design choice selection including use of one or more components and/or subsystems explicitly and/or implicitly referred to herein for at least in part implementing execution of one or more instructions of the operation o1104, for performance of the operation o1104 by an electrical circuitry arrangement as activated thereto, and/or otherwise fulfillment of the operation o1104. One or more non-transitory signal bearing physical media can bear the one or more instructions that when executed can direct performance of the operation o1104. Furthermore, processing status related intake involving direct text entry module m1104 depicted in FIG. 5-A as being included in the module m1101, when executed and/or activated, can direct performance of and/or perform the operation o1104. Illustratively, in one or more implementations, the operation o1104 can be carried out, for example, by processing status related intake involving at least in part activity associated with one or more electric vehicle user dwelling associates (e.g., processing information involving active data entry by the one or more dwelling associates such as downloading data of a personal data assistant device of the dwelling associates, or involving text of voice entry directed to an interface found in the dashboard of the one or more electric vehicles, etc.) including processing status related intake involving at least in part direct text entry (e.g., processing information regarding intended use of the one or more electric vehicles involving responses typed into a text entry device such as on a smart phone or keypad or other text entry device by one or more dwelling associates of the one or more electric vehicles, etc.).

In one or more implementations, as shown in FIG. 9-A, the operation o1101 can include operation o1105 for processing status related intake involving at least in part activity associated with one or more electric vehicle user dwelling associates including processing status related intake involving at least in part one or more dwelling associates speaking in reply to one or more sound input systems. Origination of a physically tangible component group can be accomplished through skilled in the art design choice selection including use of one or more components and/or subsystems explicitly and/or implicitly referred to herein for at least in part implementing execution of one or more instructions of the operation o1105, for performance of the operation o1105 by an electrical circuitry arrangement as activated thereto, and/or otherwise fulfillment of the operation o1105. One or more non-transitory signal bearing physical media can bear the one or more instructions that when executed can direct performance of the operation o1105. Furthermore, processing status related intake involving dwelling associates speaking in reply to sound input systems module m1105 depicted in FIG. 5-A as being included in the module m1101, when executed and/or activated, can direct performance of and/or perform the operation o1105. Illustratively, in one or more implementations, the operation o1105 can be carried out, for example, by processing status related intake involving at least in part activity associated with one or more electric vehicle user dwelling associates (e.g., processing information involving active data entry by the one or more dwelling associates such as downloading data of a personal data assistant device of the dwelling associates, or involving text of voice entry directed to an interface found in the dashboard of the one or more electric vehicles, etc.) including processing status related intake involving at least in part one or more dwelling associates speaking in reply to one or more sound input systems (e.g., processing information from one or more dwelling associates of the one or more electric vehicles by the dwelling associates verbally responding to sound cues announced by an sound system to the dwelling associates based upon determined location of the dwelling associates by the sound system, etc.).

In one or more implementations, as shown in FIG. 9-B, the operation o1101 can include operation o1106 for processing status related intake involving at least in part activity associated with one or more electric vehicle user dwelling associates including processing status related intake regarding at least in part one or more dwelling associate uses of the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1106, for performance of the operation o1106 by an electrical circuitry arrangement as activated thereto, and/or otherwise fulfillment of the operation o1106. One or more non-transitory signal bearing physical media can bear the one or more instructions that when executed can direct performance of the operation o1106. Furthermore, processing status related intake regarding dwelling associate uses of electric vehicles module m1106 depicted in FIG. 5-A as being included in the module m1101, when executed and/or activated, can direct performance of and/or perform the operation o1106. Illustratively, in one or more implementations, the operation o1106 can be carried out, for example, by processing status related intake involving at least in part activity associated with one or more electric vehicle user dwelling associates (e.g., processing information involving active data entry by the one or more dwelling associates such as downloading data of a personal data assistant device of the dwelling associates, or involving text of voice entry directed to an interface found in the dashboard of the one or more electric vehicles, etc.) including processing status related intake regarding at least in part one or more dwelling associate uses of the one or more electric vehicles (e.g., processing information regarding potential for sharing of the one or more electric vehicles among one or more groups of electric vehicle owners, economic status of the one or more electric vehicles owner, health or contagion condition of the one or more dwelling associates, physical accessibility or disability issues of the one or more dwelling associates, etc.).

In one or more implementations, as shown in FIG. 9-B, the operation o1106 can include operation o1107 for processing status related intake regarding at least in part one or more dwelling associate uses of the one or more electric vehicles including processing status related intake involving at least in part processing terrain or traffic information regarding at least in part routes of travel for the one or more electric vehicles taken by one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1107, for performance of the operation o1107 by an electrical circuitry arrangement as activated thereto, and/or otherwise fulfillment of the operation o1107. One or more non-transitory signal bearing physical media can bear the one or more instructions that when executed can direct performance of the operation o1107. Furthermore, processing status related intake involving processing terrain or traffic information regarding routes of travel for electric vehicles taken by dwelling associates module m1107 depicted in FIG. 5-A as being included in the module m1106, when executed and/or activated, can direct performance of and/or perform the operation o1107. Illustratively, in one or more implementations, the operation o1107 can be carried out, for example, by processing status related intake regarding at least in part one or more dwelling associate uses of the one or more electric vehicles (e.g., processing information regarding potential for sharing of the one or more electric vehicles among one or more groups of electric vehicle owners, economic status of the one or more electric vehicles owner, health or contagion condition of the one or more dwelling associates, physical accessibility or disability issues of the one or more dwelling associates, etc.) including processing status related intake involving at least in part processing terrain or traffic information regarding at least in part routes of travel for the one or more electric vehicles taken by one or more dwelling associates (e.g., processing information regarding anticipated or unannounced changes in road conditions, traffic delays, accident reports, detours or re-routing of traffic, weather influenced delays, etc.).

In one or more implementations, as shown in FIG. 9-B, the operation o1106 can include operation o1108 for processing status related intake regarding at least in part one or more dwelling associate uses of the one or more electric vehicles including processing status related intake involving at least in part processing commuter routing information for one or more of the dwelling associates using one or more of the electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1108, for performance of the operation o1108 by an electrical circuitry arrangement as activated thereto, and/or otherwise fulfillment of the operation o1108. One or more non-transitory signal bearing physical media can bear the one or more instructions that when executed can direct performance of the operation o1108. Furthermore, processing status related intake involving processing commuter routing information for dwelling associates using one of electric vehicles module m1108 depicted in FIG. 5-A as being included in the module m1106, when executed and/or activated, can direct performance of and/or perform the operation o1108. Illustratively, in one or more implementations, the operation o1108 can be carried out, for example, by processing status related intake regarding at least in part one or more dwelling associate uses of the one or more electric vehicles (e.g., processing information regarding potential for sharing of the one or more electric vehicles among one or more groups of electric vehicle owners, economic status of the one or more electric vehicles owner, health or contagion condition of the one or more dwelling associates, physical accessibility or disability issues of the one or more dwelling associates, etc.) including processing status related intake involving at least in part processing commuter routing information for one or more of the dwelling associates using one or more of the electric vehicles (e.g., processing information regarding traffic congestion, road work issues, weather issues, vehicle accident issues and other issues associated with the planned or estimated routes for commuter use of the one or more electric vehicles, etc.).

In one or more implementations, as shown in FIG. 9-B, the operation o1106 can include operation o1109 for processing status related intake regarding at least in part one or more dwelling associate uses of the one or more electric vehicles including processing status related intake involving at least in part processing trip advisory information regarding at least in part routes of travel for the one or more electric vehicles used by the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1109, for performance of the operation o1109 by an electrical circuitry arrangement as activated thereto, and/or otherwise fulfillment of the operation o1109. One or more non-transitory signal bearing physical media can bear the one or more instructions that when executed can direct performance of the operation o1109. Furthermore, processing status related intake involving processing trip advisory information regarding routes of travel for electric vehicles used by dwelling associates module m1109 depicted in FIG. 5-A as being included in the module m1106, when executed and/or activated, can direct performance of and/or perform the operation o1109. Illustratively, in one or more implementations, the operation o1109 can be carried out, for example, by processing status related intake regarding at least in part one or more dwelling associate uses of the one or more electric vehicles (e.g., processing information regarding potential for sharing of the one or more electric vehicles among one or more groups of electric vehicle owners, economic status of the one or more electric vehicles owner, health or contagion condition of the one or more dwelling associates, physical accessibility or disability issues of the one or more dwelling associates, etc.) including processing status related intake involving at least in part processing trip advisory information regarding at least in part routes of travel for the one or more electric vehicles used by the one or more dwelling associates (e.g., processing information regarding sight-seeing, shopping, restaurant, etc. potential availability of the routes involved as associated with delays due to charging requirements, etc.).

In one or more implementations, as shown in FIG. 9-C, the operation o1106 can include operation o1110 for processing status related intake regarding at least in part one or more dwelling associate uses of the one or more electric vehicles including processing status related intake involving at least in part processing information regarding at least in part alternative modes of transportation along one or more routes of travel of the one or more electric vehicles for the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1110, for performance of the operation o1110 by an electrical circuitry arrangement as activated thereto, and/or otherwise fulfillment of the operation o1110. One or more non-transitory signal bearing physical media can bear the one or more instructions that when executed can direct performance of the operation o1110. Furthermore, processing status related intake involving processing information regarding alternative modes of transportation along routes of travel of electric vehicles for dwelling associates module m1110 depicted in FIG. 5-A as being included in the module m1106, when executed and/or activated, can direct performance of and/or perform the operation o1110. Illustratively, in one or more implementations, the operation o1110 can be carried out, for example, by processing status related intake regarding at least in part one or more dwelling associate uses of the one or more electric vehicles (e.g., processing information regarding potential for sharing of the one or more electric vehicles among one or more groups of electric vehicle owners, economic status of the one or more electric vehicles owner, health or contagion condition of the one or more dwelling associates, physical accessibility or disability issues of the one or more dwelling associates, etc.) including processing status related intake involving at least in part processing information regarding at least in part alternative modes of transportation along one or more routes of travel of the one or more electric vehicles for the one or more dwelling associates (e.g., processing information regarding taxi, public transportation, rail, ride-share, etc. associated with planned or estimated travel routes of the one or more electric vehicles, etc.).

In one or more implementations, as shown in FIG. 9-C, the operation o1106 can include operation o1111 for processing status related intake regarding at least in part one or more dwelling associate uses of the one or more electric vehicles including processing status related intake involving at least in part processing information regarding at least in part one or more periods in which the one or more electric vehicles will be unavailable for use by the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1111, for performance of the operation o1111 by an electrical circuitry arrangement as activated thereto, and/or otherwise fulfillment of the operation o1111. One or more non-transitory signal bearing physical media can bear the one or more instructions that when executed can direct performance of the operation o1111. Furthermore, processing status related intake involving processing information regarding periods in which electric vehicles will be unavailable for use by dwelling associates module m1111 depicted in FIG. 5-A as being included in the module m1106, when executed and/or activated, can direct performance of and/or perform the operation o1111. Illustratively, in one or more implementations, the operation o1111 can be carried out, for example, by processing status related intake regarding at least in part one or more dwelling associate uses of the one or more electric vehicles (e.g., processing information regarding potential for sharing of the one or more electric vehicles among one or more groups of electric vehicle owners, economic status of the one or more electric vehicles owner, health or contagion condition of the one or more dwelling associates, physical accessibility or disability issues of the one or more dwelling associates, etc.) including processing status related intake involving at least in part processing information regarding at least in part one or more periods in which the one or more electric vehicles will be unavailable for use by the one or more dwelling associates (e.g., processing information as to reserved wait times, maintenance scheduling, use by others, planned or estimated charging times, for the one or more electric vehicles, etc.).

In one or more implementations, as shown in FIG. 9-C, the operation o1106 can include operation o1112 for processing status related intake regarding at least in part one or more dwelling associate uses of the one or more electric vehicles including processing status related intake involving at least in part processing information regarding at least in part planned errands to be run by one or more dwelling associates with the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1112, for performance of the operation o1112 by an electrical circuitry arrangement as activated thereto, and/or otherwise fulfillment of the operation o1112. One or more non-transitory signal bearing physical media can bear the one or more instructions that when executed can direct performance of the operation o1112. Furthermore, processing status related intake involving processing information regarding planned errands to be run by dwelling associates with electric vehicles module m1112 depicted in FIG. 5-B as being included in the module m1106, when executed and/or activated, can direct performance of and/or perform the operation o1112. Illustratively, in one or more implementations, the operation o1112 can be carried out, for example, by processing status related intake regarding at least in part one or more dwelling associate uses of the one or more electric vehicles (e.g., processing information regarding potential for sharing of the one or more electric vehicles among one or more groups of electric vehicle owners, economic status of the one or more electric vehicles owner, health or contagion condition of the one or more dwelling associates, physical accessibility or disability issues of the one or more dwelling associates, etc.) including processing status related intake involving at least in part processing information regarding at least in part planned errands to be run by one or more dwelling associates with the one or more electric vehicles (e.g., processing information regarding store hours, office hours, traffic congestion issues, service provider availability, shopping lists, shopping ordering information associated with planned or estimated itinerary of use of the one or more electric vehicles, etc.).

In one or more implementations, as shown in FIG. 9-C, the operation o1106 can include operation o1113 for processing status related intake regarding at least in part one or more dwelling associate uses of the one or more electric vehicles including processing status related intake involving at least in part processing information regarding at least in part one or more commercial delivery schedules driven by the one or more of dwelling associates utilizing the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1113, for performance of the operation o1113 by an electrical circuitry arrangement as activated thereto, and/or otherwise fulfillment of the operation o1113. One or more non-transitory signal bearing physical media can bear the one or more instructions that when executed can direct performance of the operation o1113. Furthermore, processing status related intake involving processing information regarding commercial delivery schedules driven by dwelling associates utilizing electric vehicles module m1113 depicted in FIG. 5-B as being included in the module m1106, when executed and/or activated, can direct performance of and/or perform the operation o1113. Illustratively, in one or more implementations, the operation o1113 can be carried out, for example, by processing status related intake regarding at least in part one or more dwelling associate uses of the one or more electric vehicles (e.g., processing information regarding potential for sharing of the one or more electric vehicles among one or more groups of electric vehicle owners, economic status of the one or more electric vehicles owner, health or contagion condition of the one or more dwelling associates, physical accessibility or disability issues of the one or more dwelling associates, etc.) including processing status related intake involving at least in part processing information regarding at least in part one or more commercial delivery schedules driven by the one or more of dwelling associates utilizing the one or more electric vehicles (e.g., processing information regarding planned or estimated routes for delivery, prioritization of various deliveries along the routes, any breaks allowed the driver along the route, one or more driving history or other factors involved with the planned electric vehicle drivers along the route, etc.).

In one or more implementations, as shown in FIG. 9-D, the operation o1106 can include operation o1114 for processing status related intake regarding at least in part one or more dwelling associate uses of the one or more electric vehicles including processing status related intake involving at least in part processing information regarding at least in part one or more regulated uses by the one or more dwelling associates of the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1114, for performance of the operation o1114 by an electrical circuitry arrangement as activated thereto, and/or otherwise fulfillment of the operation o1114. One or more non-transitory signal bearing physical media can bear the one or more instructions that when executed can direct performance of the operation o1114. Furthermore, processing status related intake involving processing information regarding regulated uses by dwelling associates of electric vehicles module m1114 depicted in FIG. 5-B as being included in the module m1106, when executed and/or activated, can direct performance of and/or perform the operation o1114. Illustratively, in one or more implementations, the operation o1114 can be carried out, for example, by processing status related intake regarding at least in part one or more dwelling associate uses of the one or more electric vehicles (e.g., processing information regarding potential for sharing of the one or more electric vehicles among one or more groups of electric vehicle owners, economic status of the one or more electric vehicles owner, health or contagion condition of the one or more dwelling associates, physical accessibility or disability issues of the one or more dwelling associates, etc.) including processing status related intake involving at least in part processing information regarding at least in part one or more regulated uses by the one or more dwelling associates of the one or more electric vehicles (e.g., processing information regarding urgency, level of payment, arrangement for delivery associated with the one or more regulated uses, etc.).

In one or more implementations, as shown in FIG. 9-D, the operation o1106 can include operation o1115 for processing status related intake regarding at least in part one or more dwelling associate uses of the one or more electric vehicles including processing status related intake involving at least in part processing information regarding at least in part ad hoc use by the one or more dwelling associates of the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1115, for performance of the operation o1115 by an electrical circuitry arrangement as activated thereto, and/or otherwise fulfillment of the operation o1115. One or more non-transitory signal bearing physical media can bear the one or more instructions that when executed can direct performance of the operation o1115. Furthermore, processing status related intake involving processing information regarding ad hoc use by dwelling associates of electric vehicles module m1115 depicted in FIG. 5-B as being included in the module m1106, when executed and/or activated, can direct performance of and/or perform the operation o1115. Illustratively, in one or more implementations, the operation o1115 can be carried out, for example, by processing status related intake regarding at least in part one or more dwelling associate uses of the one or more electric vehicles (e.g., processing information regarding potential for sharing of the one or more electric vehicles among one or more groups of electric vehicle owners, economic status of the one or more electric vehicles owner, health or contagion condition of the one or more dwelling associates, physical accessibility or disability issues of the one or more dwelling associates, etc.) including processing status related intake involving at least in part processing information regarding at least in part ad hoc use by the one or more dwelling associates of the one or more electric vehicles (e.g., processing information regarding electric vehicle use urgency, attendant hazards, scheduling issues, contractual obligations, inspection issues, etc.).

In one or more implementations, as shown in FIG. 9-D, the operation o1106 can include operation o1116 for processing status related intake regarding at least in part one or more dwelling associate uses of the one or more electric vehicles including processing status related intake involving at least in part processing information regarding at least in part one or more driving habits of the one or more dwelling associates associated with driving the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1116, for performance of the operation o1116 by an electrical circuitry arrangement as activated thereto, and/or otherwise fulfillment of the operation o1116. One or more non-transitory signal bearing physical media can bear the one or more instructions that when executed can direct performance of the operation o1116. Furthermore, processing status related intake involving processing information regarding driving habits of dwelling associates associated with driving electric vehicles module m1116 depicted in FIG. 5-B as being included in the module m1106, when executed and/or activated, can direct performance of and/or perform the operation o1116. Illustratively, in one or more implementations, the operation o1116 can be carried out, for example, by processing status related intake regarding at least in part one or more dwelling associate uses of the one or more electric vehicles (e.g., processing information regarding potential for sharing of the one or more electric vehicles among one or more groups of electric vehicle owners, economic status of the one or more electric vehicles owner, health or contagion condition of the one or more dwelling associates, physical accessibility or disability issues of the one or more dwelling associates, etc.) including processing status related intake involving at least in part processing information regarding at least in part one or more driving habits of the one or more dwelling associates associated with driving the one or more electric vehicles (e.g., processing information regarding historical punctuality of dwelling associates, traffic violation histories of the dwelling associates, tendency to exceed speed limits by the dwelling associates, braking habits of the dwelling associates, etc.).

In one or more implementations, as shown in FIG. 9-D, the operation o1106 can include operation o1117 for processing status related intake regarding at least in part one or more dwelling associate uses of the one or more electric vehicles including processing status related intake involving at least in part processing information regarding at least in part one or more itineraries associated with use of the one or more electric vehicles by the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1117, for performance of the operation o1117 by an electrical circuitry arrangement as activated thereto, and/or otherwise fulfillment of the operation o1117. One or more non-transitory signal bearing physical media can bear the one or more instructions that when executed can direct performance of the operation o1117. Furthermore, processing status related intake involving processing information regarding itineraries associated with use of electric vehicles by dwelling associates module m1117 depicted in FIG. 5-B as being included in the module m1106, when executed and/or activated, can direct performance of and/or perform the operation o1117. Illustratively, in one or more implementations, the operation o1117 can be carried out, for example, by processing status related intake regarding at least in part one or more dwelling associate uses of the one or more electric vehicles (e.g., processing information regarding potential for sharing of the one or more electric vehicles among one or more groups of electric vehicle owners, economic status of the one or more electric vehicles owner, health or contagion condition of the one or more dwelling associates, physical accessibility or disability issues of the one or more dwelling associates, etc.) including processing status related intake involving at least in part processing information regarding at least in part one or more itineraries associated with use of the one or more electric vehicles by the one or more dwelling associates (e.g., processing information start times, stop times, wait times, characterization of priority levels for arrival, etc.).

In one or more implementations, as shown in FIG. 9-E, the operation o1106 can include operation o1118 for processing status related intake regarding at least in part one or more dwelling associate uses of the one or more electric vehicles including processing status related intake involving at least in part processing information regarding at least in part one or more weather forecasts associated with travel involving at least in part use by the one or more dwelling associates of the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1118, for performance of the operation o1118 by an electrical circuitry arrangement as activated thereto, and/or otherwise fulfillment of the operation o1118. One or more non-transitory signal bearing physical media can bear the one or more instructions that when executed can direct performance of the operation o1118. Furthermore, processing status related intake involving processing information regarding wear forecasts associated with travel involving use by dwelling associates of electric vehicles module m1118 depicted in FIG. 5-B as being included in the module m1106, when executed and/or activated, can direct performance of and/or perform the operation o1118. Illustratively, in one or more implementations, the operation o1118 can be carried out, for example, by processing status related intake regarding at least in part one or more dwelling associate uses of the one or more electric vehicles (e.g., processing information regarding potential for sharing of the one or more electric vehicles among one or more groups of electric vehicle owners, economic status of the one or more electric vehicles owner, health or contagion condition of the one or more dwelling associates, physical accessibility or disability issues of the one or more dwelling associates, etc.) including processing status related intake involving at least in part processing information regarding at least in part one or more weather forecasts associated with travel involving at least in part use by the one or more dwelling associates of the one or more electric vehicles (e.g., processing information regarding current or forecasted weather issues such as storms, flooding, road conditions, traffic congestion duet to weather related aspects, etc.).

In one or more implementations, as shown in FIG. 9-E, the operation o1106 can include operation o1119 for processing status related intake regarding at least in part one or more dwelling associate uses of the one or more electric vehicles including processing status related intake involving at least in part processing information regarding at least in part one or more news broadcasts associated with travel involving at least in part use of the one or more electric vehicles by the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1119, for performance of the operation o1119 by an electrical circuitry arrangement as activated thereto, and/or otherwise fulfillment of the operation o1119. One or more non-transitory signal bearing physical media can bear the one or more instructions that when executed can direct performance of the operation o1119. Furthermore, processing status related intake involving processing information regarding news broadcasts associated with travel involving use of electric vehicles by dwelling associates module m1119 depicted in FIG. 5-B as being included in the module m1106, when executed and/or activated, can direct performance of and/or perform the operation o1119. Illustratively, in one or more implementations, the operation o1119 can be carried out, for example, by processing status related intake regarding at least in part one or more dwelling associate uses of the one or more electric vehicles (e.g., processing information regarding potential for sharing of the one or more electric vehicles among one or more groups of electric vehicle owners, economic status of the one or more electric vehicles owner, health or contagion condition of the one or more dwelling associates, physical accessibility or disability issues of the one or more dwelling associates, etc.) including processing status related intake involving at least in part processing information regarding at least in part one or more news broadcasts associated with travel involving at least in part use of the one or more electric vehicles by the one or more dwelling associates (e.g., processing information regarding sports events, political events, business events, unpredictable or catastrophic events impacting traffic or road conditions, etc.).

In one or more implementations, as shown in FIG. 9-E, the operation o1106 can include operation o1120 for processing status related intake regarding at least in part one or more dwelling associate uses of the one or more electric vehicles including processing status related intake regarding at least in part emergency warning messages associated with dwelling associate use of the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1120, for performance of the operation o1120 by an electrical circuitry arrangement as activated thereto, and/or otherwise fulfillment of the operation o1120. One or more non-transitory signal bearing physical media can bear the one or more instructions that when executed can direct performance of the operation o1120. Furthermore, processing status related intake regarding emergency warning messages associated with dwelling associate use of electric vehicles module m1120 depicted in FIG. 5-C as being included in the module m1106, when executed and/or activated, can direct performance of and/or perform the operation o1120. Illustratively, in one or more implementations, the operation o1120 can be carried out, for example, by processing status related intake regarding at least in part one or more dwelling associate uses of the one or more electric vehicles (e.g., processing information regarding potential for sharing of the one or more electric vehicles among one or more groups of electric vehicle owners, economic status of the one or more electric vehicles owner, health or contagion condition of the one or more dwelling associates, physical accessibility or disability issues of the one or more dwelling associates, etc.) including processing status related intake regarding at least in part emergency warning messages associated with dwelling associate use of the one or more electric vehicles (e.g., processing information regarding fire, police, ambulance, military or other response team issues associated with travel conditions, etc.).

In one or more implementations, as shown in FIG. 9-E, the operation o1106 can include operation o1121 for processing status related intake regarding at least in part one or more dwelling associate uses of the one or more electric vehicles including processing status related intake involving at least in part processing information regarding at least in part availability of alternate transportation by the one or more dwelling associates within one or more designated distances from electrical vehicle charging affairs for the one or more electric vehicles by wireless electrical energy transfer affiliated at least in part with one or more dwelling associates of at least in part one or more dwelling related areas. Origination of a physically tangible component group can be accomplished through skilled in the art design choice selection including use of one or more components and/or subsystems explicitly and/or implicitly referred to herein for at least in part implementing execution of one or more instructions of the operation o1121, for performance of the operation o1121 by an electrical circuitry arrangement as activated thereto, and/or otherwise fulfillment of the operation o1121. One or more non-transitory signal bearing physical media can bear the one or more instructions that when executed can direct performance of the operation o1121. Furthermore, processing status related intake involving processing information regarding availability of alternate transportation by dwelling associates within designated distances from electrical vehicle charging affairs for electric vehicles by wireless electrical energy transfer affiliated with dwelling associates of dwelling related areas module m1121 depicted in FIG. 5-C as being included in the module m1106, when executed and/or activated, can direct performance of and/or perform the operation o1121. Illustratively, in one or more implementations, the operation o1121 can be carried out, for example, by processing status related intake regarding at least in part one or more dwelling associate uses of the one or more electric vehicles (e.g., processing information regarding potential for sharing of the one or more electric vehicles among one or more groups of electric vehicle owners, economic status of the one or more electric vehicles owner, health or contagion condition of the one or more dwelling associates, physical accessibility or disability issues of the one or more dwelling associates, etc.) including processing status related intake involving at least in part processing information regarding at least in part availability of alternate transportation by the one or more dwelling associates within one or more designated distances from electrical vehicle charging affairs for the one or more electric vehicles by wireless electrical energy transfer affiliated at least in part with one or more dwelling associates of at least in part one or more dwelling related areas (e.g., processing information regarding bus, train, taxi, hitch-hiking, carpool, ride-share or other access points to transportation alternate to that provided by the one or more electric vehicles, etc.).

In one or more implementations, as shown in FIG. 9-F, the operation o1106 can include operation o1122 for processing status related intake regarding at least in part one or more dwelling associate uses of the one or more electric vehicles including processing information regarding at least in part ride-share programs for the one or more dwelling associates with respect to one or more travel routes traveled by the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1122, for performance of the operation o1122 by an electrical circuitry arrangement as activated thereto, and/or otherwise fulfillment of the operation o1122. One or more non-transitory signal bearing physical media can bear the one or more instructions that when executed can direct performance of the operation o1122. Furthermore, processing information regarding ride-share programs for dwelling associates with respect to travel routes traveled by electric vehicles module m1122 depicted in FIG. 5-C as being included in the module m1106, when executed and/or activated, can direct performance of and/or perform the operation o1122. Illustratively, in one or more implementations, the operation o1122 can be carried out, for example, by processing status related intake regarding at least in part one or more dwelling associate uses of the one or more electric vehicles (e.g., processing information regarding potential for sharing of the one or more electric vehicles among one or more groups of electric vehicle owners, economic status of the one or more electric vehicles owner, health or contagion condition of the one or more dwelling associates, physical accessibility or disability issues of the one or more dwelling associates, etc.) including processing information regarding at least in part ride-share programs for the one or more dwelling associates with respect to one or more travel routes traveled by the one or more electric vehicles (e.g., processing information regarding passenger biographical information, historical travel information of ride-share participants, availability of ride-share participants, etc.).

In one or more implementations, as shown in FIG. 9-F, the operation o11 can include operation o1123 for electronically processing status related intake associated at least in part with one or more electric vehicle recharging affairs for one or more electric vehicles by wireless electrical energy transfer affiliated at least in part with one or more dwelling associates of at least in part one or more dwelling related areas including processing status related intake from one or more locations of electric vehicle recharging affairs for one or more electric vehicles by wireless electrical energy transfer affiliated at least in part with one or more dwelling associates of at least in part one or more dwelling related areas. Origination of a physically tangible component group can be accomplished through skilled in the art design choice selection including use of one or more components and/or subsystems explicitly and/or implicitly referred to herein for at least in part implementing execution of one or more instructions of the operation o1123, for performance of the operation o1123 by an electrical circuitry arrangement as activated thereto, and/or otherwise fulfillment of the operation o1123. One or more non-transitory signal bearing physical media can bear the one or more instructions that when executed can direct performance of the operation o1123. Furthermore, processing status related intake from locations of electric vehicle recharging affairs for electric vehicles by wireless electrical energy transfer affiliated with dwelling associates of dwelling related areas module m1123 depicted in FIG. 5-C as being included in the module m11, when executed and/or activated, can direct performance of and/or perform the operation o1123. Illustratively, in one or more implementations, the operation o1123 can be carried out, for example, by electronically processing (e.g., collecting, storing, annotating, accessing, retrieving, accumulating, monitoring, reporting, analyzing, summarizing, condensing, applying, etc.) status related intake (e.g., informational, projected, historical, performance, identification, organizational, background, affiliation, goal, milestone, accomplishment, detraction, objective, guideline, award, demerit, extracurricular, etc.) associated at least in part (e.g., tangentially, directly, occasionally, temporarily, permanently, fully, partially, etc.) with one or more electric vehicle (e.g., all-electric, hybrid, gas-electric, diesel-electric, propane-electric, fuel-cell-electric, common-rail electric, car, truck, short distance, long distance, van, bus, cart, commercial, private, governmental, etc.) recharging (e.g., fast charge, slow trickle, low density, high density, recurrent, sporadic, ad hoc, predictive, total, partial, remedial, etc.) affairs (e.g., devices, mechanisms, procedures, structures, methods, countermeasures, plays, real, virtual, simulated, transitory, permanent, replacement, redundant, alternative, etc.) for one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) by wireless (e.g., electromagnetic resonance, short distance, long distance, high power, low power, static, dynamic, etc.) electrical energy (e.g., electrical energy stored or to be stored by such as battery, lead-acid, metal hydride, nickel-cadmium, chemical, solid state, capacitive, gaseous, compressed gas based, etc.) transfer (e.g., fast charge, slow trickle, low density, high density, recurrent, sporadic, ad hoc, predictive, total, partial, remedial, etc.) affiliated (e.g., tangentially, directly, indirectly, partially, fully, organizational, ethically, regionally, demographically, vocationally, generationally, educationally, politically, recreationally, etc.) at least in part with one or more dwelling (e.g., shelter, temporary, familial, residential, suburban, city, housing, high density, low density, singular, multiple, etc.) associates (e.g., habitating, lodging, occupying, visiting, touring, lounging, recreating, playing, working, studying, eating, owning, renting, leasing, contracting, retiring, sleeping, resting, reflecting, individual, group, corporate, governmental, civic, educational, volunteer, retired, candidate, temporary, permanent, driver, rider, occupant, maintainer, regular, occasional, ad hoc, commuter, pleasure, business, etc.) of at least in part one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, landscaped, palatial, in-town, uptown, downtown, penthouse, mansion, suburban, rural, family, shelter, rental, condominium, upscale, high-tech, modern, traditional, contemporary, classic, etc.) including processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.).

In one or more implementations, as shown in FIG. 9-F, the operation o1123 can include operation o1124 for processing status related intake from one or more locations of electric vehicle recharging affairs for one or more electric vehicles by wireless electrical energy transfer affiliated at least in part with one or more dwelling associates of at least in part one or more dwelling related areas including processing status related intake related at least in part to one or more schedules for electrical load sharing for one or more electrical devices sharing one or more electrical power sources with one or more electric vehicle recharging affairs for one or more electric vehicles by wireless electrical energy transfer affiliated at least in part with one or more dwelling associates of at least in part one or more dwelling related areas. Origination of a physically tangible component group can be accomplished through skilled in the art design choice selection including use of one or more components and/or subsystems explicitly and/or implicitly referred to herein for at least in part implementing execution of one or more instructions of the operation o1124, for performance of the operation o1124 by an electrical circuitry arrangement as activated thereto, and/or otherwise fulfillment of the operation o1124. One or more non-transitory signal bearing physical media can bear the one or more instructions that when executed can direct performance of the operation o1124. Furthermore, processing status related intake related to schedules for electrical load sharing for electrical devices sharing electrical power sources with electric vehicle recharging affairs for electric vehicles by wireless electrical energy transfer affiliated with dwelling associates of dwelling related areas module m1124 depicted in FIG. 5-C as being included in the module m1123, when executed and/or activated, can direct performance of and/or perform the operation o1124. Illustratively, in one or more implementations, the operation o1124 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake related at least in part to one or more schedules for electrical load sharing for one or more electrical devices sharing one or more electrical power sources with one or more electric vehicle recharging affairs for one or more electric vehicles by wireless electrical energy transfer affiliated at least in part with one or more dwelling associates of at least in part one or more dwelling related areas (e.g., processing information regarding types, capacities, demand cycles of equipment, appliances, and other equipment to share electrical energy resources with the one or more electrical charging stations for the one or more electric vehicles, etc.).

In one or more implementations, as shown in FIG. 9-G, the operation o1123 can include operation o1125 for processing status related intake from one or more locations of electric vehicle recharging affairs for one or more electric vehicles by wireless electrical energy transfer affiliated at least in part with one or more dwelling associates of at least in part one or more dwelling related areas including processing status related intake related at least in part to charging rate capacity of wireless electrical energy transfer. Origination of a physically tangible component group can be accomplished through skilled in the art design choice selection including use of one or more components and/or subsystems explicitly and/or implicitly referred to herein for at least in part implementing execution of one or more instructions of the operation o1125, for performance of the operation o1125 by an electrical circuitry arrangement as activated thereto, and/or otherwise fulfillment of the operation o1125. One or more non-transitory signal bearing physical media can bear the one or more instructions that when executed can direct performance of the operation o1125. Furthermore, processing status related intake related to charging rate capacity of wireless electrical energy transfer module m1125 depicted in FIG. 5-C as being included in the module m1123, when executed and/or activated, can direct performance of and/or perform the operation o1125. Illustratively, in one or more implementations, the operation o1125 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake related at least in part to charging rate capacity of wireless electrical energy transfer (e.g., processing information regarding short burst capacity, or long term durational levels for transfer of electrical energy wirelessly from charging stations for the one or more electric vehicles, etc.).

In one or more implementations, as shown in FIG. 9-G, the operation o1123 can include operation o1126 for processing status related intake from one or more locations of electric vehicle recharging affairs for one or more electric vehicles by wireless electrical energy transfer affiliated at least in part with one or more dwelling associates of at least in part one or more dwelling related areas including processing status related intake at one or more locations of wireless electrical energy transfer including processing status related intake related at least in part to one or more consumer incentive programs based at least in part on one or more electricity cost schedules. Origination of a physically tangible component group can be accomplished through skilled in the art design choice selection including use of one or more components and/or subsystems explicitly and/or implicitly referred to herein for at least in part implementing execution of one or more instructions of the operation o1126, for performance of the operation o1126 by an electrical circuitry arrangement as activated thereto, and/or otherwise fulfillment of the operation o1126. One or more non-transitory signal bearing physical media can bear the one or more instructions that when executed can direct performance of the operation o1126. Furthermore, processing status related intake at locations of wireless electrical energy transfer including processing status related intake related to consumer incentive programs based on electricity cost schedules module m1126 depicted in FIG. 5-C as being included in the module m1123, when executed and/or activated, can direct performance of and/or perform the operation o1126. Illustratively, in one or more implementations, the operation o1126 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake at one or more locations of wireless electrical energy transfer including processing status related intake related at least in part to one or more consumer incentive programs based at least in part on one or more electricity cost schedules (e.g., processing information timing, duration, scheduling, percentages of cost reductions associated with the consumer incentive programs, etc.).

In one or more implementations, as shown in FIG. 9-G, the operation o1123 can include operation o1127 for processing status related intake from one or more locations of electric vehicle recharging affairs for one or more electric vehicles by wireless electrical energy transfer affiliated at least in part with one or more dwelling associates of at least in part one or more dwelling related areas including processing status related intake related at least in part to one or more electricity financial cost rate schedules. Origination of a physically tangible component group can be accomplished through skilled in the art design choice selection including use of one or more components and/or subsystems explicitly and/or implicitly referred to herein for at least in part implementing execution of one or more instructions of the operation o1127, for performance of the operation o1127 by an electrical circuitry arrangement as activated thereto, and/or otherwise fulfillment of the operation o1127. One or more non-transitory signal bearing physical media can bear the one or more instructions that when executed can direct performance of the operation o1127. Furthermore, processing status related intake related to electricity financial cost rate schedules module m1127 depicted in FIG. 5-C as being included in the module m1123, when executed and/or activated, can direct performance of and/or perform the operation o1127. Illustratively, in one or more implementations, the operation o1127 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake related at least in part to one or more electricity financial cost rate schedules (e.g., processing information regarding historical, planned, estimated or other cost data as to cost structures for electrical energy pricing from utility or onsite electrical energy resource providers, etc.).

In one or more implementations, as shown in FIG. 9-G, the operation o1123 can include operation o1128 for processing status related intake from one or more locations of electric vehicle recharging affairs for one or more electric vehicles by wireless electrical energy transfer affiliated at least in part with one or more dwelling associates of at least in part one or more dwelling related areas including processing status related intake related at least in part to one or more electricity load share capacity schedules. Origination of a physically tangible component group can be accomplished through skilled in the art design choice selection including use of one or more components and/or subsystems explicitly and/or implicitly referred to herein for at least in part implementing execution of one or more instructions of the operation o1128, for performance of the operation o1128 by an electrical circuitry arrangement as activated thereto, and/or otherwise fulfillment of the operation o1128. One or more non-transitory signal bearing physical media can bear the one or more instructions that when executed can direct performance of the operation o1128. Furthermore, processing status related intake related to electricity load share capacity schedules module m1128 depicted in FIG. 5-D as being included in the module m1123, when executed and/or activated, can direct performance of and/or perform the operation o1128. Illustratively, in one or more implementations, the operation o1128 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake related at least in part to one or more electricity load share capacity schedules (e.g., processing information regarding historical, planned, or estimated use of electrical energy resource provider equipment for providing electrical energy to appliances, HVAC, industrial equipment and other demands for electrical energy including other electric vehicles, etc.).

In one or more implementations, as shown in FIG. 9-H, the operation o1123 can include operation o1129 for processing status related intake from one or more locations of electric vehicle recharging affairs for one or more electric vehicles by wireless electrical energy transfer affiliated at least in part with one or more dwelling associates of at least in part one or more dwelling related areas including processing status related intake related at least in part to electric utility capacity information involving at least in part communication channels of wireless electrical energy transfer. Origination of a physically tangible component group can be accomplished through skilled in the art design choice selection including use of one or more components and/or subsystems explicitly and/or implicitly referred to herein for at least in part implementing execution of one or more instructions of the operation o1129, for performance of the operation o1129 by an electrical circuitry arrangement as activated thereto, and/or otherwise fulfillment of the operation o1129. One or more non-transitory signal bearing physical media can bear the one or more instructions that when executed can direct performance of the operation o1129. Furthermore, processing status related intake related to electric utility capacity information involving communication channels of wireless electrical energy transfer module m1129 depicted in FIG. 5-D as being included in the module m1123, when executed and/or activated, can direct performance of and/or perform the operation o1129. Illustratively, in one or more implementations, the operation o1129 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake related at least in part to electric utility capacity information involving at least in part communication channels of wireless electrical energy transfer (e.g., processing information from wide area network, local area network, cellular network, point-to-point direct network communication, etc.).

In one or more implementations, as shown in FIG. 9-H, the operation o1123 can include operation o1130 for processing status related intake from one or more locations of electric vehicle recharging affairs for one or more electric vehicles by wireless electrical energy transfer affiliated at least in part with one or more dwelling associates of at least in part one or more dwelling related areas including processing status related intake related at least in part to one or more electrical energy charging appointments reserved for one or more electrical vehicles other than the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1130, for performance of the operation o1130 by an electrical circuitry arrangement as activated thereto, and/or otherwise fulfillment of the operation o1130. One or more non-transitory signal bearing physical media can bear the one or more instructions that when executed can direct performance of the operation o1130. Furthermore, processing status related intake related to electrical energy charging appointments reserved for electrical vehicles other than electric vehicles module m1130 depicted in FIG. 5-D as being included in the module m1123, when executed and/or activated, can direct performance of and/or perform the operation o1130. Illustratively, in one or more implementations, the operation o1130 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake related at least in part to one or more electrical energy charging appointments reserved for one or more electrical vehicles other than the one or more electric vehicles (e.g., processing information associated with planned or estimated itineraries of dwelling associates of electric vehicles other than the one or more electric vehicles as associated with use or availability of charging stations planned or estimated to be used by the one or more electric vehicles, etc.).

In one or more implementations, as shown in FIG. 9-H, the operation o1123 can include operation o1131 for processing status related intake from one or more locations of electric vehicle recharging affairs for one or more electric vehicles by wireless electrical energy transfer affiliated at least in part with one or more dwelling associates of at least in part one or more dwelling related areas including processing status related intake related at least in part to maximum charging rate capacities of wireless electrical energy transfer. Origination of a physically tangible component group can be accomplished through skilled in the art design choice selection including use of one or more components and/or subsystems explicitly and/or implicitly referred to herein for at least in part implementing execution of one or more instructions of the operation o1131, for performance of the operation o1131 by an electrical circuitry arrangement as activated thereto, and/or otherwise fulfillment of the operation o1131. One or more non-transitory signal bearing physical media can bear the one or more instructions that when executed can direct performance of the operation o1131. Furthermore, processing status related intake related to maximum charging rate capacities of wireless electrical energy transfer module m1131 depicted in FIG. 5-D as being included in the module m1123, when executed and/or activated, can direct performance of and/or perform the operation o1131. Illustratively, in one or more implementations, the operation o1131 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake related at least in part to maximum charging rate capacities of wireless electrical energy transfer (e.g., processing information regarding planned, estimated, or historical maximum charging rate capacities for the electrical charging stations with regard to charging the one or more electric vehicles at planned or estimated charging times given factors such as load sharing for the electrical energy storage charging stations with other stations and factors concerning interfacing of the one or more electric vehicles with the stations, etc.).

In one or more implementations, as shown in FIG. 9-H, the operation o1123 can include operation o1132 for processing status related intake from one or more locations of electric vehicle recharging affairs for one or more electric vehicles by wireless electrical energy transfer affiliated at least in part with one or more dwelling associates of at least in part one or more dwelling related areas including processing status related intake related at least in part to cost information for priority handling of wireless electrical energy transfer for the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1132, for performance of the operation o1132 by an electrical circuitry arrangement as activated thereto, and/or otherwise fulfillment of the operation o1132. One or more non-transitory signal bearing physical media can bear the one or more instructions that when executed can direct performance of the operation o1132. Furthermore, processing status related intake related to cost information for priority handling of wireless electrical energy transfer for electric vehicles module m1132 depicted in FIG. 5-D as being included in the module m1123, when executed and/or activated, can direct performance of and/or perform the operation o1132. Illustratively, in one or more implementations, the operation o1132 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake related at least in part to cost information for priority handling of wireless electrical energy transfer for the one or more electric vehicles (e.g., processing information regarding pricing for providing of electrical energy based on charge scheduling, load sharing of other energy consuming devices, and capacity of the electrical energy providing utility stations, etc.).

In one or more implementations, as shown in FIG. 9-I, the operation o1123 can include operation o1133 for processing status related intake from one or more locations of electric vehicle recharging affairs for one or more electric vehicles by wireless electrical energy transfer affiliated at least in part with one or more dwelling associates of at least in part one or more dwelling related areas including processing status related intake related at least in part to one or more wireless electrical energy transfer availability schedules for the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1133, for performance of the operation o1133 by an electrical circuitry arrangement as activated thereto, and/or otherwise fulfillment of the operation o1133. One or more non-transitory signal bearing physical media can bear the one or more instructions that when executed can direct performance of the operation o1133. Furthermore, processing status related intake from locations of electric vehicle recharging affairs for electric vehicles by wireless electrical energy transfer affiliated with dwelling associates of dwelling related areas including processing status related intake related to wireless electrical energy transfer availability schedules for electric vehicles module m1133 depicted in FIG. 5-D as being included in the module m1123, when executed and/or activated, can direct performance of and/or perform the operation o1133. Illustratively, in one or more implementations, the operation o1133 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake related at least in part to one or more wireless electrical energy transfer availability schedules for the one or more electric vehicles (e.g., processing information regarding actual, estimated, or historical scheduling for electrical energy storage charging stations concerning the one or more electric vehicles, dwelling associates of the stations, other electric vehicles, and other dwelling associates of the stations, etc.).

In one or more implementations, as shown in FIG. 9-I, the operation o1123 can include operation o1134 for processing status related intake from one or more locations of electric vehicle recharging affairs for one or more electric vehicles by wireless electrical energy transfer affiliated at least in part with one or more dwelling associates of at least in part one or more dwelling related areas including processing status related intake related at least in part to one or more histories of electrical energy consumption by wireless electrical energy transfer. Origination of a physically tangible component group can be accomplished through skilled in the art design choice selection including use of one or more components and/or subsystems explicitly and/or implicitly referred to herein for at least in part implementing execution of one or more instructions of the operation o1134, for performance of the operation o1134 by an electrical circuitry arrangement as activated thereto, and/or otherwise fulfillment of the operation o1134. One or more non-transitory signal bearing physical media can bear the one or more instructions that when executed can direct performance of the operation o1134. Furthermore, processing status related intake from locations of electric vehicle recharging affairs for electric vehicles by wireless electrical energy transfer affiliated with dwelling associates of dwelling related areas including processing status related intake related to histories of electrical energy consumption by wireless electrical energy transfer module m1134 depicted in FIG. 5-D as being included in the module m1123, when executed and/or activated, can direct performance of and/or perform the operation o1134. Illustratively, in one or more implementations, the operation o1134 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake related at least in part to one or more histories of electrical energy consumption by wireless electrical energy transfer (e.g., processing information regarding short term, long term, peak demand, average demand, mix of electric vehicle type, mix of dwelling associate type as associated with the electrical energy storage charging stations for the one or more electric vehicles, etc.).

In one or more implementations, as shown in FIG. 9-I, the operation o1123 can include operation o1135 for processing status related intake from one or more locations of electric vehicle recharging affairs for one or more electric vehicles by wireless electrical energy transfer affiliated at least in part with one or more dwelling associates of at least in part one or more dwelling related areas including processing status related intake related at least in part to electricity use data involving at least in part remote reporting from one or more electric utility databases. Origination of a physically tangible component group can be accomplished through skilled in the art design choice selection including use of one or more components and/or subsystems explicitly and/or implicitly referred to herein for at least in part implementing execution of one or more instructions of the operation o1135, for performance of the operation o1135 by an electrical circuitry arrangement as activated thereto, and/or otherwise fulfillment of the operation o1135. One or more non-transitory signal bearing physical media can bear the one or more instructions that when executed can direct performance of the operation o1135. Furthermore, processing status related intake from locations of electric vehicle recharging affairs for electric vehicles by wireless electrical energy transfer affiliated with dwelling associates of dwelling related areas including processing status related intake related to electricity use data involving remote reporting from electric utility databases module m1135 depicted in FIG. 5-D as being included in the module m1123, when executed and/or activated, can direct performance of and/or perform the operation o1135. Illustratively, in one or more implementations, the operation o1135 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake related at least in part to electricity use data involving at least in part remote reporting from one or more electric utility databases (e.g., processing information regarding frequency of occurrence, length of time associated, profile of individual dwelling associates or groups of dwelling associates associated with remote reporting requests, etc.).

In one or more implementations, as shown in FIG. 9-I, the operation o1123 can include operation o1136 for processing status related intake from one or more locations of electric vehicle recharging affairs for one or more electric vehicles by wireless electrical energy transfer affiliated at least in part with one or more dwelling associates of at least in part one or more dwelling related areas including processing status related intake related at least in part to peak demand and reserve capacity of wireless electrical energy transfer. Origination of a physically tangible component group can be accomplished through skilled in the art design choice selection including use of one or more components and/or subsystems explicitly and/or implicitly referred to herein for at least in part implementing execution of one or more instructions of the operation o1136, for performance of the operation o1136 by an electrical circuitry arrangement as activated thereto, and/or otherwise fulfillment of the operation o1136. One or more non-transitory signal bearing physical media can bear the one or more instructions that when executed can direct performance of the operation o1136. Furthermore, processing status related intake related to peak demand and reserve capacity of wireless electrical energy transfer module m1136 depicted in FIG. 5-E as being included in the module m1123, when executed and/or activated, can direct performance of and/or perform the operation o1136. Illustratively, in one or more implementations, the operation o1136 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake related at least in part to peak demand and reserve capacity of wireless electrical energy transfer (e.g., processing information regarding statistical data for differences in demand and capacity regarding outages, scheduled maintenance, recognized patterns of demand, recognized patterns for capacity, etc.).

In one or more implementations, as shown in FIG. 9-J, the operation o1123 can include operation o1137 for processing status related intake from one or more locations of electric vehicle recharging affairs for one or more electric vehicles by wireless electrical energy transfer affiliated at least in part with one or more dwelling associates of at least in part one or more dwelling related areas including processing status related intake related at least in part to communication with electric utility smart grid information systems with updates regarding at least in part electricity consumption from one or more electric utility databases. Origination of a physically tangible component group can be accomplished through skilled in the art design choice selection including use of one or more components and/or subsystems explicitly and/or implicitly referred to herein for at least in part implementing execution of one or more instructions of the operation o1137, for performance of the operation o1137 by an electrical circuitry arrangement as activated thereto, and/or otherwise fulfillment of the operation o1137. One or more non-transitory signal bearing physical media can bear the one or more instructions that when executed can direct performance of the operation o1137. Furthermore, processing status related intake related to communication with electric utility smart grid information systems with updates regarding electricity consumption from electric utility databases module m1137 depicted in FIG. 5-E as being included in the module m1123, when executed and/or activated, can direct performance of and/or perform the operation o1137. Illustratively, in one or more implementations, the operation o1137 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake related at least in part to communication with electric utility smart grid information systems with updates regarding at least in part electricity consumption from one or more electric utility databases (e.g., processing information from household appliances, from industrial equipment, from other electric vehicles, office equipment, etc. tied in with one or more electrical energy storage charging stations supplying charging capacity for the one or more electric vehicles, etc.).

In one or more implementations, as shown in FIG. 9-J, the operation o1123 can include operation o1138 for processing status related intake from one or more locations of electric vehicle recharging affairs for one or more electric vehicles by wireless electrical energy transfer affiliated at least in part with one or more dwelling associates of at least in part one or more dwelling related areas including processing status related intake related at least in part to priority classification for one or more electric vehicle charging scheduling requests of wireless electrical energy transfer. Origination of a physically tangible component group can be accomplished through skilled in the art design choice selection including use of one or more components and/or subsystems explicitly and/or implicitly referred to herein for at least in part implementing execution of one or more instructions of the operation o1138, for performance of the operation o1138 by an electrical circuitry arrangement as activated thereto, and/or otherwise fulfillment of the operation o1138. One or more non-transitory signal bearing physical media can bear the one or more instructions that when executed can direct performance of the operation o1138. Furthermore, processing status related intake related to priority classification for electric vehicle charging scheduling requests of wireless electrical energy transfer module m1138 depicted in FIG. 5-E as being included in the module m1123, when executed and/or activated, can direct performance of and/or perform the operation o1138. Illustratively, in one or more implementations, the operation o1138 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake related at least in part to priority classification for one or more electric vehicle charging scheduling requests of wireless electrical energy transfer (e.g., processing information regarding historical, planned, or estimated use by electric vehicles other than the one or more electric vehicles of electrical energy storage charging stations historically, planned, or estimated to be used by the one or more electric vehicles, etc.).

In one or more implementations, as shown in FIG. 9-J, the operation o1123 can include operation o1139 for processing status related intake from one or more locations of electric vehicle recharging affairs for one or more electric vehicles by wireless electrical energy transfer affiliated at least in part with one or more dwelling associates of at least in part one or more dwelling related areas including processing status related intake related at least in part to one or more dwelling associate profile classifications. Origination of a physically tangible component group can be accomplished through skilled in the art design choice selection including use of one or more components and/or subsystems explicitly and/or implicitly referred to herein for at least in part implementing execution of one or more instructions of the operation o1139, for performance of the operation o1139 by an electrical circuitry arrangement as activated thereto, and/or otherwise fulfillment of the operation o1139. One or more non-transitory signal bearing physical media can bear the one or more instructions that when executed can direct performance of the operation o1139. Furthermore, processing status related intake related to dwelling associate profile classifications module m1139 depicted in FIG. 5-E as being included in the module m1123, when executed and/or activated, can direct performance of and/or perform the operation o1139. Illustratively, in one or more implementations, the operation o1139 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake related at least in part to one or more dwelling associate profile classifications (e.g., processing information regarding dwelling associate profiles associated with employment information, benefits information, electric vehicle use information, dwelling associate demographic information, dwelling associate geographic information, etc.).

In one or more implementations, as shown in FIG. 9-J, the operation o1123 can include operation o1140 for processing status related intake from one or more locations of electric vehicle recharging affairs for one or more electric vehicles by wireless electrical energy transfer affiliated at least in part with one or more dwelling associates of at least in part one or more dwelling related areas including processing status related intake related at least in part to electrical energy use of associated one or more local grid electrical energy provider resources for other than charging of the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1140, for performance of the operation o1140 by an electrical circuitry arrangement as activated thereto, and/or otherwise fulfillment of the operation o1140. One or more non-transitory signal bearing physical media can bear the one or more instructions that when executed can direct performance of the operation o1140. Furthermore, processing status related intake related to electrical energy use of associated local grid electrical energy provider resources for other than charging of electric vehicles module m1140 depicted in FIG. 5-E as being included in the module m1123, when executed and/or activated, can direct performance of and/or perform the operation o1140. Illustratively, in one or more implementations, the operation o1140 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake related at least in part to electrical energy use of associated one or more local grid electrical energy provider resources for other than charging of the one or more electric vehicles (e.g., processing information overall household electrical energy demand, overall industrial electrical energy demand, overall office electrical energy demand, overall service provider electrical energy demand as associated with local electrical grid facilities of one or more charging stations for the one or more electric vehicles, etc.).

In one or more implementations, as shown in FIG. 9-K, the operation o1123 can include operation o1141 for processing status related intake from one or more locations of electric vehicle recharging affairs for one or more electric vehicles by wireless electrical energy transfer affiliated at least in part with one or more dwelling associates of at least in part one or more dwelling related areas including processing status related intake related at least in part to one or more plans for recharging of one or more electric vehicles other than the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1141, for performance of the operation o1141 by an electrical circuitry arrangement as activated thereto, and/or otherwise fulfillment of the operation o1141. One or more non-transitory signal bearing physical media can bear the one or more instructions that when executed can direct performance of the operation o1141. Furthermore, processing status related intake related to plans for recharging of electric vehicles other than electric vehicles module m1141 depicted in FIG. 5-E as being included in the module m1123, when executed and/or activated, can direct performance of and/or perform the operation o1141. Illustratively, in one or more implementations, the operation o1141 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake related at least in part to one or more plans for recharging of one or more electric vehicles other than the one or more electric vehicles (e.g., processing information as associated with planned or estimated travel for dwelling associates of electric vehicles other than the one or more electric vehicles, etc.).

In one or more implementations, as shown in FIG. 9-K, the operation o1123 can include operation o1142 for processing status related intake from one or more locations of electric vehicle recharging affairs for one or more electric vehicles by wireless electrical energy transfer affiliated at least in part with one or more dwelling associates of at least in part one or more dwelling related areas including processing status related intake related at least in part to one or more technical specifications of wireless electrical energy transfer. Origination of a physically tangible component group can be accomplished through skilled in the art design choice selection including use of one or more components and/or subsystems explicitly and/or implicitly referred to herein for at least in part implementing execution of one or more instructions of the operation o1142, for performance of the operation o1142 by an electrical circuitry arrangement as activated thereto, and/or otherwise fulfillment of the operation o1142. One or more non-transitory signal bearing physical media can bear the one or more instructions that when executed can direct performance of the operation o1142. Furthermore, processing status related intake related to technical specifications of wireless electrical energy transfer module m1142 depicted in FIG. 5-E as being included in the module m1123, when executed and/or activated, can direct performance of and/or perform the operation o1142. Illustratively, in one or more implementations, the operation o1142 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake related at least in part to one or more technical specifications of wireless electrical energy transfer (e.g., processing information regarding electromagnetic frequencies used for wireless transfer of electrical energy, electrical energy peak and sustained charging rates available, associated equipment capability standards, etc.).

In one or more implementations, as shown in FIG. 9-K, the operation o1123 can include operation o1143 for processing status related intake from one or more locations of electric vehicle recharging affairs for one or more electric vehicles by wireless electrical energy transfer affiliated at least in part with one or more dwelling associates of at least in part one or more dwelling related areas including processing status related intake involving at least in part computer network communication reporting of wireless electrical energy transfer. Origination of a physically tangible component group can be accomplished through skilled in the art design choice selection including use of one or more components and/or subsystems explicitly and/or implicitly referred to herein for at least in part implementing execution of one or more instructions of the operation o1143, for performance of the operation o1143 by an electrical circuitry arrangement as activated thereto, and/or otherwise fulfillment of the operation o1143. One or more non-transitory signal bearing physical media can bear the one or more instructions that when executed can direct performance of the operation o1143. Furthermore, processing status related intake involving computer network communication reporting of wireless electrical energy transfer module m1143 depicted in FIG. 5-E as being included in the module m1123, when executed and/or activated, can direct performance of and/or perform the operation o1143. Illustratively, in one or more implementations, the operation o1143 can be carried out, for example, by processing status related intake from one or more locations of electric vehicle recharging affairs for one or more electric vehicles by wireless electrical energy transfer affiliated at least in part with one or more dwelling associates of at least in part one or more dwelling related areas (e.g., processing information regarding planned or estimated one or more electromagnetic frequencies, energy transfer rates available, positioning of wireless energy transmitters, etc.) including processing status related intake involving at least in part computer network communication reporting of wireless electrical energy transfer (e.g., obtaining information associated with communication sent over wired, wireless, packetized, cellular, direct point-to-point, or other computer network communication systems, etc.).

In one or more implementations, as shown in FIG. 9-K, the operation o11 can include operation o1144 for electronically processing status related intake associated at least in part with one or more electric vehicle recharging affairs for one or more electric vehicles by wireless electrical energy transfer affiliated at least in part with one or more dwelling associates of at least in part one or more dwelling related areas including processing status related intake received wirelessly. Origination of a physically tangible component group can be accomplished through skilled in the art design choice selection including use of one or more components and/or subsystems explicitly and/or implicitly referred to herein for at least in part implementing execution of one or more instructions of the operation o1144, for performance of the operation o1144 by an electrical circuitry arrangement as activated thereto, and/or otherwise fulfillment of the operation o1144. One or more non-transitory signal bearing physical media can bear the one or more instructions that when executed can direct performance of the operation o1144. Furthermore, processing status related intake received wirelessly module m1144 depicted in FIG. 5-E as being included in the module m11, when executed and/or activated, can direct performance of and/or perform the operation o1144. Illustratively, in one or more implementations, the operation o1144 can be carried out, for example, by electronically processing (e.g., collecting, storing, annotating, accessing, retrieving, accumulating, monitoring, reporting, analyzing, summarizing, condensing, applying, etc.) status related intake (e.g., informational, projected, historical, performance, identification, organizational, background, affiliation, goal, milestone, accomplishment, detraction, objective, guideline, award, demerit, extra-curricular, etc.) associated at least in part (e.g., tangentially, directly, occasionally, temporarily, permanently, fully, partially, etc.) with one or more electric vehicle (e.g., all-electric, hybrid, gas-electric, diesel-electric, propane-electric, fuel-cell-electric, common-rail electric, car, truck, short distance, long distance, van, bus, cart, commercial, private, governmental, etc.) recharging (e.g., fast charge, slow trickle, low density, high density, recurrent, sporadic, ad hoc, predictive, total, partial, remedial, etc.) affairs (e.g., devices, mechanisms, procedures, structures, methods, countermeasures, plays, real, virtual, simulated, transitory, permanent, replacement, redundant, alternative, etc.) for one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) by wireless (e.g., electromagnetic resonance, short distance, long distance, high power, low power, static, dynamic, etc.) electrical energy (e.g., electrical energy stored or to be stored by such as battery, lead-acid, metal hydride, nickel-cadmium, chemical, solid state, capacitive, gaseous, compressed gas based, etc.) transfer (e.g., fast charge, slow trickle, low density, high density, recurrent, sporadic, ad hoc, predictive, total, partial, remedial, etc.) affiliated (e.g., tangentially, directly, indirectly, partially, fully, organizational, ethically, regionally, demographically, vocationally, generationally, educationally, politically, recreationally, etc.) at least in part with one or more dwelling (e.g., shelter, temporary, familial, residential, suburban, city, housing, high density, low density, singular, multiple, etc.) associates (e.g., habitating, lodging, occupying, visiting, touring, lounging, recreating, playing, working, studying, eating, owning, renting, leasing, contracting, retiring, sleeping, resting, reflecting, individual, group, corporate, governmental, civic, educational, volunteer, retired, candidate, temporary, permanent, driver, rider, occupant, maintainer, regular, occasional, ad hoc, commuter, pleasure, business, etc.) of at least in part one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, landscaped, palatial, in-town, uptown, downtown, penthouse, mansion, suburban, rural, family, shelter, rental, condominium, upscale, high-tech, modern, traditional, contemporary, classic, etc.) including processing status related intake received wirelessly (e.g., cellular communication, packetized communication, networked communication, broadband communication, gigahertz frequency communication, etc.).

In one or more implementations, as shown in FIG. 9-L, the operation o1144 can include operation o1145 for processing status related intake received wirelessly including processing status related intake involving at least in part one or more RFID tags. Origination of a physically tangible component group can be accomplished through skilled in the art design choice selection including use of one or more components and/or subsystems explicitly and/or implicitly referred to herein for at least in part implementing execution of one or more instructions of the operation o1145, for performance of the operation o1145 by an electrical circuitry arrangement as activated thereto, and/or otherwise fulfillment of the operation o1145. One or more non-transitory signal bearing physical media can bear the one or more instructions that when executed can direct performance of the operation o1145. Furthermore, processing status related intake involving RFID tags module m1145 depicted in FIG. 5-E as being included in the module m1144, when executed and/or activated, can direct performance of and/or perform the operation o1145. Illustratively, in one or more implementations, the operation o1145 can be carried out, for example, by processing status related intake received wirelessly (e.g., cellular communication, packetized communication, networked communication, broadband communication, gigahertz frequency communication, etc.) including processing status related intake involving at least in part one or more RFID tags (e.g., RFID tags associated with vehicle dwelling associates or associated with vehicle being read by RFID readers mounted with vehicle or in dwelling parking area, etc.).

In one or more implementations, as shown in FIG. 9-L, the operation o1144 can include operation o1146 for processing status related intake received wirelessly including processing status related intake involving at least in part bluetooth supported communication. Origination of a physically tangible component group can be accomplished through skilled in the art design choice selection including use of one or more components and/or subsystems explicitly and/or implicitly referred to herein for at least in part implementing execution of one or more instructions of the operation o1146, for performance of the operation o1146 by an electrical circuitry arrangement as activated thereto, and/or otherwise fulfillment of the operation o1146. One or more non-transitory signal bearing physical media can bear the one or more instructions that when executed can direct performance of the operation o1146. Furthermore, processing status related intake involving blue tooth supported communication module m1146 depicted in FIG. 5-E as being included in the module m1144, when executed and/or activated, can direct performance of and/or perform the operation o1146. Illustratively, in one or more implementations, the operation o1146 can be carried out, for example, by processing status related intake received wirelessly (e.g., cellular communication, packetized communication, networked communication, broadband communication, gigahertz frequency communication, etc.) including processing status related intake involving at least in part bluetooth supported communication (e.g., bluetooth communication from dwelling associate mobile calendaring device to bluetooth receiver affixed to dwelling, etc.).

In one or more implementations, as shown in FIG. 9-L, the operation o1144 can include operation o1147 for processing status related intake received wirelessly including processing status related intake involving at least in part WiFi facilitated communication. Origination of a physically tangible component group can be accomplished through skilled in the art design choice selection including use of one or more components and/or subsystems explicitly and/or implicitly referred to herein for at least in part implementing execution of one or more instructions of the operation o1147, for performance of the operation o1147 by an electrical circuitry arrangement as activated thereto, and/or otherwise fulfillment of the operation o1147. One or more non-transitory signal bearing physical media can bear the one or more instructions that when executed can direct performance of the operation o1147. Furthermore, processing status related intake involving WiFi facilitated communication module m1147 depicted in FIG. 5-F as being included in the module m1144, when executed and/or activated, can direct performance of and/or perform the operation o1147. Illustratively, in one or more implementations, the operation o1147 can be carried out, for example, by processing status related intake received wirelessly (e.g., cellular communication, packetized communication, networked communication, broadband communication, gigahertz frequency communication, etc.) including processing status related intake involving at least in part WiFi facilitated communication (e.g., WiFi communication from dwelling associate laptop to WiFi reception device integrated into dwelling console, etc.).

In one or more implementations, as shown in FIG. 9-L, the operation o1144 can include operation o1148 for processing status related intake received wirelessly including processing status related intake involving at least in part computer network protocol communication. Origination of a physically tangible component group can be accomplished through skilled in the art design choice selection including use of one or more components and/or subsystems explicitly and/or implicitly referred to herein for at least in part implementing execution of one or more instructions of the operation o1148, for performance of the operation o1148 by an electrical circuitry arrangement as activated thereto, and/or otherwise fulfillment of the operation o1148. One or more non-transitory signal bearing physical media can bear the one or more instructions that when executed can direct performance of the operation o1148. Furthermore, processing status related intake involving computer network protocol communication module m1148 depicted in FIG. 5-F as being included in the module m1144, when executed and/or activated, can direct performance of and/or perform the operation o1148. Illustratively, in one or more implementations, the operation o1148 can be carried out, for example, by processing status related intake received wirelessly (e.g., cellular communication, packetized communication, networked communication, broadband communication, gigahertz frequency communication, etc.) including processing status related intake involving at least in part computer network protocol communication (e.g., packetized broadcast from handheld dwelling associate personal information management system being received by electric vehicle communication system, etc.).

In one or more implementations, as shown in FIG. 9-L, the operation o1144 can include operation o1149 for processing status related intake received wirelessly including processing status related intake involving at least in part infrared supported communication. Origination of a physically tangible component group can be accomplished through skilled in the art design choice selection including use of one or more components and/or subsystems explicitly and/or implicitly referred to herein for at least in part implementing execution of one or more instructions of the operation o1149, for performance of the operation o1149 by an electrical circuitry arrangement as activated thereto, and/or otherwise fulfillment of the operation o1149. One or more non-transitory signal bearing physical media can bear the one or more instructions that when executed can direct performance of the operation o1149. Furthermore, processing status related intake involving infrared supported communication module m1149 depicted in FIG. 5-F as being included in the module m1144, when executed and/or activated, can direct performance of and/or perform the operation o1149. Illustratively, in one or more implementations, the operation o1149 can be carried out, for example, by processing status related intake received wirelessly (e.g., cellular communication, packetized communication, networked communication, broadband communication, gigahertz frequency communication, etc.) including processing status related intake involving at least in part infrared supported communication (e.g., processing information in communication between one or more infrared transmitters located near one or more dwelling parking locations for electric vehicles and one or more infrared receivers located on the one or more electric vehicles, etc.).

In one or more implementations, as shown in FIG. 9-M, the operation o11 can include operation o1150 for electronically processing status related intake associated at least in part with one or more electric vehicle recharging affairs for one or more electric vehicles by wireless electrical energy transfer affiliated at least in part with one or more dwelling associates of at least in part one or more dwelling related areas including processing status related intake involving at least in part direct non-wireless communication. Origination of a physically tangible component group can be accomplished through skilled in the art design choice selection including use of one or more components and/or subsystems explicitly and/or implicitly referred to herein for at least in part implementing execution of one or more instructions of the operation o1150, for performance of the operation o1150 by an electrical circuitry arrangement as activated thereto, and/or otherwise fulfillment of the operation o1150. One or more non-transitory signal bearing physical media can bear the one or more instructions that when executed can direct performance of the operation o1150. Furthermore, processing status related intake involving direct non-wireless communication module m1150 depicted in FIG. 5-F as being included in the module m11, when executed and/or activated, can direct performance of and/or perform the operation o1150. Illustratively, in one or more implementations, the operation o1150 can be carried out, for example, by electronically processing (e.g., collecting, storing, annotating, accessing, retrieving, accumulating, monitoring, reporting, analyzing, summarizing, condensing, applying, etc.) status related intake (e.g., informational, projected, historical, performance, identification, organizational, background, affiliation, goal, milestone, accomplishment, detraction, objective, guideline, award, demerit, extra-curricular, etc.) associated at least in part (e.g., tangentially, directly, occasionally, temporarily, permanently, fully, partially, etc.) with one or more electric vehicle (e.g., all-electric, hybrid, gas-electric, diesel-electric, propane-electric, fuel-cell-electric, common-rail electric, car, truck, short distance, long distance, van, bus, cart, commercial, private, governmental, etc.) recharging (e.g., fast charge, slow trickle, low density, high density, recurrent, sporadic, ad hoc, predictive, total, partial, remedial, etc.) affairs (e.g., devices, mechanisms, procedures, structures, methods, countermeasures, plays, real, virtual, simulated, transitory, permanent, replacement, redundant, alternative, etc.) for one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) by wireless (e.g., electromagnetic resonance, short distance, long distance, high power, low power, static, dynamic, etc.) electrical energy (e.g., electrical energy stored or to be stored by such as battery, lead-acid, metal hydride, nickel-cadmium, chemical, solid state, capacitive, gaseous, compressed gas based, etc.) transfer (e.g., fast charge, slow trickle, low density, high density, recurrent, sporadic, ad hoc, predictive, total, partial, remedial, etc.) affiliated (e.g., tangentially, directly, indirectly, partially, fully, organizational, ethically, regionally, demographically, vocationally, generationally, educationally, politically, recreationally, etc.) at least in part with one or more dwelling (e.g., shelter, temporary, familial, residential, suburban, city, housing, high density, low density, singular, multiple, etc.) associates (e.g., habitating, lodging, occupying, visiting, touring, lounging, recreating, playing, working, studying, eating, owning, renting, leasing, contracting, retiring, sleeping, resting, reflecting, individual, group, corporate, governmental, civic, educational, volunteer, retired, candidate, temporary, permanent, driver, rider, occupant, maintainer, regular, occasional, ad hoc, commuter, pleasure, business, etc.) of at least in part one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, landscaped, palatial, in-town, uptown, downtown, penthouse, mansion, suburban, rural, family, shelter, rental, condominium, upscale, high-tech, modern, traditional, contemporary, classic, etc.) including processing status related intake involving at least in part direct non-wireless communication (e.g., processing information involving hard wired network cable connecting one or more databases containing scheduling information, etc.).

In one or more implementations, as shown in FIG. 9-M, the operation o1150 can include operation o1151 for processing status related intake involving at least in part direct non-wireless communication including processing status related intake involving at least in part one or more direct wire connections. Origination of a physically tangible component group can be accomplished through skilled in the art design choice selection including use of one or more components and/or subsystems explicitly and/or implicitly referred to herein for at least in part implementing execution of one or more instructions of the operation o1151, for performance of the operation o1151 by an electrical circuitry arrangement as activated thereto, and/or otherwise fulfillment of the operation o1151. One or more non-transitory signal bearing physical media can bear the one or more instructions that when executed can direct performance of the operation o1151. Furthermore, processing status related intake involving direct wire connections module m1151 depicted in FIG. 5-F as being included in the module m1150, when executed and/or activated, can direct performance of and/or perform the operation o1151. Illustratively, in one or more implementations, the operation o1151 can be carried out, for example, by processing status related intake involving at least in part direct non-wireless communication (e.g., processing information involving hard wired network cable connecting one or more databases containing scheduling information, etc.) including processing status related intake involving at least in part one or more direct wire connections (e.g., processing information involving electrical grid wiring from central planning station or involving one or more communication devices located adjacent to dwelling charging of electric vehicle, etc.).

In one or more implementations, as shown in FIG. 9-M, the operation o1150 can include operation o1152 for processing status related intake involving at least in part direct non-wireless communication including processing status related intake involving at least in part one or more electronic queries of historical records of electric vehicle use by the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1152, for performance of the operation o1152 by an electrical circuitry arrangement as activated thereto, and/or otherwise fulfillment of the operation o1152. One or more non-transitory signal bearing physical media can bear the one or more instructions that when executed can direct performance of the operation o1152. Furthermore, processing status related intake involving electronic queries of historical records of electric vehicle use by dwelling associates module m1152 depicted in FIG. 5-F as being included in the module m1150, when executed and/or activated, can direct performance of and/or perform the operation o1152. Illustratively, in one or more implementations, the operation o1152 can be carried out, for example, by processing status related intake involving at least in part direct non-wireless communication (e.g., processing information involving hard wired network cable connecting one or more databases containing scheduling information, etc.) including processing status related intake involving at least in part one or more electronic queries of historical records of electric vehicle use by the one or more dwelling associates (e.g., processing information content from one or more verbal responses of one or more dwelling associates to one or more audible queries of the one or more dwelling associates in vicinity of dwelling based information center, etc.).

In one or more implementations, as shown in FIG. 10-A, the operation o12 can include operation o1201 for electronically monitoring operational aspects at least in part affecting influence between the one or more electric vehicles and one or more dwelling associates of at least in part the one or more dwelling related areas including processing status related intake involving at least in part forecast related information at least in part in electronic form. Origination of a physically tangible component group can be accomplished through skilled in the art design choice selection including use of one or more components and/or subsystems explicitly and/or implicitly referred to herein for at least in part implementing execution of one or more instructions of the operation o1201, for performance of the operation o1201 by an electrical circuitry arrangement as activated thereto, and/or otherwise fulfillment of the operation o1201. One or more non-transitory signal bearing physical media can bear the one or more instructions that when executed can direct performance of the operation o1201. Furthermore, processing status related intake involving forecast related information in electronic form module m1201 depicted in FIG. 6-A as being included in the module m12, when executed and/or activated, can direct performance of and/or perform the operation o1201. Illustratively, in one or more implementations, the operation o1201 can be carried out, for example, by electronically monitoring (e.g., on-going, temporary, ad hoc, scheduled, periodic, receiving, gathering, collecting, categorizing, grouping, noting, storing, assessing, distilling, etc.) operational (e.g., drivable, maintainable, inventorial, storable, allocatable, reliable, usable, plannable, deterministic, predictable, functional, etc.) aspects (e.g., factors, contributory, foundational, direct, indirect, regular, sporadic, considerations, secondary, tertiary, etc.) at least in part affecting (e.g., tangentially, directly, occasionally, temporarily, permanently, fully, partially, etc.) influence (e.g., plan, reliance, replacement, use cycling, maintenance, allocation, cooperative, sharing, affordability, budgeting, provision, temporary, on-going, occasional, daily, use of by, etc.) between the one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) and one or more dwelling (e.g., shelter, temporary, familial, residential, suburban, city, housing, high density, low density, singular, multiple, etc.) associates (e.g., individual, group, corporate, governmental, civic, educational, volunteer, retired, candidate, temporary, permanent, driver, rider, occupant, maintainer, regular, occasional, ad hoc, commuter, pleasure, business, etc.) of at least in part the one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, palatial, in-town, up-town, down-town, penthouse, mansion, suburban, rural, family, shelter, rental, condominium, up-scale, high-tech, modern, traditional, contemporary, classic, etc.) including processing status related intake involving at least in part forecast related information at least in part in electronic form (e.g., demodulating packetized communication received regarding evening traffic congestion, etc.).

In one or more implementations, as shown in FIG. 10-A, the operation o1201 can include operation o1202 for processing status related intake involving at least in part forecast related information at least in part in electronic form including processing status related intake involving at least in part one or more internet cloud-based collaboration systems. Origination of a physically tangible component group can be accomplished through skilled in the art design choice selection including use of one or more components and/or subsystems explicitly and/or implicitly referred to herein for at least in part implementing execution of one or more instructions of the operation o1202, for performance of the operation o1202 by an electrical circuitry arrangement as activated thereto, and/or otherwise fulfillment of the operation o1202. One or more non-transitory signal bearing physical media can bear the one or more instructions that when executed can direct performance of the operation o1202. Furthermore, processing status related intake involving internet cloud-based collaboration systems module m1202 depicted in FIG. 6-A as being included in the module m1201, when executed and/or activated, can direct performance of and/or perform the operation o1202. Illustratively, in one or more implementations, the operation o1202 can be carried out, for example, by processing status related intake involving at least in part forecast related information at least in part in electronic form (e.g., demodulating packetized communication received regarding evening traffic congestion, etc.) including processing status related intake involving at least in part one or more internet cloud-based collaboration systems (e.g., processing information by mining data contained in scheduling, planning, conferencing, or other cloud based content, etc.).

In one or more implementations, as shown in FIG. 10-A, the operation o1201 can include operation o1203 for processing status related intake involving at least in part forecast related information at least in part in electronic form including processing status related intake involving at least in part one or more incentive-based programs for the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1203, for performance of the operation o1203 by an electrical circuitry arrangement as activated thereto, and/or otherwise fulfillment of the operation o1203. One or more non-transitory signal bearing physical media can bear the one or more instructions that when executed can direct performance of the operation o1203. Furthermore, processing status related intake involving incentive-based programs for dwelling associates module m1203 depicted in FIG. 6-A as being included in the module m1201, when executed and/or activated, can direct performance of and/or perform the operation o1203. Illustratively, in one or more implementations, the operation o1203 can be carried out, for example, by processing status related intake involving at least in part forecast related information at least in part in electronic form (e.g., demodulating packetized communication received regarding evening traffic congestion, etc.) including processing status related intake involving at least in part one or more incentive-based programs for the one or more dwelling associates (e.g., processing driving profile of dwelling associate with one or more of the electric vehicles to award the dwelling associate as home owner rebates associated with electric utility bills based on driving profile, etc.).

In one or more implementations, as shown in FIG. 10-A, the operation o1201 can include operation o1204 for processing status related intake involving at least in part forecast related information at least in part in electronic form including processing status related intake involving at least in part human relationships of the one or more dwelling associates affecting use of the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1204, for performance of the operation o1204 by an electrical circuitry arrangement as activated thereto, and/or otherwise fulfillment of the operation o1204. One or more non-transitory signal bearing physical media can bear the one or more instructions that when executed can direct performance of the operation o1204. Furthermore, processing status related intake involving human relationships of dwelling associates affecting use of electric vehicles module m1204 depicted in FIG. 6-A as being included in the module m1201, when executed and/or activated, can direct performance of and/or perform the operation o1204. Illustratively, in one or more implementations, the operation o1204 can be carried out, for example, by processing status related intake involving at least in part forecast related information at least in part in electronic form (e.g., demodulating packetized communication received regarding evening traffic congestion, etc.) including processing status related intake involving at least in part human relationships of the one or more dwelling associates affecting use of the one or more electric vehicles (e.g., processing information regarding family tree association of the dwelling associates to anticipate future demand for electric vehicle services, etc.).

In one or more implementations, as shown in FIG. 10-A, the operation o1201 can include operation o1205 for processing status related intake involving at least in part forecast related information at least in part in electronic form including processing status related intake involving at least in part household budgeting of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1205, for performance of the operation o1205 by an electrical circuitry arrangement as activated thereto, and/or otherwise fulfillment of the operation o1205. One or more non-transitory signal bearing physical media can bear the one or more instructions that when executed can direct performance of the operation o1205. Furthermore, processing status related intake involving household budgeting of dwelling associates module m1205 depicted in FIG. 6-A as being included in the module m1201, when executed and/or activated, can direct performance of and/or perform the operation o1205. Illustratively, in one or more implementations, the operation o1205 can be carried out, for example, by processing status related intake involving at least in part forecast related information at least in part in electronic form (e.g., demodulating packetized communication received regarding evening traffic congestion, etc.) including processing status related intake involving at least in part household budgeting of the one or more dwelling associates (e.g., processing information regarding allocation of funds for electric vehicle related expenses compared with overall expenses, etc.).

In one or more implementations, as shown in FIG. 10-A, the operation o1201 can include operation o1206 for processing status related intake involving at least in part forecast related information at least in part in electronic form including processing status related intake involving at least in part one or more dwelling maintenance tasks. Origination of a physically tangible component group can be accomplished through skilled in the art design choice selection including use of one or more components and/or subsystems explicitly and/or implicitly referred to herein for at least in part implementing execution of one or more instructions of the operation o1206, for performance of the operation o1206 by an electrical circuitry arrangement as activated thereto, and/or otherwise fulfillment of the operation o1206. One or more non-transitory signal bearing physical media can bear the one or more instructions that when executed can direct performance of the operation o1206. Furthermore, processing status related intake involving dwelling maintenance tasks module m1206 depicted in FIG. 6-A as being included in the module m1201, when executed and/or activated, can direct performance of and/or perform the operation o1206. Illustratively, in one or more implementations, the operation o1206 can be carried out, for example, by processing status related intake involving at least in part forecast related information at least in part in electronic form (e.g., demodulating packetized communication received regarding evening traffic congestion, etc.) including processing status related intake involving at least in part one or more dwelling maintenance tasks (e.g., processing information regarding cleaning, repairing, or other maintaining of dwelling areas associated with electric vehicle recharging, repair, maintenance or other use, etc.).

In one or more implementations, as shown in FIG. 10-A, the operation o1201 can include operation o1207 for processing status related intake involving at least in part forecast related information at least in part in electronic form including processing status related intake involving at least in part group objectives of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1207, for performance of the operation o1207 by an electrical circuitry arrangement as activated thereto, and/or otherwise fulfillment of the operation o1207. One or more non-transitory signal bearing physical media can bear the one or more instructions that when executed can direct performance of the operation o1207. Furthermore, processing status related intake involving group objectives of dwelling associates module m1207 depicted in FIG. 6-A as being included in the module m1201, when executed and/or activated, can direct performance of and/or perform the operation o1207. Illustratively, in one or more implementations, the operation o1207 can be carried out, for example, by processing status related intake involving at least in part forecast related information at least in part in electronic form (e.g., demodulating packetized communication received regarding evening traffic congestion, etc.) including processing status related intake involving at least in part group objectives of the one or more dwelling associates (e.g., processing information related to errands, deliveries, escorts, outings, events, etc. concerning use of the electric vehicle by one or more of the dwelling associates, etc.).

In one or more implementations, as shown in FIG. 10-B, the operation o1201 can include operation o1208 for processing status related intake involving at least in part forecast related information at least in part in electronic form including processing status related intake involving at least in part guidelines for dwelling associate participation in electric vehicle use. Origination of a physically tangible component group can be accomplished through skilled in the art design choice selection including use of one or more components and/or subsystems explicitly and/or implicitly referred to herein for at least in part implementing execution of one or more instructions of the operation o1208, for performance of the operation o1208 by an electrical circuitry arrangement as activated thereto, and/or otherwise fulfillment of the operation o1208. One or more non-transitory signal bearing physical media can bear the one or more instructions that when executed can direct performance of the operation o1208. Furthermore, processing status related intake involving guidelines for dwelling associate participation in electric vehicle use module m1208 depicted in FIG. 6-A as being included in the module m1201, when executed and/or activated, can direct performance of and/or perform the operation o1208. Illustratively, in one or more implementations, the operation o1208 can be carried out, for example, by processing status related intake involving at least in part forecast related information at least in part in electronic form (e.g., demodulating packetized communication received regarding evening traffic congestion, etc.) including processing status related intake involving at least in part guidelines for dwelling associate participation in electric vehicle use (e.g., processing information related to governmental, educational, vocational, civic, etc. instructions containing parameters and other metrics for electric vehicle driving, etc.).

In one or more implementations, as shown in FIG. 10-B, the operation o1201 can include operation o1209 for processing status related intake involving at least in part forecast related information at least in part in electronic form including processing status related intake involving at least in part dwelling associate input to one or more social networking systems. Origination of a physically tangible component group can be accomplished through skilled in the art design choice selection including use of one or more components and/or subsystems explicitly and/or implicitly referred to herein for at least in part implementing execution of one or more instructions of the operation o1209, for performance of the operation o1209 by an electrical circuitry arrangement as activated thereto, and/or otherwise fulfillment of the operation o1209. One or more non-transitory signal bearing physical media can bear the one or more instructions that when executed can direct performance of the operation o1209. Furthermore, processing status related intake involving dwelling associate input to social networking systems module m1209 depicted in FIG. 6-A as being included in the module m1201, when executed and/or activated, can direct performance of and/or perform the operation o1209. Illustratively, in one or more implementations, the operation o1209 can be carried out, for example, by processing status related intake involving at least in part forecast related information at least in part in electronic form (e.g., demodulating packetized communication received regarding evening traffic congestion, etc.) including processing status related intake involving at least in part dwelling associate input to one or more social networking systems (e.g., processing information regarding posts, blogs, tweets, e-mail, websites, chats, etc. related to use of the one or more electric vehicles, etc.).

In one or more implementations, as shown in FIG. 10-B, the operation o1201 can include operation o1210 for processing status related intake involving at least in part forecast related information at least in part in electronic form including processing status related intake involving at least in part one or more tax strategies of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1210, for performance of the operation o1210 by an electrical circuitry arrangement as activated thereto, and/or otherwise fulfillment of the operation o1210. One or more non-transitory signal bearing physical media can bear the one or more instructions that when executed can direct performance of the operation o1210. Furthermore, processing status related intake involving tax strategies of dwelling associates module m1210 depicted in FIG. 6-A as being included in the module m1201, when executed and/or activated, can direct performance of and/or perform the operation o1210. Illustratively, in one or more implementations, the operation o1210 can be carried out, for example, by processing status related intake involving at least in part forecast related information at least in part in electronic form (e.g., demodulating packetized communication received regarding evening traffic congestion, etc.) including processing status related intake involving at least in part one or more tax strategies of the one or more dwelling associates (e.g., processing information related to dwelling tax incentives for electric vehicle used with ride-sharing, economy modes of travel, coop use of electric vehicle, etc.).

In one or more implementations, as shown in FIG. 10-B, the operation o1201 can include operation o1211 for processing status related intake involving at least in part forecast related information at least in part in electronic form including processing status related intake involving at least in part compensation objectives of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1211, for performance of the operation o1211 by an electrical circuitry arrangement as activated thereto, and/or otherwise fulfillment of the operation o1211. One or more non-transitory signal bearing physical media can bear the one or more instructions that when executed can direct performance of the operation o1211. Furthermore, processing status related intake involving compensation objectives of dwelling associates module m1211 depicted in FIG. 6-A as being included in the module m1201, when executed and/or activated, can direct performance of and/or perform the operation o1211. Illustratively, in one or more implementations, the operation o1211 can be carried out, for example, by processing status related intake involving at least in part forecast related information at least in part in electronic form (e.g., demodulating packetized communication received regarding evening traffic congestion, etc.) including processing status related intake involving at least in part compensation objectives of the one or more dwelling associates (e.g., processing information related to use of the one or more electric vehicles for receiving income from other than the one or more dwelling associates, etc.).

In one or more implementations, as shown in FIG. 10-B, the operation o1201 can include operation o1212 for processing status related intake involving at least in part forecast related information at least in part in electronic form including processing status related intake involving at least in part voucher related aspects regarding at least in part the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1212, for performance of the operation o1212 by an electrical circuitry arrangement as activated thereto, and/or otherwise fulfillment of the operation o1212. One or more non-transitory signal bearing physical media can bear the one or more instructions that when executed can direct performance of the operation o1212. Furthermore, processing status related intake involving voucher related aspects regarding dwelling associates module m1212 depicted in FIG. 6-A as being included in the module m1201, when executed and/or activated, can direct performance of and/or perform the operation o1212. Illustratively, in one or more implementations, the operation o1212 can be carried out, for example, by processing status related intake involving at least in part forecast related information at least in part in electronic form (e.g., demodulating packetized communication received regarding evening traffic congestion, etc.) including processing status related intake involving at least in part voucher related aspects regarding at least in part the one or more dwelling associates (e.g., processing information related to coupons or other discount media associated with the one or more electric vehicles, etc.).

In one or more implementations, as shown in FIG. 10-B, the operation o1201 can include operation o1213 for processing status related intake involving at least in part forecast related information at least in part in electronic form including processing status related intake involving at least in part gift program details associated with the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1213, for performance of the operation o1213 by an electrical circuitry arrangement as activated thereto, and/or otherwise fulfillment of the operation o1213. One or more non-transitory signal bearing physical media can bear the one or more instructions that when executed can direct performance of the operation o1213. Furthermore, processing status related intake involving gift program details associated with dwelling associates module m1213 depicted in FIG. 6-A as being included in the module m1201, when executed and/or activated, can direct performance of and/or perform the operation o1213. Illustratively, in one or more implementations, the operation o1213 can be carried out, for example, by processing status related intake involving at least in part forecast related information at least in part in electronic form (e.g., demodulating packetized communication received regarding evening traffic congestion, etc.) including processing status related intake involving at least in part gift program details associated with the one or more dwelling associates (e.g., processing information related to gifts of kilowatt-hours, or other electrical energy equivalents from individuals or organizations to one or more of the dwelling associates, etc.).

In one or more implementations, as shown in FIG. 10-C, the operation o1201 can include operation o1214 for processing status related intake involving at least in part forecast related information at least in part in electronic form including processing status related intake involving at least in part retirement benefits of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1214, for performance of the operation o1214 by an electrical circuitry arrangement as activated thereto, and/or otherwise fulfillment of the operation o1214. One or more non-transitory signal bearing physical media can bear the one or more instructions that when executed can direct performance of the operation o1214. Furthermore, processing status related intake involving retirement benefits of dwelling associates module m1214 depicted in FIG. 6-A as being included in the module m1201, when executed and/or activated, can direct performance of and/or perform the operation o1214. Illustratively, in one or more implementations, the operation o1214 can be carried out, for example, by processing status related intake involving at least in part forecast related information at least in part in electronic form (e.g., demodulating packetized communication received regarding evening traffic congestion, etc.) including processing status related intake involving at least in part retirement benefits of the one or more dwelling associates (e.g., processing information regarding amount of electrical power received periodically for electrical vehicle use by one or more dwelling associates in retired status from a previous vocation occupation, etc.).

In one or more implementations, as shown in FIG. 10-C, the operation o1201 can include operation o1215 for processing status related intake involving at least in part forecast related information at least in part in electronic form including processing status related intake involving at least in part access to one or more dwelling system databases. Origination of a physically tangible component group can be accomplished through skilled in the art design choice selection including use of one or more components and/or subsystems explicitly and/or implicitly referred to herein for at least in part implementing execution of one or more instructions of the operation o1215, for performance of the operation o1215 by an electrical circuitry arrangement as activated thereto, and/or otherwise fulfillment of the operation o1215. One or more non-transitory signal bearing physical media can bear the one or more instructions that when executed can direct performance of the operation o1215. Furthermore, processing status related intake involving access to dwelling system databases module m1215 depicted in FIG. 6-B as being included in the module m1201, when executed and/or activated, can direct performance of and/or perform the operation o1215. Illustratively, in one or more implementations, the operation o1215 can be carried out, for example, by processing status related intake involving at least in part forecast related information at least in part in electronic form (e.g., demodulating packetized communication received regarding evening traffic congestion, etc.) including processing status related intake involving at least in part access to one or more dwelling system databases (e.g., monitoring information involving access into one or more databases regarding perks, bonuses, rewards, incentives or other compensation associated with one or more dwelling associates that are occupants of one or more electric vehicles being charged one or more dwelling facilities, etc.).

In one or more implementations, as shown in FIG. 10-C, the operation o1201 can include operation o1216 for processing status related intake involving at least in part forecast related information at least in part in electronic form including processing status related intake involving at least in part data calls to one or more electronic calendaring systems of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1216, for performance of the operation o1216 by an electrical circuitry arrangement as activated thereto, and/or otherwise fulfillment of the operation o1216. One or more non-transitory signal bearing physical media can bear the one or more instructions that when executed can direct performance of the operation o1216. Furthermore, processing status related intake involving data calls to electronic calendaring systems of dwelling associates module m1216 depicted in FIG. 6-B as being included in the module m1201, when executed and/or activated, can direct performance of and/or perform the operation o1216. Illustratively, in one or more implementations, the operation o1216 can be carried out, for example, by processing status related intake involving at least in part forecast related information at least in part in electronic form (e.g., demodulating packetized communication received regarding evening traffic congestion, etc.) including processing status related intake involving at least in part data calls to one or more electronic calendaring systems of the one or more dwelling associates (e.g., processing information by querying into one or more calendaring systems to determine how one or more electric vehicles are to be used over a course of time by factoring in relevant activity listed in the one or more calendaring systems, etc.).

In one or more implementations, as shown in FIG. 10-C, the operation o1201 can include operation o1217 for processing status related intake involving at least in part forecast related information at least in part in electronic form including processing status related intake involving at least in part access to one or more scheduling programs of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1217, for performance of the operation o1217 by an electrical circuitry arrangement as activated thereto, and/or otherwise fulfillment of the operation o1217. One or more non-transitory signal bearing physical media can bear the one or more instructions that when executed can direct performance of the operation o1217. Furthermore, processing status related intake involving access to scheduling programs of dwelling associates module m1217 depicted in FIG. 6-B as being included in the module m1201, when executed and/or activated, can direct performance of and/or perform the operation o1217. Illustratively, in one or more implementations, the operation o1217 can be carried out, for example, by processing status related intake involving at least in part forecast related information at least in part in electronic form (e.g., demodulating packetized communication received regarding evening traffic congestion, etc.) including processing status related intake involving at least in part access to one or more scheduling programs of the one or more dwelling associates (e.g., processing information by analyzing one or more scheduled activities contained in one or more scheduling programs associated with one or more group projects and/or personal errands of one or more dwelling associates, etc.).

In one or more implementations, as shown in FIG. 10-C, the operation o1201 can include operation o1218 for processing status related intake involving at least in part forecast related information at least in part in electronic form including processing status related intake involving at least in part electronic monitoring of one or more phone conversations of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1218, for performance of the operation o1218 by an electrical circuitry arrangement as activated thereto, and/or otherwise fulfillment of the operation o1218. One or more non-transitory signal bearing physical media can bear the one or more instructions that when executed can direct performance of the operation o1218. Furthermore, processing status related intake involving electronic monitoring of phone conversations of dwelling associates module m1218 depicted in FIG. 6-B as being included in the module m1201, when executed and/or activated, can direct performance of and/or perform the operation o1218. Illustratively, in one or more implementations, the operation o1218 can be carried out, for example, by processing status related intake involving at least in part forecast related information at least in part in electronic form (e.g., demodulating packetized communication received regarding evening traffic congestion, etc.) including processing status related intake involving at least in part electronic monitoring of one or more phone conversations of the one or more dwelling associates (e.g., processing information be extracting relevant information of one or more cell phone calls either in real time or involving at least in part recorded information either of oral or textual content, etc.).

In one or more implementations, as shown in FIG. 10-D, the operation o1201 can include operation o1219 for processing status related intake involving at least in part forecast related information at least in part in electronic form including processing status related intake involving at least in part one or more electronic recordings of in-person conversations of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1219, for performance of the operation o1219 by an electrical circuitry arrangement as activated thereto, and/or otherwise fulfillment of the operation o1219. One or more non-transitory signal bearing physical media can bear the one or more instructions that when executed can direct performance of the operation o1219. Furthermore, processing status related intake involving electronic recordings of in-person conversations of dwelling associates module m1219 depicted in FIG. 6-B as being included in the module m1201, when executed and/or activated, can direct performance of and/or perform the operation o1219. Illustratively, in one or more implementations, the operation o1219 can be carried out, for example, by processing status related intake involving at least in part forecast related information at least in part in electronic form (e.g., demodulating packetized communication received regarding evening traffic congestion, etc.) including processing status related intake involving at least in part one or more electronic recordings of in-person conversations of the one or more dwelling associates (e.g., processing information involving at least in part mining recording of oral conversations by one or more dwelling associates regarding plans associated with use of the one or more electric vehicles, etc.).

In one or more implementations, as shown in FIG. 10-D, the operation o1201 can include operation o1220 for processing status related intake involving at least in part forecast related information at least in part in electronic form including processing status related intake involving at least in part data access to one or more e-mail systems of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1220, for performance of the operation o1220 by an electrical circuitry arrangement as activated thereto, and/or otherwise fulfillment of the operation o1220. One or more non-transitory signal bearing physical media can bear the one or more instructions that when executed can direct performance of the operation o1220. Furthermore, processing status related intake involving data access to e-mail systems of dwelling associates module m1220 depicted in FIG. 6-B as being included in the module m1201, when executed and/or activated, can direct performance of and/or perform the operation o1220. Illustratively, in one or more implementations, the operation o1220 can be carried out, for example, by processing status related intake involving at least in part forecast related information at least in part in electronic form (e.g., demodulating packetized communication received regarding evening traffic congestion, etc.) including processing status related intake involving at least in part data access to one or more e-mail systems of the one or more dwelling associates (e.g., processing information by extracting relevant planning information associated with use of the one or more electric vehicles by one or more dwelling associates of the one or more electric vehicles involving at least in part textual analysis of one or more e-mails sent or received by the one or more dwelling associates, etc.).

In one or more implementations, as shown in FIG. 10-D, the operation o1201 can include operation o1221 for processing status related intake involving at least in part forecast related information at least in part in electronic form including processing status related intake involving at least in part access to one or more electronic vehicle maintenance logs associated with use of the one or more electric vehicles by the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1221, for performance of the operation o1221 by an electrical circuitry arrangement as activated thereto, and/or otherwise fulfillment of the operation o1221. One or more non-transitory signal bearing physical media can bear the one or more instructions that when executed can direct performance of the operation o1221. Furthermore, processing status related intake involving access to electronic vehicle maintenance logs associated with use of one or more electric vehicles by dwelling associates module m1221 depicted in FIG. 6-B as being included in the module m1201, when executed and/or activated, can direct performance of and/or perform the operation o1221. Illustratively, in one or more implementations, the operation o1221 can be carried out, for example, by processing status related intake involving at least in part forecast related information at least in part in electronic form (e.g., demodulating packetized communication received regarding evening traffic congestion, etc.) including processing status related intake involving at least in part access to one or more electronic vehicle maintenance logs associated with use of the one or more electric vehicles by the one or more dwelling associates (e.g., processing information by analyzing data contained in electronic logs of the one or more electric vehicles regarding trip length, velocity, acceleration, idling, and other performance profiles, etc.).

In one or more implementations, as shown in FIG. 10-D, the operation o1201 can include operation o1222 for processing status related intake involving at least in part forecast related information at least in part in electronic form including processing status related intake involving at least in part one or more electronic queries of historical records regarding electric vehicle use by the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1222, for performance of the operation o1222 by an electrical circuitry arrangement as activated thereto, and/or otherwise fulfillment of the operation o1222. One or more non-transitory signal bearing physical media can bear the one or more instructions that when executed can direct performance of the operation o1222. Furthermore, processing status related intake involving electronic queries of historical records regarding electric vehicle use by dwelling associates module m1222 depicted in FIG. 6-B as being included in the module m1201, when executed and/or activated, can direct performance of and/or perform the operation o1222. Illustratively, in one or more implementations, the operation o1222 can be carried out, for example, by processing status related intake involving at least in part forecast related information at least in part in electronic form (e.g., demodulating packetized communication received regarding evening traffic congestion, etc.) including processing status related intake involving at least in part one or more electronic queries of historical records regarding electric vehicle use by the one or more dwelling associates (e.g., processing information by processing patterns of use regarding duration, trip length, frequency of use, weekly use profiles, monthly use profiles, impact by outside events such as holidays, weekends, work schedule as contain in use logs, etc.).

In one or more implementations, as shown in FIG. 10-D, the operation o1201 can include operation o1223 for processing status related intake involving at least in part forecast related information at least in part in electronic form including processing status related intake as provided electronically from one or more electric vehicle use logs. Origination of a physically tangible component group can be accomplished through skilled in the art design choice selection including use of one or more components and/or subsystems explicitly and/or implicitly referred to herein for at least in part implementing execution of one or more instructions of the operation o1223, for performance of the operation o1223 by an electrical circuitry arrangement as activated thereto, and/or otherwise fulfillment of the operation o1223. One or more non-transitory signal bearing physical media can bear the one or more instructions that when executed can direct performance of the operation o1223. Furthermore, processing status related intake as provided electronically from electric vehicle use logs module m1223 depicted in FIG. 6-B as being included in the module m1201, when executed and/or activated, can direct performance of and/or perform the operation o1223. Illustratively, in one or more implementations, the operation o1223 can be carried out, for example, by processing status related intake involving at least in part forecast related information at least in part in electronic form (e.g., demodulating packetized communication received regarding evening traffic congestion, etc.) including processing status related intake as provided electronically from one or more electric vehicle use logs (e.g., processing information involving direct access to use logs contained onboard in the one or more electric vehicles regarding performance metrics of the one or more electric vehicles showing characteristics of use including kinematic and dynamic parameters including acceleration, deceleration, cruising, parking, waiting, idling, GPS location data and other patterns of use, etc.).

In one or more implementations, as shown in FIG. 10-E, the operation o12 can include operation o1224 for electronically processing status related intake associated at least in part with one or more electric vehicle recharging affairs for one or more electric vehicles by wireless electrical energy transfer affiliated at least in part with one or more dwelling associates of at least in part one or more dwelling related areas including monitoring operational aspects regarding at least in part one or more electric vehicles related at least in part to commuting aspects of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1224, for performance of the operation o1224 by an electrical circuitry arrangement as activated thereto, and/or otherwise fulfillment of the operation o1224. One or more non-transitory signal bearing physical media can bear the one or more instructions that when executed can direct performance of the operation o1224. Furthermore, monitoring operational aspects regarding electric vehicles related to commuting aspects of dwelling associates module m1224 depicted in FIG. 6-B as being included in the module m12, when executed and/or activated, can direct performance of and/or perform the operation o1224. Illustratively, in one or more implementations, the operation o1224 can be carried out, for example, by electronically processing (e.g., collecting, storing, annotating, accessing, retrieving, accumulating, monitoring, reporting, analyzing, summarizing, condensing, applying, etc.) status related intake (e.g., informational, projected, historical, performance, identification, organizational, background, affiliation, goal, milestone, accomplishment, detraction, objective, guideline, award, demerit, extra-curricular, etc.) associated at least in part (e.g., tangentially, directly, occasionally, temporarily, permanently, fully, partially, etc.) with one or more electric vehicle (e.g., all-electric, hybrid, gas-electric, diesel-electric, propane-electric, fuel-cell-electric, common-rail electric, car, truck, short distance, long distance, van, bus, cart, commercial, private, governmental, etc.) recharging (e.g., fast charge, slow trickle, low density, high density, recurrent, sporadic, ad hoc, predictive, total, partial, remedial, etc.) affairs (e.g., devices, mechanisms, procedures, structures, methods, countermeasures, plays, real, virtual, simulated, transitory, permanent, replacement, redundant, alternative, etc.) for one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) by wireless (e.g., electromagnetic resonance, short distance, long distance, high power, low power, static, dynamic, etc.) electrical energy (e.g., electrical energy stored or to be stored by such as battery, lead-acid, metal hydride, nickel-cadmium, chemical, solid state, capacitive, gaseous, compressed gas based, etc.) transfer (e.g., fast charge, slow trickle, low density, high density, recurrent, sporadic, ad hoc, predictive, total, partial, remedial, etc.) affiliated (e.g., tangentially, directly, indirectly, partially, fully, organizational, ethically, regionally, demographically, vocationally, generationally, educationally, politically, recreationally, etc.) at least in part with one or more dwelling (e.g., shelter, temporary, familial, residential, suburban, city, housing, high density, low density, singular, multiple, etc.) associates (e.g., habitating, lodging, occupying, visiting, touring, lounging, recreating, playing, working, studying, eating, owning, renting, leasing, contracting, retiring, sleeping, resting, reflecting, individual, group, corporate, governmental, civic, educational, volunteer, retired, candidate, temporary, permanent, driver, rider, occupant, maintainer, regular, occasional, ad hoc, commuter, pleasure, business, etc.) of at least in part one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, landscaped, palatial, in-town, uptown, downtown, penthouse, mansion, suburban, rural, family, shelter, rental, condominium, upscale, high-tech, modern, traditional, contemporary, classic, etc.) including monitoring operational aspects regarding at least in part one or more electric vehicles related at least in part to commuting aspects of the one or more dwelling associates (e.g., monitoring information including commute information such as residence location, work location, employment scheduling, or other errand information of one or more passengers associated with one or more drivers of the one or more electric vehicles, etc.).

In one or more implementations, as shown in FIG. 10-E, the operation o1224 can include operation o1225 for monitoring operational aspects regarding at least in part one or more electric vehicles related at least in part to commuting aspects of the one or more dwelling associates including monitoring operational aspects regarding at least in part the one or more dwelling associate drivers of the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1225, for performance of the operation o1225 by an electrical circuitry arrangement as activated thereto, and/or otherwise fulfillment of the operation o1225. One or more non-transitory signal bearing physical media can bear the one or more instructions that when executed can direct performance of the operation o1225. Furthermore, monitoring operational aspects regarding dwelling associate drivers of electric vehicles module m1225 depicted in FIG. 6-B as being included in the module m1224, when executed and/or activated, can direct performance of and/or perform the operation o1225. Illustratively, in one or more implementations, the operation o1225 can be carried out, for example, by monitoring operational aspects regarding at least in part one or more electric vehicles related at least in part to commuting aspects of the one or more dwelling associates (e.g., monitoring information including commute information such as residence location, work location, employment scheduling, or other errand information of one or more passengers associated with one or more drivers of the one or more electric vehicles, etc.) including monitoring operational aspects regarding at least in part the one or more dwelling associate drivers of the one or more electric vehicles (e.g., monitoring information associated with driving habits of one or more drivers of the one or more electric vehicles such as their driving styles, favorite places to drive, compliance with driving rules, etc.).

In one or more implementations, as shown in FIG. 10-E, the operation o1224 can include operation o1226 for monitoring operational aspects regarding at least in part one or more electric vehicles related at least in part to commuting aspects of the one or more dwelling associates including monitoring operational aspects regarding at least in part the one or more electric vehicles of the one or more dwelling associates to receive electrical energy from a local electrical grid substation. Origination of a physically tangible component group can be accomplished through skilled in the art design choice selection including use of one or more components and/or subsystems explicitly and/or implicitly referred to herein for at least in part implementing execution of one or more instructions of the operation o1226, for performance of the operation o1226 by an electrical circuitry arrangement as activated thereto, and/or otherwise fulfillment of the operation o1226. One or more non-transitory signal bearing physical media can bear the one or more instructions that when executed can direct performance of the operation o1226. Furthermore, monitoring operational aspects regarding electric vehicles of dwelling associates to receive electrical energy from a local electrical grid substation module m1226 depicted in FIG. 6-B as being included in the module m1224, when executed and/or activated, can direct performance of and/or perform the operation o1226. Illustratively, in one or more implementations, the operation o1226 can be carried out, for example, by monitoring operational aspects regarding at least in part one or more electric vehicles related at least in part to commuting aspects of the one or more dwelling associates (e.g., monitoring information including commute information such as residence location, work location, employment scheduling, or other errand information of one or more passengers associated with one or more drivers of the one or more electric vehicles, etc.) including monitoring operational aspects regarding at least in part the one or more electric vehicles of the one or more dwelling associates to receive electrical energy from a local electrical grid substation (e.g., monitoring information from a utility substation, a local solar panel, or a local wind generator associated with load sharing activity with other electrical energy consuming devices in addition to the electrical energy imparting stations, etc.).

In one or more implementations, as shown in FIG. 10-E, the operation o1224 can include operation o1227 for monitoring operational aspects regarding at least in part one or more electric vehicles related at least in part to commuting aspects of the one or more dwelling associates including monitoring operational aspects regarding at least in part actual recorded use compared with planned use of the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1227, for performance of the operation o1227 by an electrical circuitry arrangement as activated thereto, and/or otherwise fulfillment of the operation o1227. One or more non-transitory signal bearing physical media can bear the one or more instructions that when executed can direct performance of the operation o1227. Furthermore, monitoring operational aspects regarding actual recorded use compared with planned use of electric vehicles module m1227 depicted in FIG. 6-C as being included in the module m1224, when executed and/or activated, can direct performance of and/or perform the operation o1227. Illustratively, in one or more implementations, the operation o1227 can be carried out, for example, by monitoring operational aspects regarding at least in part one or more electric vehicles related at least in part to commuting aspects of the one or more dwelling associates (e.g., monitoring information including commute information such as residence location, work location, employment scheduling, or other errand information of one or more passengers associated with one or more drivers of the one or more electric vehicles, etc.) including monitoring operational aspects regarding at least in part actual recorded use compared with planned use of the one or more electric vehicles (e.g., monitoring information regarding itineraries posted prior to travel and comparing such with vehicle logs to determine discrepancies between planned activity and actual accomplished activities, etc.).

In one or more implementations, as shown in FIG. 10-E, the operation o1224 can include operation o1228 for monitoring operational aspects regarding at least in part one or more electric vehicles related at least in part to commuting aspects of the one or more dwelling associates including monitoring operational aspects regarding at least in part driving patterns of the one or more dwelling associates associated with the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1228, for performance of the operation o1228 by an electrical circuitry arrangement as activated thereto, and/or otherwise fulfillment of the operation o1228. One or more non-transitory signal bearing physical media can bear the one or more instructions that when executed can direct performance of the operation o1228. Furthermore, monitoring operational aspects regarding driving patterns of dwelling associates associated with electric vehicles module m1228 depicted in FIG. 6-C as being included in the module m1224, when executed and/or activated, can direct performance of and/or perform the operation o1228. Illustratively, in one or more implementations, the operation o1228 can be carried out, for example, by monitoring operational aspects regarding at least in part one or more electric vehicles related at least in part to commuting aspects of the one or more dwelling associates (e.g., monitoring information including commute information such as residence location, work location, employment scheduling, or other errand information of one or more passengers associated with one or more drivers of the one or more electric vehicles, etc.) including monitoring operational aspects regarding at least in part driving patterns of the one or more dwelling associates associated with the one or more electric vehicles (e.g., monitoring information regarding detours from planned routes, departures from compliance with driving rules or regulations, statistical data regarding frequency or duration of waits or stops, historical data regarding weight of loads transported, etc.).

In one or more implementations, as shown in FIG. 10-F, the operation o1224 can include operation o1229 for monitoring operational aspects regarding at least in part one or more electric vehicles related at least in part to commuting aspects of the one or more dwelling associates including monitoring operational aspects regarding at least in part one or more ride-sharing plans of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1229, for performance of the operation o1229 by an electrical circuitry arrangement as activated thereto, and/or otherwise fulfillment of the operation o1229. One or more non-transitory signal bearing physical media can bear the one or more instructions that when executed can direct performance of the operation o1229. Furthermore, monitoring operational aspects regarding ride-sharing plans of dwelling associates module m1229 depicted in FIG. 6-C as being included in the module m1224, when executed and/or activated, can direct performance of and/or perform the operation o1229. Illustratively, in one or more implementations, the operation o1229 can be carried out, for example, by monitoring operational aspects regarding at least in part one or more electric vehicles related at least in part to commuting aspects of the one or more dwelling associates (e.g., monitoring information including commute information such as residence location, work location, employment scheduling, or other errand information of one or more passengers associated with one or more drivers of the one or more electric vehicles, etc.) including monitoring operational aspects regarding at least in part one or more ride-sharing plans of the one or more dwelling associates (e.g., monitoring information regarding designated one or more car pool riders that frequent use of the one or more electric vehicles along with one or more designated drivers, etc.).

In one or more implementations, as shown in FIG. 10-F, the operation o1224 can include operation o1230 for monitoring operational aspects regarding at least in part one or more electric vehicles related at least in part to commuting aspects of the one or more dwelling associates including monitoring operational aspects regarding at least in part one or more priorities distributed among the one or more dwelling associates for use of the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1230, for performance of the operation o1230 by an electrical circuitry arrangement as activated thereto, and/or otherwise fulfillment of the operation o1230. One or more non-transitory signal bearing physical media can bear the one or more instructions that when executed can direct performance of the operation o1230. Furthermore, monitoring operational aspects regarding priorities distributed among dwelling associates for use of electric vehicles module m1230 depicted in FIG. 6-C as being included in the module m1224, when executed and/or activated, can direct performance of and/or perform the operation o1230. Illustratively, in one or more implementations, the operation o1230 can be carried out, for example, by monitoring operational aspects regarding at least in part one or more electric vehicles related at least in part to commuting aspects of the one or more dwelling associates (e.g., monitoring information including commute information such as residence location, work location, employment scheduling, or other errand information of one or more passengers associated with one or more drivers of the one or more electric vehicles, etc.) including monitoring operational aspects regarding at least in part one or more priorities distributed among the one or more dwelling associates for use of the one or more electric vehicles (e.g., monitoring information indicating how scheduling conflicts are generally resolved involving use of the one or more electric vehicles by a plurality of dwelling associates such that one or more rules of priority are generated for use in predicting future use of the one or more electric vehicles, etc.).

In one or more implementations, as shown in FIG. 10-F, the operation o1224 can include operation o1231 for monitoring operational aspects regarding at least in part one or more electric vehicles related at least in part to commuting aspects of the one or more dwelling associates including monitoring operational aspects regarding at least in part use of the one or more electric vehicles by one or more drivers before electrical energy storage charging of the one or more electric vehicles occurs after the one or more electric vehicles is driven by another driver. Origination of a physically tangible component group can be accomplished through skilled in the art design choice selection including use of one or more components and/or subsystems explicitly and/or implicitly referred to herein for at least in part implementing execution of one or more instructions of the operation o1231, for performance of the operation o1231 by an electrical circuitry arrangement as activated thereto, and/or otherwise fulfillment of the operation o1231. One or more non-transitory signal bearing physical media can bear the one or more instructions that when executed can direct performance of the operation o1231. Furthermore, monitoring operational aspects regarding use of electric vehicles by drivers before electrical energy storage charging of electric vehicles occurs after electric vehicles are driven by another driver module m1231 depicted in FIG. 6-C as being included in the module m1224, when executed and/or activated, can direct performance of and/or perform the operation o1231. Illustratively, in one or more implementations, the operation o1231 can be carried out, for example, by monitoring operational aspects regarding at least in part one or more electric vehicles related at least in part to commuting aspects of the one or more dwelling associates (e.g., monitoring information including commute information such as residence location, work location, employment scheduling, or other errand information of one or more passengers associated with one or more drivers of the one or more electric vehicles, etc.) including monitoring operational aspects regarding at least in part use of the one or more electric vehicles by one or more drivers before electrical energy storage charging of the one or more electric vehicles occurs after the one or more electric vehicles is driven by another driver (e.g., monitoring information regarding a first sets of uses to determine how the one or more electric vehicles may be used for a second set of uses before the one or more electric vehicles is charged for the second set of uses, etc.).

In one or more implementations, as shown in FIG. 10-F, the operation o1224 can include operation o1232 for monitoring operational aspects regarding at least in part one or more electric vehicles related at least in part to commuting aspects of the one or more dwelling associates including monitoring operational aspects as merged plans of multiple dwelling associates for the one or more electric vehicles for consecutive periods of use planned to occur before the one or more electric vehicles are returned to receive electrical energy storage charging. Origination of a physically tangible component group can be accomplished through skilled in the art design choice selection including use of one or more components and/or subsystems explicitly and/or implicitly referred to herein for at least in part implementing execution of one or more instructions of the operation o1232, for performance of the operation o1232 by an electrical circuitry arrangement as activated thereto, and/or otherwise fulfillment of the operation o1232. One or more non-transitory signal bearing physical media can bear the one or more instructions that when executed can direct performance of the operation o1232. Furthermore, monitoring operational aspects as merged plans of multiple dwelling associates for electric vehicles for consecutive periods of use planned to occur before electric vehicles are returned to receive electrical energy storage charging module m1232 depicted in FIG. 6-C as being included in the module m1224, when executed and/or activated, can direct performance of and/or perform the operation o1232. Illustratively, in one or more implementations, the operation o1232 can be carried out, for example, by monitoring operational aspects regarding at least in part one or more electric vehicles related at least in part to commuting aspects of the one or more dwelling associates (e.g., monitoring information including commute information such as residence location, work location, employment scheduling, or other errand information of one or more passengers associated with one or more drivers of the one or more electric vehicles, etc.) including monitoring operational aspects as merged plans of multiple dwelling associates for the one or more electric vehicles for consecutive periods of use planned to occur before the one or more electric vehicles are returned to receive electrical energy storage charging (e.g., monitoring information by extracting data from multiple calendars to generate a composite calendar for use in forecasting use of the one or more electric vehicles, etc.).

In one or more implementations, as shown in FIG. 10-G, the operation o1224 can include operation o1233 for monitoring operational aspects regarding at least in part one or more electric vehicles related at least in part to commuting aspects of the one or more dwelling associates including monitoring operational aspects associated with individual goals of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1233, for performance of the operation o1233 by an electrical circuitry arrangement as activated thereto, and/or otherwise fulfillment of the operation o1233. One or more non-transitory signal bearing physical media can bear the one or more instructions that when executed can direct performance of the operation o1233. Furthermore, monitoring operational aspects associated with individual goals of dwelling associates module m1233 depicted in FIG. 6-C as being included in the module m1224, when executed and/or activated, can direct performance of and/or perform the operation o1233. Illustratively, in one or more implementations, the operation o1233 can be carried out, for example, by monitoring operational aspects regarding at least in part one or more electric vehicles related at least in part to commuting aspects of the one or more dwelling associates (e.g., monitoring information including commute information such as residence location, work location, employment scheduling, or other errand information of one or more passengers associated with one or more drivers of the one or more electric vehicles, etc.) including monitoring operational aspects associated with individual goals of the one or more dwelling associates (e.g., monitoring information from one or more database implemented monetary goal-based incentive programs for dwelling associates to avail themselves of charging stations located in one or more parking garages on the vicinity of a dwelling of one or more dwelling associates of the one or more electric vehicles, etc.).

In one or more implementations, as shown in FIG. 10-G, the operation o1224 can include operation o1234 for monitoring operational aspects regarding at least in part one or more electric vehicles related at least in part to commuting aspects of the one or more dwelling associates including monitoring operational aspects associated with preferences of electric vehicle use of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1234, for performance of the operation o1234 by an electrical circuitry arrangement as activated thereto, and/or otherwise fulfillment of the operation o1234. One or more non-transitory signal bearing physical media can bear the one or more instructions that when executed can direct performance of the operation o1234. Furthermore, monitoring operational aspects associated with preferences of electric vehicle use of dwelling associates module m1234 depicted in FIG. 6-C as being included in the module m1224, when executed and/or activated, can direct performance of and/or perform the operation o1234. Illustratively, in one or more implementations, the operation o1234 can be carried out, for example, by monitoring operational aspects regarding at least in part one or more electric vehicles related at least in part to commuting aspects of the one or more dwelling associates (e.g., monitoring information including commute information such as residence location, work location, employment scheduling, or other errand information of one or more passengers associated with one or more drivers of the one or more electric vehicles, etc.) including monitoring operational aspects associated with preferences of electric vehicle use of the one or more dwelling associates (e.g., monitoring information regarding terms and conditions of contractually obligated benefits to be distributed to one or more dwelling associates concerning use of charging stations provided for charging of the one or more electric vehicles as used by the dwelling associate, the terms and conditions such as including total energy obtained for a designated period of time, frequency and amount of use of the one or more charging stations located at the employer, etc.).

In one or more implementations, as shown in FIG. 10-G, the operation o1224 can include operation o1235 for monitoring operational aspects regarding at least in part one or more electric vehicles related at least in part to commuting aspects of the one or more dwelling associates including monitoring operational aspects associated with one or more prioritized tasks of one or more work schedules of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1235, for performance of the operation o1235 by an electrical circuitry arrangement as activated thereto, and/or otherwise fulfillment of the operation o1235. One or more non-transitory signal bearing physical media can bear the one or more instructions that when executed can direct performance of the operation o1235. Furthermore, monitoring operational aspects associated with prioritized tasks of work schedules of dwelling associates module m1235 depicted in FIG. 6-C as being included in the module m1224, when executed and/or activated, can direct performance of and/or perform the operation o1235. Illustratively, in one or more implementations, the operation o1235 can be carried out, for example, by monitoring operational aspects regarding at least in part one or more electric vehicles related at least in part to commuting aspects of the one or more dwelling associates (e.g., monitoring information including commute information such as residence location, work location, employment scheduling, or other errand information of one or more passengers associated with one or more drivers of the one or more electric vehicles, etc.) including monitoring operational aspects associated with one or more prioritized tasks of one or more work schedules of the one or more dwelling associates (e.g., monitoring information regarding tasks associated involving scheduling documents such as pert, gannet, or other similar planning documents, etc.).

In one or more implementations, as shown in FIG. 10-G, the operation o1224 can include operation o1236 for monitoring operational aspects regarding at least in part one or more electric vehicles related at least in part to commuting aspects of the one or more dwelling associates including monitoring operational aspects regarding at least in part planned number of one or more dwelling associates as electric vehicle occupants to use the one or more electric vehicles before the one or more electric vehicles receive electrical energy storage charging. Origination of a physically tangible component group can be accomplished through skilled in the art design choice selection including use of one or more components and/or subsystems explicitly and/or implicitly referred to herein for at least in part implementing execution of one or more instructions of the operation o1236, for performance of the operation o1236 by an electrical circuitry arrangement as activated thereto, and/or otherwise fulfillment of the operation o1236. One or more non-transitory signal bearing physical media can bear the one or more instructions that when executed can direct performance of the operation o1236. Furthermore, monitoring operational aspects regarding planned number of dwelling associates as electric vehicle occupants to use electric vehicles before electric vehicles receive electrical energy storage charging module m1236 depicted in FIG. 6-C as being included in the module m1224, when executed and/or activated, can direct performance of and/or perform the operation o1236. Illustratively, in one or more implementations, the operation o1236 can be carried out, for example, by monitoring operational aspects regarding at least in part one or more electric vehicles related at least in part to commuting aspects of the one or more dwelling associates (e.g., monitoring information including commute information such as residence location, work location, employment scheduling, or other errand information of one or more passengers associated with one or more drivers of the one or more electric vehicles, etc.) including monitoring operational aspects regarding at least in part planned number of one or more dwelling associates as electric vehicle occupants to use the one or more electric vehicles before the one or more electric vehicles receive electrical energy storage charging (e.g., monitoring information regarding a number of dwelling associates per day that will be using a commonly shared electric vehicle over a course of one or more days based on reservation scheduling of the number of dwelling associates, etc.).

In one or more implementations, as shown in FIG. 10-H, the operation o12 can include operation o1237 for electronically processing status related intake associated at least in part with one or more electric vehicle recharging affairs for one or more electric vehicles by wireless electrical energy transfer affiliated at least in part with one or more dwelling associates of at least in part one or more dwelling related areas including monitoring operational aspects regarding at least in part features of the one or more electric vehicles indicated as of concern by the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1237, for performance of the operation o1237 by an electrical circuitry arrangement as activated thereto, and/or otherwise fulfillment of the operation o1237. One or more non-transitory signal bearing physical media can bear the one or more instructions that when executed can direct performance of the operation o1237. Furthermore, monitoring operational aspects regarding features of electric vehicles indicated as of concern by dwelling associates module m1237 depicted in FIG. 6-D as being included in the module m12, when executed and/or activated, can direct performance of and/or perform the operation o1237. Illustratively, in one or more implementations, the operation o1237 can be carried out, for example, by electronically processing (e.g., collecting, storing, annotating, accessing, retrieving, accumulating, monitoring, reporting, analyzing, summarizing, condensing, applying, etc.) status related intake (e.g., informational, projected, historical, performance, identification, organizational, background, affiliation, goal, milestone, accomplishment, detraction, objective, guideline, award, demerit, extra-curricular, etc.) associated at least in part (e.g., tangentially, directly, occasionally, temporarily, permanently, fully, partially, etc.) with one or more electric vehicle (e.g., all-electric, hybrid, gas-electric, diesel-electric, propane-electric, fuel-cell-electric, common-rail electric, car, truck, short distance, long distance, van, bus, cart, commercial, private, governmental, etc.) recharging (e.g., fast charge, slow trickle, low density, high density, recurrent, sporadic, ad hoc, predictive, total, partial, remedial, etc.) affairs (e.g., devices, mechanisms, procedures, structures, methods, countermeasures, plays, real, virtual, simulated, transitory, permanent, replacement, redundant, alternative, etc.) for one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) by wireless (e.g., electromagnetic resonance, short distance, long distance, high power, low power, static, dynamic, etc.) electrical energy (e.g., electrical energy stored or to be stored by such as battery, lead-acid, metal hydride, nickel-cadmium, chemical, solid state, capacitive, gaseous, compressed gas based, etc.) transfer (e.g., fast charge, slow trickle, low density, high density, recurrent, sporadic, ad hoc, predictive, total, partial, remedial, etc.) affiliated (e.g., tangentially, directly, indirectly, partially, fully, organizational, ethically, regionally, demographically, vocationally, generationally, educationally, politically, recreationally, etc.) at least in part with one or more dwelling (e.g., shelter, temporary, familial, residential, suburban, city, housing, high density, low density, singular, multiple, etc.) associates (e.g., habitating, lodging, occupying, visiting, touring, lounging, recreating, playing, working, studying, eating, owning, renting, leasing, contracting, retiring, sleeping, resting, reflecting, individual, group, corporate, governmental, civic, educational, volunteer, retired, candidate, temporary, permanent, driver, rider, occupant, maintainer, regular, occasional, ad hoc, commuter, pleasure, business, etc.) of at least in part one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, landscaped, palatial, in-town, uptown, downtown, penthouse, mansion, suburban, rural, family, shelter, rental, condominium, upscale, high-tech, modern, traditional, contemporary, classic, etc.) including monitoring operational aspects regarding at least in part features of the one or more electric vehicles indicated as of concern by the one or more dwelling associates (e.g., monitoring information regarding performance characteristics of the one or more electric vehicles including electrical energy storage capacity, electrical energy demand for representative driving cycles, electrical energy charging involving output rate, etc.).

In one or more implementations, as shown in FIG. 10-H, the operation o1237 can include operation o1238 for monitoring operational aspects regarding at least in part features of the one or more electric vehicles indicated as of concern by the one or more dwelling associates including monitoring operational aspects involving at least in part electric vehicle feature information regarding at least in part range of the one or more electric vehicles in an all-electric mode. Origination of a physically tangible component group can be accomplished through skilled in the art design choice selection including use of one or more components and/or subsystems explicitly and/or implicitly referred to herein for at least in part implementing execution of one or more instructions of the operation o1238, for performance of the operation o1238 by an electrical circuitry arrangement as activated thereto, and/or otherwise fulfillment of the operation o1238. One or more non-transitory signal bearing physical media can bear the one or more instructions that when executed can direct performance of the operation o1238. Furthermore, monitoring operational aspects involving electric vehicle feature information regarding range of electric vehicles in an all-electric mode module m1238 depicted in FIG. 6-D as being included in the module m1237, when executed and/or activated, can direct performance of and/or perform the operation o1238. Illustratively, in one or more implementations, the operation o1238 can be carried out, for example, by monitoring operational aspects regarding at least in part features of the one or more electric vehicles indicated as of concern by the one or more dwelling associates (e.g., monitoring information regarding performance characteristics of the one or more electric vehicles including electrical energy storage capacity, electrical energy demand for representative driving cycles, electrical energy charging involving output rate, etc.) including monitoring operational aspects involving at least in part electric vehicle feature information regarding at least in part range of the one or more electric vehicles in an all-electric mode (e.g., monitoring information regarding historical use records indicating actual range of the one or more electric vehicles for particular charge levels and routes of travel having various sets of conditions, etc.).

In one or more implementations, as shown in FIG. 10-H, the operation o1237 can include operation o1239 for monitoring operational aspects regarding at least in part features of the one or more electric vehicles indicated as of concern by the one or more dwelling associates including monitoring operational aspects involving at least in part electric vehicle feature information regarding at least in part range of the one or more electric vehicles in one or more hybrid electric-fuel modes. Origination of a physically tangible component group can be accomplished through skilled in the art design choice selection including use of one or more components and/or subsystems explicitly and/or implicitly referred to herein for at least in part implementing execution of one or more instructions of the operation o1239, for performance of the operation o1239 by an electrical circuitry arrangement as activated thereto, and/or otherwise fulfillment of the operation o1239. One or more non-transitory signal bearing physical media can bear the one or more instructions that when executed can direct performance of the operation o1239. Furthermore, monitoring operational aspects involving electric vehicle feature information regarding range of electric vehicles in hybrid electric-fuel modes module m1239 depicted in FIG. 6-D as being included in the module m1237, when executed and/or activated, can direct performance of and/or perform the operation o1239. Illustratively, in one or more implementations, the operation o1239 can be carried out, for example, by monitoring operational aspects regarding at least in part features of the one or more electric vehicles indicated as of concern by the one or more dwelling associates (e.g., monitoring information regarding performance characteristics of the one or more electric vehicles including electrical energy storage capacity, electrical energy demand for representative driving cycles, electrical energy charging involving output rate, etc.) including monitoring operational aspects involving at least in part electric vehicle feature information regarding at least in part range of the one or more electric vehicles in one or more hybrid electric-fuel modes (e.g., monitoring information regarding distance range capacity for liquid fuel such as gasoline, diesel, other hydrocarbon or hydrogen fuel and distance range capacity for electric mode for a number of varying ratios of fueled versus electric use, etc.).

In one or more implementations, as shown in FIG. 10-H, the operation o1237 can include operation o1240 for monitoring operational aspects regarding at least in part features of the one or more electric vehicles indicated as of concern by the one or more dwelling associates including monitoring operational aspects involving at least in part electric vehicle feature information regarding at least in part one or more maintenance schedules for the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1240, for performance of the operation o1240 by an electrical circuitry arrangement as activated thereto, and/or otherwise fulfillment of the operation o1240. One or more non-transitory signal bearing physical media can bear the one or more instructions that when executed can direct performance of the operation o1240. Furthermore, monitoring operational aspects involving electric vehicle feature information regarding maintenance schedules for electric vehicles module m1240 depicted in FIG. 6-D as being included in the module m1237, when executed and/or activated, can direct performance of and/or perform the operation o1240. Illustratively, in one or more implementations, the operation o1240 can be carried out, for example, by monitoring operational aspects regarding at least in part features of the one or more electric vehicles indicated as of concern by the one or more dwelling associates (e.g., monitoring information regarding performance characteristics of the one or more electric vehicles including electrical energy storage capacity, electrical energy demand for representative driving cycles, electrical energy charging involving output rate, etc.) including monitoring operational aspects involving at least in part electric vehicle feature information regarding at least in part one or more maintenance schedules for the one or more electric vehicles (e.g., monitoring information regarding quality of maintenance performed to determine possible future unavailability or other performance issues regarding the one or more electric vehicles including those that may affect reliability of charging the one or more electric vehicles, etc.).

In one or more implementations, as shown in FIG. 10-H, the operation o1237 can include operation o1241 for monitoring operational aspects regarding at least in part features of the one or more electric vehicles indicated as of concern by the one or more dwelling associates including monitoring operational aspects involving at least in part electric vehicle feature information regarding at least in part fueling capacity of the one or more electric vehicles as one or more hybrid electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1241, for performance of the operation o1241 by an electrical circuitry arrangement as activated thereto, and/or otherwise fulfillment of the operation o1241. One or more non-transitory signal bearing physical media can bear the one or more instructions that when executed can direct performance of the operation o1241. Furthermore, monitoring operational aspects involving electric vehicle feature information regarding fueling capacity of electric vehicles as hybrid electric vehicles module m1241 depicted in FIG. 6-D as being included in the module m1237, when executed and/or activated, can direct performance of and/or perform the operation o1241. Illustratively, in one or more implementations, the operation o1241 can be carried out, for example, by monitoring operational aspects regarding at least in part features of the one or more electric vehicles indicated as of concern by the one or more dwelling associates (e.g., monitoring information regarding performance characteristics of the one or more electric vehicles including electrical energy storage capacity, electrical energy demand for representative driving cycles, electrical energy charging involving output rate, etc.) including monitoring operational aspects involving at least in part electric vehicle feature information regarding at least in part fueling capacity of the one or more electric vehicles as one or more hybrid electric vehicles (e.g., monitoring information regarding range of the one or more electric vehicles in a non-electric mode in relation to location of electric charging stations found along a desired route for the one or more electric vehicles, etc.).

In one or more implementations, as shown in FIG. 10-I, the operation o1237 can include operation o1242 for monitoring operational aspects regarding at least in part features of the one or more electric vehicles indicated as of concern by the one or more dwelling associates including monitoring operational aspects involving at least in part electric vehicle feature information regarding at least in part specifications of one or more another electric vehicles other than the one or more electric vehicles, the one or more another electric vehicles involved with plans to receive wireless electrical energy transfer from electrical equipment shared with the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1242, for performance of the operation o1242 by an electrical circuitry arrangement as activated thereto, and/or otherwise fulfillment of the operation o1242. One or more non-transitory signal bearing physical media can bear the one or more instructions that when executed can direct performance of the operation o1242. Furthermore, monitoring operational aspects involving electric vehicle feature information regarding specifications of another electric vehicles other than electric vehicles, another electric vehicles involved with plans to receive wireless electrical energy transfer from electrical equipment shared with electric vehicles module m1242 depicted in FIG. 6-D as being included in the module m1237, when executed and/or activated, can direct performance of and/or perform the operation o1242. Illustratively, in one or more implementations, the operation o1242 can be carried out, for example, by monitoring operational aspects regarding at least in part features of the one or more electric vehicles indicated as of concern by the one or more dwelling associates (e.g., monitoring information regarding performance characteristics of the one or more electric vehicles including electrical energy storage capacity, electrical energy demand for representative driving cycles, electrical energy charging involving output rate, etc.) including monitoring operational aspects involving at least in part electric vehicle feature information regarding at least in part specifications of one or more another electric vehicles other than the one or more electric vehicles, the one or more another electric vehicles involved with plans to receive wireless electrical energy transfer from electrical equipment shared with the one or more electric vehicles (e.g., monitoring information regarding another electric vehicle such as length of time to charge the other electric vehicle to a certain capacity to determine availability of charging equipment for the one or more electric vehicles, etc.).

In one or more implementations, as shown in FIG. 10-I, the operation o1237 can include operation o1243 for monitoring operational aspects regarding at least in part features of the one or more electric vehicles indicated as of concern by the one or more dwelling associates including monitoring operational aspects involving at least in part electric vehicle feature information regarding at least in part the one or more electric vehicles as one or more all-electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1243, for performance of the operation o1243 by an electrical circuitry arrangement as activated thereto, and/or otherwise fulfillment of the operation o1243. One or more non-transitory signal bearing physical media can bear the one or more instructions that when executed can direct performance of the operation o1243. Furthermore, monitoring operational aspects involving electric vehicle feature information regarding electric vehicles as all-electric vehicles module m1243 depicted in FIG. 6-D as being included in the module m1237, when executed and/or activated, can direct performance of and/or perform the operation o1243. Illustratively, in one or more implementations, the operation o1243 can be carried out, for example, by monitoring operational aspects regarding at least in part features of the one or more electric vehicles indicated as of concern by the one or more dwelling associates (e.g., monitoring information regarding performance characteristics of the one or more electric vehicles including electrical energy storage capacity, electrical energy demand for representative driving cycles, electrical energy charging involving output rate, etc.) including monitoring operational aspects involving at least in part electric vehicle feature information regarding at least in part the one or more electric vehicles as one or more all-electric vehicles (e.g., monitoring information regarding charging capacity, length of time to charge, maximum distance available for a particular charge level and driving condition, etc.).

In one or more implementations, as shown in FIG. 10-I, the operation o1237 can include operation o1244 for monitoring operational aspects regarding at least in part features of the one or more electric vehicles indicated as of concern by the one or more dwelling associates including monitoring operational aspects involving at least in part electric vehicle feature information regarding at least in part the one or more electric vehicles as one or more hybrid-electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1244, for performance of the operation o1244 by an electrical circuitry arrangement as activated thereto, and/or otherwise fulfillment of the operation o1244. One or more non-transitory signal bearing physical media can bear the one or more instructions that when executed can direct performance of the operation o1244. Furthermore, monitoring operational aspects involving electric vehicle feature information regarding electric vehicles as hybrid-electric vehicles module m1244 depicted in FIG. 6-D as being included in the module m1237, when executed and/or activated, can direct performance of and/or perform the operation o1244. Illustratively, in one or more implementations, the operation o1244 can be carried out, for example, by monitoring operational aspects regarding at least in part features of the one or more electric vehicles indicated as of concern by the one or more dwelling associates (e.g., monitoring information regarding performance characteristics of the one or more electric vehicles including electrical energy storage capacity, electrical energy demand for representative driving cycles, electrical energy charging involving output rate, etc.) including monitoring operational aspects involving at least in part electric vehicle feature information regarding at least in part the one or more electric vehicles as one or more hybrid-electric vehicles (e.g., monitoring information regarding maximum distance available for an amount of fuel available for the vehicle given particular driving characteristics, etc.).

In one or more implementations, as shown in FIG. 10-I, the operation o1237 can include operation o1245 for monitoring operational aspects regarding at least in part features of the one or more electric vehicles indicated as of concern by the one or more dwelling associates including monitoring operational aspects involving at least in part electric vehicle feature information regarding at least in part the one or more electric vehicles including one or more wireless electrical energy transfer devices to receive electrical energy storage charging involving at least in part field magnetic resonance induction. Origination of a physically tangible component group can be accomplished through skilled in the art design choice selection including use of one or more components and/or subsystems explicitly and/or implicitly referred to herein for at least in part implementing execution of one or more instructions of the operation o1245, for performance of the operation o1245 by an electrical circuitry arrangement as activated thereto, and/or otherwise fulfillment of the operation o1245. One or more non-transitory signal bearing physical media can bear the one or more instructions that when executed can direct performance of the operation o1245. Furthermore, monitoring operational aspects involving electric vehicle feature information regarding electric vehicles including wireless electrical energy transfer devices to receive electrical energy storage charging involving field magnetic resonance induction module m1245 depicted in FIG. 6-D as being included in the module m1237, when executed and/or activated, can direct performance of and/or perform the operation o1245. Illustratively, in one or more implementations, the operation o1245 can be carried out, for example, by monitoring operational aspects regarding at least in part features of the one or more electric vehicles indicated as of concern by the one or more dwelling associates (e.g., monitoring information regarding performance characteristics of the one or more electric vehicles including electrical energy storage capacity, electrical energy demand for representative driving cycles, electrical energy charging involving output rate, etc.) including monitoring operational aspects involving at least in part electric vehicle feature information regarding at least in part the one or more electric vehicles including one or more wireless electrical energy transfer devices to receive electrical energy storage charging involving at least in part field magnetic resonance induction (e.g., monitoring information regarding planned electromagnetic frequency profiles describing when certain frequencies will be used in wireless electrical energy transfer, etc.).

In one or more implementations, as shown in FIG. 10-J, the operation o1237 can include operation o1246 for monitoring operational aspects regarding at least in part features of the one or more electric vehicles indicated as of concern by the one or more dwelling associates including monitoring operational aspects involving at least in part electric vehicle feature information regarding at least in part the one or more electric vehicles including one or more wireless electrical energy transfer devices to receive electrical energy storage charging involving at least in part highly resonant inductive wireless power transfer. Origination of a physically tangible component group can be accomplished through skilled in the art design choice selection including use of one or more components and/or subsystems explicitly and/or implicitly referred to herein for at least in part implementing execution of one or more instructions of the operation o1246, for performance of the operation o1246 by an electrical circuitry arrangement as activated thereto, and/or otherwise fulfillment of the operation o1246. One or more non-transitory signal bearing physical media can bear the one or more instructions that when executed can direct performance of the operation o1246. Furthermore, monitoring operational aspects involving electric vehicle feature information regarding electric vehicles including wireless electrical energy transfer devices to receive electrical energy storage charging involving highly resonant inductive wireless power transfer module m1246 depicted in FIG. 6-E as being included in the module m1237, when executed and/or activated, can direct performance of and/or perform the operation o1246. Illustratively, in one or more implementations, the operation o1246 can be carried out, for example, by monitoring operational aspects regarding at least in part features of the one or more electric vehicles indicated as of concern by the one or more dwelling associates (e.g., monitoring information regarding performance characteristics of the one or more electric vehicles including electrical energy storage capacity, electrical energy demand for representative driving cycles, electrical energy charging involving output rate, etc.) including monitoring operational aspects involving at least in part electric vehicle feature information regarding at least in part the one or more electric vehicles including one or more wireless electrical energy transfer devices to receive electrical energy storage charging involving at least in part highly resonant inductive wireless power transfer (e.g., monitoring information regarding electrical energy storage charging rate and transfer scheduling for a planned wireless electrical energy transfer of the one or more electric vehicles, etc.).

In one or more implementations, as shown in FIG. 10-J, the operation o1237 can include operation o1247 for monitoring operational aspects regarding at least in part features of the one or more electric vehicles indicated as of concern by the one or more dwelling associates including monitoring operational aspects involving at least in part electric vehicle feature information regarding at least in part the one or more electric vehicles including one or more wireless electrical energy transfer devices to receive electrical energy storage charging involving at least in part wireless capacitive charging. Origination of a physically tangible component group can be accomplished through skilled in the art design choice selection including use of one or more components and/or subsystems explicitly and/or implicitly referred to herein for at least in part implementing execution of one or more instructions of the operation o1247, for performance of the operation o1247 by an electrical circuitry arrangement as activated thereto, and/or otherwise fulfillment of the operation o1247. One or more non-transitory signal bearing physical media can bear the one or more instructions that when executed can direct performance of the operation o1247. Furthermore, monitoring operational aspects involving electric vehicle feature information regarding electric vehicles including wireless electrical energy transfer devices to receive electrical energy storage charging involving wireless capacitive charging module m1247 depicted in FIG. 6-E as being included in the module m1237, when executed and/or activated, can direct performance of and/or perform the operation o1247. Illustratively, in one or more implementations, the operation o1247 can be carried out, for example, by monitoring operational aspects regarding at least in part features of the one or more electric vehicles indicated as of concern by the one or more dwelling associates (e.g., monitoring information regarding performance characteristics of the one or more electric vehicles including electrical energy storage capacity, electrical energy demand for representative driving cycles, electrical energy charging involving output rate, etc.) including monitoring operational aspects involving at least in part electric vehicle feature information regarding at least in part the one or more electric vehicles including one or more wireless electrical energy transfer devices to receive electrical energy storage charging involving at least in part wireless capacitive charging (e.g., monitoring information regarding electrical energy storage charging rate and capacity of charging over a planned charging duration for wireless electrical energy transfer of the one or more electric vehicles, etc.).

In one or more implementations, as shown in FIG. 10-J, the operation o1237 can include operation o1248 for monitoring operational aspects regarding at least in part features of the one or more electric vehicles indicated as of concern by the one or more dwelling associates including monitoring operational aspects regarding at least in part one or more electric vehicle features associated with input by the one or more dwelling associates including monitoring operational aspects involving at least in part tracking electric vehicle feature information regarding at least in part the one or more electric vehicles including one or more electrical energy storage devices. Origination of a physically tangible component group can be accomplished through skilled in the art design choice selection including use of one or more components and/or subsystems explicitly and/or implicitly referred to herein for at least in part implementing execution of one or more instructions of the operation o1248, for performance of the operation o1248 by an electrical circuitry arrangement as activated thereto, and/or otherwise fulfillment of the operation o1248. One or more non-transitory signal bearing physical media can bear the one or more instructions that when executed can direct performance of the operation o1248. Furthermore, monitoring operational aspects regarding electric vehicle features associated with input by dwelling associates including monitoring operational aspects involving tracking electric vehicle feature information regarding electric vehicles including electrical energy storage devices module m1248 depicted in FIG. 6-E as being included in the module m1237, when executed and/or activated, can direct performance of and/or perform the operation o1248. Illustratively, in one or more implementations, the operation o1248 can be carried out, for example, by monitoring operational aspects regarding at least in part features of the one or more electric vehicles indicated as of concern by the one or more dwelling associates (e.g., monitoring information regarding performance characteristics of the one or more electric vehicles including electrical energy storage capacity, electrical energy demand for representative driving cycles, electrical energy charging involving output rate, etc.) including monitoring operational aspects regarding at least in part one or more electric vehicle features associated with input by the one or more dwelling associates including monitoring operational aspects involving at least in part tracking electric vehicle feature information regarding at least in part the one or more electric vehicles including one or more electrical energy storage devices (e.g., monitoring information regarding current total electrical energy capacity of electrical batteries onboard the one or more electric vehicles currently capable of receiving wireless electrical energy, etc.).

In one or more implementations, as shown in FIG. 10-K, the operation o1248 can include operation o1249 for monitoring operational aspects regarding at least in part one or more electric vehicle features associated with input by the one or more dwelling associates including monitoring operational aspects involving at least in part tracking electric vehicle feature information regarding at least in part the one or more electric vehicles including one or more electrical energy storage devices including monitoring operational aspects involving at least in part electric vehicle feature information regarding at least in part the one or more electric vehicles including electrical energy storage as capacitive electrical energy storage devices. Origination of a physically tangible component group can be accomplished through skilled in the art design choice selection including use of one or more components and/or subsystems explicitly and/or implicitly referred to herein for at least in part implementing execution of one or more instructions of the operation o1249, for performance of the operation o1249 by an electrical circuitry arrangement as activated thereto, and/or otherwise fulfillment of the operation o1249. One or more non-transitory signal bearing physical media can bear the one or more instructions that when executed can direct performance of the operation o1249. Furthermore, monitoring operational aspects involving electric vehicle feature information regarding electric vehicles including electrical energy storage as capacitive electrical energy storage devices module m1249 depicted in FIG. 6-E as being included in the module m1248, when executed and/or activated, can direct performance of and/or perform the operation o1249. Illustratively, in one or more implementations, the operation o1249 can be carried out, for example, by monitoring operational aspects regarding at least in part one or more electric vehicle features associated with input by the one or more dwelling associates including monitoring operational aspects involving at least in part tracking electric vehicle feature information regarding at least in part the one or more electric vehicles including one or more electrical energy storage devices (e.g., monitoring information regarding current total electrical energy capacity of electrical batteries onboard the one or more electric vehicles currently capable of receiving wireless electrical energy, etc.) including monitoring operational aspects involving at least in part electric vehicle feature information regarding at least in part the one or more electric vehicles including electrical energy storage as capacitive electrical energy storage devices (e.g., monitoring information regarding charging rate for the capacitive electrical energy storage devices at their current level of electrical charge, etc.).

In one or more implementations, as shown in FIG. 10-K, the operation o1248 can include operation o1250 for monitoring operational aspects regarding at least in part one or more electric vehicle features associated with input by the one or more dwelling associates including monitoring operational aspects involving at least in part tracking electric vehicle feature information regarding at least in part the one or more electric vehicles including one or more electrical energy storage devices including monitoring operational aspects involving at least in part tracking electric vehicle feature information regarding at least in part the one or more electric vehicles including electrical energy storage as lithium ion, lead acid, or nickel cadmium electrical energy storage devices. Origination of a physically tangible component group can be accomplished through skilled in the art design choice selection including use of one or more components and/or subsystems explicitly and/or implicitly referred to herein for at least in part implementing execution of one or more instructions of the operation o1250, for performance of the operation o1250 by an electrical circuitry arrangement as activated thereto, and/or otherwise fulfillment of the operation o1250. One or more non-transitory signal bearing physical media can bear the one or more instructions that when executed can direct performance of the operation o1250. Furthermore, monitoring operational aspects involving tracking electric vehicle feature information regarding electric vehicles including electrical energy storage as lithium ion, lead acid, or nickel cadmium electrical energy storage devices module m1250 depicted in FIG. 6-E as being included in the module m1248, when executed and/or activated, can direct performance of and/or perform the operation o1250. Illustratively, in one or more implementations, the operation o1250 can be carried out, for example, by monitoring operational aspects regarding at least in part one or more electric vehicle features associated with input by the one or more dwelling associates including monitoring operational aspects involving at least in part tracking electric vehicle feature information regarding at least in part the one or more electric vehicles including one or more electrical energy storage devices (e.g., monitoring information regarding current total electrical energy capacity of electrical batteries onboard the one or more electric vehicles currently capable of receiving wireless electrical energy, etc.) including monitoring operational aspects involving at least in part tracking electric vehicle feature information regarding at least in part the one or more electric vehicles including electrical energy storage as lithium ion, lead acid, or nickel cadmium electrical energy storage devices (e.g., monitoring information regarding age of storage devices, replacement plans for the storage devices including expiration dates, recall notices, upgrade plans, etc.).

In one or more implementations, as shown in FIG. 10-K, the operation o1248 can include operation o1251 for monitoring operational aspects regarding at least in part one or more electric vehicle features associated with input by the one or more dwelling associates including monitoring operational aspects involving at least in part tracking electric vehicle feature information regarding at least in part the one or more electric vehicles including one or more electrical energy storage devices including monitoring operational aspects involving at least in part electric vehicle feature information regarding at least in part the one or more electric vehicles including storage life aspects of electrical energy storage. Origination of a physically tangible component group can be accomplished through skilled in the art design choice selection including use of one or more components and/or subsystems explicitly and/or implicitly referred to herein for at least in part implementing execution of one or more instructions of the operation o1251, for performance of the operation o1251 by an electrical circuitry arrangement as activated thereto, and/or otherwise fulfillment of the operation o1251. One or more non-transitory signal bearing physical media can bear the one or more instructions that when executed can direct performance of the operation o1251. Furthermore, monitoring operational aspects involving electric vehicle feature information regarding electric vehicles including storage life aspects of electrical energy storage module m1251 depicted in FIG. 6-E as being included in the module m1248, when executed and/or activated, can direct performance of and/or perform the operation o1251. Illustratively, in one or more implementations, the operation o1251 can be carried out, for example, by monitoring operational aspects regarding at least in part one or more electric vehicle features associated with input by the one or more dwelling associates including monitoring operational aspects involving at least in part tracking electric vehicle feature information regarding at least in part the one or more electric vehicles including one or more electrical energy storage devices (e.g., monitoring information regarding current total electrical energy capacity of electrical batteries onboard the one or more electric vehicles currently capable of receiving wireless electrical energy, etc.) including monitoring operational aspects involving at least in part electric vehicle feature information regarding at least in part the one or more electric vehicles including storage life aspects of electrical energy storage (e.g., monitoring information regarding historical data for charging of the batteries onboard the one or more electric vehicles to determine reliability and actual present energy capacity of the batteries, etc.).

In one or more implementations, as shown in FIG. 10-L, the operation o1237 can include operation o1252 for monitoring operational aspects regarding at least in part features of the one or more electric vehicles indicated as of concern by the one or more dwelling associates including monitoring operational aspects regarding at least in part one or more dwelling associate preferences of location for energy transfer to the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1252, for performance of the operation o1252 by an electrical circuitry arrangement as activated thereto, and/or otherwise fulfillment of the operation o1252. One or more non-transitory signal bearing physical media can bear the one or more instructions that when executed can direct performance of the operation o1252. Furthermore, monitoring operational aspects regarding dwelling associate preferences of location for energy transfer to electric vehicles module m1252 depicted in FIG. 6-E as being included in the module m1237, when executed and/or activated, can direct performance of and/or perform the operation o1252. Illustratively, in one or more implementations, the operation o1252 can be carried out, for example, by monitoring operational aspects regarding at least in part features of the one or more electric vehicles indicated as of concern by the one or more dwelling associates (e.g., monitoring information regarding performance characteristics of the one or more electric vehicles including electrical energy storage capacity, electrical energy demand for representative driving cycles, electrical energy charging involving output rate, etc.)

including monitoring operational aspects regarding at least in part one or more dwelling associate preferences of location for energy transfer to the one or more electric vehicles (e.g., monitoring information regarding one or more locations that the one or more dwelling associates historically charge the one or more electric vehicles as to frequency of use of each location and any patterns of use for the one or more chargers at the locations, etc.).

In one or more implementations, as shown in FIG. 10-L, the operation o1252 can include operation o1253 for monitoring operational aspects regarding at least in part one or more dwelling associate preferences of location for energy transfer to the one or more electric vehicles including monitoring operational aspects involving at least in part one or more dwelling associate preferences of location other than one or more destination locations of one or more dwelling associate occupants of the one or more electric vehicles to include subsequent electrical energy storage charging of the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1253, for performance of the operation o1253 by an electrical circuitry arrangement as activated thereto, and/or otherwise fulfillment of the operation o1253. One or more non-transitory signal bearing physical media can bear the one or more instructions that when executed can direct performance of the operation o1253. Furthermore, monitoring operational aspects involving dwelling associate preferences of location other than destination locations of dwelling associate occupants of electric vehicles to include subsequent electrical energy storage charging of electric vehicles module m1253 depicted in FIG. 6-E as being included in the module m1252, when executed and/or activated, can direct performance of and/or perform the operation o1253. Illustratively, in one or more implementations, the operation o1253 can be carried out, for example, by monitoring operational aspects regarding at least in part one or more dwelling associate preferences of location for energy transfer to the one or more electric vehicles (e.g., monitoring information regarding one or more locations that the one or more dwelling associates historically charge the one or more electric vehicles as to frequency of use of each location and any patterns of use for the one or more chargers at the locations, etc.) including monitoring operational aspects involving at least in part one or more dwelling associate preferences of location other than one or more destination locations of one or more dwelling associate occupants of the one or more electric vehicles to include subsequent electrical energy storage charging of the one or more electric vehicles (e.g., monitoring information regarding prioritized location information for charging the one or more electric vehicles by the one or more dwelling associates as associated with planned future use of the one or more electric vehicles, etc.).

In one or more implementations, as shown in FIG. 10-L, the operation o1252 can include operation o1254 for monitoring operational aspects regarding at least in part one or more dwelling associate preferences of location for energy transfer to the one or more electric vehicles including monitoring operational aspects involving at least in part one or more dwelling associate preferences of location for electrical energy storage charging of the one or more electric vehicles at one or more locations of vocational employ of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1254, for performance of the operation o1254 by an electrical circuitry arrangement as activated thereto, and/or otherwise fulfillment of the operation o1254. One or more non-transitory signal bearing physical media can bear the one or more instructions that when executed can direct performance of the operation o1254. Furthermore, monitoring operational aspects involving dwelling associate preferences of location for electrical energy storage charging of electric vehicles at locations of vocational employ of dwelling associates module m1254 depicted in FIG. 6-F as being included in the module m1252, when executed and/or activated, can direct performance of and/or perform the operation o1254. Illustratively, in one or more implementations, the operation o1254 can be carried out, for example, by monitoring operational aspects regarding at least in part one or more dwelling associate preferences of location for energy transfer to the one or more electric vehicles (e.g., monitoring information regarding one or more locations that the one or more dwelling associates historically charge the one or more electric vehicles as to frequency of use of each location and any patterns of use for the one or more chargers at the locations, etc.) including monitoring operational aspects involving at least in part one or more dwelling associate preferences of location for electrical energy storage charging of the one or more electric vehicles at one or more locations of vocational employ of the one or more dwelling associates (e.g., monitoring information regarding employment locations for charging of the one or more electric vehicles such as degree of availability of charging stations, quality of equipment, capacity of equipment, any payment or reimbursement issues with particular charging locations associated with place of employ, etc.).

In one or more implementations, as shown in FIG. 10-L, the operation o1252 can include operation o1255 for monitoring operational aspects regarding at least in part one or more dwelling associate preferences of location for energy transfer to the one or more electric vehicles including monitoring operational aspects involving at least in part one or more dwelling associate preferences of location for electrical energy storage charging of the one or more electric vehicles at one or more locations on one or more planned routes of travel of the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1255, for performance of the operation o1255 by an electrical circuitry arrangement as activated thereto, and/or otherwise fulfillment of the operation o1255. One or more non-transitory signal bearing physical media can bear the one or more instructions that when executed can direct performance of the operation o1255. Furthermore, monitoring operational aspects involving dwelling associate preferences of location for electrical energy storage charging of electric vehicles at locations on planned routes of travel of electric vehicles module m1255 depicted in FIG. 6-F as being included in the module m1252, when executed and/or activated, can direct performance of and/or perform the operation o1255. Illustratively, in one or more implementations, the operation o1255 can be carried out, for example, by monitoring operational aspects regarding at least in part one or more dwelling associate preferences of location for energy transfer to the one or more electric vehicles (e.g., monitoring information regarding one or more locations that the one or more dwelling associates historically charge the one or more electric vehicles as to frequency of use of each location and any patterns of use for the one or more chargers at the locations, etc.) including monitoring operational aspects involving at least in part one or more dwelling associate preferences of location for electrical energy storage charging of the one or more electric vehicles at one or more locations on one or more planned routes of travel of the one or more electric vehicles (e.g., monitoring information regarding charging stations for the one or more electric vehicles in terms of integration of particular charging stations with itinerary of planned or otherwise future travel of the one or more electric vehicles regarding timing associated itinerary, scheduling of other electric vehicle using charging stations, ability of charging station to accommodate charging of the one or more electric vehicles involved with the anticipated itinerary, etc.).

In one or more implementations, as shown in FIG. 10-M, the operation o1252 can include operation o1256 for monitoring operational aspects regarding at least in part one or more dwelling associate preferences of location for energy transfer to the one or more electric vehicles including monitoring operational aspects involving at least in part one or more dwelling associate preferences of location for electrical charging of the one or more electric vehicles at one or more garage locations for housing the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1256, for performance of the operation o1256 by an electrical circuitry arrangement as activated thereto, and/or otherwise fulfillment of the operation o1256. One or more non-transitory signal bearing physical media can bear the one or more instructions that when executed can direct performance of the operation o1256. Furthermore, monitoring operational aspects involving dwelling associate preferences of location for electrical charging of electric vehicles at garage locations for housing electric vehicles module m1256 depicted in FIG. 6-F as being included in the module m1252, when executed and/or activated, can direct performance of and/or perform the operation o1256. Illustratively, in one or more implementations, the operation o1256 can be carried out, for example, by monitoring operational aspects regarding at least in part one or more dwelling associate preferences of location for energy transfer to the one or more electric vehicles (e.g., monitoring information regarding one or more locations that the one or more dwelling associates historically charge the one or more electric vehicles as to frequency of use of each location and any patterns of use for the one or more chargers at the locations, etc.) including monitoring operational aspects involving at least in part one or more dwelling associate preferences of location for electrical charging of the one or more electric vehicles at one or more garage locations for housing the one or more electric vehicles (e.g., monitoring information regarding frequency, duration, capacity, scheduling, conflicts with other electric vehicles as to historical or anticipated use of the one or more charging stations suited for the one or more electric vehicles at the garage locations that can house the one or more electric vehicles, etc.).

In one or more implementations, as shown in FIG. 10-M, the operation o1252 can include operation o1257 for monitoring operational aspects regarding at least in part one or more dwelling associate preferences of location for energy transfer to the one or more electric vehicles including monitoring operational aspects involving at least in part one or more dwelling associate preferences of location for electrical energy storage charging of the one or more electric vehicles at one or more park and ride locations for parking the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1257, for performance of the operation o1257 by an electrical circuitry arrangement as activated thereto, and/or otherwise fulfillment of the operation o1257. One or more non-transitory signal bearing physical media can bear the one or more instructions that when executed can direct performance of the operation o1257. Furthermore, monitoring operational aspects involving dwelling associate preferences of location for electrical energy storage charging of electric vehicles at park and ride locations for parking electric vehicles module m1257 depicted in FIG. 6-F as being included in the module m1252, when executed and/or activated, can direct performance of and/or perform the operation o1257. Illustratively, in one or more implementations, the operation o1257 can be carried out, for example, by monitoring operational aspects regarding at least in part one or more dwelling associate preferences of location for energy transfer to the one or more electric vehicles (e.g., monitoring information regarding one or more locations that the one or more dwelling associates historically charge the one or more electric vehicles as to frequency of use of each location and any patterns of use for the one or more chargers at the locations, etc.) including monitoring operational aspects involving at least in part one or more dwelling associate preferences of location for electrical energy storage charging of the one or more electric vehicles at one or more park and ride locations for parking the one or more electric vehicles (e.g., monitoring information regarding percentage of vehicle charge is satisfactory to be accomplished at any particular location, amount of time desired as buffer to accommodate changes in scheduling or unanticipated events in schedule for each parking location, etc.).

In one or more implementations, as shown in FIG. 10-M, the operation o1252 can include operation o1258 for monitoring operational aspects regarding at least in part one or more dwelling associate preferences of location for energy transfer to the one or more electric vehicles including monitoring operational aspects involving at least in part one or more dwelling associate preferences of location for electrical charging of the one or more electric vehicles at one or more parking lot locations for parking the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1258, for performance of the operation o1258 by an electrical circuitry arrangement as activated thereto, and/or otherwise fulfillment of the operation o1258. One or more non-transitory signal bearing physical media can bear the one or more instructions that when executed can direct performance of the operation o1258. Furthermore, monitoring operational aspects involving dwelling associate preferences of location for electrical charging of electric vehicles at parking lot locations for parking electric vehicles module m1258 depicted in FIG. 6-F as being included in the module m1252, when executed and/or activated, can direct performance of and/or perform the operation o1258. Illustratively, in one or more implementations, the operation o1258 can be carried out, for example, by monitoring operational aspects regarding at least in part one or more dwelling associate preferences of location for energy transfer to the one or more electric vehicles (e.g., monitoring information regarding one or more locations that the one or more dwelling associates historically charge the one or more electric vehicles as to frequency of use of each location and any patterns of use for the one or more chargers at the locations, etc.) including monitoring operational aspects involving at least in part one or more dwelling associate preferences of location for electrical charging of the one or more electric vehicles at one or more parking lot locations for parking the one or more electric vehicles (e.g., monitoring information regarding access to one or more electrical charging stations located at the one or more parking locations in association with planned or otherwise potential use of the one or more electric vehicles of the charging stations including availability and potential conflicting issues such as crowding of the parking lots and compatibility of charging equipment found in the parking lots found with the one or more electric vehicles, etc.).

In one or more implementations, as shown in FIG. 10-N, the operation o1252 can include operation o1259 for monitoring operational aspects regarding at least in part one or more dwelling associate preferences of location for energy transfer to the one or more electric vehicles including monitoring operational aspects involving at least in part one or more dwelling associate preferences of location for electrical charging of the one or more electric vehicles at one or more parking garage locations for parking the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1259, for performance of the operation o1259 by an electrical circuitry arrangement as activated thereto, and/or otherwise fulfillment of the operation o1259. One or more non-transitory signal bearing physical media can bear the one or more instructions that when executed can direct performance of the operation o1259. Furthermore, monitoring operational aspects involving dwelling associate preferences of location for electrical charging of electric vehicles at parking garage locations for parking electric vehicles module m1259 depicted in FIG. 6-F as being included in the module m1252, when executed and/or activated, can direct performance of and/or perform the operation o1259. Illustratively, in one or more implementations, the operation o1259 can be carried out, for example, by monitoring operational aspects regarding at least in part one or more dwelling associate preferences of location for energy transfer to the one or more electric vehicles (e.g., monitoring information regarding one or more locations that the one or more dwelling associates historically charge the one or more electric vehicles as to frequency of use of each location and any patterns of use for the one or more chargers at the locations, etc.) including monitoring operational aspects involving at least in part one or more dwelling associate preferences of location for electrical charging of the one or more electric vehicles at one or more parking garage locations for parking the one or more electric vehicles (e.g., monitoring information including type of vehicle repair performed at the garage locations associated with impact to accessibility and otherwise use of the charging stations found at the garage locations, etc.).

In one or more implementations, as shown in FIG. 10-N, the operation o1252 can include operation o1260 for monitoring operational aspects regarding at least in part one or more dwelling associate preferences of location for energy transfer to the one or more electric vehicles including monitoring operational aspects involving at least in part one or more dwelling associate preferences of location for non-electrical energy transfer to the one or more electric vehicles as a hybrid-electric vehicle at one or more non-electric re-fueling station locations. Origination of a physically tangible component group can be accomplished through skilled in the art design choice selection including use of one or more components and/or subsystems explicitly and/or implicitly referred to herein for at least in part implementing execution of one or more instructions of the operation o1260, for performance of the operation o1260 by an electrical circuitry arrangement as activated thereto, and/or otherwise fulfillment of the operation o1260. One or more non-transitory signal bearing physical media can bear the one or more instructions that when executed can direct performance of the operation o1260. Furthermore, monitoring operational aspects involving dwelling associate preferences of location for non-electrical energy transfer to electric vehicles as a hybrid-electric vehicle at non-electric re-fueling station locations module m1260 depicted in FIG. 6-F as being included in the module m1252, when executed and/or activated, can direct performance of and/or perform the operation o1260. Illustratively, in one or more implementations, the operation o1260 can be carried out, for example, by monitoring operational aspects regarding at least in part one or more dwelling associate preferences of location for energy transfer to the one or more electric vehicles (e.g., monitoring information regarding one or more locations that the one or more dwelling associates historically charge the one or more electric vehicles as to frequency of use of each location and any patterns of use for the one or more chargers at the locations, etc.) including monitoring operational aspects involving at least in part one or more dwelling associate preferences of location for non-electrical energy transfer to the one or more electric vehicles as a hybrid-electric vehicle at one or more non-electric re-fueling station locations (e.g., monitoring information regarding type of fuel grade, price range, brand loyalty, fuel additives available, etc.).

In one or more implementations, as shown in FIG. 10-N, the operation o1252 can include operation o1261 for monitoring operational aspects regarding at least in part one or more dwelling associate preferences of location for energy transfer to the one or more electric vehicles including monitoring operational aspects involving at least in part one or more dwelling associate preferences of location for electrical charging of the one or more electric vehicles at one or more static charging locations along one or more routes of travel of the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1261, for performance of the operation o1261 by an electrical circuitry arrangement as activated thereto, and/or otherwise fulfillment of the operation o1261. One or more non-transitory signal bearing physical media can bear the one or more instructions that when executed can direct performance of the operation o1261. Furthermore, monitoring operational aspects involving dwelling associate preferences of location for electrical charging of electric vehicles at static charging locations along routes of travel of electric vehicles module m1261 depicted in FIG. 6-F as being included in the module m1252, when executed and/or activated, can direct performance of and/or perform the operation o1261. Illustratively, in one or more implementations, the operation o1261 can be carried out, for example, by monitoring operational aspects regarding at least in part one or more dwelling associate preferences of location for energy transfer to the one or more electric vehicles (e.g., monitoring information regarding one or more locations that the one or more dwelling associates historically charge the one or more electric vehicles as to frequency of use of each location and any patterns of use for the one or more chargers at the locations, etc.) including monitoring operational aspects involving at least in part one or more dwelling associate preferences of location for electrical charging of the one or more electric vehicles at one or more static charging locations along one or more routes of travel of the one or more electric vehicles (e.g., monitoring information regarding location, charging rates, or equipment compatibility regarding charging stations located at traffic signals, locations of heavy traffic congestion, locations where vehicles wait temporarily for relatively brief periods or other locations where electric vehicle charging stations are located to provide intermittent charging along a route of travel for relatively short periods of time such as for less than a minute to a few minutes or tens of minutes, etc.).

In one or more implementations, as shown in FIG. 10-O, the operation o1252 can include operation o1262 for monitoring operational aspects regarding at least in part one or more dwelling associate preferences of location for energy transfer to the one or more electric vehicles including monitoring operational aspects involving at least in part one or more dwelling associate preferences of location for electrical charging of the one or more electric vehicles based at least in part on historical or predicted availability of wireless electrical energy transfer provided by one or more organizations employing one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1262, for performance of the operation o1262 by an electrical circuitry arrangement as activated thereto, and/or otherwise fulfillment of the operation o1262. One or more non-transitory signal bearing physical media can bear the one or more instructions that when executed can direct performance of the operation o1262. Furthermore, monitoring operational aspects involving dwelling associate preferences of location for electrical charging of electric vehicles based on historical or predicted availability of wireless electrical energy transfer provided by organizations employing dwelling associates module m1262 depicted in FIG. 6-G as being included in the module m1252, when executed and/or activated, can direct performance of and/or perform the operation o1262. Illustratively, in one or more implementations, the operation o1262 can be carried out, for example, by monitoring operational aspects regarding at least in part one or more dwelling associate preferences of location for energy transfer to the one or more electric vehicles (e.g., monitoring information regarding one or more locations that the one or more dwelling associates historically charge the one or more electric vehicles as to frequency of use of each location and any patterns of use for the one or more chargers at the locations, etc.) including monitoring operational aspects involving at least in part one or more dwelling associate preferences of location for electrical charging of the one or more electric vehicles based at least in part on historical or predicted availability of wireless electrical energy transfer provided by one or more organizations employing one or more dwelling associates (e.g., monitoring information regarding capacity, availability, equipment type of electric vehicle charging stations that are potentially available for charging of the one or more electric vehicles for short or long duration charging dependent upon how drivers or passengers of vehicle are associated with each other in use of the one or more electric vehicles such as whether the one or more electric vehicles is shared concurrently or serially, etc.).

In one or more implementations, as shown in FIG. 10-O, the operation o1252 can include operation o1263 for monitoring operational aspects regarding at least in part one or more dwelling associate preferences of location for energy transfer to the one or more electric vehicles including monitoring operational aspects involving at least in part one or more dwelling associate preferences of location for electrical energy storage charging of the one or more electric vehicles at one or more locations for mechanical maintenance of the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1263, for performance of the operation o1263 by an electrical circuitry arrangement as activated thereto, and/or otherwise fulfillment of the operation o1263. One or more non-transitory signal bearing physical media can bear the one or more instructions that when executed can direct performance of the operation o1263. Furthermore, monitoring operational aspects involving dwelling associate preferences of location for electrical energy storage charging of electric vehicles at locations for mechanical maintenance of electric vehicles module m1263 depicted in FIG. 6-G as being included in the module m1252, when executed and/or activated, can direct performance of and/or perform the operation o1263. Illustratively, in one or more implementations, the operation o1263 can be carried out, for example, by monitoring operational aspects regarding at least in part one or more dwelling associate preferences of location for energy transfer to the one or more electric vehicles (e.g., monitoring information regarding one or more locations that the one or more dwelling associates historically charge the one or more electric vehicles as to frequency of use of each location and any patterns of use for the one or more chargers at the locations, etc.) including monitoring operational aspects involving at least in part one or more dwelling associate preferences of location for electrical energy storage charging of the one or more electric vehicles at one or more locations for mechanical maintenance of the one or more electric vehicles (e.g., monitoring information involving amount of time to factor into delays in repairs or unexpected events regarding the repairs to allow for additional charging, etc.).

In one or more implementations, as shown in FIG. 10-O, the operation o1252 can include operation o1264 for monitoring operational aspects regarding at least in part one or more dwelling associate preferences of location for energy transfer to the one or more electric vehicles including monitoring operational aspects involving at least in part one or more dwelling associate preferences for one or more fuels used to re-fuel the one or more electric vehicles as one or more hybrid electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1264, for performance of the operation o1264 by an electrical circuitry arrangement as activated thereto, and/or otherwise fulfillment of the operation o1264. One or more non-transitory signal bearing physical media can bear the one or more instructions that when executed can direct performance of the operation o1264. Furthermore, monitoring operational aspects involving dwelling associate preferences for fuels used to re-fuel electric vehicles as hybrid electric vehicles module m1264 depicted in FIG. 6-G as being included in the module m1252, when executed and/or activated, can direct performance of and/or perform the operation o1264. Illustratively, in one or more implementations, the operation o1264 can be carried out, for example, by monitoring operational aspects regarding at least in part one or more dwelling associate preferences of location for energy transfer to the one or more electric vehicles (e.g., monitoring information regarding one or more locations that the one or more dwelling associates historically charge the one or more electric vehicles as to frequency of use of each location and any patterns of use for the one or more chargers at the locations, etc.) including monitoring operational aspects involving at least in part one or more dwelling associate preferences for one or more fuels used to re-fuel the one or more electric vehicles as one or more hybrid electric vehicles (e.g., monitoring information regarding price, quality, additional ingredients such as cleansing agents, acceptable contaminant levels or other parameters regarding the fuels, etc.).

In one or more implementations, as shown in FIG. 10-P, the operation o1252 can include operation o1265 for monitoring operational aspects regarding at least in part one or more dwelling associate preferences of location for energy transfer to the one or more electric vehicles including monitoring operational aspects involving at least in part one or more dwelling associate preferences for contingency plans for unplanned unavailability to the one or more electric vehicles of wireless electrical energy transfer. Origination of a physically tangible component group can be accomplished through skilled in the art design choice selection including use of one or more components and/or subsystems explicitly and/or implicitly referred to herein for at least in part implementing execution of one or more instructions of the operation o1265, for performance of the operation o1265 by an electrical circuitry arrangement as activated thereto, and/or otherwise fulfillment of the operation o1265. One or more non-transitory signal bearing physical media can bear the one or more instructions that when executed can direct performance of the operation o1265. Furthermore, monitoring operational aspects involving dwelling associate preferences for contingency plans for unplanned unavailability to electric vehicles of wireless electrical energy transfer module m1265 depicted in FIG. 6-G as being included in the module m1252, when executed and/or activated, can direct performance of and/or perform the operation o1265. Illustratively, in one or more implementations, the operation o1265 can be carried out, for example, by monitoring operational aspects regarding at least in part one or more dwelling associate preferences of location for energy transfer to the one or more electric vehicles (e.g., monitoring information regarding one or more locations that the one or more dwelling associates historically charge the one or more electric vehicles as to frequency of use of each location and any patterns of use for the one or more chargers at the locations, etc.) including monitoring operational aspects involving at least in part one or more dwelling associate preferences for contingency plans for unplanned unavailability to the one or more electric vehicles of wireless electrical energy transfer (e.g., monitoring information regarding alternative routes that can be taken, additional time available by the one or more electric vehicles dwelling associate for travel, other modes of transportation available to the one or more electric vehicles dwelling associate, etc.).

In one or more implementations, as shown in FIG. 11-A, the operation o13 can include operation o1301 for electronically ascertaining dwelling related wireless recharging guidance for recharging of the one or more electric vehicles by the wireless electrical energy transfer affiliated at least in part with the one or more dwelling associates of at least in part the one or more dwelling related areas based at least in part upon at least a portion of the status related intake associated at least in part with the one or more electric vehicle recharging affairs for one or more electric vehicles by wireless electrical energy transfer affiliated at least in part with the one or more dwelling associates of at least in part the one or more dwelling related areas and based at least in part upon at least a portion of the operational aspects at least in part affecting influence between the one or more electric vehicles and the one or more dwelling associates of at least in part the one or more dwelling related areas including ascertaining dwelling related wireless recharging guidance involving at least in part one or more locations of wireless electrical energy transfer. Origination of a physically tangible component group can be accomplished through skilled in the art design choice selection including use of one or more components and/or subsystems explicitly and/or implicitly referred to herein for at least in part implementing execution of one or more instructions of the operation o1301, for performance of the operation o1301 by an electrical circuitry arrangement as activated thereto, and/or otherwise fulfillment of the operation o1301. One or more non-transitory signal bearing physical media can bear the one or more instructions that when executed can direct performance of the operation o1301. Furthermore, ascertaining dwelling related wireless recharging guidance involving locations of wireless electrical energy transfer module m1301 depicted in FIG. 7-A as being included in the module m13, when executed and/or activated, can direct performance of and/or perform the operation o1301. Illustratively, in one or more implementations, the operation o1301 can be carried out, for example, by electronically ascertaining (e.g., determining, judging, comparing, noting, sorting, classifying, categorizing, indexing, reviewing, assessing, addressing, identifying, assembling, etc.) dwelling (e.g., shelter, temporary, familial, residential, suburban, city, housing, high density, low density, singular, multiple, etc.) related (e.g., tangentially, directly, occasionally, temporarily, permanently, fully, partially, etc.) wireless (e.g., electromagnetic resonance, short distance, long distance, high power, low power, static, dynamic, etc.) recharging (e.g., fast charge, slow trickle, low density, high density, recurrent, sporadic, ad hoc, predictive, total, partial, remedial, etc.) guidance (e.g., mandatory, instructional, suggestive, advisory, cautionary, encouragement, congratulatory, rewarding, maintaining, warning, reactionary, optimistic, proactive, supplemental, etc.) for recharging (e.g., fast charge, slow trickle, low density, high density, recurrent, sporadic, ad hoc, predictive, total, partial, remedial, etc.) of the one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) by the wireless (e.g., electromagnetic resonance, short distance, long distance, high power, low power, static, dynamic, etc.) electrical energy (e.g., electrical energy stored or to be stored by such as battery, lead-acid, metal hydride, nickel-cadmium, chemical, solid state, capacitive, gaseous, compressed gas based, etc.) transfer (e.g., fast charge, slow trickle, low density, high density, recurrent, sporadic, ad hoc, predictive, total, partial, remedial, etc.) affiliated (e.g., tangentially, directly, indirectly, partially, fully, organizational, ethically, regionally, demographically, vocationally, generationally, educationally, politically, recreationally, etc.) at least in part with the one or more dwelling (e.g., shelter, temporary, familial, residential, suburban, city, housing, high density, low density, singular, multiple, etc.) associates (e.g., habitating, lodging, occupying, visiting, touring, lounging, recreating, playing, working, studying, eating, owning, renting, leasing, contracting, retiring, sleeping, resting, reflecting, individual, group, corporate, governmental, civic, educational, volunteer, retired, candidate, temporary, permanent, driver, rider, occupant, maintainer, regular, occasional, ad hoc, commuter, pleasure, business, etc.) of at least in part the one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, landscaped, palatial, in-town, uptown, downtown, penthouse, mansion, suburban, rural, family, shelter, rental, condominium, upscale, high-tech, modern, traditional, contemporary, classic, etc.) based at least in part upon (e.g., directly, derived, indirectly, assumed, presumed, anticipated, predicted, concluded, deductive, inductive, conjecture, experiential, theoretical, historical, prophetic, etc.) at least a portion (e.g., limiting, exclusionary, inclusionary, encompassing, limited, surpassing, macroscopic, microscopic, singular, multitude, etc.) of the status related intake (e.g., informational, projected, historical, performance, identification, organizational, background, affiliation, goal, milestone, accomplishment, detraction, objective, guideline, award, demerit, extra-curricular, etc.) associated at least in part (e.g., tangentially, directly, occasionally, temporarily, permanently, fully, partially, etc.) with the one or more electric vehicle (e.g., all-electric, hybrid, gas-electric, diesel-electric, propane-electric, fuel-cell-electric, common-rail electric, car, truck, short distance, long distance, van, bus, cart, commercial, private, governmental, etc.) recharging (e.g., fast charge, slow trickle, low density, high density, recurrent, sporadic, ad hoc, predictive, total, partial, remedial, etc.) affairs (e.g., devices, mechanisms, procedures, structures, methods, countermeasures, plays, real, virtual, simulated, transitory, permanent, replacement, redundant, alternative, etc.) for one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) by wireless (e.g., electromagnetic resonance, short distance, long distance, high power, low power, static, dynamic, etc.) electrical energy (e.g., electrical energy stored or to be stored by such as battery, lead-acid, metal hydride, nickel-cadmium, chemical, solid state, capacitive, gaseous, compressed gas based, etc.) transfer (e.g., fast charge, slow trickle, low density, high density, recurrent, sporadic, ad hoc, predictive, total, partial, remedial, etc.) affiliated (e.g., tangentially, directly, indirectly, partially, fully, organizational, ethically, regionally, demographically, vocationally, generationally, educationally, politically, recreationally, etc.) at least in part with the one or more dwelling (e.g., shelter, temporary, familial, residential, suburban, city, housing, high density, low density, singular, multiple, etc.) associates (e.g., habitating, lodging, occupying, visiting, touring, lounging, recreating, playing, working, studying, eating, owning, renting, leasing, contracting, retiring, sleeping, resting, reflecting, individual, group, corporate, governmental, civic, educational, volunteer, retired, candidate, temporary, permanent, driver, rider, occupant, maintainer, regular, occasional, ad hoc, commuter, pleasure, business, etc.) of at least in part the one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, landscaped, palatial, in-town, uptown, downtown, penthouse, mansion, suburban, rural, family, shelter, rental, condominium, upscale, high-tech, modern, traditional, contemporary, classic, etc.) and based at least in part upon (e.g., directly, derived, indirectly, assumed, presumed, anticipated, predicted, concluded, deductive, inductive, conjecture, experiential, theoretical, historical, prophetic, etc.) at least a portion of the operational (e.g., drivable, maintainable, inventorial, storable, allocatable, reliable, usable, plannable, deterministic, predictable, functional, etc.) aspects (e.g., factors, contributory, foundational, direct, indirect, regular, sporadic, considerations, secondary, tertiary, etc.) at least in part affecting (e.g., tangentially, directly, occasionally, temporarily, permanently, fully, partially, etc.) influence (e.g., plan, reliance, replacement, use cycling, maintenance, allocation, cooperative, sharing, affordability, budgeting, provision, temporary, on-going, occasional, daily, use of by, etc.) between the one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) and the one or more dwelling (e.g., shelter, temporary, familial, residential, suburban, city, housing, high density, low density, singular, multiple, etc.) associates (e.g., individual, group, corporate, governmental, civic, educational, volunteer, retired, candidate, temporary, permanent, driver, rider, occupant, maintainer, regular, occasional, ad hoc, commuter, pleasure, business, etc.) of at least in part the one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, palatial, in-town, up-town, down-town, penthouse, mansion, suburban, rural, family, shelter, rental, condominium, up-scale, high-tech, modern, traditional, contemporary, classic, etc.) including ascertaining dwelling related wireless recharging guidance involving at least in part one or more locations of wireless electrical energy transfer (e.g., ascertaining guidance information to electrical energy storage charging stations as associated with a planned or estimated itinerary for the one or more electric vehicles, etc.).

In one or more implementations, as shown in FIG. 11-A, the operation o1301 can include operation o1302 for ascertaining dwelling related wireless recharging guidance involving at least in part one or more locations of wireless electrical energy transfer including ascertaining dwelling related wireless recharging guidance involving at least in part one or more electric vehicles present at one or more dwelling locations of wireless electrical energy transfer. Origination of a physically tangible component group can be accomplished through skilled in the art design choice selection including use of one or more components and/or subsystems explicitly and/or implicitly referred to herein for at least in part implementing execution of one or more instructions of the operation o1302, for performance of the operation o1302 by an electrical circuitry arrangement as activated thereto, and/or otherwise fulfillment of the operation o1302. One or more non-transitory signal bearing physical media can bear the one or more instructions that when executed can direct performance of the operation o1302. Furthermore, ascertaining dwelling related wireless recharging guidance involving electric vehicles present at dwelling locations of wireless electrical energy transfer module m1302 depicted in FIG. 7-A as being included in the module m1301, when executed and/or activated, can direct performance of and/or perform the operation o1302. Illustratively, in one or more implementations, the operation o1302 can be carried out, for example, by ascertaining dwelling related wireless recharging guidance involving at least in part one or more locations of wireless electrical energy transfer (e.g., ascertaining guidance information to electrical energy storage charging stations as associated with a planned or estimated itinerary for the one or more electric vehicles, etc.) including ascertaining dwelling related wireless recharging guidance involving at least in part one or more electric vehicles present at one or more dwelling locations of wireless electrical energy transfer (e.g., ascertaining guidance information regarding length of charging time available, maximum charging rate available, etc. of charging locations in a dwelling garage, etc.).

In one or more implementations, as shown in FIG. 11-A, the operation o1301 can include operation o1303 for ascertaining dwelling related wireless recharging guidance involving at least in part one or more locations of wireless electrical energy transfer including ascertaining dwelling related wireless recharging guidance based at least in part on identification and verification of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1303, for performance of the operation o1303 by an electrical circuitry arrangement as activated thereto, and/or otherwise fulfillment of the operation o1303. One or more non-transitory signal bearing physical media can bear the one or more instructions that when executed can direct performance of the operation o1303. Furthermore, ascertaining dwelling related wireless recharging guidance based on identification and verification of dwelling associates module m1303 depicted in FIG. 7-A as being included in the module m1301, when executed and/or activated, can direct performance of and/or perform the operation o1303. Illustratively, in one or more implementations, the operation o1303 can be carried out, for example, by ascertaining dwelling related wireless recharging guidance involving at least in part one or more locations of wireless electrical energy transfer (e.g., ascertaining guidance information to electrical energy storage charging stations as associated with a planned or estimated itinerary for the one or more electric vehicles, etc.) including ascertaining dwelling related wireless recharging guidance based at least in part on identification and verification of the one or more dwelling associates (e.g., ascertaining guidance related to driver's license information, tax identification information, dwelling identification information, etc. of the one or more dwelling associates, etc.).

In one or more implementations, as shown in FIG. 11-A, the operation o1301 can include operation o1304 for ascertaining dwelling related wireless recharging guidance involving at least in part one or more locations of wireless electrical energy transfer including ascertaining dwelling related wireless recharging guidance regarding at least in part verification of selection of wireless electrical energy transfer for the one or more electrical vehicles. Origination of a physically tangible component group can be accomplished through skilled in the art design choice selection including use of one or more components and/or subsystems explicitly and/or implicitly referred to herein for at least in part implementing execution of one or more instructions of the operation o1304, for performance of the operation o1304 by an electrical circuitry arrangement as activated thereto, and/or otherwise fulfillment of the operation o1304. One or more non-transitory signal bearing physical media can bear the one or more instructions that when executed can direct performance of the operation o1304. Furthermore, ascertaining dwelling related wireless recharging guidance regarding verification of selection of wireless electrical energy transfer for electrical vehicles module m1304 depicted in FIG. 7-A as being included in the module m1301, when executed and/or activated, can direct performance of and/or perform the operation o1304. Illustratively, in one or more implementations, the operation o1304 can be carried out, for example, by ascertaining dwelling related wireless recharging guidance involving at least in part one or more locations of wireless electrical energy transfer (e.g., ascertaining guidance information to electrical energy storage charging stations as associated with a planned or estimated itinerary for the one or more electric vehicles, etc.) including ascertaining dwelling related wireless recharging guidance regarding at least in part verification of selection of wireless electrical energy transfer for the one or more electrical vehicles (e.g., ascertaining guidance information regarding dwelling associate identification, electric utility consumer identification, industrial electric dwelling associate identification, banking identification, electric consumer club identification, etc.).

In one or more implementations, as shown in FIG. 11-B, the operation o1301 can include operation o1305 for ascertaining dwelling related wireless recharging guidance involving at least in part one or more locations of wireless electrical energy transfer including ascertaining dwelling related wireless recharging guidance regarding at least in part financial status information for one or more dwelling associate accounts of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1305, for performance of the operation o1305 by an electrical circuitry arrangement as activated thereto, and/or otherwise fulfillment of the operation o1305. One or more non-transitory signal bearing physical media can bear the one or more instructions that when executed can direct performance of the operation o1305. Furthermore, ascertaining dwelling related wireless recharging guidance regarding financial status information for dwelling associate accounts of dwelling associates module m1305 depicted in FIG. 7-A as being included in the module m1301, when executed and/or activated, can direct performance of and/or perform the operation o1305. Illustratively, in one or more implementations, the operation o1305 can be carried out, for example, by ascertaining dwelling related wireless recharging guidance involving at least in part one or more locations of wireless electrical energy transfer (e.g., ascertaining guidance information to electrical energy storage charging stations as associated with a planned or estimated itinerary for the one or more electric vehicles, etc.) including ascertaining dwelling related wireless recharging guidance regarding at least in part financial status information for one or more dwelling associate accounts of the one or more dwelling associates (e.g., ascertaining guidance information regarding banking information, credit information, security information, coupon information, credit information, reimbursement information, payment plan information, dwelling associate benefit information, etc.).

In one or more implementations, as shown in FIG. 11-B, the operation o1301 can include operation o1306 for ascertaining dwelling related wireless recharging guidance involving at least in part one or more locations of wireless electrical energy transfer including ascertaining dwelling related wireless recharging guidance based at least in part on charging rate capacity of wireless electrical energy transfer. Origination of a physically tangible component group can be accomplished through skilled in the art design choice selection including use of one or more components and/or subsystems explicitly and/or implicitly referred to herein for at least in part implementing execution of one or more instructions of the operation o1306, for performance of the operation o1306 by an electrical circuitry arrangement as activated thereto, and/or otherwise fulfillment of the operation o1306. One or more non-transitory signal bearing physical media can bear the one or more instructions that when executed can direct performance of the operation o1306. Furthermore, ascertaining dwelling related wireless recharging guidance based on charging rate capacity of wireless electrical energy transfer module m1306 depicted in FIG. 7-A as being included in the module m1301, when executed and/or activated, can direct performance of and/or perform the operation o1306. Illustratively, in one or more implementations, the operation o1306 can be carried out, for example, by ascertaining dwelling related wireless recharging guidance involving at least in part one or more locations of wireless electrical energy transfer (e.g., ascertaining guidance information to electrical energy storage charging stations as associated with a planned or estimated itinerary for the one or more electric vehicles, etc.) including ascertaining dwelling related wireless recharging guidance based at least in part on charging rate capacity of wireless electrical energy transfer (e.g., ascertaining guidance information regarding steady state transfer rates, peak transfer rates, burst transfer rates, historical, estimated, or planned brownout or blackout conditions, etc.).

In one or more implementations, as shown in FIG. 11-B, the operation o1301 can include operation o1307 for ascertaining dwelling related wireless recharging guidance involving at least in part one or more locations of wireless electrical energy transfer including ascertaining dwelling related wireless recharging guidance involving at least in part electrical charging rate for one or more electrical energy storage devices of the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1307, for performance of the operation o1307 by an electrical circuitry arrangement as activated thereto, and/or otherwise fulfillment of the operation o1307. One or more non-transitory signal bearing physical media can bear the one or more instructions that when executed can direct performance of the operation o1307. Furthermore, ascertaining dwelling related wireless recharging guidance involving electrical charging rate for electrical energy storage devices of electric vehicles module m1307 depicted in FIG. 7-A as being included in the module m1301, when executed and/or activated, can direct performance of and/or perform the operation o1307. Illustratively, in one or more implementations, the operation o1307 can be carried out, for example, by ascertaining dwelling related wireless recharging guidance involving at least in part one or more locations of wireless electrical energy transfer (e.g., ascertaining guidance information to electrical energy storage charging stations as associated with a planned or estimated itinerary for the one or more electric vehicles, etc.) including ascertaining dwelling related wireless recharging guidance involving at least in part electrical charging rate for one or more electrical energy storage devices of the one or more electric vehicles (e.g., ascertaining guidance information regarding historical, planned, or estimated charging capacity, off-line cycling, downtime for maintenance, availability due to demand of the one or more electric vehicles, etc.).

In one or more implementations, as shown in FIG. 11-B, the operation o1301 can include operation o1308 for ascertaining dwelling related wireless recharging guidance involving at least in part one or more locations of wireless electrical energy transfer including ascertaining dwelling related wireless recharging guidance concerning at least in part use planning for the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1308, for performance of the operation o1308 by an electrical circuitry arrangement as activated thereto, and/or otherwise fulfillment of the operation o1308. One or more non-transitory signal bearing physical media can bear the one or more instructions that when executed can direct performance of the operation o1308. Furthermore, ascertaining dwelling related wireless recharging guidance concerning use planning for electric vehicles module m1308 depicted in FIG. 7-A as being included in the module m1301, when executed and/or activated, can direct performance of and/or perform the operation o1308. Illustratively, in one or more implementations, the operation o1308 can be carried out, for example, by ascertaining dwelling related wireless recharging guidance involving at least in part one or more locations of wireless electrical energy transfer (e.g., ascertaining guidance information to electrical energy storage charging stations as associated with a planned or estimated itinerary for the one or more electric vehicles, etc.) including ascertaining dwelling related wireless recharging guidance concerning at least in part use planning for the one or more electric vehicles (e.g., ascertaining guidance information associated with reliability of information collection, variability of statistical veracity of the data collected, population spectrum for data samples collected, etc.).

In one or more implementations, as shown in FIG. 11-B, the operation o1301 can include operation o1309 for ascertaining dwelling related wireless recharging guidance involving at least in part one or more locations of wireless electrical energy transfer including ascertaining dwelling related wireless recharging guidance involving at least in part amount of time the one or more electric vehicles are available for wireless electrical energy transfer. Origination of a physically tangible component group can be accomplished through skilled in the art design choice selection including use of one or more components and/or subsystems explicitly and/or implicitly referred to herein for at least in part implementing execution of one or more instructions of the operation o1309, for performance of the operation o1309 by an electrical circuitry arrangement as activated thereto, and/or otherwise fulfillment of the operation o1309. One or more non-transitory signal bearing physical media can bear the one or more instructions that when executed can direct performance of the operation o1309. Furthermore, ascertaining dwelling related wireless recharging guidance involving amount of time electric vehicles are available for wireless electrical energy transfer module m1309 depicted in FIG. 7-A as being included in the module m1301, when executed and/or activated, can direct performance of and/or perform the operation o1309. Illustratively, in one or more implementations, the operation o1309 can be carried out, for example, by ascertaining dwelling related wireless recharging guidance involving at least in part one or more locations of wireless electrical energy transfer (e.g., ascertaining guidance information to electrical energy storage charging stations as associated with a planned or estimated itinerary for the one or more electric vehicles, etc.) including ascertaining dwelling related wireless recharging guidance involving at least in part amount of time the one or more electric vehicles are available for wireless electrical energy transfer (e.g., ascertaining guidance information regarding historical, planned, or estimated availability of electric vehicle for charging by one or more electrical energy storage charging stations based on historical, planned, or estimated one or more itineraries of travel associated with the one or more electric vehicles, etc.).

In one or more implementations, as shown in FIG. 11-C, the operation o1301 can include operation o1310 for ascertaining dwelling related wireless recharging guidance involving at least in part one or more locations of wireless electrical energy transfer including ascertaining dwelling related wireless recharging guidance involving at least in part amount of electrical energy available to be transferred to the one or more electric vehicles in a designated period of time by wireless electrical energy transfer. Origination of a physically tangible component group can be accomplished through skilled in the art design choice selection including use of one or more components and/or subsystems explicitly and/or implicitly referred to herein for at least in part implementing execution of one or more instructions of the operation o1310, for performance of the operation o1310 by an electrical circuitry arrangement as activated thereto, and/or otherwise fulfillment of the operation o1310. One or more non-transitory signal bearing physical media can bear the one or more instructions that when executed can direct performance of the operation o1310. Furthermore, ascertaining dwelling related wireless recharging guidance involving amount of electrical energy available to be transferred to electric vehicles in a designated period of time by wireless electrical energy transfer module m1310 depicted in FIG. 7-A as being included in the module m1301, when executed and/or activated, can direct performance of and/or perform the operation o1310. Illustratively, in one or more implementations, the operation o1310 can be carried out, for example, by ascertaining dwelling related wireless recharging guidance involving at least in part one or more locations of wireless electrical energy transfer (e.g., ascertaining guidance information to electrical energy storage charging stations as associated with a planned or estimated itinerary for the one or more electric vehicles, etc.) including ascertaining dwelling related wireless recharging guidance involving at least in part amount of electrical energy available to be transferred to the one or more electric vehicles in a designated period of time by wireless electrical energy transfer (e.g., ascertaining information as to preferred safety margins to provide an additional percentage of charge over the minimum required to accomplish a given itinerary for each of the one or more electrical energy storage charging stations, etc.).

In one or more implementations, as shown in FIG. 11-C, the operation o1301 can include operation o1311 for ascertaining dwelling related wireless recharging guidance involving at least in part one or more locations of wireless electrical energy transfer including ascertaining dwelling related wireless recharging guidance involving at least in part approval of electric vehicle use profile of the one or more dwelling associates. Origination of a physically tangible component group can be accomplished through skilled in the art design choice selection including use of one or more components and/or subsystems explicitly and/or implicitly referred to herein for at least in part implementing execution of one or more instructions of the operation o1311, for performance of the operation o1311 by an electrical circuitry arrangement as activated thereto, and/or otherwise fulfillment of the operation o1311. One or more non-transitory signal bearing physical media can bear the one or more instructions that when executed can direct performance of the operation o1311. Furthermore, ascertaining dwelling related wireless recharging guidance involving approval of electric vehicle use profile of dwelling associates module m1311 depicted in FIG. 7-B as being included in the module m1301, when executed and/or activated, can direct performance of and/or perform the operation o1311. Illustratively, in one or more implementations, the operation o1311 can be carried out, for example, by ascertaining dwelling related wireless recharging guidance involving at least in part one or more locations of wireless electrical energy transfer (e.g., ascertaining guidance information to electrical energy storage charging stations as associated with a planned or estimated itinerary for the one or more electric vehicles, etc.) including ascertaining dwelling related wireless recharging guidance involving at least in part approval of electric vehicle use profile of the one or more dwelling associates (e.g., ascertaining guidance information regarding general demographic, consumer oriented shopping detail, employment work history, financial data, historical itinerary information, etc.).

In one or more implementations, as shown in FIG. 11-C, the operation o1301 can include operation o1312 for ascertaining dwelling related wireless recharging guidance involving at least in part one or more locations of wireless electrical energy transfer including ascertaining dwelling related wireless recharging guidance involving at least in part impact from planned wireless electrical energy transfer schedule to itinerary and route information associated with the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1312, for performance of the operation o1312 by an electrical circuitry arrangement as activated thereto, and/or otherwise fulfillment of the operation o1312. One or more non-transitory signal bearing physical media can bear the one or more instructions that when executed can direct performance of the operation o1312. Furthermore, ascertaining dwelling related wireless recharging guidance involving impact from planned wireless electrical energy transfer schedule to itinerary and route information associated with electric vehicles module m1312 depicted in FIG. 7-B as being included in the module m1301, when executed and/or activated, can direct performance of and/or perform the operation o1312. Illustratively, in one or more implementations, the operation o1312 can be carried out, for example, by ascertaining dwelling related wireless recharging guidance involving at least in part one or more locations of wireless electrical energy transfer (e.g., ascertaining guidance information to electrical energy storage charging stations as associated with a planned or estimated itinerary for the one or more electric vehicles, etc.) including ascertaining dwelling related wireless recharging guidance involving at least in part impact from planned wireless electrical energy transfer schedule to itinerary and route information associated with the one or more electric vehicles (e.g., ascertaining guidance information historical, planned, or estimated itinerary information associated with one or more dwelling associates of the one or more electric vehicles as individual or shared use, etc.).

In one or more implementations, as shown in FIG. 11-C, the operation o13 can include operation o1313 for electronically ascertaining dwelling related wireless recharging guidance for recharging of the one or more electric vehicles by the wireless electrical energy transfer affiliated at least in part with the one or more dwelling associates of at least in part the one or more dwelling related areas based at least in part upon at least a portion of the status related intake associated at least in part with the one or more electric vehicle recharging affairs for one or more electric vehicles by wireless electrical energy transfer affiliated at least in part with the one or more dwelling associates of at least in part the one or more dwelling related areas and based at least in part upon at least a portion of the operational aspects at least in part affecting influence between the one or more electric vehicles and the one or more dwelling associates of at least in part the one or more dwelling related areas including ascertaining dwelling related wireless recharging guidance involving one or more communication links involving at least in part wireless electrical energy transfer and the one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1313, for performance of the operation o1313 by an electrical circuitry arrangement as activated thereto, and/or otherwise fulfillment of the operation o1313. One or more non-transitory signal bearing physical media can bear the one or more instructions that when executed can direct performance of the operation o1313. Furthermore, ascertaining dwelling related wireless recharging guidance involving communication links involving wireless electrical energy transfer and electric vehicles module m1313 depicted in FIG. 7-B as being included in the module m13, when executed and/or activated, can direct performance of and/or perform the operation o1313. Illustratively, in one or more implementations, the operation o1313 can be carried out, for example, by electronically ascertaining (e.g., determining, judging, comparing, noting, sorting, classifying, categorizing, indexing, reviewing, assessing, addressing, identifying, assembling, etc.) dwelling (e.g., shelter, temporary, familial, residential, suburban, city, housing, high density, low density, singular, multiple, etc.) related (e.g., tangentially, directly, occasionally, temporarily, permanently, fully, partially, etc.) wireless (e.g., electromagnetic resonance, short distance, long distance, high power, low power, static, dynamic, etc.) recharging (e.g., fast charge, slow trickle, low density, high density, recurrent, sporadic, ad hoc, predictive, total, partial, remedial, etc.) guidance (e.g., mandatory, instructional, suggestive, advisory, cautionary, encouragement, congratulatory, rewarding, maintaining, warning, reactionary, optimistic, proactive, supplemental, etc.) for recharging (e.g., fast charge, slow trickle, low density, high density, recurrent, sporadic, ad hoc, predictive, total, partial, remedial, etc.) of the one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) by the wireless (e.g., electromagnetic resonance, short distance, long distance, high power, low power, static, dynamic, etc.) electrical energy (e.g., electrical energy stored or to be stored by such as battery, lead-acid, metal hydride, nickel-cadmium, chemical, solid state, capacitive, gaseous, compressed gas based, etc.) transfer (e.g., fast charge, slow trickle, low density, high density, recurrent, sporadic, ad hoc, predictive, total, partial, remedial, etc.) affiliated (e.g., tangentially, directly, indirectly, partially, fully, organizational, ethically, regionally, demographically, vocationally, generationally, educationally, politically, recreationally, etc.) at least in part with the one or more dwelling (e.g., shelter, temporary, familial, residential, suburban, city, housing, high density, low density, singular, multiple, etc.) associates (e.g., habitating, lodging, occupying, visiting, touring, lounging, recreating, playing, working, studying, eating, owning, renting, leasing, contracting, retiring, sleeping, resting, reflecting, individual, group, corporate, governmental, civic, educational, volunteer, retired, candidate, temporary, permanent, driver, rider, occupant, maintainer, regular, occasional, ad hoc, commuter, pleasure, business, etc.) of at least in part the one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, landscaped, palatial, in-town, uptown, downtown, penthouse, mansion, suburban, rural, family, shelter, rental, condominium, upscale, high-tech, modern, traditional, contemporary, classic, etc.) based at least in part upon (e.g., directly, derived, indirectly, assumed, presumed, anticipated, predicted, concluded, deductive, inductive, conjecture, experiential, theoretical, historical, prophetic, etc.) at least a portion (e.g., limiting, exclusionary, inclusionary, encompassing, limited, surpassing, macroscopic, microscopic, singular, multitude, etc.) of the status related intake (e.g., informational, projected, historical, performance, identification, organizational, background, affiliation, goal, milestone, accomplishment, detraction, objective, guideline, award, demerit, extra-curricular, etc.) associated at least in part (e.g., tangentially, directly, occasionally, temporarily, permanently, fully, partially, etc.) with the one or more electric vehicle (e.g., all-electric, hybrid, gas-electric, diesel-electric, propane-electric, fuel-cell-electric, common-rail electric, car, truck, short distance, long distance, van, bus, cart, commercial, private, governmental, etc.) recharging (e.g., fast charge, slow trickle, low density, high density, recurrent, sporadic, ad hoc, predictive, total, partial, remedial, etc.) affairs (e.g., devices, mechanisms, procedures, structures, methods, countermeasures, plays, real, virtual, simulated, transitory, permanent, replacement, redundant, alternative, etc.) for one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) by wireless (e.g., electromagnetic resonance, short distance, long distance, high power, low power, static, dynamic, etc.) electrical energy (e.g., electrical energy stored or to be stored by such as battery, lead-acid, metal hydride, nickel-cadmium, chemical, solid state, capacitive, gaseous, compressed gas based, etc.) transfer (e.g., fast charge, slow trickle, low density, high density, recurrent, sporadic, ad hoc, predictive, total, partial, remedial, etc.) affiliated (e.g., tangentially, directly, indirectly, partially, fully, organizational, ethically, regionally, demographically, vocationally, generationally, educationally, politically, recreationally, etc.) at least in part with the one or more dwelling (e.g., shelter, temporary, familial, residential, suburban, city, housing, high density, low density, singular, multiple, etc.) associates (e.g., habitating, lodging, occupying, visiting, touring, lounging, recreating, playing, working, studying, eating, owning, renting, leasing, contracting, retiring, sleeping, resting, reflecting, individual, group, corporate, governmental, civic, educational, volunteer, retired, candidate, temporary, permanent, driver, rider, occupant, maintainer, regular, occasional, ad hoc, commuter, pleasure, business, etc.) of at least in part the one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, landscaped, palatial, in-town, uptown, downtown, penthouse, mansion, suburban, rural, family, shelter, rental, condominium, upscale, high-tech, modern, traditional, contemporary, classic, etc.) and based at least in part upon (e.g., directly, derived, indirectly, assumed, presumed, anticipated, predicted, concluded, deductive, inductive, conjecture, experiential, theoretical, historical, prophetic, etc.) at least a portion of the operational (e.g., drivable, maintainable, inventorial, storable, allocatable, reliable, usable, plannable, deterministic, predictable, functional, etc.) aspects (e.g., factors, contributory, foundational, direct, indirect, regular, sporadic, considerations, secondary, tertiary, etc.) at least in part affecting (e.g., tangentially, directly, occasionally, temporarily, permanently, fully, partially, etc.) influence (e.g., plan, reliance, replacement, use cycling, maintenance, allocation, cooperative, sharing, affordability, budgeting, provision, temporary, on-going, occasional, daily, use of by, etc.) between the one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) and the one or more dwelling (e.g., shelter, temporary, familial, residential, suburban, city, housing, high density, low density, singular, multiple, etc.) associates (e.g., individual, group, corporate, governmental, civic, educational, volunteer, retired, candidate, temporary, permanent, driver, rider, occupant, maintainer, regular, occasional, ad hoc, commuter, pleasure, business, etc.) of at least in part the one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, palatial, in-town, up-town, down-town, penthouse, mansion, suburban, rural, family, shelter, rental, condominium, up-scale, high-tech, modern, traditional, contemporary, classic, etc.) including ascertaining dwelling related wireless recharging guidance involving one or more communication links involving at least in part wireless electrical energy transfer and the one or more electric vehicles (e.g., ascertaining guidance information to one or more wired, wireless, cellular, packetized, direct point-to-point, internet, wide area network, local area network, or other communication links, etc.).

In one or more implementations, as shown in FIG. 11-D, the operation o1313 can include operation o1314 for ascertaining dwelling related wireless recharging guidance involving one or more communication links involving at least in part wireless electrical energy transfer and the one or more electric vehicles including ascertaining dwelling related wireless recharging guidance involving at least in part one or more contactless smart card readers. Origination of a physically tangible component group can be accomplished through skilled in the art design choice selection including use of one or more components and/or subsystems explicitly and/or implicitly referred to herein for at least in part implementing execution of one or more instructions of the operation o1314, for performance of the operation o1314 by an electrical circuitry arrangement as activated thereto, and/or otherwise fulfillment of the operation o1314. One or more non-transitory signal bearing physical media can bear the one or more instructions that when executed can direct performance of the operation o1314. Furthermore, ascertaining dwelling related wireless recharging guidance involving contactless smart card readers module m1314 depicted in FIG. 7-B as being included in the module m1313, when executed and/or activated, can direct performance of and/or perform the operation o1314. Illustratively, in one or more implementations, the operation o1314 can be carried out, for example, by ascertaining dwelling related wireless recharging guidance involving one or more communication links involving at least in part wireless electrical energy transfer and the one or more electric vehicles (e.g., ascertaining guidance information to one or more wired, wireless, cellular, packetized, direct point-to-point, internet, wide area network, local area network, or other communication links, etc.) including ascertaining dwelling related wireless recharging guidance involving at least in part one or more contactless smart card readers (e.g., ascertaining guidance information to the contactless smart card readers located within the one or more electric vehicles as accessed involving a dashboard console of the one or more electric vehicles, door panel of the one or more electric vehicles, exterior surface of the one or more electric vehicles, located near one or more electrical energy dwelling storage charging stations adjacent to locations for charging of the one or more electric vehicles, etc.).

In one or more implementations, as shown in FIG. 11-D, the operation o1313 can include operation o1315 for ascertaining dwelling related wireless recharging guidance involving one or more communication links involving at least in part wireless electrical energy transfer and the one or more electric vehicles including ascertaining dwelling related wireless recharging guidance involving at least in part one or more RFID tag readers. Origination of a physically tangible component group can be accomplished through skilled in the art design choice selection including use of one or more components and/or subsystems explicitly and/or implicitly referred to herein for at least in part implementing execution of one or more instructions of the operation o1315, for performance of the operation o1315 by an electrical circuitry arrangement as activated thereto, and/or otherwise fulfillment of the operation o1315. One or more non-transitory signal bearing physical media can bear the one or more instructions that when executed can direct performance of the operation o1315. Furthermore, ascertaining dwelling related wireless recharging guidance involving RFID tag readers module m1315 depicted in FIG. 7-B as being included in the module m1313, when executed and/or activated, can direct performance of and/or perform the operation o1315. Illustratively, in one or more implementations, the operation o1315 can be carried out, for example, by ascertaining dwelling related wireless recharging guidance involving one or more communication links involving at least in part wireless electrical energy transfer and the one or more electric vehicles (e.g., ascertaining guidance information to one or more wired, wireless, cellular, packetized, direct point-to-point, internet, wide area network, local area network, or other communication links, etc.) including ascertaining dwelling related wireless recharging guidance involving at least in part one or more RFID tag readers (e.g., ascertaining guidance information regarding RFID tag readers located within the one or more electric vehicles as accessed involving a dashboard console of the one or more electric vehicles, door panel of the one or more electric vehicles, exterior surface of the one or more electric vehicles, located near one or more electrical energy storage charging stations adjacent to locations for charging of the one or more electric vehicles, etc.).

In one or more implementations, as shown in FIG. 11-D, the operation o1313 can include operation o1316 for ascertaining dwelling related wireless recharging guidance involving one or more communication links involving at least in part wireless electrical energy transfer and the one or more electric vehicles including ascertaining dwelling related wireless recharging guidance involving at least in part one or more manual entry keypads. Origination of a physically tangible component group can be accomplished through skilled in the art design choice selection including use of one or more components and/or subsystems explicitly and/or implicitly referred to herein for at least in part implementing execution of one or more instructions of the operation o1316, for performance of the operation o1316 by an electrical circuitry arrangement as activated thereto, and/or otherwise fulfillment of the operation o1316. One or more non-transitory signal bearing physical media can bear the one or more instructions that when executed can direct performance of the operation o1316. Furthermore, ascertaining dwelling related wireless recharging guidance involving manual entry keypads module m1316 depicted in FIG. 7-B as being included in the module m1313, when executed and/or activated, can direct performance of and/or perform the operation o1316. Illustratively, in one or more implementations, the operation o1316 can be carried out, for example, by ascertaining dwelling related wireless recharging guidance involving one or more communication links involving at least in part wireless electrical energy transfer and the one or more electric vehicles (e.g., ascertaining guidance information to one or more wired, wireless, cellular, packetized, direct point-to-point, internet, wide area network, local area network, or other communication links, etc.) including ascertaining dwelling related wireless recharging guidance involving at least in part one or more manual entry keypads (e.g., ascertaining guidance information regarding the manual entry keypads located within the one or more electric vehicles as accessed involving a dashboard console of the one or more electric vehicles, door panel of the one or more electric vehicles, exterior surface of the one or more electric vehicles, located near one or more electrical energy storage charging stations adjacent to locations for charging of the one or more electric vehicles, etc.).

In one or more implementations, as shown in FIG. 11-D, the operation o1313 can include operation o1317 for ascertaining dwelling related wireless recharging guidance involving one or more communication links involving at least in part wireless electrical energy transfer and the one or more electric vehicles including ascertaining dwelling related wireless recharging guidance involving at least in part one or more bluetooth communication devices. Origination of a physically tangible component group can be accomplished through skilled in the art design choice selection including use of one or more components and/or subsystems explicitly and/or implicitly referred to herein for at least in part implementing execution of one or more instructions of the operation o1317, for performance of the operation o1317 by an electrical circuitry arrangement as activated thereto, and/or otherwise fulfillment of the operation o1317. One or more non-transitory signal bearing physical media can bear the one or more instructions that when executed can direct performance of the operation o1317. Furthermore, ascertaining dwelling related wireless recharging guidance involving blue tooth communication devices module m1317 depicted in FIG. 7-B as being included in the module m1313, when executed and/or activated, can direct performance of and/or perform the operation o1317. Illustratively, in one or more implementations, the operation o1317 can be carried out, for example, by ascertaining dwelling related wireless recharging guidance involving one or more communication links involving at least in part wireless electrical energy transfer and the one or more electric vehicles (e.g., ascertaining guidance information to one or more wired, wireless, cellular, packetized, direct point-to-point, internet, wide area network, local area network, or other communication links, etc.) including ascertaining dwelling related wireless recharging guidance involving at least in part one or more bluetooth communication devices (e.g., ascertaining guidance information regarding bluetooth communication devices located within the one or more electric vehicles as accessed involving a dashboard console of the one or more electric vehicles, door panel of the one or more electric vehicles, exterior surface of the one or more electric vehicles, located near one or more electrical energy storage charging stations adjacent to locations for charging of the one or more electric vehicles, etc.).

In one or more implementations, as shown in FIG. 11-D, the operation o1313 can include operation o1318 for ascertaining dwelling related wireless recharging guidance involving one or more communication links involving at least in part wireless electrical energy transfer and the one or more electric vehicles including ascertaining dwelling related wireless recharging guidance involving one or more WiFi communication devices. Origination of a physically tangible component group can be accomplished through skilled in the art design choice selection including use of one or more components and/or subsystems explicitly and/or implicitly referred to herein for at least in part implementing execution of one or more instructions of the operation o1318, for performance of the operation o1318 by an electrical circuitry arrangement as activated thereto, and/or otherwise fulfillment of the operation o1318. One or more non-transitory signal bearing physical media can bear the one or more instructions that when executed can direct performance of the operation o1318. Furthermore, ascertaining dwelling related wireless recharging guidance involving WiFi communication devices module m1318 depicted in FIG. 7-B as being included in the module m1313, when executed and/or activated, can direct performance of and/or perform the operation o1318. Illustratively, in one or more implementations, the operation o1318 can be carried out, for example, by ascertaining dwelling related wireless recharging guidance involving one or more communication links involving at least in part wireless electrical energy transfer and the one or more electric vehicles (e.g., ascertaining guidance information to one or more wired, wireless, cellular, packetized, direct point-to-point, internet, wide area network, local area network, or other communication links, etc.) including ascertaining dwelling related wireless recharging guidance involving one or more WiFi communication devices (e.g., ascertaining guidance information regarding WiFi communication devices located within the one or more electric vehicles as accessed involving a dashboard console of the one or more electric vehicles, door panel of the one or more electric vehicles, exterior surface of the one or more electric vehicles, located near one or more electrical energy storage charging stations adjacent to locations for charging of the one or more electric vehicles, etc.).

In one or more implementations, as shown in FIG. 11-E, the operation o1313 can include operation o1319 for ascertaining dwelling related wireless recharging guidance involving one or more communication links involving at least in part wireless electrical energy transfer and the one or more electric vehicles including ascertaining dwelling related wireless recharging guidance involving one or more packetized communication networks. Origination of a physically tangible component group can be accomplished through skilled in the art design choice selection including use of one or more components and/or subsystems explicitly and/or implicitly referred to herein for at least in part implementing execution of one or more instructions of the operation o1319, for performance of the operation o1319 by an electrical circuitry arrangement as activated thereto, and/or otherwise fulfillment of the operation o1319. One or more non-transitory signal bearing physical media can bear the one or more instructions that when executed can direct performance of the operation o1319. Furthermore, ascertaining dwelling related wireless recharging guidance involving packetized communication networks module m1319 depicted in FIG. 7-B as being included in the module m1313, when executed and/or activated, can direct performance of and/or perform the operation o1319. Illustratively, in one or more implementations, the operation o1319 can be carried out, for example, by ascertaining dwelling related wireless recharging guidance involving one or more communication links involving at least in part wireless electrical energy transfer and the one or more electric vehicles (e.g., ascertaining guidance information to one or more wired, wireless, cellular, packetized, direct point-to-point, internet, wide area network, local area network, or other communication links, etc.) including ascertaining dwelling related wireless recharging guidance involving one or more packetized communication networks (e.g., ascertaining guidance information regarding network packetized communication devices located within the one or more electric vehicles as accessed involving a dashboard console of the one or more electric vehicles, door panel of the one or more electric vehicles, exterior surface of the one or more electric vehicles, located near one or more electrical energy storage charging stations adjacent to locations for charging of the one or more electric vehicles, etc.).

In one or more implementations, as shown in FIG. 11-E, the operation o1313 can include operation o1320 for ascertaining dwelling related wireless recharging guidance involving one or more communication links involving at least in part wireless electrical energy transfer and the one or more electric vehicles including ascertaining dwelling related wireless recharging guidance involving one or more infrared communication devices. Origination of a physically tangible component group can be accomplished through skilled in the art design choice selection including use of one or more components and/or subsystems explicitly and/or implicitly referred to herein for at least in part implementing execution of one or more instructions of the operation o1320, for performance of the operation o1320 by an electrical circuitry arrangement as activated thereto, and/or otherwise fulfillment of the operation o1320. One or more non-transitory signal bearing physical media can bear the one or more instructions that when executed can direct performance of the operation o1320. Furthermore, ascertaining dwelling related wireless recharging guidance involving infrared communication devices module m1320 depicted in FIG. 7-B as being included in the module m1313, when executed and/or activated, can direct performance of and/or perform the operation o1320. Illustratively, in one or more implementations, the operation o1320 can be carried out, for example, by ascertaining dwelling related wireless recharging guidance involving one or more communication links involving at least in part wireless electrical energy transfer and the one or more electric vehicles (e.g., ascertaining guidance information to one or more wired, wireless, cellular, packetized, direct point-to-point, internet, wide area network, local area network, or other communication links, etc.) including ascertaining dwelling related wireless recharging guidance involving one or more infrared communication devices (e.g., ascertaining guidance information regarding infrared communication devices located within the one or more electric vehicles as accessed involving a dashboard console of the one or more electric vehicles, door panel of the one or more electric vehicles, exterior surface of the one or more electric vehicles, located near one or more electrical energy storage charging stations adjacent to locations for charging of the one or more electric vehicles, etc.).

In one or more implementations, as shown in FIG. 11-E, the operation o13 can include operation o1321 for electronically ascertaining dwelling related wireless recharging guidance for recharging of the one or more electric vehicles by the wireless electrical energy transfer affiliated at least in part with the one or more dwelling associates of at least in part the one or more dwelling related areas based at least in part upon at least a portion of the status related intake associated at least in part with the one or more electric vehicle recharging affairs for one or more electric vehicles by wireless electrical energy transfer affiliated at least in part with the one or more dwelling associates of at least in part the one or more dwelling related areas and based at least in part upon at least a portion of the operational aspects at least in part affecting influence between the one or more electric vehicles and the one or more dwelling associates of at least in part the one or more dwelling related areas including ascertaining dwelling related wireless recharging guidance wirelessly. Origination of a physically tangible component group can be accomplished through skilled in the art design choice selection including use of one or more components and/or subsystems explicitly and/or implicitly referred to herein for at least in part implementing execution of one or more instructions of the operation o1321, for performance of the operation o1321 by an electrical circuitry arrangement as activated thereto, and/or otherwise fulfillment of the operation o1321. One or more non-transitory signal bearing physical media can bear the one or more instructions that when executed can direct performance of the operation o1321. Furthermore, ascertaining dwelling related wireless recharging guidance wirelessly module m1321 depicted in FIG. 7-B as being included in the module m13, when executed and/or activated, can direct performance of and/or perform the operation o1321. Illustratively, in one or more implementations, the operation o1321 can be carried out, for example, by electronically ascertaining (e.g., determining, judging, comparing, noting, sorting, classifying, categorizing, indexing, reviewing, assessing, addressing, identifying, assembling, etc.) dwelling (e.g., shelter, temporary, familial, residential, suburban, city, housing, high density, low density, singular, multiple, etc.) related (e.g., tangentially, directly, occasionally, temporarily, permanently, fully, partially, etc.) wireless (e.g., electromagnetic resonance, short distance, long distance, high power, low power, static, dynamic, etc.) recharging (e.g., fast charge, slow trickle, low density, high density, recurrent, sporadic, ad hoc, predictive, total, partial, remedial, etc.) guidance (e.g., mandatory, instructional, suggestive, advisory, cautionary, encouragement, congratulatory, rewarding, maintaining, warning, reactionary, optimistic, proactive, supplemental, etc.) for recharging (e.g., fast charge, slow trickle, low density, high density, recurrent, sporadic, ad hoc, predictive, total, partial, remedial, etc.) of the one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) by the wireless (e.g., electromagnetic resonance, short distance, long distance, high power, low power, static, dynamic, etc.) electrical energy (e.g., electrical energy stored or to be stored by such as battery, lead-acid, metal hydride, nickel-cadmium, chemical, solid state, capacitive, gaseous, compressed gas based, etc.) transfer (e.g., fast charge, slow trickle, low density, high density, recurrent, sporadic, ad hoc, predictive, total, partial, remedial, etc.) affiliated (e.g., tangentially, directly, indirectly, partially, fully, organizational, ethically, regionally, demographically, vocationally, generationally, educationally, politically, recreationally, etc.) at least in part with the one or more dwelling (e.g., shelter, temporary, familial, residential, suburban, city, housing, high density, low density, singular, multiple, etc.) associates (e.g., habitating, lodging, occupying, visiting, touring, lounging, recreating, playing, working, studying, eating, owning, renting, leasing, contracting, retiring, sleeping, resting, reflecting, individual, group, corporate, governmental, civic, educational, volunteer, retired, candidate, temporary, permanent, driver, rider, occupant, maintainer, regular, occasional, ad hoc, commuter, pleasure, business, etc.) of at least in part the one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, landscaped, palatial, in-town, uptown, downtown, penthouse, mansion, suburban, rural, family, shelter, rental, condominium, upscale, high-tech, modern, traditional, contemporary, classic, etc.) based at least in part upon (e.g., directly, derived, indirectly, assumed, presumed, anticipated, predicted, concluded, deductive, inductive, conjecture, experiential, theoretical, historical, prophetic, etc.) at least a portion (e.g., limiting, exclusionary, inclusionary, encompassing, limited, surpassing, macroscopic, microscopic, singular, multitude, etc.) of the status related intake (e.g., informational, projected, historical, performance, identification, organizational, background, affiliation, goal, milestone, accomplishment, detraction, objective, guideline, award, demerit, extra-curricular, etc.) associated at least in part (e.g., tangentially, directly, occasionally, temporarily, permanently, fully, partially, etc.) with the one or more electric vehicle (e.g., all-electric, hybrid, gas-electric, diesel-electric, propane-electric, fuel-cell-electric, common-rail electric, car, truck, short distance, long distance, van, bus, cart, commercial, private, governmental, etc.) recharging (e.g., fast charge, slow trickle, low density, high density, recurrent, sporadic, ad hoc, predictive, total, partial, remedial, etc.) affairs (e.g., devices, mechanisms, procedures, structures, methods, countermeasures, plays, real, virtual, simulated, transitory, permanent, replacement, redundant, alternative, etc.) for one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) by wireless (e.g., electromagnetic resonance, short distance, long distance, high power, low power, static, dynamic, etc.) electrical energy (e.g., electrical energy stored or to be stored by such as battery, lead-acid, metal hydride, nickel-cadmium, chemical, solid state, capacitive, gaseous, compressed gas based, etc.) transfer (e.g., fast charge, slow trickle, low density, high density, recurrent, sporadic, ad hoc, predictive, total, partial, remedial, etc.) affiliated (e.g., tangentially, directly, indirectly, partially, fully, organizational, ethically, regionally, demographically, vocationally, generationally, educationally, politically, recreationally, etc.) at least in part with the one or more dwelling (e.g., shelter, temporary, familial, residential, suburban, city, housing, high density, low density, singular, multiple, etc.) associates (e.g., habitating, lodging, occupying, visiting, touring, lounging, recreating, playing, working, studying, eating, owning, renting, leasing, contracting, retiring, sleeping, resting, reflecting, individual, group, corporate, governmental, civic, educational, volunteer, retired, candidate, temporary, permanent, driver, rider, occupant, maintainer, regular, occasional, ad hoc, commuter, pleasure, business, etc.) of at least in part the one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, landscaped, palatial, in-town, uptown, downtown, penthouse, mansion, suburban, rural, family, shelter, rental, condominium, upscale, high-tech, modern, traditional, contemporary, classic, etc.) and based at least in part upon (e.g., directly, derived, indirectly, assumed, presumed, anticipated, predicted, concluded, deductive, inductive, conjecture, experiential, theoretical, historical, prophetic, etc.) at least a portion of the operational (e.g., drivable, maintainable, inventorial, storable, allocatable, reliable, usable, plannable, deterministic, predictable, functional, etc.) aspects (e.g., factors, contributory, foundational, direct, indirect, regular, sporadic, considerations, secondary, tertiary, etc.) at least in part affecting (e.g., tangentially, directly, occasionally, temporarily, permanently, fully, partially, etc.) influence (e.g., plan, reliance, replacement, use cycling, maintenance, allocation, cooperative, sharing, affordability, budgeting, provision, temporary, on-going, occasional, daily, use of by, etc.) between the one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) and the one or more dwelling (e.g., shelter, temporary, familial, residential, suburban, city, housing, high density, low density, singular, multiple, etc.) associates (e.g., individual, group, corporate, governmental, civic, educational, volunteer, retired, candidate, temporary, permanent, driver, rider, occupant, maintainer, regular, occasional, ad hoc, commuter, pleasure, business, etc.) of at least in part the one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, palatial, in-town, up-town, down-town, penthouse, mansion, suburban, rural, family, shelter, rental, condominium, up-scale, high-tech, modern, traditional, contemporary, classic, etc.) including ascertaining dwelling related wireless recharging guidance wirelessly (e.g., cellular communication, packetized communication, networked communication, broadband communication, gigahertz frequency communication, etc.).

In one or more implementations, as shown in FIG. 11-E, the operation o1321 can include operation o1322 for ascertaining dwelling related wireless recharging guidance wirelessly including wirelessly ascertaining dwelling related wireless recharging guidance involving at least in part one or more RFID tags. Origination of a physically tangible component group can be accomplished through skilled in the art design choice selection including use of one or more components and/or subsystems explicitly and/or implicitly referred to herein for at least in part implementing execution of one or more instructions of the operation o1322, for performance of the operation o1322 by an electrical circuitry arrangement as activated thereto, and/or otherwise fulfillment of the operation o1322. One or more non-transitory signal bearing physical media can bear the one or more instructions that when executed can direct performance of the operation o1322. Furthermore, wirelessly ascertaining dwelling related wireless recharging guidance involving RFID tags module m1322 depicted in FIG. 7-B as being included in the module m1321, when executed and/or activated, can direct performance of and/or perform the operation o1322. Illustratively, in one or more implementations, the operation o1322 can be carried out, for example, by ascertaining dwelling related wireless recharging guidance wirelessly (e.g., cellular communication, packetized communication, networked communication, broadband communication, gigahertz frequency communication, etc.) including wirelessly ascertaining dwelling related wireless recharging guidance involving at least in part one or more RFID tags (e.g., RFID tags associated with vehicle dwelling associates or associated with vehicle being read by RFID readers mounted with vehicle or in dwelling parking area, etc.).

In one or more implementations, as shown in FIG. 11-F, the operation o1321 can include operation o1323 for ascertaining dwelling related wireless recharging guidance wirelessly including wirelessly ascertaining dwelling related wireless recharging guidance involving at least in part bluetooth supported communication. Origination of a physically tangible component group can be accomplished through skilled in the art design choice selection including use of one or more components and/or subsystems explicitly and/or implicitly referred to herein for at least in part implementing execution of one or more instructions of the operation o1323, for performance of the operation o1323 by an electrical circuitry arrangement as activated thereto, and/or otherwise fulfillment of the operation o1323. One or more non-transitory signal bearing physical media can bear the one or more instructions that when executed can direct performance of the operation o1323. Furthermore, wirelessly ascertaining dwelling related wireless recharging guidance involving blue tooth supported communication module m1323 depicted in FIG. 7-C as being included in the module m1321, when executed and/or activated, can direct performance of and/or perform the operation o1323. Illustratively, in one or more implementations, the operation o1323 can be carried out, for example, by ascertaining dwelling related wireless recharging guidance wirelessly (e.g., cellular communication, packetized communication, networked communication, broadband communication, gigahertz frequency communication, etc.) including wirelessly ascertaining dwelling related wireless recharging guidance involving at least in part bluetooth supported communication (e.g., bluetooth communication from dwelling associate mobile calendaring device to bluetooth receiver affixed to vehicle, etc.).

In one or more implementations, as shown in FIG. 11-F, the operation o1321 can include operation o1324 for ascertaining dwelling related wireless recharging guidance wirelessly including wirelessly ascertaining dwelling related wireless recharging guidance involving at least in part WiFi facilitated communication. Origination of a physically tangible component group can be accomplished through skilled in the art design choice selection including use of one or more components and/or subsystems explicitly and/or implicitly referred to herein for at least in part implementing execution of one or more instructions of the operation o1324, for performance of the operation o1324 by an electrical circuitry arrangement as activated thereto, and/or otherwise fulfillment of the operation o1324. One or more non-transitory signal bearing physical media can bear the one or more instructions that when executed can direct performance of the operation o1324. Furthermore, wirelessly ascertaining dwelling related wireless recharging guidance involving WiFi facilitated communication module m1324 depicted in FIG. 7-C as being included in the module m1321, when executed and/or activated, can direct performance of and/or perform the operation o1324. Illustratively, in one or more implementations, the operation o1324 can be carried out, for example, by ascertaining dwelling related wireless recharging guidance wirelessly (e.g., cellular communication, packetized communication, networked communication, broadband communication, gigahertz frequency communication, etc.) including wirelessly ascertaining dwelling related wireless recharging guidance involving at least in part WiFi facilitated communication (e.g., WiFi communication from dwelling associate laptop to WiFi reception device integrated into vehicle console, etc.).

In one or more implementations, as shown in FIG. 11-F, the operation o1321 can include operation o1325 for ascertaining dwelling related wireless recharging guidance wirelessly including wirelessly ascertaining dwelling related wireless recharging guidance involving at least in part packetized network communication. Origination of a physically tangible component group can be accomplished through skilled in the art design choice selection including use of one or more components and/or subsystems explicitly and/or implicitly referred to herein for at least in part implementing execution of one or more instructions of the operation o1325, for performance of the operation o1325 by an electrical circuitry arrangement as activated thereto, and/or otherwise fulfillment of the operation o1325. One or more non-transitory signal bearing physical media can bear the one or more instructions that when executed can direct performance of the operation o1325. Furthermore, wirelessly ascertaining dwelling related wireless recharging guidance involving packetized network communication module m1325 depicted in FIG. 7-C as being included in the module m1321, when executed and/or activated, can direct performance of and/or perform the operation o1325. Illustratively, in one or more implementations, the operation o1325 can be carried out, for example, by ascertaining dwelling related wireless recharging guidance wirelessly (e.g., cellular communication, packetized communication, networked communication, broadband communication, gigahertz frequency communication, etc.) including wirelessly ascertaining dwelling related wireless recharging guidance involving at least in part packetized network communication (e.g., network packetized broadcast from handheld dwelling associate personal information management system being received by electric vehicle communication system, etc.).

In one or more implementations, as shown in FIG. 11-F, the operation o1321 can include operation o1326 for ascertaining dwelling related wireless recharging guidance wirelessly including wirelessly ascertaining dwelling related wireless recharging guidance involving at least in part infrared supported communication. Origination of a physically tangible component group can be accomplished through skilled in the art design choice selection including use of one or more components and/or subsystems explicitly and/or implicitly referred to herein for at least in part implementing execution of one or more instructions of the operation o1326, for performance of the operation o1326 by an electrical circuitry arrangement as activated thereto, and/or otherwise fulfillment of the operation o1326. One or more non-transitory signal bearing physical media can bear the one or more instructions that when executed can direct performance of the operation o1326. Furthermore, wirelessly ascertaining dwelling related wireless recharging guidance involving infrared supported communication module m1326 depicted in FIG. 7-C as being included in the module m1321, when executed and/or activated, can direct performance of and/or perform the operation o1326. Illustratively, in one or more implementations, the operation o1326 can be carried out, for example, by ascertaining dwelling related wireless recharging guidance wirelessly (e.g., cellular communication, packetized communication, networked communication, broadband communication, gigahertz frequency communication, etc.) including wirelessly ascertaining dwelling related wireless recharging guidance involving at least in part infrared supported communication (e.g., processing information in communication between one or more infrared transmitters located near one or more parking locations for electric vehicles and one or more infrared receivers associated with one or more electric vehicles, etc.).

In one or more implementations, as shown in FIG. 11-F, the operation o13 can include operation o1327 for electronically ascertaining dwelling related wireless recharging guidance for recharging of the one or more electric vehicles by the wireless electrical energy transfer affiliated at least in part with the one or more dwelling associates of at least in part the one or more dwelling related areas based at least in part upon at least a portion of the status related intake associated at least in part with the one or more electric vehicle recharging affairs for one or more electric vehicles by wireless electrical energy transfer affiliated at least in part with the one or more dwelling associates of at least in part the one or more dwelling related areas and based at least in part upon at least a portion of the operational aspects at least in part affecting influence between the one or more electric vehicles and the one or more dwelling associates of at least in part the one or more dwelling related areas including ascertaining dwelling related wireless recharging guidance involving at least in part direct non-wireless communication. Origination of a physically tangible component group can be accomplished through skilled in the art design choice selection including use of one or more components and/or subsystems explicitly and/or implicitly referred to herein for at least in part implementing execution of one or more instructions of the operation o1327, for performance of the operation o1327 by an electrical circuitry arrangement as activated thereto, and/or otherwise fulfillment of the operation o1327. One or more non-transitory signal bearing physical media can bear the one or more instructions that when executed can direct performance of the operation o1327. Furthermore, ascertaining dwelling related wireless recharging guidance involving direct non-wireless communication module m1327 depicted in FIG. 7-C as being included in the module m13, when executed and/or activated, can direct performance of and/or perform the operation o1327. Illustratively, in one or more implementations, the operation o1327 can be carried out, for example, by electronically ascertaining (e.g., determining, judging, comparing, noting, sorting, classifying, categorizing, indexing, reviewing, assessing, addressing, identifying, assembling, etc.) dwelling (e.g., shelter, temporary, familial, residential, suburban, city, housing, high density, low density, singular, multiple, etc.) related (e.g., tangentially, directly, occasionally, temporarily, permanently, fully, partially, etc.) wireless (e.g., electromagnetic resonance, short distance, long distance, high power, low power, static, dynamic, etc.) recharging (e.g., fast charge, slow trickle, low density, high density, recurrent, sporadic, ad hoc, predictive, total, partial, remedial, etc.) guidance (e.g., mandatory, instructional, suggestive, advisory, cautionary, encouragement, congratulatory, rewarding, maintaining, warning, reactionary, optimistic, proactive, supplemental, etc.) for recharging (e.g., fast charge, slow trickle, low density, high density, recurrent, sporadic, ad hoc, predictive, total, partial, remedial, etc.) of the one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) by the wireless (e.g., electromagnetic resonance, short distance, long distance, high power, low power, static, dynamic, etc.) electrical energy (e.g., electrical energy stored or to be stored by such as battery, lead-acid, metal hydride, nickel-cadmium, chemical, solid state, capacitive, gaseous, compressed gas based, etc.) transfer (e.g., fast charge, slow trickle, low density, high density, recurrent, sporadic, ad hoc, predictive, total, partial, remedial, etc.) affiliated (e.g., tangentially, directly, indirectly, partially, fully, organizational, ethically, regionally, demographically, vocationally, generationally, educationally, politically, recreationally, etc.) at least in part with the one or more dwelling (e.g., shelter, temporary, familial, residential, suburban, city, housing, high density, low density, singular, multiple, etc.) associates (e.g., habitating, lodging, occupying, visiting, touring, lounging, recreating, playing, working, studying, eating, owning, renting, leasing, contracting, retiring, sleeping, resting, reflecting, individual, group, corporate, governmental, civic, educational, volunteer, retired, candidate, temporary, permanent, driver, rider, occupant, maintainer, regular, occasional, ad hoc, commuter, pleasure, business, etc.) of at least in part the one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, landscaped, palatial, in-town, uptown, downtown, penthouse, mansion, suburban, rural, family, shelter, rental, condominium, upscale, high-tech, modern, traditional, contemporary, classic, etc.) based at least in part upon (e.g., directly, derived, indirectly, assumed, presumed, anticipated, predicted, concluded, deductive, inductive, conjecture, experiential, theoretical, historical, prophetic, etc.) at least a portion (e.g., limiting, exclusionary, inclusionary, encompassing, limited, surpassing, macroscopic, microscopic, singular, multitude, etc.) of the status related intake (e.g., informational, projected, historical, performance, identification, organizational, background, affiliation, goal, milestone, accomplishment, detraction, objective, guideline, award, demerit, extra-curricular, etc.) associated at least in part (e.g., tangentially, directly, occasionally, temporarily, permanently, fully, partially, etc.) with the one or more electric vehicle (e.g., all-electric, hybrid, gas-electric, diesel-electric, propane-electric, fuel-cell-electric, common-rail electric, car, truck, short distance, long distance, van, bus, cart, commercial, private, governmental, etc.) recharging (e.g., fast charge, slow trickle, low density, high density, recurrent, sporadic, ad hoc, predictive, total, partial, remedial, etc.) affairs (e.g., devices, mechanisms, procedures, structures, methods, countermeasures, plays, real, virtual, simulated, transitory, permanent, replacement, redundant, alternative, etc.) for one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) by wireless (e.g., electromagnetic resonance, short distance, long distance, high power, low power, static, dynamic, etc.) electrical energy (e.g., electrical energy stored or to be stored by such as battery, lead-acid, metal hydride, nickel-cadmium, chemical, solid state, capacitive, gaseous, compressed gas based, etc.) transfer (e.g., fast charge, slow trickle, low density, high density, recurrent, sporadic, ad hoc, predictive, total, partial, remedial, etc.) affiliated (e.g., tangentially, directly, indirectly, partially, fully, organizational, ethically, regionally, demographically, vocationally, generationally, educationally, politically, recreationally, etc.) at least in part with the one or more dwelling (e.g., shelter, temporary, familial, residential, suburban, city, housing, high density, low density, singular, multiple, etc.) associates (e.g., habitating, lodging, occupying, visiting, touring, lounging, recreating, playing, working, studying, eating, owning, renting, leasing, contracting, retiring, sleeping, resting, reflecting, individual, group, corporate, governmental, civic, educational, volunteer, retired, candidate, temporary, permanent, driver, rider, occupant, maintainer, regular, occasional, ad hoc, commuter, pleasure, business, etc.) of at least in part the one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, landscaped, palatial, in-town, uptown, downtown, penthouse, mansion, suburban, rural, family, shelter, rental, condominium, upscale, high-tech, modern, traditional, contemporary, classic, etc.) and based at least in part upon (e.g., directly, derived, indirectly, assumed, presumed, anticipated, predicted, concluded, deductive, inductive, conjecture, experiential, theoretical, historical, prophetic, etc.) at least a portion of the operational (e.g., drivable, maintainable, inventorial, storable, allocatable, reliable, usable, plannable, deterministic, predictable, functional, etc.) aspects (e.g., factors, contributory, foundational, direct, indirect, regular, sporadic, considerations, secondary, tertiary, etc.) at least in part affecting (e.g., tangentially, directly, occasionally, temporarily, permanently, fully, partially, etc.) influence (e.g., plan, reliance, replacement, use cycling, maintenance, allocation, cooperative, sharing, affordability, budgeting, provision, temporary, on-going, occasional, daily, use of by, etc.) between the one or more electric vehicles (e.g., all-electric, hybrid, gas-electric, diesel-electric, propane-electric, fuel-cell-electric, common-rail electric, car, truck, short distance, long distance, van, bus, cart, commercial, private, governmental, etc.) and the one or more dwelling (e.g., shelter, temporary, familial, residential, suburban, city, housing, high density, low density, singular, multiple, etc.) associates (e.g., individual, group, corporate, governmental, civic, educational, volunteer, retired, candidate, temporary, permanent, driver, rider, occupant, maintainer, regular, occasional, ad hoc, commuter, pleasure, business, etc.) of at least in part the one or more dwelling (e.g., shelter, temporary, familial, residential, suburban, city, housing, high density, low density, singular, multiple, etc.) related (e.g., tangentially, directly, occasionally, temporarily, permanently, fully, partially, etc.) areas (e.g., structural, architectural, palatial, in-town, up-town, down-town, penthouse, mansion, suburban, rural, family, shelter, rental, condominium, up-scale, high-tech, modern, traditional, contemporary, classic, etc.) including ascertaining dwelling related wireless recharging guidance involving at least in part direct non-wireless communication (e.g., processing information involving hard wired network cable connecting one or more databases containing scheduling information, etc.).

In one or more implementations, as shown in FIG. 11-G, the operation o1327 can include operation o1328 for ascertaining dwelling related wireless recharging guidance involving at least in part direct non-wireless communication including ascertaining dwelling related wireless recharging guidance involving at least in part direct non-wireless communication. Origination of a physically tangible component group can be accomplished through skilled in the art design choice selection including use of one or more components and/or subsystems explicitly and/or implicitly referred to herein for at least in part implementing execution of one or more instructions of the operation o1328, for performance of the operation o1328 by an electrical circuitry arrangement as activated thereto, and/or otherwise fulfillment of the operation o1328. One or more non-transitory signal bearing physical media can bear the one or more instructions that when executed can direct performance of the operation o1328. Furthermore, ascertaining dwelling related wireless recharging guidance involving direct non-wireless communication module m1328 depicted in FIG. 7-C as being included in the module m1327, when executed and/or activated, can direct performance of and/or perform the operation o1328. Illustratively, in one or more implementations, the operation o1328 can be carried out, for example, by ascertaining dwelling related wireless recharging guidance involving at least in part direct non-wireless communication (e.g., processing information involving hard wired network cable connecting one or more databases containing scheduling information, etc.) including ascertaining dwelling related wireless recharging guidance involving at least in part direct non-wireless communication (e.g., processing information involving electrical grid wiring from central planning station on involving to communication device located adjacent to charging of electric vehicle, etc.).

In one or more implementations, as shown in FIG. 11-G, the operation o1327 can include operation o1329 for ascertaining dwelling related wireless recharging guidance involving at least in part direct non-wireless communication including ascertaining dwelling related wireless recharging guidance involving at least in part one or more sound wave broadcasts. Origination of a physically tangible component group can be accomplished through skilled in the art design choice selection including use of one or more components and/or subsystems explicitly and/or implicitly referred to herein for at least in part implementing execution of one or more instructions of the operation o1329, for performance of the operation o1329 by an electrical circuitry arrangement as activated thereto, and/or otherwise fulfillment of the operation o1329. One or more non-transitory signal bearing physical media can bear the one or more instructions that when executed can direct performance of the operation o1329. Furthermore, ascertaining dwelling related wireless recharging guidance involving sound wave broadcasts module m1329 depicted in FIG. 7-C as being included in the module m1327, when executed and/or activated, can direct performance of and/or perform the operation o1329. Illustratively, in one or more implementations, the operation o1329 can be carried out, for example, by ascertaining dwelling related wireless recharging guidance involving at least in part direct non-wireless communication (e.g., processing information involving hard wired network cable connecting one or more databases containing scheduling information, etc.) including ascertaining dwelling related wireless recharging guidance involving at least in part one or more sound wave broadcasts (e.g., processing information content from one or more verbal responses of one or more dwelling associates to one or more audible queries of the one or more dwelling associates in vicinity of electric vehicle parking, etc.).

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The one or more instructions discussed herein may be, for example, computer executable and/or logic-implemented instructions. In some implementations, signal-bearing medium as articles of manufacture may store the one or more instructions. In some implementations, the signal bearing medium may include a computer-readable medium. In some implementations, the signal-bearing medium may include a recordable medium. In some implementations, the signal-bearing medium may include a communication medium.

Those having skill in the art will recognize that the state of the art has progressed to the point where there is little distinction left between hardware and software implementations of aspects of systems; the use of hardware or software is generally (but not always, in that in certain contexts the choice between hardware an d software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture (limited to patentable subject matter under 35 USC 101). Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof (limited to patentable subject matter under 35 U.S.C. 101). In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure (limited to patentable subject matter under 35 USC 101). In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, (e.g., transmitter, receiver, transmission logic, reception logic, etc.), etc.).

Electro-mechanical System Support

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., grapheme based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

Electrical Circuitry Support

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Image Processing System Support

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Data Processing System Support

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Software as Patentable Subject Matter Support

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex inter-chaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire"

(e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "melt," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Mote System Support

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc. . . ), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Licensing System Support Language

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

Extraterritorial Use Language

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

Residual Incorporation Language

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

Not Limited to Implementations Described Language

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Not Limited to Human User Language

Although user XXX is shown/described herein as a single illustrated figure, those skilled in the art will appreciate that user XXX may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

Plural Terms Language

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

Operably-Coupled Language

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

Active/Inactive Component Language

In some instances, one or more components may be referred to herein as "configured to," "configured by," "configurable to," "operable/operative to," "adapted/adaptable," "able to," "conformable/conformed to," etc. Those skilled in the art will recognize that such terms (e.g., "configured to") generally encompass active-state components and/or inactive-state components and/or standby-state components, unless context requires otherwise.

Cloud Computing Standard Language

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scalable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Use of Trademarks in Specification Language

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Caselaw-Driven Clarification Language

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system, comprising:
   circuitry for electronically processing status related intake associated at least in part with one or more electric vehicle recharging affairs for one or more electric vehicles by wireless electrical energy transfer affiliated at least in part with one or more dwelling associates of at least in part one or more dwelling related areas;
   circuitry for electronically monitoring operational aspects at least in part affecting influence between the one or more electric vehicles and one or more dwelling associates of at least in part the one or more dwelling related areas; and
   circuitry for electronically ascertaining dwelling related wireless recharging guidance for recharging of the one or more electric vehicles by the wireless electrical energy transfer affiliated at least in part with the one or more dwelling associates of at least in part the one or more dwelling related areas based at least in part upon at least a portion of the status related intake associated at least in part with the one or more electric vehicle recharging affairs for one or more electric vehicles by wireless electrical energy transfer affiliated at least in part with the one or more dwelling associates of at least in part the one or more dwelling related areas and based at least in part upon at least a portion of the operational aspects at least in part affecting influence between the one or more electric vehicles and the one or more dwelling associates of at least in part the one or more dwelling related areas.

2. The system of claim 1, wherein the electronically processing status related intake associated at least in part with one or more electric vehicle recharging affairs for one or more electric vehicles by wireless electrical energy transfer affiliated at least in part with one or more dwelling associates of at least in part one or more dwelling related areas comprises:
   circuitry for processing status related intake involving at least in part activity associated with one or more electric vehicle user dwelling associates.

3. The system of claim 2, wherein the circuitry for processing status related intake involving at least in part activity associated with one or more electric vehicle user dwelling associates comprises:
   circuitry for processing status related intake regarding at least in part one or more dwelling associate uses of the one or more electric vehicles.

4. The system of claim 3, wherein the circuitry for processing status related intake regarding at least in part one or more dwelling associate uses of the one or more electric vehicles comprises:
   circuitry for processing status related intake involving at least in part processing commuter routing information for one or more of the dwelling associates using one or more of the electric vehicles.

5. The system of claim 3, wherein the circuitry for processing status related intake regarding at least in part one or more dwelling associate uses of the one or more electric vehicles comprises:
   circuitry for processing status related intake involving at least in part processing trip advisory information regarding at least in part routes of travel for the one or more electric vehicles used by the one or more dwelling associates.

6. The system of claim 3, wherein the circuitry for processing status related intake regarding at least in part one or more dwelling associate uses of the one or more electric vehicles comprises:
   circuitry for processing status related intake involving at least in part processing information regarding at least in part one or more commercial delivery schedules driven by the one or more of dwelling associates utilizing the one or more electric vehicles.

7. The system of claim 3, wherein the circuitry for processing status related intake regarding at least in part one or more dwelling associate uses of the one or more electric vehicles comprises:
   circuitry for processing status related intake involving at least in part processing information regarding at least in part one or more itineraries associated with use of the one or more electric vehicles by the one or more dwelling associates.

8. The system of claim 3, wherein the circuitry for processing status related intake regarding at least in part one or more dwelling associate uses of the one or more electric vehicles comprises:
  circuitry for processing status related intake involving at least in part processing information regarding at least in part one or more news broadcasts associated with travel involving at least in part use of the one or more electric vehicles by the one or more dwelling associates. circuitry for processing status related intake regarding at least in part one or more dwelling associate uses of the one or more electric vehicles comprises:
  circuitry for processing status related intake involving at least in part processing information regarding at least in part one or more news broadcasts associated with travel involving at least in part use of the one or more electric vehicles by the one or more dwelling associates.

9. The system of claim 3, wherein the circuitry for processing status related intake regarding at least in part one or more dwelling associate uses of the one or more electric vehicles comprises:
  circuitry for processing status related intake regarding at least in part emergency warning messages associated with dwelling associate use of the one or more electric vehicles.

10. The system of claim 3, wherein the circuitry for processing status related intake regarding at least in part one or more dwelling associate uses of the one or more electric vehicles comprises:
  circuitry for processing status related intake involving at least in part processing information regarding at least in part availability of alternate transportation by the one or more dwelling associates within one or more designated distances from electrical vehicle charging affairs for the one or more electric vehicles by wireless electrical energy transfer affiliated at least in part with one or more dwelling associates of at least in part one or more dwelling related areas.

11. The system of claim 1, wherein the circuitry for electrically processing status related intake associated at least in part with one or more electric vehicle recharging affairs for one or more electric vehicles by wireless electrical energy transfer affiliated at least in part with one or more dwelling associates of at least in part one or more dwelling related areas comprises:
  circuitry for processing status related intake from one or more locations of electric vehicle recharging affairs for one or more electric vehicles by wireless electrical energy transfer affiliated at least in part with one or more dwelling associates of at least in part one or more dwelling related areas.

12. The system of claim 11, wherein the circuitry for processing status related intake from one or more locations of electric vehicle recharging affairs for one or more electric vehicles by wireless electrical energy transfer affiliated at least in part with one or more dwelling associates of at least in part one or more dwelling related areas comprises:
  circuitry for processing status related intake related at least in part to charging rate capacity of wireless electrical energy transfer.

13. The system of claim 11, wherein the circuitry for processing status related intake from one or more locations of electric vehicle recharging affairs for one or more electric vehicles by wireless electrical energy transfer affiliated at least in part with one or more dwelling associates of at least in part one or more dwelling related areas comprises:
  circuitry for processing status related intake related at least in part to one or more electricity load share capacity schedules.

14. The system of claim 11, wherein the circuitry for processing status related intake from one or more locations of electric vehicle recharging affairs for one or more electric vehicles by wireless electrical energy transfer affiliated at least in part with one or more dwelling associates of at least in part one or more dwelling related areas comprises:
  circuitry for processing status related intake related at least in part to cost information for priority handling of wireless electrical energy transfer for the one or more electric vehicles.

15. The system of claim 11, wherein the circuitry for processing status related intake from one or more locations of electric vehicle recharging affairs for one or more electric vehicles by wireless electrical energy transfer affiliated at least in part with one or more dwelling associates of at least in part one or more dwelling related areas comprises:
  circuitry for processing status related intake related at least in part to one or more histories of electrical energy consumption by wireless electrical energy transfer.

16. The system of claim 11, wherein the circuitry for processing status related intake from one or more locations of electric vehicle recharging affairs for one or more electric vehicles by wireless electrical energy transfer affiliated at least in part with one or more dwelling associates of at least in part one or more dwelling related areas comprises:
  processing status related intake related at least in part to one or more dwelling associate profile classifications.

17. The system of claim 11, wherein the circuitry for processing status related intake from one or more locations of electric vehicle recharging affairs for one or more electric vehicles by wireless electrical energy transfer affiliated at least in part with one or more dwelling associates of at least in part one or more dwelling related areas comprises:
  circuitry for processing status related intake related at least in part to electrical energy use of associated one or more local grid electrical energy provider resources for other than charging of the one or more electric vehicles.

18. The system of claim 1, wherein the circuitry for electronically monitoring operational aspects at least in part affecting influence between the one or more electric vehicles and one or more dwelling associates of at least in part the one or more dwelling related areas comprises:
  circuitry for processing status related intake involving at least in part forecast related information at least in part in electronic form.

19. The system of claim 18, wherein the circuitry for processing status related intake involving at least in part forecast related information at least in part in electronic form comprises:
  circuitry for processing status related intake involving at least in part household budgeting of the one or more dwelling associates.

20. The system of claim 18, wherein the circuitry for processing status related intake involving at least in part forecast related information at least in part in electronic form comprises:
  circuitry for processing status related intake involving at least in part group objectives of the one or more dwelling associates.

21. The system of claim 18, wherein the circuitry for processing status related intake involving at least in part forecast related information at least in part in electronic form comprises:

circuitry for processing status related intake involving at least in part dwelling associate input to one or more social networking systems.

22. The system of claim 18, wherein the circuitry for processing status related intake involving at least in part forecast related information at least in part in electronic form comprises:
circuitry for processing status related intake involving at least in part one or more tax strategies of the one or more dwelling associates.

23. The system of claim 18, wherein the circuitry for processing status related intake involving at least in part forecast related information at least in part in electronic form comprises:
processing status related intake involving at least in part access to one or more scheduling programs of the one or more dwelling associates.

24. The system of claim 18, wherein the circuitry for processing status related intake involving at least in part forecast related information at least in part in electronic form comprises:
circuitry for circuitry for processing status related intake involving at least in part electronic monitoring of one or more phone conversations of the one or more dwelling associates.

25. The system of claim 18, wherein the circuitry for processing status related intake involving at least in part forecast related information at least in part in electronic form comprises:
processing status related intake involving at least in part access to one or more electronic vehicle maintenance logs associated with use of the one or more electric vehicles by the one or more dwelling associates.

26. The system of claim 18, wherein the circuitry for processing status related intake involving at least in part forecast related information at least in part in electronic form comprises:
circuitry for processing status related intake involving at least in part one or more electronic queries of historical records regarding electric vehicle use by the one or more dwelling associates.

27. The system of claim 1, wherein the circuitry for electronically processing status related intake associated at least in part with one or more electric vehicle recharging affairs for one or more electric vehicles by wireless electrical energy transfer affiliated at least in part with one or more dwelling associates of at least in part one or more dwelling related areas comprises:
circuitry for monitoring operational aspects regarding at least in part one or more electric vehicles related at least in part to commuting aspects of the one or more dwelling associates.

28. The system of claim 27, wherein the circuitry for monitoring operational aspects regarding at least in part one or more electric vehicles related at least in part to commuting aspects of the one or more dwelling associates comprises:
circuitry for monitoring operational aspects regarding at least in part the one or more dwelling associate drivers of the one or more electric vehicles.

29. The system of claim 27, wherein the circuitry for monitoring operational aspects regarding at least in part one or more electric vehicles related at least in part to commuting aspects of the one or more dwelling associates comprises:
circuitry for monitoring operational aspects regarding at least in part one or more ride-sharing plans of the one or more dwelling associates.

30. The system of claim 27, wherein the circuitry for monitoring operational aspects regarding at least in part one or more electric vehicles related at least in part to commuting aspects of the one or more dwelling associates comprises:
circuitry for monitoring operational aspects regarding at least in part one or more priorities distributed among the one or more dwelling associates for use of the one or more electric vehicles.

31. The system of claim 27, wherein the circuitry for monitoring operational aspects regarding at least in part one or more electric vehicles related at least in part to commuting aspects of the one or more dwelling associates comprises:
circuitry for monitoring operational aspects associated with one or more prioritized tasks of one or more work schedules of the one or more dwelling associates.

32. The system of claim 27, wherein the circuitry for monitoring operational aspects regarding at least in part one or more electric vehicles related at least in part to commuting aspects of the one or more dwelling associates comprises:
circuitry for monitoring operational aspects regarding at least in part planned number of one or more dwelling associates as electric vehicle occupants to use the one or more electric vehicles before the one or more electric vehicles receive electrical energy storage charging.

33. The system of claim 1, wherein the circuitry for electronically processing status related intake associated at least in part with one or more electric vehicle recharging affairs for one or more electric vehicles by wireless electrical energy transfer affiliated at least in part with one or more dwelling associates of at least in part one or more dwelling related areas comprises:
circuitry for monitoring operational aspects regarding at least in part features of the one or more electric vehicles indicated as of concern by the one or more dwelling associates.

34. The system of claim 33, wherein the circuitry for monitoring operational aspects regarding at least in part features of the one or more electric vehicles indicated as of concern by the one or more dwelling associates comprises:
circuitry for monitoring operational aspects involving at least in part electric vehicle feature information regarding at least in part fueling capacity of the one or more electric vehicles as one or more hybrid electric vehicles.

35. The system of claim 33, wherein the circuitry for monitoring operational aspects regarding at least in part features of the one or more electric vehicles indicated as of concern by the one or more dwelling associates comprises:
circuitry for monitoring operational aspects involving at least in part electric vehicle feature information regarding at least in part the one or more electric vehicles including one or more wireless electrical energy transfer devices to receive electrical energy storage charging involving at least in part highly resonant inductive wireless power transfer.

36. The system of claim 33, wherein the circuitry for monitoring operational aspects regarding at least in part features of the one or more electric vehicles indicated as of concern by the one or more dwelling associates comprises:

circuitry for monitoring operational aspects regarding at least in part one or more dwelling associate preferences of location for energy transfer to the one or more electric vehicles.

37. The system of claim 36, wherein the circuitry for monitoring operational aspects regarding at least in part one or more dwelling associate preferences of location for energy transfer to the one or more electric vehicles comprises:
circuitry for monitoring operational aspects involving at least in part one or more dwelling associate preferences of location for electrical energy storage charging of the one or more electric vehicles at one or more locations of vocational employ of the one or more dwelling associates.

38. The system of claim 36, wherein the circuitry for monitoring operational aspects regarding at least in part one or more dwelling associate preferences of location for energy transfer to the one or more electric vehicles comprises:
circuitry for monitoring operational aspects involving at least in part one or more dwelling associate preferences of location for electrical charging of the one or more electric vehicles at one or more garage locations for housing the one or more electric vehicles.

39. The system of claim 36, wherein the circuitry for monitoring operational aspects regarding at least in part one or more dwelling associate preferences of location for energy transfer to the one or more electric vehicles comprises:
circuitry for monitoring operational aspects involving at least in part one or more dwelling associate preferences of location for electrical charging of the one or more electric vehicles at one or more parking garage locations for parking the one or more electric vehicles.

40. The system of claim 1, wherein the circuitry for electronically ascertaining dwelling related wireless recharging guidance for recharging of the one or more electric vehicles by the wireless electrical energy transfer affiliated at least in part with the one or more dwelling associates of at least in part the one or more dwelling related areas based at least in part upon at least a portion of the status related intake associated at least in part with the one or more electric vehicle recharging affairs for one or more electric vehicles by wireless electrical energy transfer affiliated at least in part with the one or more dwelling associates of at least in part the one or more dwelling related areas and based at least in part upon at least a portion of the operational aspects at least in part affecting influence between the one or more electric vehicles and the one or more dwelling associates of at least in part the one or more dwelling related areas comprises:
circuitry for ascertaining dwelling related wireless recharging guidance involving at least in part one or more locations of wireless electrical energy transfer.

41. The system of claim 40, wherein the circuitry for ascertaining dwelling related wireless recharging guidance involving at least in part one or more locations of wireless electrical energy transfer comprises:
circuitry for ascertaining dwelling related wireless recharging guidance involving at least in part one or more electric vehicles present at one or more dwelling locations of wireless electrical energy transfer.

* * * * *